US012651309B2

(12) United States Patent
Liktor et al.

(10) Patent No.: US 12,651,309 B2
(45) Date of Patent: Jun. 9, 2026

(54) SAMPLING ACROSS MULTIPLE VIEWS IN SUPERSAMPLING OPERATION

(71) Applicant: Intel Corporation, Santa Clara, CA (US)

(72) Inventors: Gabor Liktor, San Francisco, CA (US); Karthik Vaidyanathan, San Francisco, CA (US); Tobias Zirr, Karlsruhe (DE)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 17/980,492

(22) Filed: Nov. 3, 2022

(65) Prior Publication Data

US 2023/0146259 A1     May 11, 2023

Related U.S. Application Data

(60) Provisional application No. 63/276,276, filed on Nov. 5, 2021.

(51) Int. Cl.
G06T 3/4046     (2024.01)
G06T 3/18     (2024.01)
(Continued)

(52) U.S. Cl.
CPC .............. G06T 3/4046 (2013.01); G06T 3/18 (2024.01); G06T 3/4053 (2013.01); H04N 13/271 (2018.05)

(58) Field of Classification Search
CPC ....... G06T 3/4046; G06T 3/18; G06T 3/4053; H04N 13/271; H04N 2013/0085; H04N 13/106; H04N 13/239; H04N 2013/0081
(Continued)

(56) References Cited

U.S. PATENT DOCUMENTS 6,111,582 A * 8/2000 Jenkins ................... G06T 15/20
345/422
10,540,818 B2 * 1/2020 Akeley ................. G06T 19/006
(Continued)

OTHER PUBLICATIONS

S.-P. Lu, S.-M. Li, R. Wang, G. Lafruit, M.-M. Cheng and A. Munteanu, "Low-Rank Constrained Super-Resolution for Mixed-Resolution Multiview Video," in IEEE Transactions on Image Processing, vol. 30, pp. 1072-1085, 2021 (Year: 2021).*
(Continued)

*Primary Examiner* — Kathleen Y Dulaney
(74) *Attorney, Agent, or Firm* — JAFFERY WATSON HAMMILTON & DESANCTIS LLP

(57) ABSTRACT

Sampling across multiple views in supersampling operation is described. An example of an apparatus includes one or more processing resources configured to perform a supersampling operation for image data generated for multiple views utilizing one or more neural networks, the processing resources including at least a first circuitry to process a first current frame including first image data for a first view, and a second circuitry to process a second current frame including second image data for a second view, the first view and second view being displaced from each other, the processing resources to receive for processing the first current frame and the second current frame, and perform supersampling processing utilizing the one or more neural networks based on at least the first current frame and the second current frame and one or more prior generated frames for each of the views.

17 Claims, 75 Drawing Sheets

PROCESSING OF MULTIPLE VIEWS FOR SUPERSAMPLING — 5200

Render Images of Scene at Each of Set of Multiple Cameras/ Viewpoints — 5205

Apply Jitter Pattern(s) to the Cameras for Each of the Multiple Viewpoints — 5210

Generate Disparity Data Between Views of the Multiple Viewpoints — 5215

Generate Velocity Data For Each View of the Multiple Viewpoints — 5220

Reproject Frames Based on Current Frames for Each View and the Disparity Data — 5225

For Image Rendering at Less than Target Resolution, Receive Velocity, Current Frame, and Reprojected Frame for Each View for Upsampling to Target Resolution — 5230

Receive Prior Frame for Each View and Warp Prior Frame Based on the Generated Velocity Data — 5235

Apply Supersampling For Each View at Neural Network(s) Based on the Current Frame, the Reprojected Frame, and the Warped Prior Frame — 5240

Present Output Frames to Post Processing of the Imaging Data — 5245

(51) Int. Cl.
 *G06T 3/4053* (2024.01)
 *H04N 13/271* (2018.01)
(58) Field of Classification Search
 USPC .......................................... 382/229, 154, 254
 See application file for complete search history.

(56) References Cited

U.S. PATENT DOCUMENTS

| | | | | | |
|---|---|---|---|---|---|
| 11,094,137 | B2 * | 8/2021 | Gausebeck | ............. | G06T 19/20 |
| 11,503,266 | B2 * | 11/2022 | Vyas | ......................... | G06T 7/593 |
| 11,644,685 | B2 * | 5/2023 | Patney | ................. | H04N 19/597 |
| | | | | | 382/154 |
| 2005/0001844 | A1 * | 1/2005 | Naegle | .................. | G06T 15/503 |
| | | | | | 345/505 |
| 2005/0100207 | A1 * | 5/2005 | Konolige | ................. | G06T 7/593 |
| | | | | | 348/E13.064 |
| 2012/0002866 | A1 * | 1/2012 | Hirschmueller | ........ | G06T 7/593 |
| | | | | | 382/154 |
| 2013/0163880 | A1 * | 6/2013 | Cheng | .................... | H04N 19/56 |
| | | | | | 382/209 |
| 2013/0322544 | A1 * | 12/2013 | Horlander | ............ | H04N 13/161 |
| | | | | | 375/240.16 |
| 2014/0125762 | A1 * | 5/2014 | Tsukagoshi | ........ | H04N 21/2365 |
| | | | | | 348/43 |
| 2014/0146201 | A1 * | 5/2014 | Knight | ............... | G02B 27/0075 |
| | | | | | 348/222.1 |
| 2018/0309969 | A1 * | 10/2018 | Schluessler | ............ | H04N 5/911 |
| 2019/0045168 | A1 * | 2/2019 | Chaudhuri | ............ | G06T 3/4053 |
| 2019/0311228 | A1 * | 10/2019 | Zhao | ...................... | G06T 7/0014 |
| 2020/0014904 | A1 * | 1/2020 | Wetzstein | ............. | G06T 7/0002 |
| 2020/0193566 | A1 * | 6/2020 | Croxford | .............. | G06T 3/4053 |
| 2020/0294194 | A1 * | 9/2020 | Sun | ........................... | G06T 7/30 |
| 2020/0394759 | A1 * | 12/2020 | Luo | ........................... | G06T 5/60 |
| 2021/0073944 | A1 * | 3/2021 | Liu | ............................ | G06T 5/70 |
| 2021/0192826 | A1 * | 6/2021 | Douglas | ................. | G09G 5/391 |
| 2021/0281813 | A1 * | 9/2021 | Vyas | ......................... | G06T 5/50 |
| 2021/0366082 | A1 * | 11/2021 | Xiao | ........................ | G06T 11/00 |
| 2022/0014723 | A1 * | 1/2022 | Pandey | .................... | G06T 5/60 |
| 2022/0130013 | A1 * | 4/2022 | Pottorff | ................. | G06T 3/4053 |
| 2022/0156886 | A1 * | 5/2022 | Petrangeli | ........... | G06N 3/0464 |
| 2022/0382056 | A1 * | 12/2022 | Price | ................... | H04N 25/441 |
| 2023/0095092 | A1 * | 3/2023 | Xiao | ........................ | G06T 5/70 |
| | | | | | 382/254 |

OTHER PUBLICATIONS

P. Bhattacharya and U. Zölzer, "A Convolutional Neural Network with Two-Channel Input for Image Super-Resolution," 2019 International Joint Conference on Neural Networks (IJCNN), Budapest, Hungary, 2019, pp. 1-7. (Year: 2019).*

H.-J. Kim, J.-W. Kang and B.-U. Lee, "Super-resolution of Multi-view ERP 360-Degree Images with Two-Stage Disparity Refinement," 2020 Asia-Pacific Signal and Information Processing Association Annual Summit and Conference (APSIPA ASC), Auckland, New Zealand, 2020, pp. 1283-1286. (Year: 2020).*

* cited by examiner

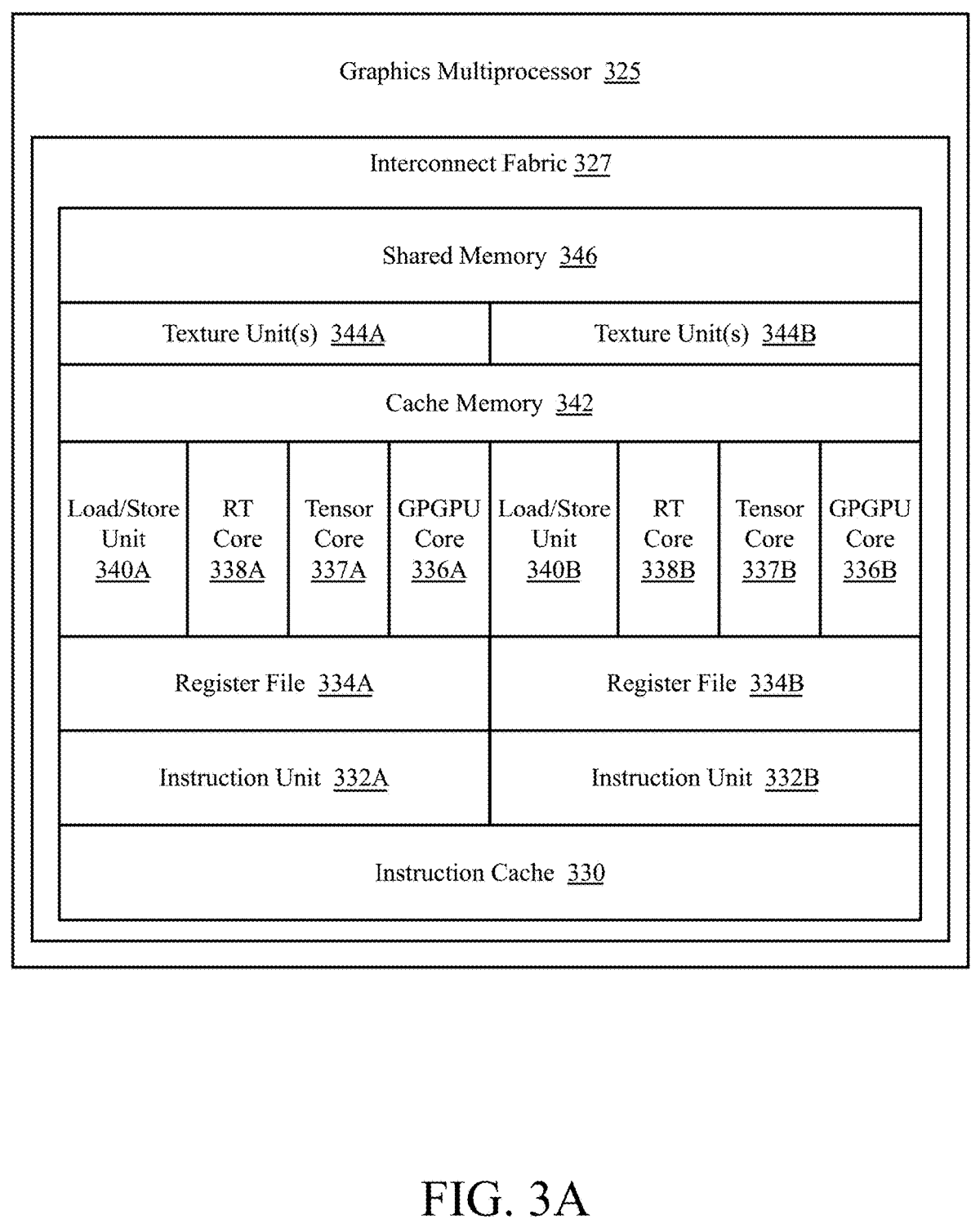

Graphics Multiprocessor  325

Interconnect Fabric 327

Shared Memory  346

| Texture Unit(s)  344A | Texture Unit(s)  344B |
|---|---|

Cache Memory  342

| Load/Store Unit 340A | RT Core 338A | Tensor Core 337A | GPGPU Core 336A | Load/Store Unit 340B | RT Core 338B | Tensor Core 337B | GPGPU Core 336B |
|---|---|---|---|---|---|---|---|

| Register File  334A | Register File  334B |
|---|---|

| Instruction Unit  332A | Instruction Unit  332B |
|---|---|

Instruction Cache  330

FIG. 3A

Figure 3B:
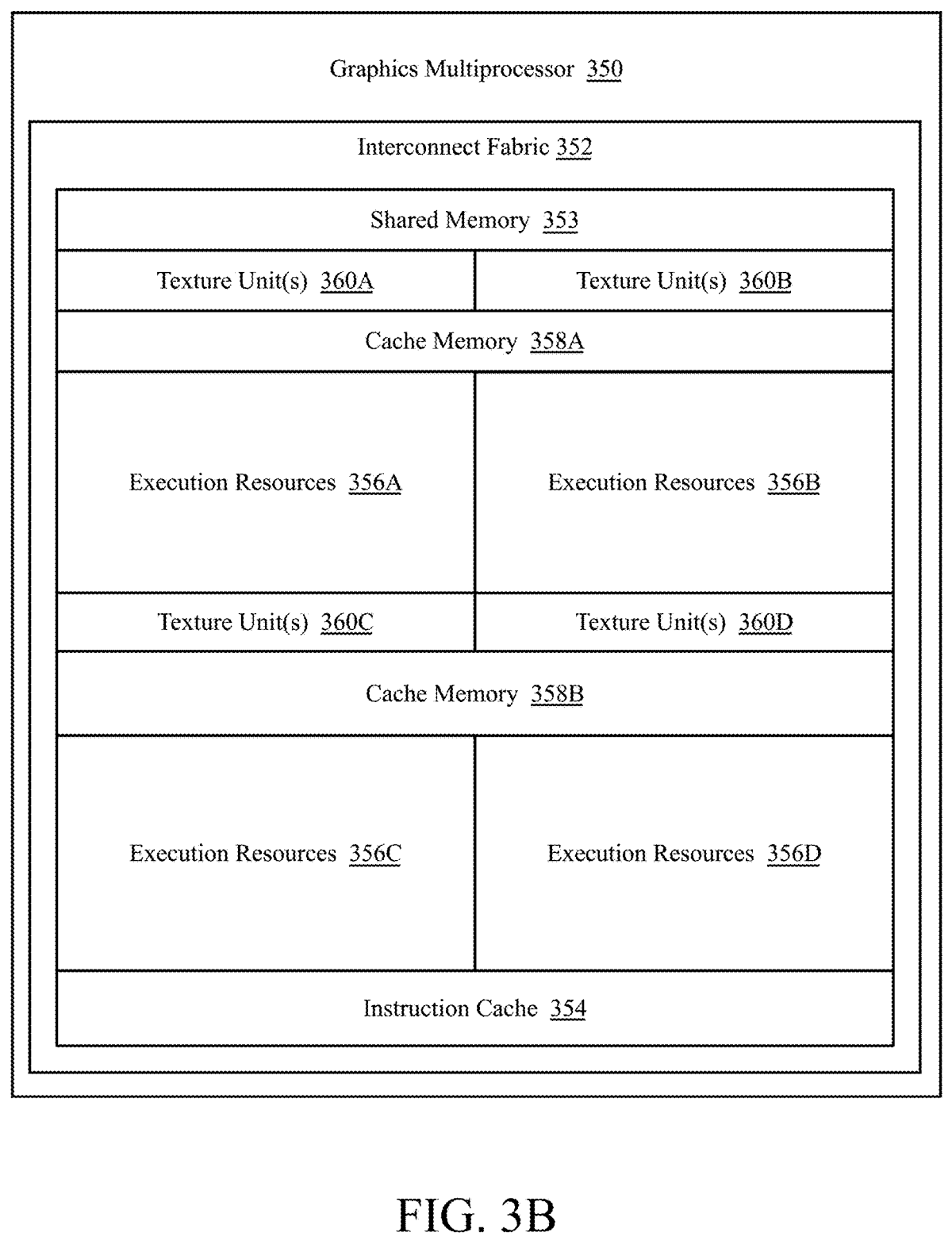

Graphics Multiprocessor  350

Interconnect Fabric 352

Shared Memory  353

| Texture Unit(s)  360A | Texture Unit(s)  360B |
|---|---|

Cache Memory  358A

| Execution Resources  356A | Execution Resources  356B |
|---|---|

| Texture Unit(s)  360C | Texture Unit(s)  360D |
|---|---|

Cache Memory  358B

| Execution Resources  356C | Execution Resources  356D |
|---|---|

Instruction Cache  354

Machine Learning Application
602

Machine Learning Framework
604

Compute Framework
606

GPGPU Driver
608

GPGPU Hardware
610

RGB
Components

Convolutional
Layers

Fully Connected
Layers

Input to Convolutional
Layer
912

Convolutional Layer
914

Convolution Stage
916

Detector Stage
918

Pooling Stage
920

Next layer
922

1300

| MEDIA PROCESSOR 1302 | VISION PROCESSOR 1304 |
|---|---|
| ON-CHIP MEMORY 1305 | |
| GPGPU 1306 | MULTI-CORE PROCESSOR 1308 |

GEOMETRY & FIXED FUNCTION PIPELINE 1531

GRAPHICS SOC INTERFACE 1532

GRAPHICS MICROCONTROLLER 1533

MEDIA PIPELINE 1534

1521A

EU ARRAY 1522A | TD/IC 1523A | MEDIA SAMPLER 1526A
EU ARRAY 1524A | 3D SAMPLER 1525A | SHADER PROCESSOR 1527A
| | SLM 1528A

1521B

EU ARRAY 1522B | TD/IC 1523B | MEDIA SAMPLER 1526B
EU ARRAY 1524B | 3D SAMPLER 1525B | SHADER PROCESSOR 1527B
| | SLM 1528B

1521C

EU ARRAY 1522C | TD/IC 1523C | MEDIA SAMPLER 1526C
EU ARRAY 1524C | 3D SAMPLER 1525C | SHADER PROCESSOR 1527C
| | SLM 1528C

SHARED FUNCTION LOGIC 1535

SHARED MEMORY/ CACHE MEMORY 1536

GEOMETRY & FIXED FUNCTION PIPELINE 1537

ADDITIONAL FIXED FUNCTION LOGIC 1538

1521D

EU ARRAY 1522D | TD/IC 1523D | MEDIA SAMPLER 1526D
EU ARRAY 1524D | 3D SAMPLER 1525D | SHADER PROCESSOR 1527D
| | SLM 1528D

1521E

EU ARRAY 1522E | TD/IC 1523E | MEDIA SAMPLER 1526E
EU ARRAY 1524E | 3D SAMPLER 1525E | SHADER PROCESSOR 1527E
| | SLM 1528E

1521F

EU ARRAY 1522F | TD/IC 1523F | MEDIA SAMPLER 1526F
EU ARRAY 1524F | 3D SAMPLER 1525F | SHADER PROCESSOR 1527F
| | SLM 1528F

FIG. 15B

GRAPHICS PROCESSOR COMMAND FORMAT
2200

| CLIENT 2202 | OPCODE 2204 | SUB-OPCODE 2205 | DATA 2206 | COMMAND SIZE 2208 |
|---|---|---|---|---|

GRAPHICS PROCESSOR COMMAND SEQUENCE
2210

DATA PROCESSING SYSTEM - 2300

Figure 24A:
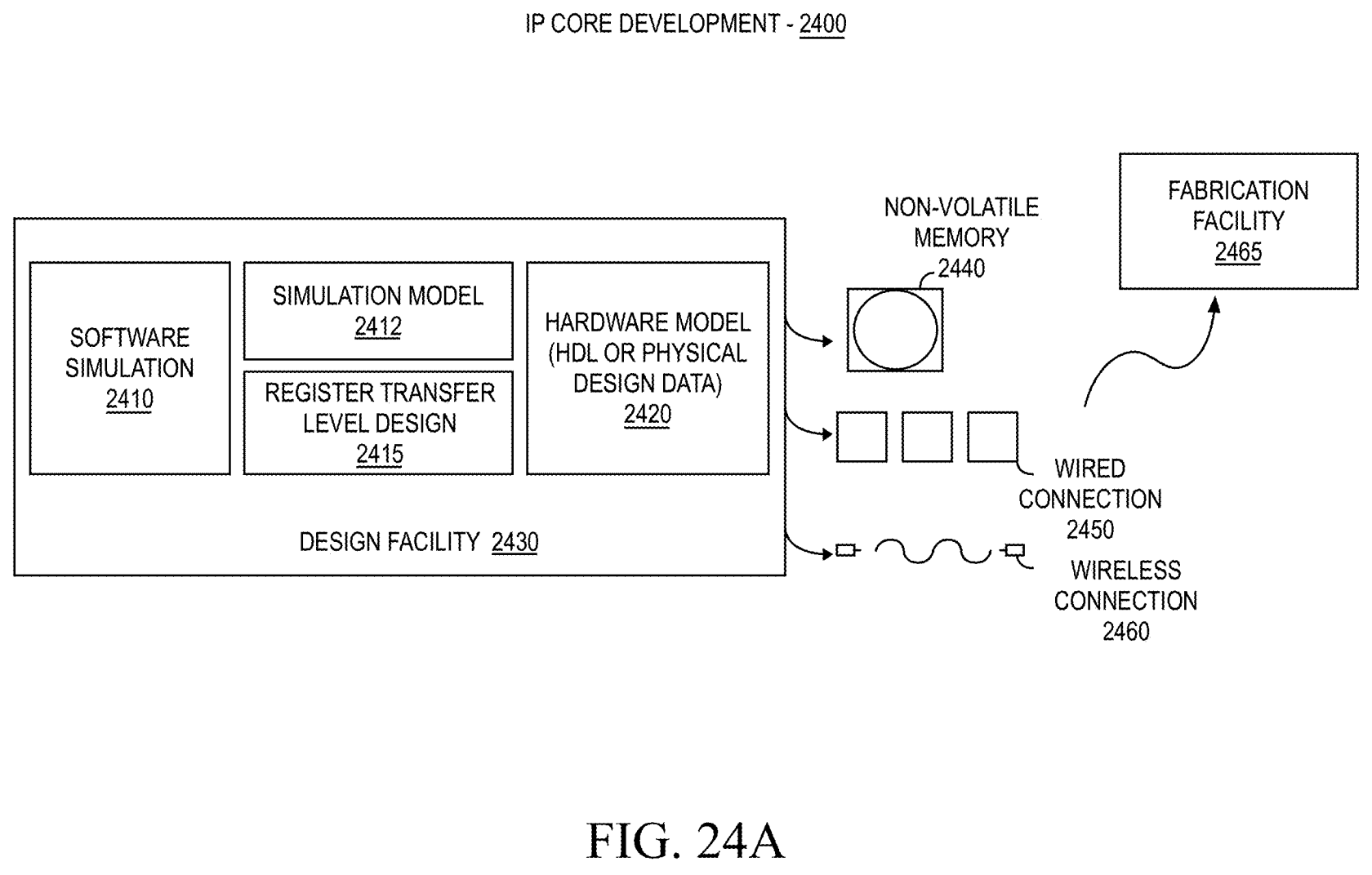

IP CORE DEVELOPMENT - 2400

FABRICATION FACILITY 2465

NON-VOLATILE MEMORY 2440

WIRED CONNECTION 2450

WIRELESS CONNECTION 2460

DESIGN FACILITY 2430

SOFTWARE SIMULATION 2410

SIMULATION MODEL 2412

REGISTER TRANSFER LEVEL DESIGN 2415

HARDWARE MODEL (HDL OR PHYSICAL DESIGN DATA) 2420

Interchangeable Chiplets
2495

Base Chiplet
2496

Bridge
Interconnect
2497

Base Chiplet
2498

SOC
INTEGRATED CIRCUIT
2500

APPLICATION
PROCESSOR(s)
2505

GRAPHICS
PROCESSOR
2510

IMAGE
PROCESSOR
2515

VIDEO
PROCESSOR
2520

USB
2525

UART
2530

SPI/SDIO
2535

$I^2S/I^2C$
2540

DISPLAY
2545

SECURITY
ENGINE
2570

MEMORY
2565

FLASH
2560

MIPI
2555

HDMI
2550

GRAPHICS PROCESSOR
2610

VERTEX PROCESSOR
2605

FRAGMENT
PROCESSOR
2615A

FRAGMENT
PROCESSOR
2615C

FRAGMENT
PROCESSOR
2615N-1

FRAGMENT
PROCESSOR
2615B

FRAGMENT
PROCESSOR
2615D

FRAGMENT
PROCESSOR
2615N

MMU
2620A

MMU
2620B

CACHE
2625A

CACHE
2625B

INTERCONNECT
2630A

INTERCONNECT
2630B

GRAPHICS PROCESSOR
2640

INTER-CORE TASK-MANAGER
(e.g., THREAD DISPATCHER)
2645

| SHADER CORE 2655A | SHADER CORE 2655C | SHADER CORE 2655E | – – | SHADER CORE 2655N-1 |
| SHADER CORE 2655B | SHADER CORE 2655D | SHADER CORE 2655F | – – | SHADER CORE 2655N |

TILING UNIT
2658

| MMU 2620A | MMU 2620B |
| CACHE 2625A | CACHE 2625B |
| INTERCONNECT 2630A | INTERCONNECT 2630B |

4102 — History (Previous Output)

4104 — Velocity (Motion Vectors)

4106 — Current Frame

4107 — Jitter Offset

Input Block — 4108

FP16

FP16

Encoder Block 1

Encoder Block 2

Encoder Block 3 — 4112

...

Encoder Block N

Latent Representation — 4114

Decoder Block N

...

Decoder Block 3

Decoder Block 2 — 4116

Decoder Block 1

Feature Extraction Network 4110

INT8

Output Block (INT8/FP16)

4120

4400

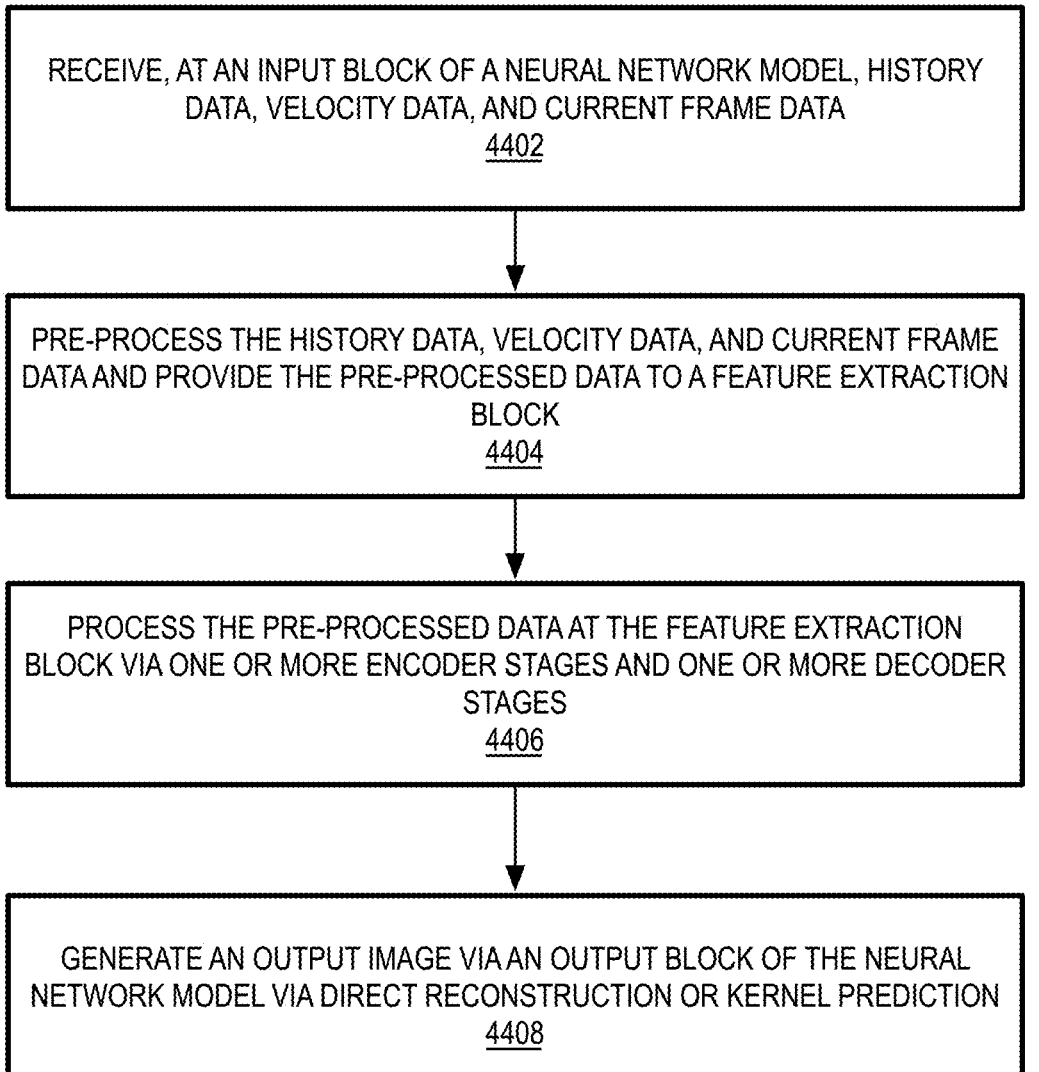

RECEIVE, AT AN INPUT BLOCK OF A NEURAL NETWORK MODEL, HISTORY DATA, VELOCITY DATA, AND CURRENT FRAME DATA
4402

PRE-PROCESS THE HISTORY DATA, VELOCITY DATA, AND CURRENT FRAME DATA AND PROVIDE THE PRE-PROCESSED DATA TO A FEATURE EXTRACTION BLOCK
4404

PROCESS THE PRE-PROCESSED DATA AT THE FEATURE EXTRACTION BLOCK VIA ONE OR MORE ENCODER STAGES AND ONE OR MORE DECODER STAGES
4406

GENERATE AN OUTPUT IMAGE VIA AN OUTPUT BLOCK OF THE NEURAL NETWORK MODEL VIA DIRECT RECONSTRUCTION OR KERNEL PREDICTION
4408

FIG. 44

SUPERSAMPLING ACROSS
MULTIPLE VIEWS

4700

4715

4710

Right
Camera
4725

Left
Camera
4720

STEREO VIEWS

APPLICATION OF VARYING JITTER PATTERNS FOR MULTIPLE VIEWS

4800

SCENE

SECOND VIEW 4825

FIRST VIEW 4820

Second Jitter Pattern 4835

First Jitter Pattern 4830

PROCESSING OF MULTIPLE VIEWS FOR
SUPERSAMPLING

SAMPLING ACROSS MULTIPLE VIEWS IN SUPERSAMPLING OPERATION

CLAIM TO PRIORITY

This application claims priority to U.S. Provisional Application Ser. No. 63/276,276, entitled SAMPLING ACROSS MULTIPLE VIEWS IN SUPERSAMPLING OPERATION, by Gabor Liktor, et al., filed Nov. 5, 2021, the entire contents of which are incorporated herein by reference.

FIELD

This disclosure relates generally to sampling across multiple views in supersampling operation.

BACKGROUND OF THE DISCLOSURE

Temporal Anti-aliasing (TAA) is an anti-aliasing technique in which the renderer jitters the camera every frame to sample different coordinates in screen space. The TAA stage accumulates these samples temporally to produce a supersampled image. The previously accumulated frame is warped using renderer generated velocity/motion vectors to align it with the current frame before accumulation. Although TAA is a widely used technique to generate temporally stable anti-aliased image, the warped sample history can be mismatched to the current pixel due to frame-to-frame changes in visibility and shading or errors in the motion vectors. This typically results in ghosting artifacts around moving object boundary.

BRIEF DESCRIPTION OF THE DRAWINGS

The present invention is illustrated by way of example and not limitation in the figures of the accompanying drawings in which like references indicate similar elements, and in which:

FIG. 3A-3C are block diagrams of graphics multiprocessors and multiprocessor-based GPUs;

FIG. 13 illustrates an exemplary inferencing system on a chip (SOC) suitable for performing inferencing using a trained model;

FIG. 15A-15C illustrate computing systems and graphics processors;

FIG. 24A is a block diagram illustrating an IP core development system;

FIG. 34 shows a scalable sparse matrix multiply accelerator using systolic arrays with feedback inputs and outputs on each stage;

FIG. 44 illustrates a method to perform temporally amortized supersampling;

DETAILED DESCRIPTION

Figure 1:
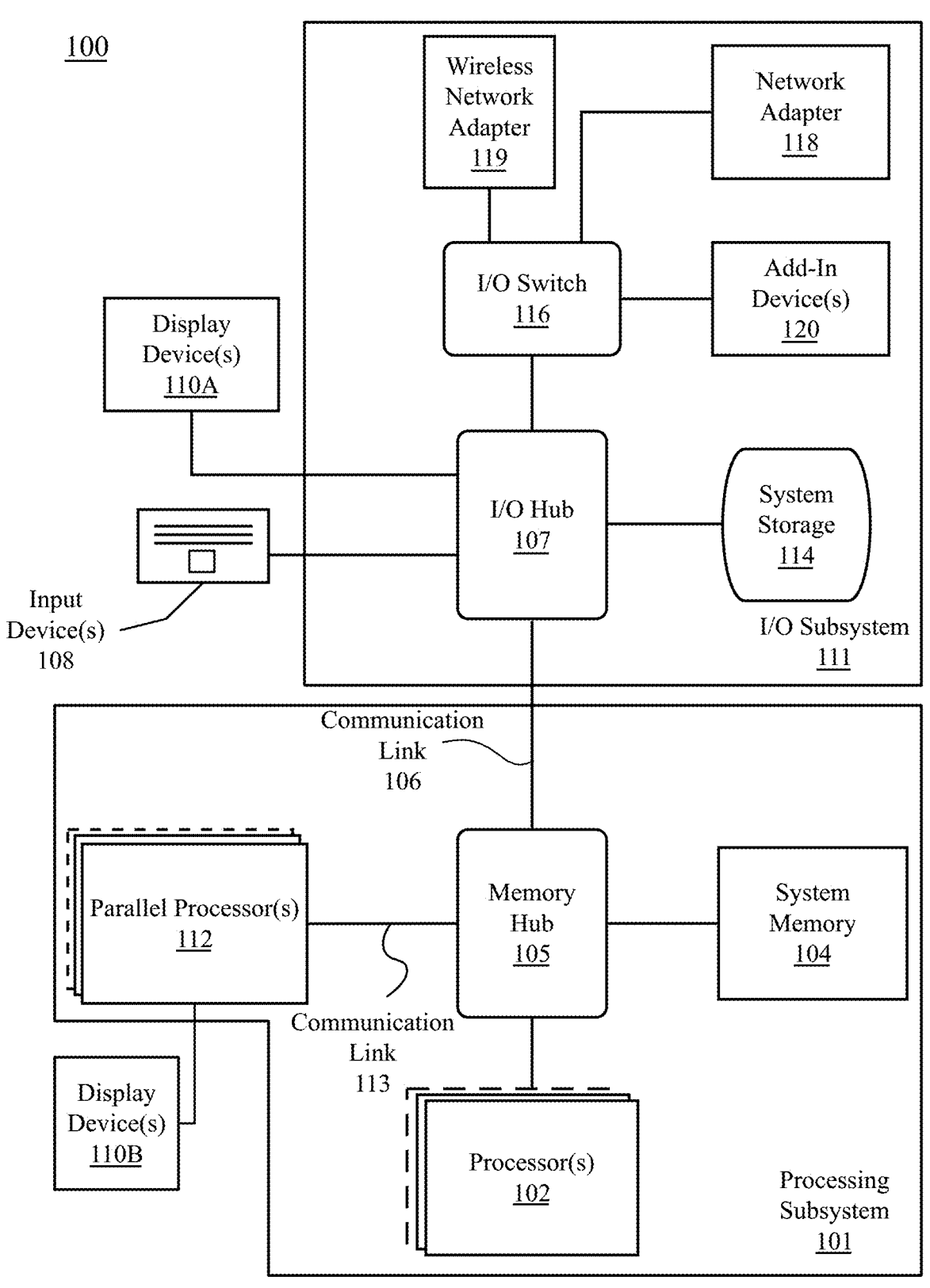
FIG. 1 is a block diagram illustrating a computer system configured to implement one or more aspects of the embodiments described herein.

A graphics processing unit (GPU) is communicatively coupled to host/processor cores to accelerate, for example, graphics operations, machine-learning operations, pattern analysis operations, and/or various general-purpose GPU (GPGPU) functions. The GPU may be communicatively coupled to the host processor/cores over a bus or another interconnect (e.g., a high-speed interconnect such as PCIe or NVLink). Alternatively, the GPU may be integrated on the same package or chip as the cores and communicatively coupled to the cores over an internal processor bus/interconnect (i.e., internal to the package or chip). Regardless of the manner in which the GPU is connected, the processor cores may allocate work to the GPU in the form of sequences of commands/instructions contained in a work descriptor. The GPU then uses dedicated circuitry/logic for efficiently processing these commands/instructions.

Current parallel graphics data processing includes systems and methods developed to perform specific operations on graphics data such as, for example, linear interpolation, tessellation, rasterization, texture mapping, depth testing, etc. Traditionally, graphics processors used fixed function computational units to process graphics data. However, more recently, portions of graphics processors have been made programmable, enabling such processors to support a wider variety of operations for processing vertex and fragment data.

To further increase performance, graphics processors typically implement processing techniques such as pipelining that attempt to process, in parallel, as much graphics data as possible throughout the different parts of the graphics pipeline. Parallel graphics processors with single instruction, multiple thread (SIMT) architectures are designed to maximize the amount of parallel processing in the graphics pipeline. In a SIMT architecture, groups of parallel threads attempt to execute program instructions synchronously together as often as possible to increase processing efficiency. A general overview of software and hardware for SIMT architectures can be found in Shane Cook, *CUDA Programming* Chapter 3, pages 37-51 (2013).

Temporal upsampling can be combined with TAA to upscale spatial resolution at the same time so that frames are rendered at lower spatial resolution to save render time. Post-process stages after the temporal anti-aliasing upsampling can then run at target display resolution. This allows the creation of sharper images than can be created using spatial-only upscaling techniques and effectively reduces render time than when rendering frames at native display resolution.

Supersampling may utilize history (temporal) elements by combining a current frame and a past frame. However, there may also be multiple camera views available as well in stereo imaging or other imaging that utilizes multiple viewpoints in rendering. An existing supersampling concept does not utilize of additional available information related to spatial differences when there are multiple camera views available.

In some embodiments, supersampling further utilizes image data with across multiple views, which may include, for example, stereo views. Supersampling across multiple views allows for application of additional data in sampling to improve results.

In the following description, numerous specific details are set forth to provide a more thorough understanding. However, it will be apparent to one of skill in the art that the embodiments described herein may be practiced without one or more of these specific details. In other instances, well-known features have not been described to avoid obscuring the details of the present embodiments.

System Overview

FIG. 1 is a block diagram illustrating a computing system 100 configured to implement one or more aspects of the embodiments described herein. The computing system 100 includes a processing subsystem 101 having one or more processor(s) 102 and a system memory 104 communicating via an interconnection path that may include a memory hub 105. The memory hub 105 may be a separate component within a chipset component or may be integrated within the one or more processor(s) 102. The memory hub 105 couples with an I/O subsystem 111 via a communication link 106. The I/O subsystem 111 includes an I/O hub 107 that can enable the computing system 100 to receive input from one or more input device(s) 108. Additionally, the I/O hub 107 can enable a display controller, which may be included in the one or more processor(s) 102, to provide outputs to one or more display device(s) 110A. In one embodiment the one or more display device(s) 110A coupled with the I/O hub 107 can include a local, internal, or embedded display device.

The processing subsystem 101, for example, includes one or more parallel processor(s) 112 coupled to memory hub 105 via a bus or other communication link 113. The communication link 113 may be one of any number of standards-based communication link technologies or protocols, such as, but not limited to PCI Express, or may be a vendor specific communications interface or communications fabric. The one or more parallel processor(s) 112 may form a computationally focused parallel or vector processing system that can include a large number of processing cores and/or processing clusters, such as a many integrated core (MIC) processor. For example, the one or more parallel processor(s) 112 form a graphics processing subsystem that can output pixels to one of the one or more display device(s) 110A coupled via the I/O hub 107. The one or more parallel processor(s) 112 can also include a display controller and display interface (not shown) to enable a direct connection to one or more display device(s) 110B.

Within the I/O subsystem 111, a system storage unit 114 can connect to the I/O hub 107 to provide a storage mechanism for the computing system 100. An I/O switch 116 can be used to provide an interface mechanism to enable connections between the I/O hub 107 and other components, such as a network adapter 118 and/or wireless network adapter 119 that may be integrated into the platform, and various other devices that can be added via one or more add-in device(s) 120. The add-in device(s) 120 may also include, for example, one or more external graphics processor devices, graphics cards, and/or compute accelerators. The network adapter 118 can be an Ethernet adapter or another wired network adapter. The wireless network adapter 119 can include one or more of a Wi-Fi, Bluetooth, near field communication (NFC), or other network device that includes one or more wireless radios.

The computing system 100 can include other components not explicitly shown, including USB or other port connections, optical storage drives, video capture devices, and the like, which may also be connected to the I/O hub 107. Communication paths interconnecting the various components in FIG. 1 may be implemented using any suitable protocols, such as PCI (Peripheral Component Interconnect) based protocols (e.g., PCI-Express), or any other bus or point-to-point communication interfaces and/or protocol(s), such as the NVLink high-speed interconnect, Compute Express Link™ (CXL™) (e.g., CXL.mem), Infinity Fabric (IF), Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Intel QuickPath Interconnect (QPI), Intel Ultra Path Interconnect (UPI), Intel On-Chip System Fabric (IOSF), Omnipath, HyperTransport, Advanced Microcontroller Bus Architecture (AMBA) interconnect, OpenCAPI, Gen-Z, Cache Coherent Interconnect for Accelerators (CCIX), 3GPP Long Term Evolution (LTE) (4G), 3GPP 5G, and variations thereof, or wired or wireless interconnect protocols known in the art. In some examples, data can be copied or stored to virtualized storage nodes using a protocol such as non-volatile memory express (NVMe) over Fabrics (NVMe-oF) or NVMe.

The one or more parallel processor(s) 112 may incorporate circuitry optimized for graphics and video processing, including, for example, video output circuitry, and constitutes a graphics processing unit (GPU). Alternatively or additionally, the one or more parallel processor(s) 112 can incorporate circuitry optimized for general purpose processing, while preserving the underlying computational architecture, described in greater detail herein. Components of the computing system 100 may be integrated with one or more other system elements on a single integrated circuit. For example, the one or more parallel processor(s) 112, memory hub 105, processor(s) 102, and I/O hub 107 can be integrated into a system on chip (SoC) integrated circuit. Alternatively, the components of the computing system 100 can be integrated into a single package to form a system in package (SIP) configuration. In one embodiment at least a portion of the components of the computing system 100 can be integrated into a multi-chip module (MCM), which can be interconnected with other multi-chip modules into a modular computing system.

It will be appreciated that the computing system 100 shown herein is illustrative and that variations and modifications are possible. The connection topology, including the number and arrangement of bridges, the number of processor(s) 102, and the number of parallel processor(s) 112, may be modified as desired. For instance, system memory 104 can be connected to the processor(s) 102 directly rather than through a bridge, while other devices communicate with system memory 104 via the memory hub 105 and the processor(s) 102. In other alternative topologies, the parallel processor(s) 112 are connected to the I/O hub 107 or directly to one of the one or more processor(s) 102, rather than to the memory hub 105. In other embodiments, the I/O hub 107 and memory hub 105 may be integrated into a single chip. It is also possible that two or more sets of processor(s) 102 are attached via multiple sockets, which can couple with two or more instances of the parallel processor(s) 112.

Some of the particular components shown herein are optional and may not be included in all implementations of the computing system 100. For example, any number of add-in cards or peripherals may be supported, or some components may be eliminated. Furthermore, some architectures may use different terminology for components similar to those illustrated in FIG. 1. For example, the memory hub 105 may be referred to as a Northbridge in some architectures, while the I/O hub 107 may be referred to as a Southbridge.

Figure 2A:
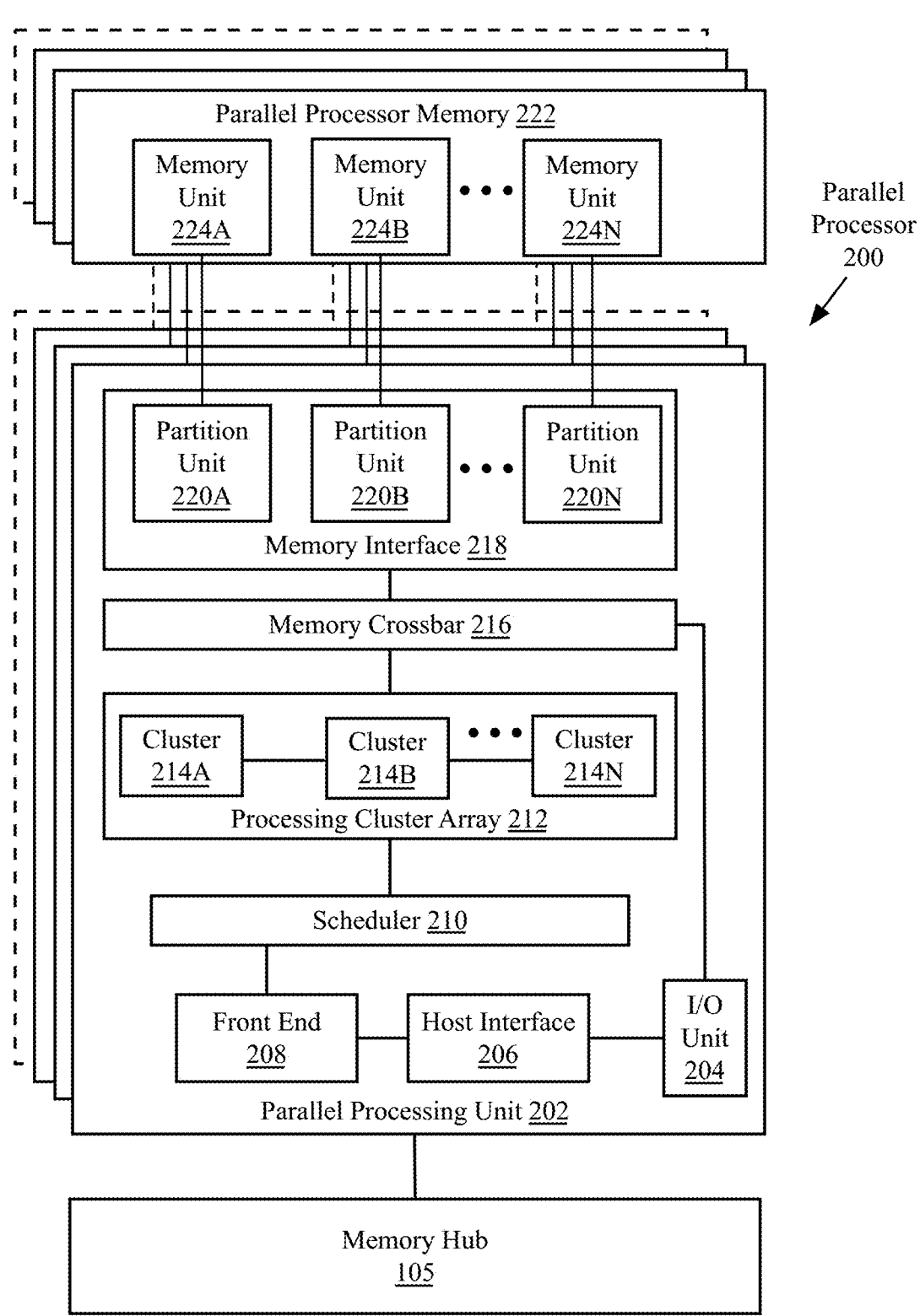
FIG. 2A-2D illustrate parallel processor components.

FIG. 2A illustrates a parallel processor 200. The parallel processor 200 may be a GPU, GPGPU or the like as described herein. The various components of the parallel processor 200 may be implemented using one or more integrated circuit devices, such as programmable processors, application specific integrated circuits (ASICs), or field programmable gate arrays (FPGA). The illustrated parallel processor 200 may be one or more of the parallel processor(s) 112 shown in FIG. 1.

The parallel processor 200 includes a parallel processing unit 202. The parallel processing unit includes an I/O unit 204 that enables communication with other devices, including other instances of the parallel processing unit 202. The I/O unit 204 may be directly connected to other devices. For instance, the I/O unit 204 connects with other devices via the use of a hub or switch interface, such as memory hub 105. The connections between the memory hub 105 and the I/O unit 204 form a communication link 113. Within the parallel processing unit 202, the I/O unit 204 connects with a host interface 206 and a memory crossbar 216, where the host interface 206 receives commands directed to performing processing operations and the memory crossbar 216 receives commands directed to performing memory operations.

When the host interface 206 receives a command buffer via the I/O unit 204, the host interface 206 can direct work operations to perform those commands to a front end 208. In one embodiment the front end 208 couples with a scheduler 210, which is configured to distribute commands or other work items to a processing cluster array 212. The scheduler 210 ensures that the processing cluster array 212 is properly configured and in a valid state before tasks are distributed to the processing clusters of the processing cluster array 212. The scheduler 210 may be implemented via firmware logic executing on a microcontroller. The microcontroller implemented scheduler 210 is configurable to perform complex scheduling and work distribution operations at coarse and fine granularity, enabling rapid preemption and context switching of threads executing on the processing cluster array 212. Preferably, the host software can prove workloads for scheduling on the processing cluster array 212 via one of multiple graphics processing doorbells. In other examples, polling for new workloads or interrupts can be used to identify or indicate availability of work to perform. The workloads can then be automatically distributed across the processing cluster array 212 by the scheduler 210 logic within the scheduler microcontroller.

The processing cluster array 212 can include up to "N" processing clusters (e.g., cluster 214A, cluster 214B, through cluster 214N). Each cluster 214A-214N of the processing cluster array 212 can execute a large number of concurrent threads. The scheduler 210 can allocate work to the clusters 214A-214N of the processing cluster array 212 using various scheduling and/or work distribution algorithms, which may vary depending on the workload arising for each type of program or computation. The scheduling can be handled dynamically by the scheduler 210, or can be assisted in part by compiler logic during compilation of program logic configured for execution by the processing cluster array 212. Optionally, different clusters 214A-214N of the processing cluster array 212 can be allocated for processing different types of programs or for performing different types of computations.

The processing cluster array 212 can be configured to perform various types of parallel processing operations. For example, the processing cluster array 212 is configured to perform general-purpose parallel compute operations. For example, the processing cluster array 212 can include logic to execute processing tasks including filtering of video and/or audio data, performing modeling operations, including physics operations, and performing data transformations.

The processing cluster array 212 is configured to perform parallel graphics processing operations. In such embodiments in which the parallel processor 200 is configured to perform graphics processing operations, the processing cluster array 212 can include additional logic to support the execution of such graphics processing operations, including, but not limited to texture sampling logic to perform texture operations, as well as tessellation logic and other vertex processing logic. Additionally, the processing cluster array 212 can be configured to execute graphics processing related shader programs such as, but not limited to vertex shaders, tessellation shaders, geometry shaders, and pixel shaders. The parallel processing unit 202 can transfer data from system memory via the I/O unit 204 for processing. During processing, the transferred data can be stored to on-chip memory (e.g., parallel processor memory 222) during processing, then written back to system memory.

In embodiments in which the parallel processing unit 202 is used to perform graphics processing, the scheduler 210 may be configured to divide the processing workload into approximately equal sized tasks, to better enable distribution of the graphics processing operations to multiple clusters 214A-214N of the processing cluster array 212. In some of these embodiments, portions of the processing cluster array 212 can be configured to perform different types of processing. For example, a first portion may be configured to perform vertex shading and topology generation, a second portion may be configured to perform tessellation and geometry shading, and a third portion may be configured to perform pixel shading or other screen space operations, to produce a rendered image for display. Intermediate data produced by one or more of the clusters 214A-214N may be stored in buffers to allow the intermediate data to be transmitted between clusters 214A-214N for further processing.

During operation, the processing cluster array 212 can receive processing tasks to be executed via the scheduler 210, which receives commands defining processing tasks from front end 208. For graphics processing operations, processing tasks can include indices of data to be processed, e.g., surface (patch) data, primitive data, vertex data, and/or pixel data, as well as state parameters and commands defining how the data is to be processed (e.g., what program is to be executed). The scheduler 210 may be configured to fetch the indices corresponding to the tasks or may receive the indices from the front end 208. The front end 208 can be configured to ensure the processing cluster array 212 is configured to a valid state before the workload specified by incoming command buffers (e.g., batch-buffers, push buffers, etc.) is initiated.

Each of the one or more instances of the parallel processing unit 202 can couple with parallel processor memory 222. The parallel processor memory 222 can be accessed via the memory crossbar 216, which can receive memory requests from the processing cluster array 212 as well as the I/O unit 204. The memory crossbar 216 can access the parallel processor memory 222 via a memory interface 218. The memory interface 218 can include multiple partition units (e.g., partition unit 220A, partition unit 220B, through partition unit 220N) that can each couple to a portion (e.g., memory unit) of parallel processor memory 222. The number of partition units 220A-220N may be configured to be equal to the number of memory units, such that a first partition unit 220A has a corresponding first memory unit 224A, a second partition unit 220B has a corresponding second memory unit 224B, and an Nth partition unit 220N has a corresponding Nth memory unit 224N. In other embodiments, the number of partition units 220A-220N may not be equal to the number of memory devices.

The memory units 224A-224N can include various types of memory devices, including dynamic random-access memory (DRAM) or graphics random access memory, such as synchronous graphics random access memory (SGRAM), including graphics double data rate (GDDR) memory. Optionally, the memory units 224A-224N may also include 3D stacked memory, including but not limited to high bandwidth memory (HBM). Persons skilled in the art will appreciate that the specific implementation of the memory units 224A-224N can vary and can be selected from one of various conventional designs. Render targets, such as frame buffers or texture maps may be stored across the memory units 224A-224N, allowing partition units 220A-220N to write portions of each render target in parallel to efficiently use the available bandwidth of parallel processor memory 222. In some embodiments, a local instance of the parallel processor memory 222 may be excluded in favor of a unified memory design that utilizes system memory in conjunction with local cache memory.

Optionally, any one of the clusters 214A-214N of the processing cluster array 212 has the ability to process data that will be written to any of the memory units 224A-224N within parallel processor memory 222. The memory crossbar 216 can be configured to transfer the output of each cluster 214A-214N to any partition unit 220A-220N or to another cluster 214A-214N, which can perform additional processing operations on the output. Each cluster 214A-214N can communicate with the memory interface 218 through the memory crossbar 216 to read from or write to various external memory devices. In one of the embodiments with the memory crossbar 216 the memory crossbar 216 has a connection to the memory interface 218 to communicate with the I/O unit 204, as well as a connection to a local instance of the parallel processor memory 222, enabling the processing units within the different processing clusters 214A-214N to communicate with system memory or other memory that is not local to the parallel processing unit 202. Generally, the memory crossbar 216 may, for example, be able to use virtual channels to separate traffic streams between the clusters 214A-214N and the partition units 220A-220N.

While a single instance of the parallel processing unit 202 is illustrated within the parallel processor 200, any number of instances of the parallel processing unit 202 can be included. For example, multiple instances of the parallel processing unit 202 can be provided on a single add-in card, or multiple add-in cards can be interconnected. For example, the parallel processor 200 can be an add-in device, such as add-in device 120 of FIG. 1, which may be a graphics card such as a discrete graphics card that includes one or more GPUs, one or more memory devices, and device-to-device or network or fabric interfaces. The different instances of the parallel processing unit 202 can be configured to inter-operate even if the different instances have different num-bers of processing cores, different amounts of local parallel processor memory, and/or other configuration differences. Optionally, some instances of the parallel processing unit 202 can include higher precision floating point units relative to other instances. Systems incorporating one or more instances of the parallel processing unit 202 or the parallel processor 200 can be implemented in a variety of configu-rations and form factors, including but not limited to desk-top, laptop, or handheld personal computers, servers, work-stations, game consoles, and/or embedded systems. An orchestrator can form composite nodes for workload per-formance using one or more of: disaggregated processor resources, cache resources, memory resources, storage resources, and networking resources.

Figure 2B:
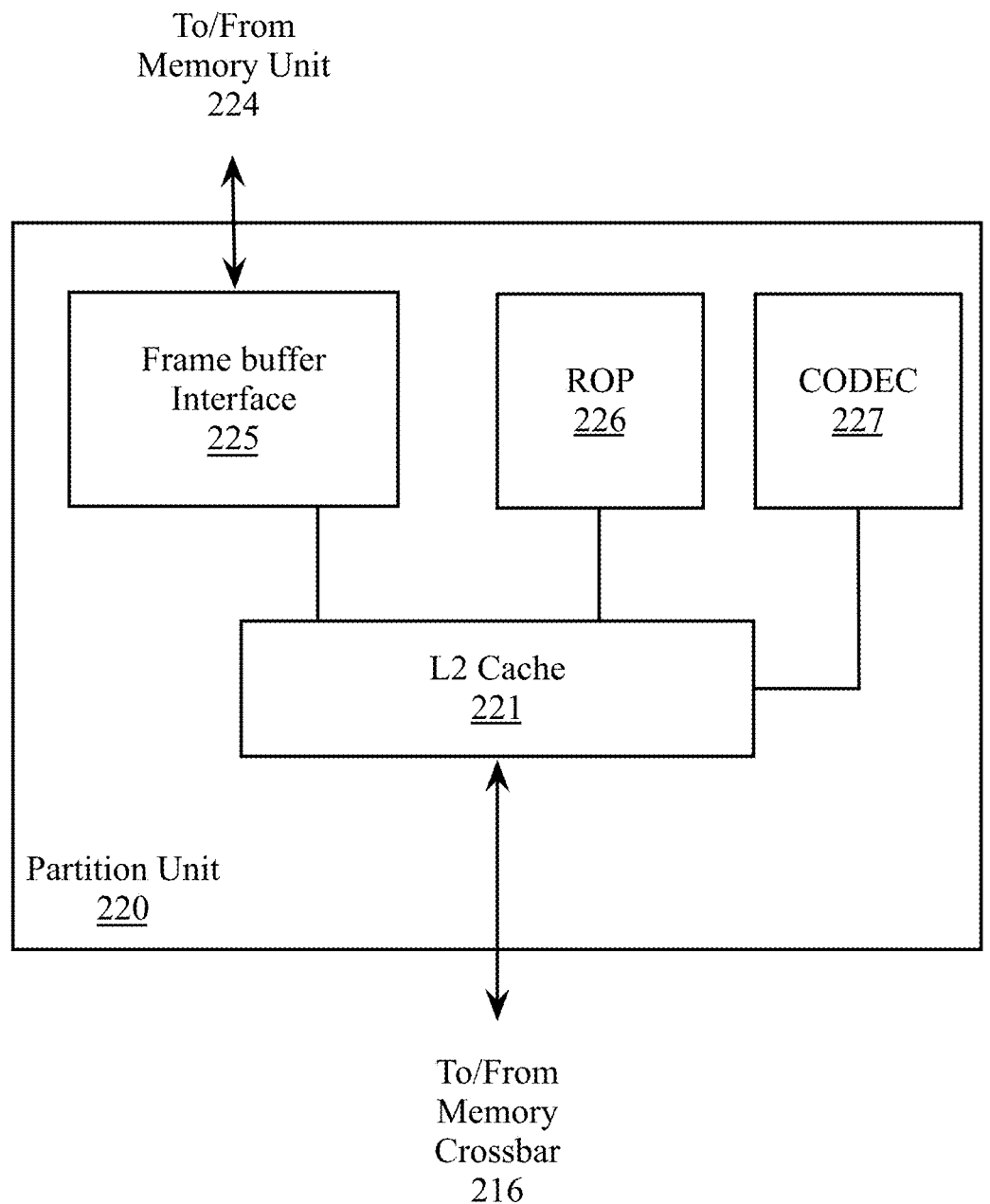

FIG. 2B is a block diagram of a partition unit 220. The partition unit 220 may be an instance of one of the partition units 220A-220N of FIG. 2A. As illustrated, the partition unit 220 includes an L2 cache 221, a frame buffer interface 225, and a ROP 226 (raster operations unit). The L2 cache 221 is a read/write cache that is configured to perform load and store operations received from the memory crossbar 216 and ROP 226. Read misses and urgent write-back requests are output by L2 cache 221 to frame buffer interface 225 for processing. Updates can also be sent to the frame buffer via the frame buffer interface 225 for processing. In one embodiment the frame buffer interface 225 interfaces with one of the memory units in parallel processor memory, such as the memory units 224A-224N of FIG. 2A (e.g., within parallel processor memory 222). The partition unit 220 may additionally or alternatively also interface with one of the memory units in parallel processor memory via a memory controller (not shown).

In graphics applications, the ROP 226 is a processing unit that performs raster operations such as stencil, z test, blend-ing, and the like. The ROP 226 then outputs processed graphics data that is stored in graphics memory. In some embodiments the ROP 226 includes or couples with a CODEC 227 that includes compression logic to compress depth or color data that is written to memory or the L2 cache 221 and decompress depth or color data that is read from memory or the L2 cache 221. The compression logic can be lossless compression logic that makes use of one or more of multiple compression algorithms. The type of compression that is performed by the CODEC 227 can vary based on the statistical characteristics of the data to be compressed. For example, in one embodiment, delta color compression is performed on depth and color data on a per-tile basis. In one embodiment the CODEC 227 includes compression and decompression logic that can compress and decompress compute data associated with machine learning operations. The CODEC 227 can, for example, compress sparse matrix data for sparse machine learning operations. The CODEC 227 can also compress sparse matrix data that is encoded in a sparse matrix format (e.g., coordinate list encoding (COO), compressed sparse row (CSR), compress sparse column (CSC), etc.) to generate compressed and encoded sparse matrix data. The compressed and encoded sparse matrix data can be decompressed and/or decoded before being processed by processing elements or the processing elements can be configured to consume compressed, encoded, or compressed and encoded data for processing.

The ROP 226 may be included within each processing cluster (e.g., cluster 214A-214N of FIG. 2A) instead of within the partition unit 220. In such embodiment, read and write requests for pixel data are transmitted over the memory crossbar 216 instead of pixel fragment data. The processed graphics data may be displayed on a display device, such as one of the one or more display device(s) 110A-110B of FIG. 1, routed for further processing by the processor(s) 102, or routed for further processing by one of the processing entities within the parallel processor 200 of FIG. 2A.

Figure 2C:
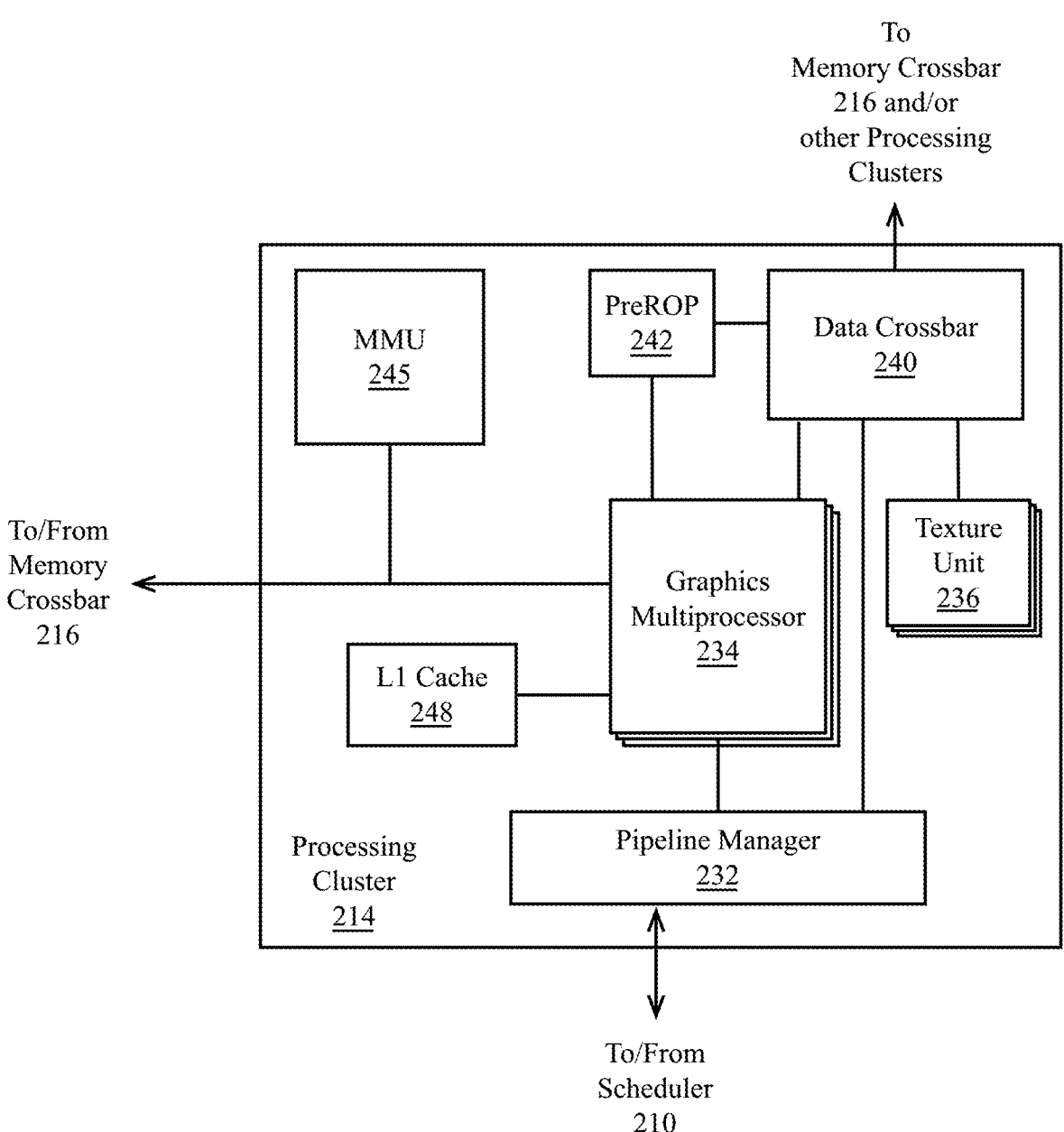

FIG. 2C is a block diagram of a processing cluster 214 within a parallel processing unit. For example, the process-ing cluster is an instance of one of the processing clusters 214A-214N of FIG. 2A. The processing cluster 214 can be configured to execute many threads in parallel, where the term "thread" refers to an instance of a particular program executing on a particular set of input data. Optionally, single-instruction, multiple-data (SIMD) instruction issue techniques may be used to support parallel execution of a large number of threads without providing multiple inde-pendent instruction units. Alternatively, single-instruction, multiple-thread (SIMT) techniques may be used to support parallel execution of a large number of generally synchro-nized threads, using a common instruction unit configured to issue instructions to a set of processing engines within each one of the processing clusters. Unlike a SIMD execution regime, where all processing engines typically execute iden-tical instructions, SIMT execution allows different threads to more readily follow divergent execution paths through a given thread program. Persons skilled in the art will under-stand that a SIMD processing regime represents a functional subset of a SIMT processing regime.

Operation of the processing cluster 214 can be controlled via a pipeline manager 232 that distributes processing tasks to SIMT parallel processors. The pipeline manager 232 receives instructions from the scheduler 210 of FIG. 2A and manages execution of those instructions via a graphics multiprocessor 234 and/or a texture unit 236. The illustrated graphics multiprocessor 234 is an exemplary instance of a SIMT parallel processor. However, various types of SIMT parallel processors of differing architectures may be included within the processing cluster 214. One or more instances of the graphics multiprocessor 234 can be included within a processing cluster 214. The graphics multiprocessor 234 can process data and a data crossbar 240 can be used to distribute the processed data to one of multiple possible destinations, including other shader units. The pipeline manager 232 can facilitate the distribution of processed data by specifying destinations for processed data to be distrib-uted via the data crossbar 240.

Each graphics multiprocessor 234 within the processing cluster 214 can include an identical set of functional execu-tion logic (e.g., arithmetic logic units, load-store units, etc.). The functional execution logic can be configured in a pipelined manner in which new instructions can be issued before previous instructions are complete. The functional execution logic supports a variety of operations including integer and floating-point arithmetic, comparison opera-tions, Boolean operations, bit-shifting, and computation of various algebraic functions. The same functional-unit hardware could be leveraged to perform different operations and any combination of functional units may be present.

The instructions transmitted to the processing cluster 214 constitute a thread. A set of threads executing across the set of parallel processing engines is a thread group. A thread group executes the same program on different input data. Each thread within a thread group can be assigned to a different processing engine within a graphics multiprocessor 234. A thread group may include fewer threads than the number of processing engines within the graphics multiprocessor 234. When a thread group includes fewer threads than the number of processing engines, one or more of the processing engines may be idle during cycles in which that thread group is being processed. A thread group may also include more threads than the number of processing engines within the graphics multiprocessor 234. When the thread group includes more threads than the number of processing engines within the graphics multiprocessor 234, processing can be performed over consecutive clock cycles. Optionally, multiple thread groups can be executed concurrently on the graphics multiprocessor 234.

The graphics multiprocessor 234 may include an internal cache memory to perform load and store operations. Optionally, the graphics multiprocessor 234 can forego an internal cache and use a cache memory (e.g., level 1 (L1) cache 248) within the processing cluster 214. Each graphics multiprocessor 234 also has access to level 2 (L2) caches within the partition units (e.g., partition units 220A-220N of FIG. 2A) that are shared among all processing clusters 214 and may be used to transfer data between threads. The graphics multiprocessor 234 may also access off-chip global memory, which can include one or more of local parallel processor memory and/or system memory. Any memory external to the parallel processing unit 202 may be used as global memory. Embodiments in which the processing cluster 214 includes multiple instances of the graphics multiprocessor 234 can share common instructions and data, which may be stored in the L1 cache 248.

Each processing cluster 214 may include an MMU 245 (memory management unit) that is configured to map virtual addresses into physical addresses. In other embodiments, one or more instances of the MMU 245 may reside within the memory interface 218 of FIG. 2A. The MMU 245 includes a set of page table entries (PTEs) used to map a virtual address to a physical address of a tile and optionally a cache line index. The MNU 245 may include address translation lookaside buffers (TLB) or caches that may reside within the graphics multiprocessor 234 or the L1 cache or processing cluster 214. The physical address is processed to distribute surface data access locality to allow efficient request interleaving among partition units. The cache line index may be used to determine whether a request for a cache line is a hit or miss.

In graphics and computing applications, a processing cluster 214 may be configured such that each graphics multiprocessor 234 is coupled to a texture unit 236 for performing texture mapping operations, e.g., determining texture sample positions, reading texture data, and filtering the texture data. Texture data is read from an internal texture L1 cache (not shown) or in some embodiments from the L1 cache within graphics multiprocessor 234 and is fetched from an L2 cache, local parallel processor memory, or system memory, as needed. Each graphics multiprocessor 234 outputs processed tasks to the data crossbar 240 to provide the processed task to another processing cluster 214 for further processing or to store the processed task in an L2 cache, local parallel processor memory, or system memory via the memory crossbar 216. A preROP 242 (pre-raster operations unit) is configured to receive data from graphics multiprocessor 234, direct data to ROP units, which may be located with partition units as described herein (e.g., partition units 220A-220N of FIG. 2A). The preROP 242 unit can perform optimizations for color blending, organize pixel color data, and perform address translations.

It will be appreciated that the core architecture described herein is illustrative and that variations and modifications are possible. Any number of processing units, e.g., graphics multiprocessor 234, texture units 236, preROPs 242, etc., may be included within a processing cluster 214. Further, while only one processing cluster 214 is shown, a parallel processing unit as described herein may include any number of instances of the processing cluster 214. Optionally, each processing cluster 214 can be configured to operate independently of other processing clusters 214 using separate and distinct processing units, L1 caches, L2 caches, etc.

Figure 2D:
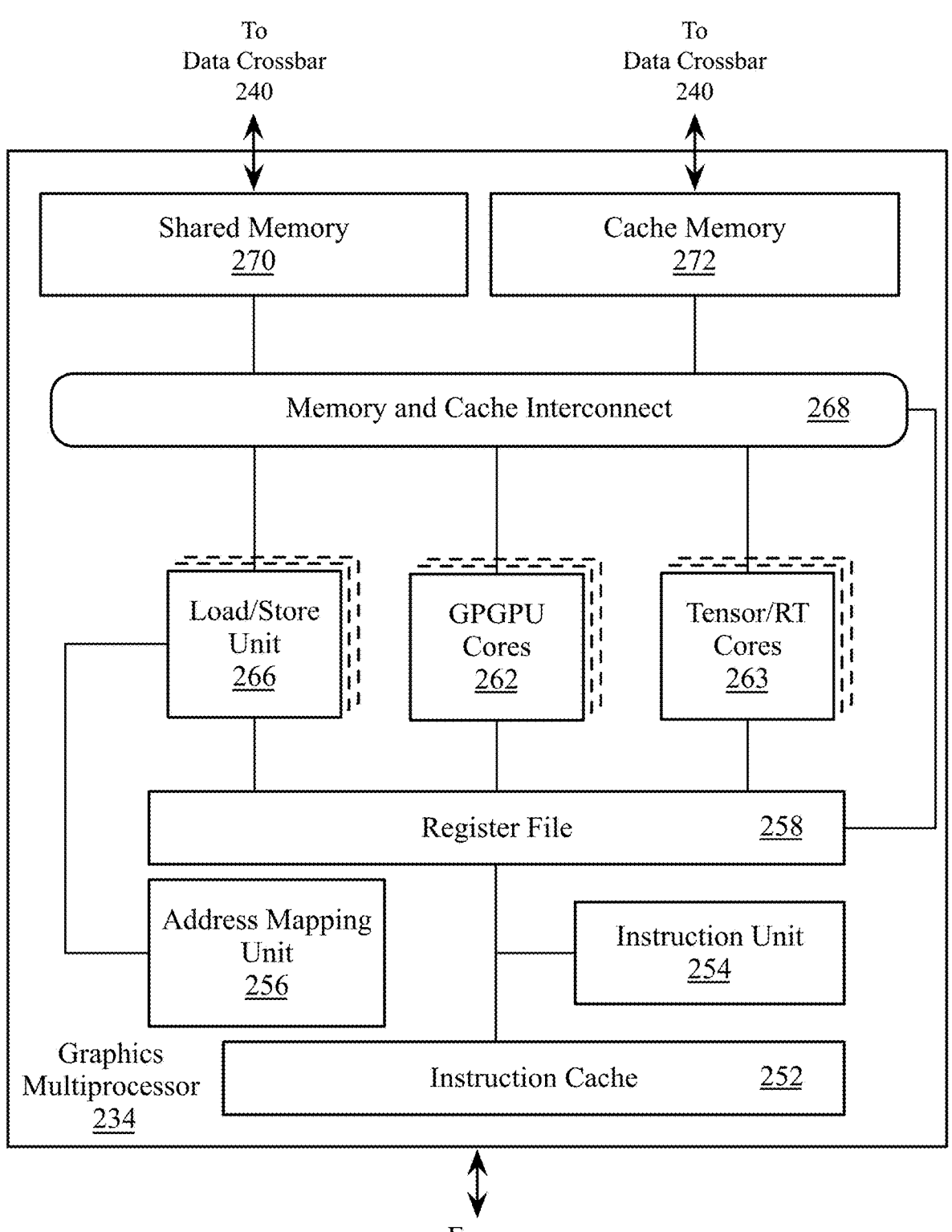

FIG. 2D shows an example of the graphics multiprocessor 234 in which the graphics multiprocessor 234 couples with the pipeline manager 232 of the processing cluster 214. The graphics multiprocessor 234 has an execution pipeline including but not limited to an instruction cache 252, an instruction unit 254, an address mapping unit 256, a register file 258, one or more general purpose graphics processing unit (GPGPU) cores 262, and one or more load/store units 266. The GPGPU cores 262 and load/store units 266 are coupled with cache memory 272 and shared memory 270 via a memory and cache interconnect 268. The graphics multiprocessor 234 may additionally include tensor and/or ray-tracing cores 263 that include hardware logic to accelerate matrix and/or ray-tracing operations.

The instruction cache 252 may receive a stream of instructions to execute from the pipeline manager 232. The instructions are cached in the instruction cache 252 and dispatched for execution by the instruction unit 254. The instruction unit 254 can dispatch instructions as thread groups (e.g., warps), with each thread of the thread group assigned to a different execution unit within GPGPU core 262. An instruction can access any of a local, shared, or global address space by specifying an address within a unified address space. The address mapping unit 256 can be used to translate addresses in the unified address space into a distinct memory address that can be accessed by the load/store units 266.

The register file 258 provides a set of registers for the functional units of the graphics multiprocessor 234. The register file 258 provides temporary storage for operands connected to the data paths of the functional units (e.g., GPGPU cores 262, load/store units 266) of the graphics multiprocessor 234. The register file 258 may be divided between each of the functional units such that each functional unit is allocated a dedicated portion of the register file 258. For example, the register file 258 may be divided between the different warps being executed by the graphics multiprocessor 234.

The GPGPU cores 262 can each include floating point units (FPUs) and/or integer arithmetic logic units (ALUs) that are used to execute instructions of the graphics multiprocessor 234. In some implementations, the GPGPU cores 262 can include hardware logic that may otherwise reside within the tensor and/or ray-tracing cores 263. The GPGPU cores 262 can be similar in architecture or can differ in architecture. For example and in one embodiment, a first portion of the GPGPU cores 262 include a single precision FPU and an integer ALU while a second portion of the GPGPU cores include a double precision FPU. Optionally, the FPUs can implement the IEEE 754-2008 standard for floating point arithmetic or enable variable precision floating point arithmetic. The graphics multiprocessor 234 can additionally include one or more fixed function or special function units to perform specific functions such as copy rectangle or pixel blending operations. One or more of the GPGPU cores can also include fixed or special function logic.

The GPGPU cores 262 may include SIMD logic capable of performing a single instruction on multiple sets of data. Optionally, GPGPU cores 262 can physically execute SIMD4, SIMD8, and SIMD16 instructions and logically execute SIMD, SIMD2, and SIMD32 instructions. The SIMD instructions for the GPGPU cores can be generated at compile time by a shader compiler or automatically generated when executing programs written and compiled for single program multiple data (SPMD) or SIMT architectures. Multiple threads of a program configured for the SIMT execution model can be executed via a single SIMD instruction. For example and in one embodiment, eight SIMT threads that perform the same or similar operations can be executed in parallel via a single SIMD8 logic unit.

The memory and cache interconnect 268 is an interconnect network that connects each of the functional units of the graphics multiprocessor 234 to the register file 258 and to the shared memory 270. For example, the memory and cache interconnect 268 is a crossbar interconnect that allows the load/store unit 266 to implement load and store operations between the shared memory 270 and the register file 258. The register file 258 can operate at the same frequency as the GPGPU cores 262, thus data transfer between the GPGPU cores 262 and the register file 258 is very low latency. The shared memory 270 can be used to enable communication between threads that execute on the functional units within the graphics multiprocessor 234. The cache memory 272 can be used as a data cache for example, to cache texture data communicated between the functional units and the texture unit 236. The shared memory 270 can also be used as a program managed cached. The shared memory 270 and the cache memory 272 can couple with the data crossbar 240 to enable communication with other components of the processing cluster. Threads executing on the GPGPU cores 262 can programmatically store data within the shared memory in addition to the automatically cached data that is stored within the cache memory 272.

Figure 3C:
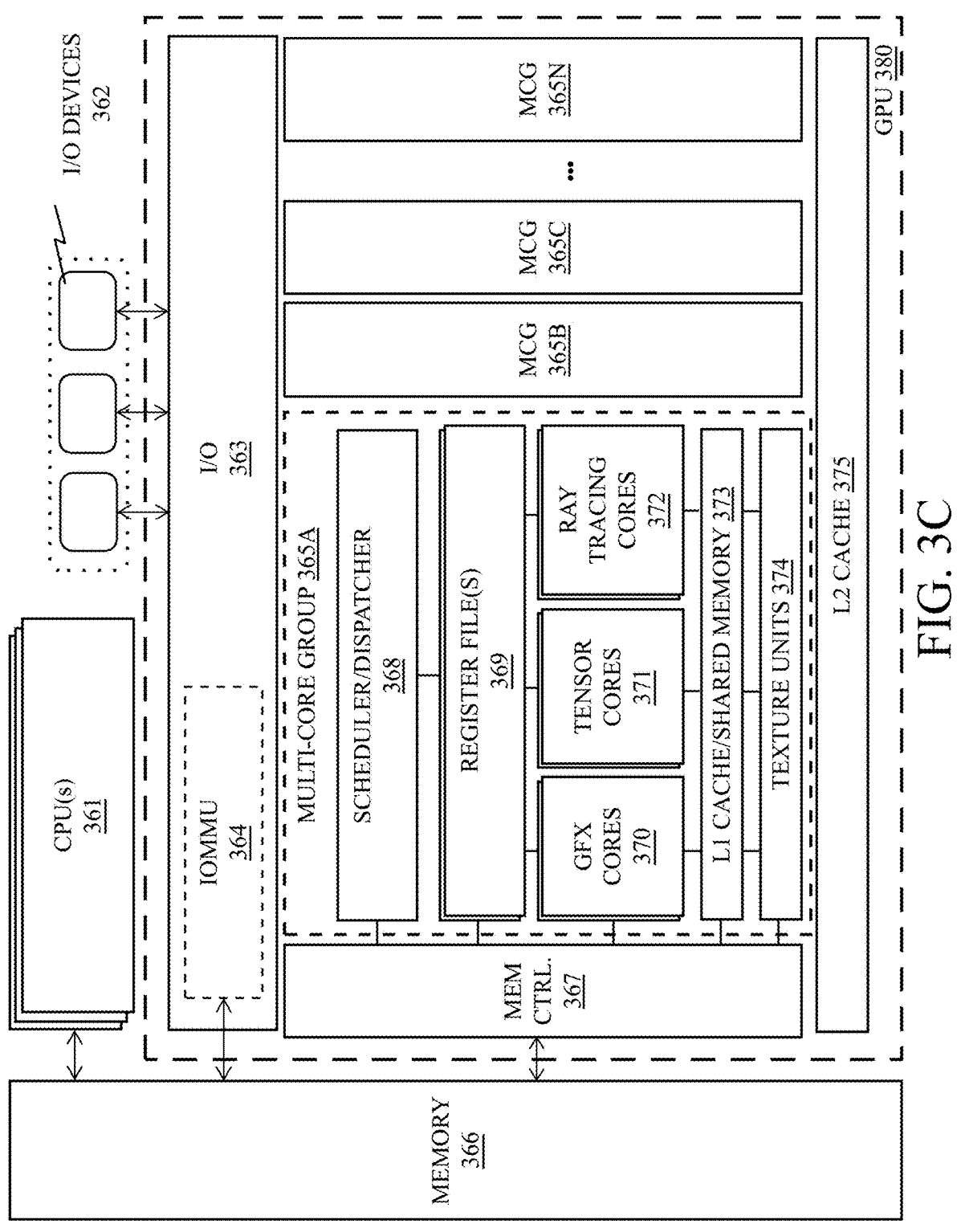

FIG. 3A-3C illustrate additional graphics multiprocessors, according to embodiments. FIG. 3A-3B illustrate graphics multiprocessors 325, 350, which are related to the graphics multiprocessor 234 of FIG. 2C and may be used in place of one of those. Therefore, the disclosure of any features in combination with the graphics multiprocessor 234 herein also discloses a corresponding combination with the graphics multiprocessor(s) 325, 350, but is not limited to such. FIG. 3C illustrates a graphics processing unit (GPU) 380 which includes dedicated sets of graphics processing resources arranged into multi-core groups 365A-365N, which correspond to the graphics multiprocessors 325, 350. The illustrated graphics multiprocessors 325, 350 and the multi-core groups 365A-365N can be streaming multiprocessors (SM) capable of simultaneous execution of a large number of execution threads.

The graphics multiprocessor 325 of FIG. 3A includes multiple additional instances of execution resource units relative to the graphics multiprocessor 234 of FIG. 2D. For example, the graphics multiprocessor 325 can include multiple instances of the instruction unit 332A-332B, register file 334A-334B, and texture unit(s) 344A-344B. The graphics multiprocessor 325 also includes multiple sets of graphics or compute execution units (e.g., GPGPU core 336A-336B, tensor core 337A-337B, ray-tracing core 338A-338B) and multiple sets of load/store units 340A-340B. The execution resource units have a common instruction cache 330, texture and/or data cache memory 342, and shared memory 346.

The various components can communicate via an interconnect fabric 327. The interconnect fabric 327 may include one or more crossbar switches to enable communication between the various components of the graphics multiprocessor 325. The interconnect fabric 327 may be a separate, high-speed network fabric layer upon which each component of the graphics multiprocessor 325 is stacked. The components of the graphics multiprocessor 325 communicate with remote components via the interconnect fabric 327. For example, the cores 336A-336B, 337A-337B, and 338A-338B can each communicate with shared memory 346 via the interconnect fabric 327. The interconnect fabric 327 can arbitrate communication within the graphics multiprocessor 325 to ensure a fair bandwidth allocation between components.

The graphics multiprocessor 350 of FIG. 3B includes multiple sets of execution resources 356A-356D, where each set of execution resource includes multiple instruction units, register files, GPGPU cores, and load store units, as illustrated in FIG. 2D and FIG. 3A. The execution resources 356A-356D can work in concert with texture unit(s) 360A-360D for texture operations, while sharing an instruction cache 354, and shared memory 353. For example, the execution resources 356A-356D can share an instruction cache 354 and shared memory 353, as well as multiple instances of a texture and/or data cache memory 358A-358B. The various components can communicate via an interconnect fabric 352 similar to the interconnect fabric 327 of FIG. 3A.

Persons skilled in the art will understand that the architecture described in FIGS. 1, 2A-2D, and 3A-3B are descriptive and not limiting as to the scope of the present embodiments. Thus, the techniques described herein may be implemented on any properly configured processing unit, including, without limitation, one or more mobile application processors, one or more desktop or server central processing units (CPUs) including multi-core CPUs, one or more parallel processing units, such as the parallel processing unit 202 of FIG. 2A, as well as one or more graphics processors or special purpose processing units, without departure from the scope of the embodiments described herein.

The parallel processor or GPGPU as described herein may be communicatively coupled to host/processor cores to accelerate graphics operations, machine-learning operations, pattern analysis operations, and various general-purpose GPU (GPGPU) functions. The GPU may be communicatively coupled to the host processor/cores over a bus or other interconnect (e.g., a high-speed interconnect such as PCIe, NVLink, or other known protocols, standardized protocols, or proprietary protocols). In other embodiments, the GPU may be integrated on the same package or chip as the cores and communicatively coupled to the cores over an internal processor bus/interconnect (i.e., internal to the package or chip). Regardless of the manner in which the GPU is connected, the processor cores may allocate work to the GPU in the form of sequences of commands/instructions contained in a work descriptor. The GPU then uses dedicated circuitry/logic for efficiently processing these commands/instructions.

FIG. 3C illustrates a graphics processing unit (GPU) 380 which includes dedicated sets of graphics processing resources arranged into multi-core groups 365A-365N. While the details of only a single multi-core group 365A are provided, it will be appreciated that the other multi-core groups 365B-365N may be equipped with the same or similar sets of graphics processing resources. Details described with respect to the multi-core groups 365A-365N may also apply to any graphics multiprocessor 234, 325, 350 described herein.

As illustrated, a multi-core group 365A may include a set of graphics cores 370, a set of tensor cores 371, and a set of ray tracing cores 372. A scheduler/dispatcher 368 schedules and dispatches the graphics threads for execution on the various cores 370, 371, 372. A set of register files 369 store operand values used by the cores 370, 371, 372 when executing the graphics threads. These may include, for example, integer registers for storing integer values, floating point registers for storing floating point values, vector registers for storing packed data elements (integer and/or floating-point data elements) and tile registers for storing tensor/matrix values. The tile registers may be implemented as combined sets of vector registers.

One or more combined level 1 (L1) caches and shared memory units 373 store graphics data such as texture data, vertex data, pixel data, ray data, bounding volume data, etc., locally within each multi-core group 365A. One or more texture units 374 can also be used to perform texturing operations, such as texture mapping and sampling. A Level 2 (L2) cache 375 shared by all or a subset of the multi-core groups 365A-365N stores graphics data and/or instructions for multiple concurrent graphics threads. As illustrated, the L2 cache 375 may be shared across a plurality of multi-core groups 365A-365N. One or more memory controllers 367 couple the GPU 380 to a memory 366 which may be a system memory (e.g., DRAM) and/or a dedicated graphics memory (e.g., GDDR6 memory).

Input/output (I/O) circuitry 363 couples the GPU 380 to one or more I/O devices 362 such as digital signal processors (DSPs), network controllers, or user input devices. An on-chip interconnect may be used to couple the I/O devices 362 to the GPU 380 and memory 366. One or more I/O memory management units (IOMMUs) 364 of the I/O circuitry 363 couple the I/O devices 362 directly to the system memory 366. Optionally, the IOMMU 364 manages multiple sets of page tables to map virtual addresses to physical addresses in system memory 366. The I/O devices 362, CPU(s) 361, and GPU(s) 380 may then share the same virtual address space.

In one implementation of the IOMMU 364, the IOMMU 364 supports virtualization. In this case, it may manage a first set of page tables to map guest/graphics virtual addresses to guest/graphics physical addresses and a second set of page tables to map the guest/graphics physical addresses to system/host physical addresses (e.g., within system memory 366). The base addresses of each of the first and second sets of page tables may be stored in control registers and swapped out on a context switch (e.g., so that the new context is provided with access to the relevant set of page tables). While not illustrated in FIG. 3C, each of the cores 370, 371, 372 and/or multi-core groups 365A-365N may include translation lookaside buffers (TLBs) to cache guest virtual to guest physical translations, guest physical to host physical translations, and guest virtual to host physical translations.

The CPU(s) 361, GPUs 380, and I/O devices 362 may be integrated on a single semiconductor chip and/or chip package. The illustrated memory 366 may be integrated on the same chip or may be coupled to the memory controllers 367 via an off-chip interface. In one implementation, the memory 366 comprises GDDR6 memory which shares the same virtual address space as other physical system-level memories, although the underlying principles described herein are not limited to this specific implementation.

The tensor cores 371 may include a plurality of execution units specifically designed to perform matrix operations, which are the fundamental compute operation used to perform deep learning operations. For example, simultaneous matrix multiplication operations may be used for neural network training and inferencing. The tensor cores 371 may perform matrix processing using a variety of operand precisions including single precision floating-point (e.g., 32 bits), half-precision floating point (e.g., 16 bits), integer words (16 bits), bytes (8 bits), and half-bytes (4 bits). For example, a neural network implementation extracts features of each rendered scene, potentially combining details from multiple frames, to construct a high-quality final image.

In deep learning implementations, parallel matrix multiplication work may be scheduled for execution on the tensor cores 371. The training of neural networks, in particular, requires a significant number of matrix dot product operations. In order to process an inner-product formulation of an N×N×N matrix multiply, the tensor cores 371 may include at least N dot-product processing elements. Before the matrix multiply begins, one entire matrix is loaded into tile registers and at least one column of a second matrix is loaded each cycle for N cycles. Each cycle, there are N dot products that are processed.

Matrix elements may be stored at different precisions depending on the particular implementation, including 16-bit words, 8-bit bytes (e.g., INT8) and 4-bit half-bytes (e.g., INT4). Different precision modes may be specified for the tensor cores 371 to ensure that the most efficient precision is used for different workloads (e.g., such as inferencing workloads which can tolerate quantization to bytes and half-bytes). Supported formats additionally include 64-bit floating point (FP64) and non-IEEE floating point formats such as the bfloat16 format (e.g., Brain floating point), a 16-bit floating point format with one sign bit, eight exponent bits, and eight significand bits, of which seven are explicitly stored. One embodiment includes support for a reduced precision tensor-float format (TF32), which has the range of FP32 (8-bits) with the precision of FP16 (10-bits). Reduced precision TF32 operations can be performed on FP32 inputs and produce FP32 outputs at higher performance relative to FP32 and increased precision relative to FP16.

In one embodiment the tensor cores 371 support a sparse mode of operation for matrices in which the vast majority of values are zero. The tensor cores 371 include support for sparse input matrices that are encoded in a sparse matrix representation (e.g., coordinate list encoding (COO), compressed sparse row (CSR), compress sparse column (CSC), etc.). The tensor cores 371 also include support for compressed sparse matrix representations in the event that the sparse matrix representation may be further compressed. Compressed, encoded, and/or compressed and encoded matrix data, along with associated compression and/or encoding metadata, can be read by the tensor cores 371 and the non-zero values can be extracted. For example, for a given input matrix A, a non-zero value can be loaded from the compressed and/or encoded representation of at least a portion of matrix A. Based on the location in matrix A for the non-zero value, which may be determined from index or coordinate metadata associated with the non-zero value, a corresponding value in input matrix B may be loaded. Depending on the operation to be performed (e.g., multiply), the load of the value from input matrix B may be bypassed if the corresponding value is a zero value. In one embodiment, the pairings of values for certain operations, such as multiply operations, may be pre-scanned by scheduler logic and only operations between non-zero inputs are scheduled. Depending on the dimensions of matrix A and matrix B and the operation to be performed, output matrix C may be dense or sparse. Where output matrix C is sparse and depending on the configuration of the tensor cores 371, output matrix C may be output in a compressed format, a sparse encoding, or a compressed sparse encoding.

The ray tracing cores 372 may accelerate ray tracing operations for both real-time ray tracing and non-real-time ray tracing implementations. In particular, the ray tracing cores 372 may include ray traversal/intersection circuitry for performing ray traversal using bounding volume hierarchies (BVHs) and identifying intersections between rays and primitives enclosed within the BVH volumes. The ray tracing cores 372 may also include circuitry for performing depth testing and culling (e.g., using a Z buffer or similar arrangement). In one implementation, the ray tracing cores 372 perform traversal and intersection operations in concert with the image denoising techniques described herein, at least a portion of which may be executed on the tensor cores 371. For example, the tensor cores 371 may implement a deep learning neural network to perform denoising of frames generated by the ray tracing cores 372. However, the CPU(s) 361, graphics cores 370, and/or ray tracing cores 372 may also implement all or a portion of the denoising and/or deep learning algorithms.

In addition, as described above, a distributed approach to denoising may be employed in which the GPU 380 is in a computing device coupled to other computing devices over a network or high-speed interconnect. In this distributed approach, the interconnected computing devices may share neural network learning/training data to improve the speed with which the overall system learns to perform denoising for different types of image frames and/or different graphics applications.

The ray tracing cores 372 may process all BVH traversal and/or ray-primitive intersections, saving the graphics cores 370 from being overloaded with thousands of instructions per ray. For example, each ray tracing core 372 includes a first set of specialized circuitry for performing bounding box tests (e.g., for traversal operations) and/or a second set of specialized circuitry for performing the ray-triangle intersection tests (e.g., intersecting rays which have been traversed). Thus, for example, the multi-core group 365A can simply launch a ray probe, and the ray tracing cores 372 independently perform ray traversal and intersection and return hit data (e.g., a hit, no hit, multiple hits, etc.) to the thread context. The other cores 370, 371 are freed to perform other graphics or compute work while the ray tracing cores 372 perform the traversal and intersection operations.

Optionally, each ray tracing core 372 may include a traversal unit to perform BVH testing operations and/or an intersection unit which performs ray-primitive intersection tests. The intersection unit generates a "hit", "no hit", or "multiple hit" response, which it provides to the appropriate thread. During the traversal and intersection operations, the execution resources of the other cores (e.g., graphics cores 370 and tensor cores 371) are freed to perform other forms of graphics work.

In one optional embodiment described below, a hybrid rasterization/ray tracing approach is used in which work is distributed between the graphics cores 370 and ray tracing cores 372.

The ray tracing cores 372 (and/or other cores 370, 371) may include hardware support for a ray tracing instruction set such as Microsoft's DirectX Ray Tracing (DXR) which includes a DispatchRays command, as well as ray-generation, closest-hit, any-hit, and miss shaders, which enable the assignment of unique sets of shaders and textures for each object. Another ray tracing platform which may be supported by the ray tracing cores 372, graphics cores 370 and tensor cores 371 is Vulkan 1.1.85. Note, however, that the underlying principles described herein are not limited to any particular ray tracing ISA.

In general, the various cores 372, 371, 370 may support a ray tracing instruction set that includes instructions/functions for one or more of ray generation, closest hit, any hit, ray-primitive intersection, per-primitive and hierarchical bounding box construction, miss, visit, and exceptions. More specifically, a preferred embodiment includes ray tracing instructions to perform one or more of the following functions:

Ray Generation—Ray generation instructions may be executed for each pixel, sample, or other user-defined work assignment.

Closest Hit—A closest hit instruction may be executed to locate the closest intersection point of a ray with primitives within a scene.

Any Hit—An any hit instruction identifies multiple intersections between a ray and primitives within a scene, potentially to identify a new closest intersection point.

Intersection—An intersection instruction performs a ray-primitive intersection test and outputs a result.

Per-primitive Bounding box Construction—This instruction builds a bounding box around a given primitive or group of primitives (e.g., when building a new BVH or other acceleration data structure).

Miss—Indicates that a ray misses all geometry within a scene, or specified region of a scene.

Visit—Indicates the children volumes a ray will traverse.

Exceptions—Includes various types of exception handlers (e.g., invoked for various error conditions).

In one embodiment the ray tracing cores 372 may be adapted to accelerate general-purpose compute operations that can be accelerated using computational techniques that are analogous to ray intersection tests. A compute framework can be provided that enables shader programs to be compiled into low level instructions and/or primitives that perform general-purpose compute operations via the ray tracing cores. Exemplary computational problems that can benefit from compute operations performed on the ray tracing cores 372 include computations involving beam, wave, ray, or particle propagation within a coordinate space. Interactions associated with that propagation can be computed relative to a geometry or mesh within the coordinate space. For example, computations associated with electromagnetic signal propagation through an environment can be accelerated via the use of instructions or primitives that are executed via the ray tracing cores. Diffraction and reflection of the signals by objects in the environment can be computed as direct ray-tracing analogies.

Ray tracing cores 372 can also be used to perform computations that are not directly analogous to ray tracing.

For example, mesh projection, mesh refinement, and volume sampling computations can be accelerated using the ray tracing cores 372. Generic coordinate space calculations, such as nearest neighbor calculations can also be performed. For example, the set of points near a given point can be discovered by defining a bounding box in the coordinate space around the point. BVH and ray probe logic within the ray tracing cores 372 can then be used to determine the set of point intersections within the bounding box. The intersections constitute the origin point and the nearest neighbors to that origin point. Computations that are performed using the ray tracing cores 372 can be performed in parallel with computations performed on the graphics cores 372 and tensor cores 371. A shader compiler can be configured to compile a compute shader or other general-purpose graphics processing program into low level primitives that can be parallelized across the graphics cores 370, tensor cores 371, and ray tracing cores 372.

Techniques for GPU to Host Processor Interconnection

Figure 4A:
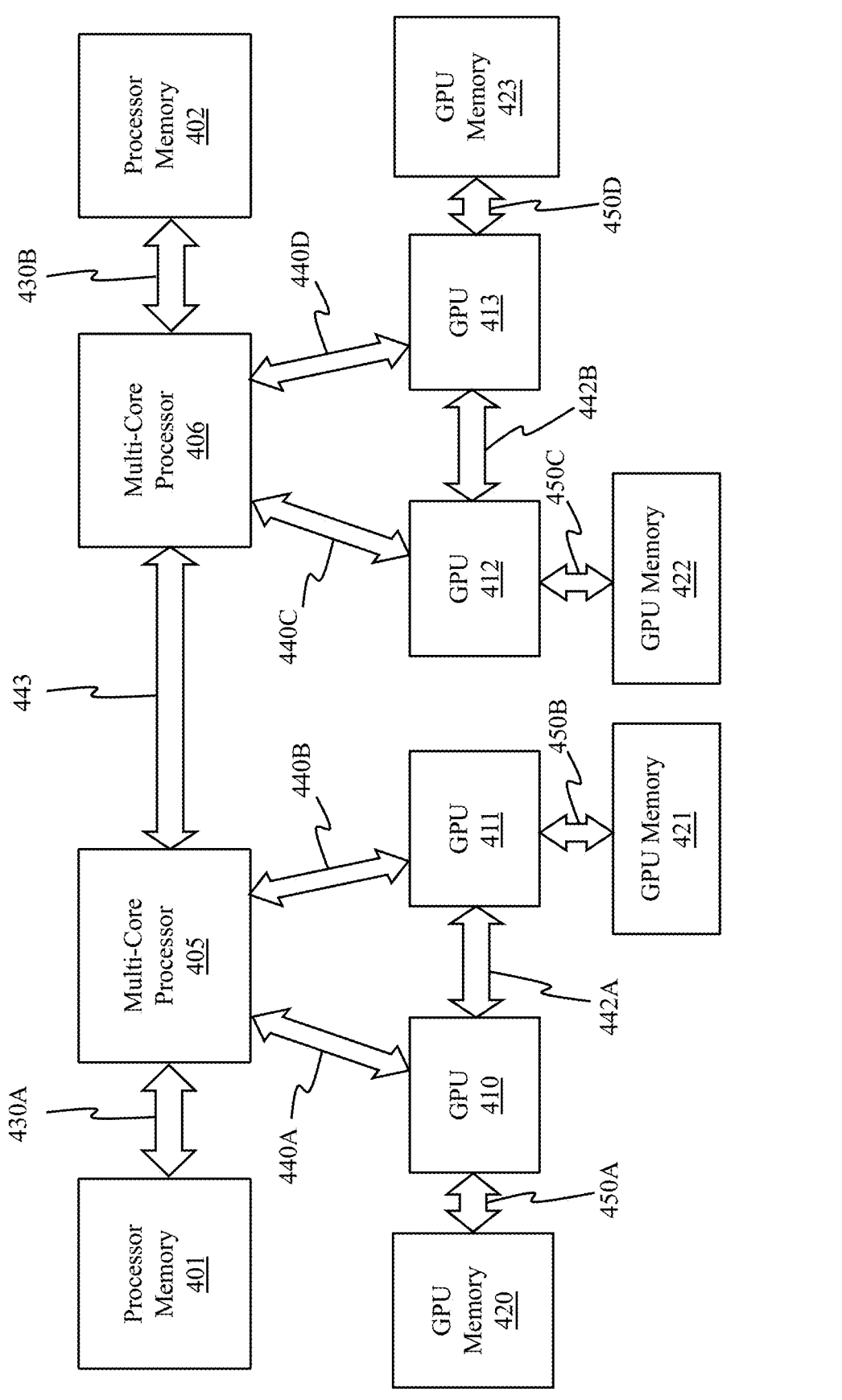
FIG. 4A-4F illustrate an exemplary architecture in which a plurality of GPUs is communicatively coupled to a plurality of multi-core processors.

FIG. 4A illustrates an exemplary architecture in which a plurality of GPUs 410-413, e.g. such as the parallel processors 200 shown in FIG. 2A, are communicatively coupled to a plurality of multi-core processors 405-406 over high-speed links 440A-440D (e.g., buses, point-to-point interconnects, etc.). The high-speed links 440A-440D may support a communication throughput of 4 GB/s, 30 GB/s, 80 GB/s or higher, depending on the implementation. Various interconnect protocols may be used including, but not limited to, PCIe 4.0 or 5.0 and NVLink 2.0. However, the underlying principles described herein are not limited to any particular communication protocol or throughput.

Two or more of the GPUs 410-413 may be interconnected over high-speed links 442A-442B, which may be implemented using the same or different protocols/links than those used for high-speed links 440A-440D. Similarly, two or more of the multi-core processors 405-406 may be connected over high-speed link 443 which may be symmetric multi-processor (SMP) buses operating at 20 GB/s, 30 GB/s, 120 GB/s or lower or higher speeds. Alternatively, all communication between the various system components shown in FIG. 4A may be accomplished using the same protocols/links (e.g., over a common interconnection fabric). As mentioned, however, the underlying principles described herein are not limited to any particular type of interconnect technology.

Each multi-core processor 405-406 may be communicatively coupled to a processor memory 401-402, via memory interconnects 430A-430B, respectively, and each GPU 410-413 is communicatively coupled to GPU memory 420-423 over GPU memory interconnects 450A-450D, respectively. The memory interconnects 430A-430B and 450A-450D may utilize the same or different memory access technologies. By way of example, and not limitation, the processor memories 401-402 and GPU memories 420-423 may be volatile memories such as dynamic random-access memories (DRAMs) (including stacked DRAMs), Graphics DDR SDRAM (GDDR) (e.g., GDDR5, GDDR6), or High Bandwidth Memory (HBM) and/or may be non-volatile memories such as 3D XPoint/Optane or Nano-Ram. For example, some portion of the memories may be volatile memory and another portion may be non-volatile memory (e.g., using a two-level memory (2LM) hierarchy). A memory subsystem as described herein may be compatible with a number of memory technologies, such as Double Data Rate versions released by JEDEC (Joint Electronic Device Engineering Council).

As described below, although the various processors 405-406 and GPUs 410-413 may be physically coupled to a particular memory 401-402, 420-423, respectively, a unified memory architecture may be implemented in which the same virtual system address space (also referred to as the "effective address" space) is distributed among all of the various physical memories. For example, processor memories 401-402 may each comprise 64 GB of the system memory address space and GPU memories 420-423 may each comprise 32 GB of the system memory address space (resulting in a total of 256 GB addressable memory in this example).

Figure 4B:
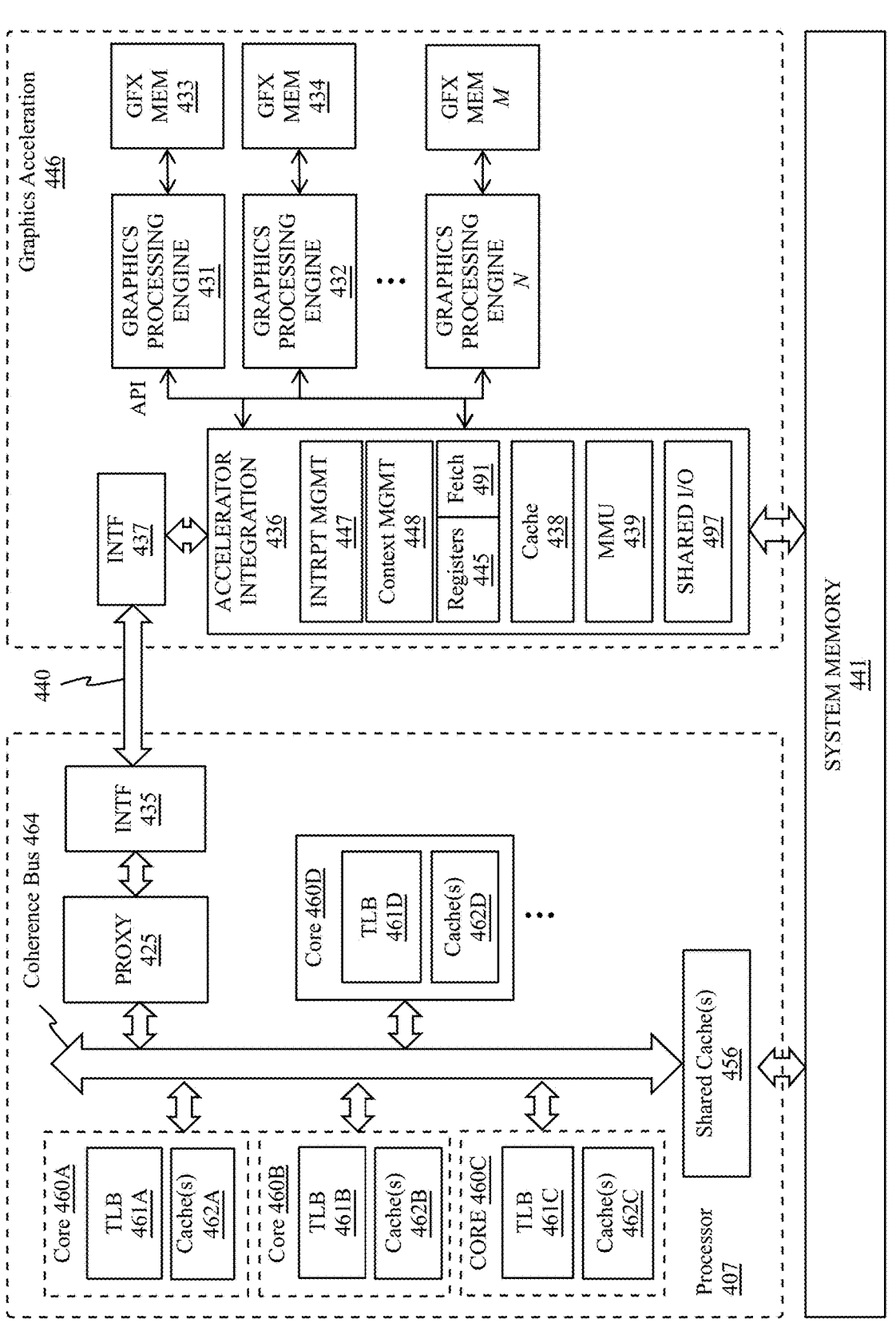

FIG. 4B illustrates additional optional details for an interconnection between a multi-core processor 407 and a graphics acceleration module 446. The graphics acceleration module 446 may include one or more GPU chips integrated on a line card which is coupled to the processor 407 via the high-speed link 440. Alternatively, the graphics acceleration module 446 may be integrated on the same package or chip as the processor 407.

The illustrated processor 407 includes a plurality of cores 460A-460D, each with a translation lookaside buffer 461A-461D and one or more caches 462A-462D. The cores may include various other components for executing instructions and processing data which are not illustrated to avoid obscuring the underlying principles of the components described herein (e.g., instruction fetch units, branch prediction units, decoders, execution units, reorder buffers, etc.). The caches 462A-462D may comprise level 1 (L1) and level 2 (L2) caches. In addition, one or more shared caches 456 may be included in the caching hierarchy and shared by sets of the cores 460A-460D. For example, one embodiment of the processor 407 includes 24 cores, each with its own L1 cache, twelve shared L2 caches, and twelve shared L3 caches. In this embodiment, one of the L2 and L3 caches are shared by two adjacent cores. The processor 407 and the graphics accelerator integration module 446 connect with system memory 441, which may include processor memories 401-402.

Coherency is maintained for data and instructions stored in the various caches 462A-462D, 456 and system memory 441 via inter-core communication over a coherence bus 464. For example, each cache may have cache coherency logic/circuitry associated therewith to communicate to over the coherence bus 464 in response to detected reads or writes to particular cache lines. In one implementation, a cache snooping protocol is implemented over the coherence bus 464 to snoop cache accesses. Cache snooping/coherency techniques are well understood by those of skill in the art and will not be described in detail here to avoid obscuring the underlying principles described herein.

A proxy circuit 425 may be provided that communicatively couples the graphics acceleration module 446 to the coherence bus 464, allowing the graphics acceleration module 446 to participate in the cache coherence protocol as a peer of the cores. In particular, an interface 435 provides connectivity to the proxy circuit 425 over high-speed link 440 (e.g., a PCIe bus, NVLink, etc.) and an interface 437 connects the graphics acceleration module 446 to the high-speed link 440.

In one implementation, an accelerator integration circuit 436 provides cache management, memory access, context management, and interrupt management services on behalf of a plurality of graphics processing engines 431, 432, N of the graphics acceleration module 446. The graphics processing engines 431, 432, N may each comprise a separate graphics processing unit (GPU). Alternatively, the graphics processing engines 431, 432, N may comprise different types of graphics processing engines within a GPU such as graphics execution units, media processing engines (e.g., video encoders/decoders), samplers, and blit engines. In other words, the graphics acceleration module may be a GPU with a plurality of graphics processing engines 431-432, N or the graphics processing engines 431-432, N may be individual GPUs integrated on a common package, line card, or chip.

The accelerator integration circuit 436 may include a memory management unit (MMU) 439 for performing various memory management functions such as virtual-to-physical memory translations (also referred to as effective-to-real memory translations) and memory access protocols for accessing system memory 441. The MMU 439 may also include a translation lookaside buffer (TLB) (not shown) for caching the virtual/effective to physical/real address translations. In one implementation, a cache 438 stores commands and data for efficient access by the graphics processing engines 431, 432, N. The data stored in cache 438 and graphics memories 433-434, M may be kept coherent with the core caches 462A-462D, 456 and system memory 441. As mentioned, this may be accomplished via proxy circuit 425 which takes part in the cache coherency mechanism on behalf of cache 438 and memories 433-434, M (e.g., sending updates to the cache 438 related to modifications/accesses of cache lines on processor caches 462A-462D, 456 and receiving updates from the cache 438).

A set of registers 445 store context data for threads executed by the graphics processing engines 431-432, N and a context management circuit 448 manages the thread contexts. For example, the context management circuit 448 may perform save and restore operations to save and restore contexts of the various threads during contexts switches (e.g., where a first thread is saved and a second thread is restored so that the second thread can be execute by a graphics processing engine). For example, on a context switch, the context management circuit 448 may store current register values to a designated region in memory (e.g., identified by a context pointer). It may then restore the register values when returning to the context. An interrupt management circuit 447, for example, may receive and processes interrupts received from system devices.

In one implementation, virtual/effective addresses from a graphics processing engine 431 are translated to real/physical addresses in system memory 441 by the MMU 439. Optionally, the accelerator integration circuit 436 supports multiple (e.g., 4, 8, 16) graphics accelerator modules 446 and/or other accelerator devices. The graphics accelerator module 446 may be dedicated to a single application executed on the processor 407 or may be shared between multiple applications. Optionally, a virtualized graphics execution environment is provided in which the resources of the graphics processing engines 431-432, N are shared with multiple applications, virtual machines (VMs), or containers. The resources may be subdivided into "slices" which are allocated to different VMs and/or applications based on the processing requirements and priorities associated with the VMs and/or applications. VMs and containers can be used interchangeably herein.

A virtual machine (VM) can be software that runs an operating system and one or more applications. A VM can be defined by specification, configuration files, virtual disk file, non-volatile random-access memory (NVRAM) setting file, and the log file and is backed by the physical resources of a host computing platform. A VM can include an operating system (OS) or application environment that is installed on software, which imitates dedicated hardware. The end user has the same experience on a virtual machine as they would have on dedicated hardware. Specialized software, called a hypervisor, emulates the PC client or server's CPU, memory, hard disk, network and other hardware resources completely, enabling virtual machines to share the resources. The hypervisor can emulate multiple virtual hardware platforms that are isolated from each other, allowing virtual machines to run Linux®, Windows® Server, VMware ESXi, and other operating systems on the same underlying physical host.

A container can be a software package of applications, configurations and dependencies so the applications run reliably on one computing environment to another. Containers can share an operating system installed on the server platform and run as isolated processes. A container can be a software package that contains everything the software needs to run such as system tools, libraries, and settings. Containers are not installed like traditional software programs, which allows them to be isolated from the other software and the operating system itself. The isolated nature of containers provides several benefits. First, the software in a container will run the same in different environments. For example, a container that includes PUP and MySQL can run identically on both a Linux® computer and a Windows® machine. Second, containers provide added security since the software will not affect the host operating system. While an installed application may alter system settings and modify resources, such as the Windows registry, a container can only modify settings within the container.

Thus, the accelerator integration circuit 436 acts as a bridge to the system for the graphics acceleration module 446 and provides address translation and system memory cache services. In one embodiment, to facilitate the bridging functionality, the accelerator integration circuit 436 may also include shared I/O 497 (e.g., PCIe, USB, or others) and hardware to enable system control of voltage, clocking, performance, thermals, and security. The shared I/O 497 may utilize separate physical connections or may traverse the high-speed link 440. In addition, the accelerator integration circuit 436 may provide virtualization facilities for the host processor to manage virtualization of the graphics processing engines, interrupts, and memory management.

Because hardware resources of the graphics processing engines 431-432, N are mapped explicitly to the real address space seen by the host processor 407, any host processor can address these resources directly using an effective address value. One optional function of the accelerator integration circuit 436 is the physical separation of the graphics processing engines 431-432, N so that they appear to the system as independent units.

One or more graphics memories 433-434, M may be coupled to each of the graphics processing engines 431-432, N, respectively. The graphics memories 433-434, M store instructions and data being processed by each of the graphics processing engines 431-432, N. The graphics memories 433-434, M may be volatile memories such as DRAMs (including stacked DRAMs), GDDR memory (e.g., GDDR5, GDDR6), or HBM, and/or may be non-volatile memories such as 3D XPoint/Optane, Samsung Z-NAND, or Nano-Ram.

To reduce data traffic over the high-speed link 440, biasing techniques may be used to ensure that the data stored in graphics memories 433-434, M is data which will be used most frequently by the graphics processing engines 431-432, N and preferably not used by the cores 460A-460D (at least not frequently). Similarly, the biasing mechanism attempts to keep data needed by the cores (and preferably not the graphics processing engines 431-432, N) within the caches 462A-462D, 456 of the cores and system memory 441.

Figure 4C:
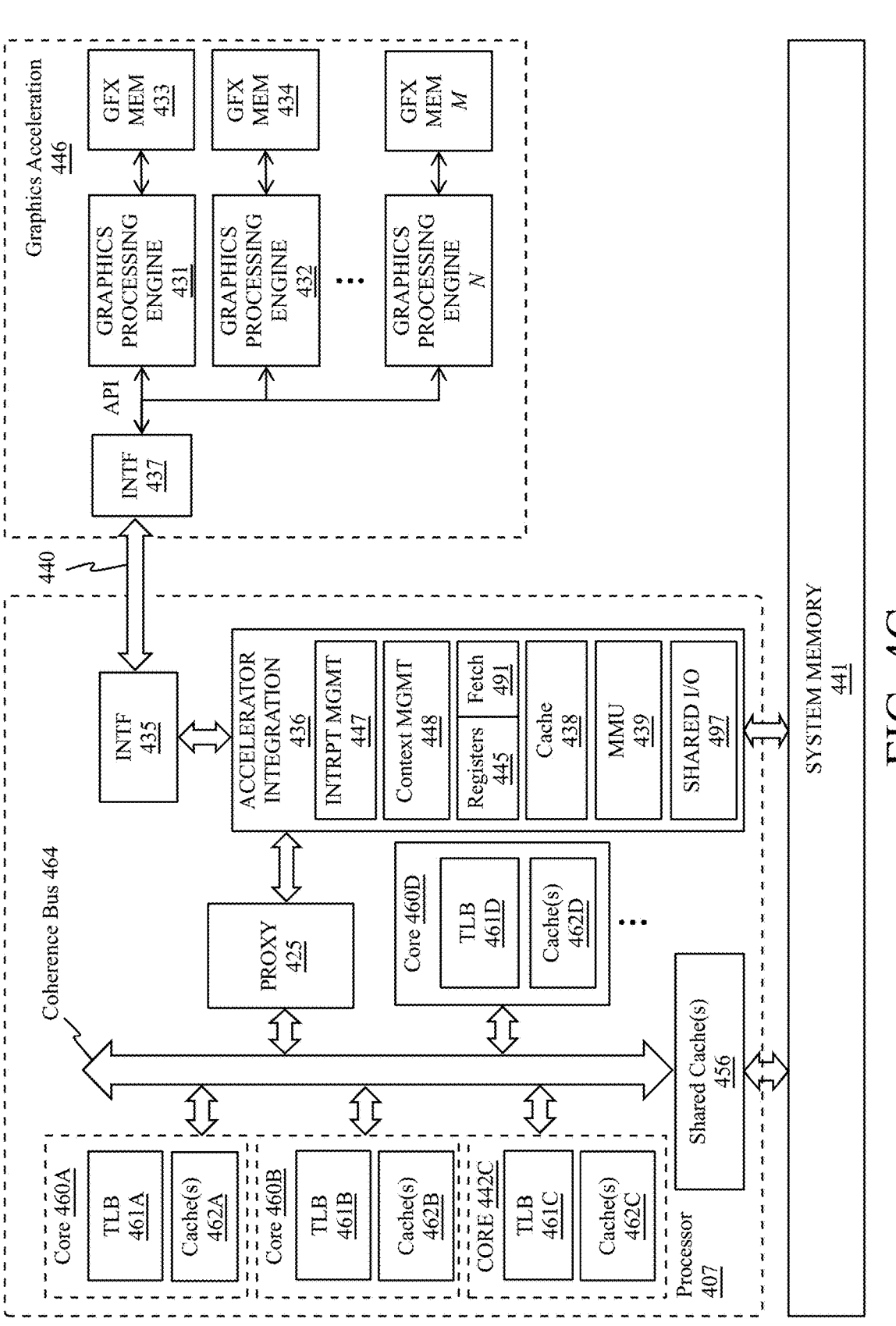

According to a variant shown in FIG. 4C the accelerator integration circuit 436 is integrated within the processor 407. The graphics processing engines 431-432, N communicate directly over the high-speed link 440 to the accelerator integration circuit 436 via interface 437 and interface 435 (which, again, may be utilize any form of bus or interface protocol). The accelerator integration circuit 436 may perform the same operations as those described with respect to FIG. 4B, but potentially at a higher throughput given its close proximity to the coherence bus 464 and caches 462A-462D, 456.

The embodiments described may support different programming models including a dedicated-process programming model (no graphics acceleration module virtualization) and shared programming models (with virtualization). The latter may include programming models which are controlled by the accelerator integration circuit 436 and programming models which are controlled by the graphics acceleration module 446.

In the embodiments of the dedicated process model, graphics processing engines 431, 432, . . . N may be dedicated to a single application or process under a single operating system. The single application can funnel other application requests to the graphics engines 431, 432, . . . N, providing virtualization within a VM/partition.

In the dedicated-process programming models, the graphics processing engines 431,432, N, may be shared by multiple VM/application partitions. The shared models require a system hypervisor to virtualize the graphics processing engines 431-432, N to allow access by each operating system. For single-partition systems without a hypervisor, the graphics processing engines 431-432, N are owned by the operating system. In both cases, the operating system can virtualize the graphics processing engines 431-432, N to provide access to each process or application.

For the shared programming model, the graphics acceleration module 446 or an individual graphics processing engine 431-432, N selects a process element using a process handle. The process elements may be stored in system memory 441 and be addressable using the effective address to real address translation techniques described herein. The process handle may be an implementation-specific value provided to the host process when registering its context with the graphics processing engine 431-432, N (that is, calling system software to add the process element to the process element linked list). The lower 16-bits of the process handle may be the offset of the process element within the process element linked list.

Figure 4D:
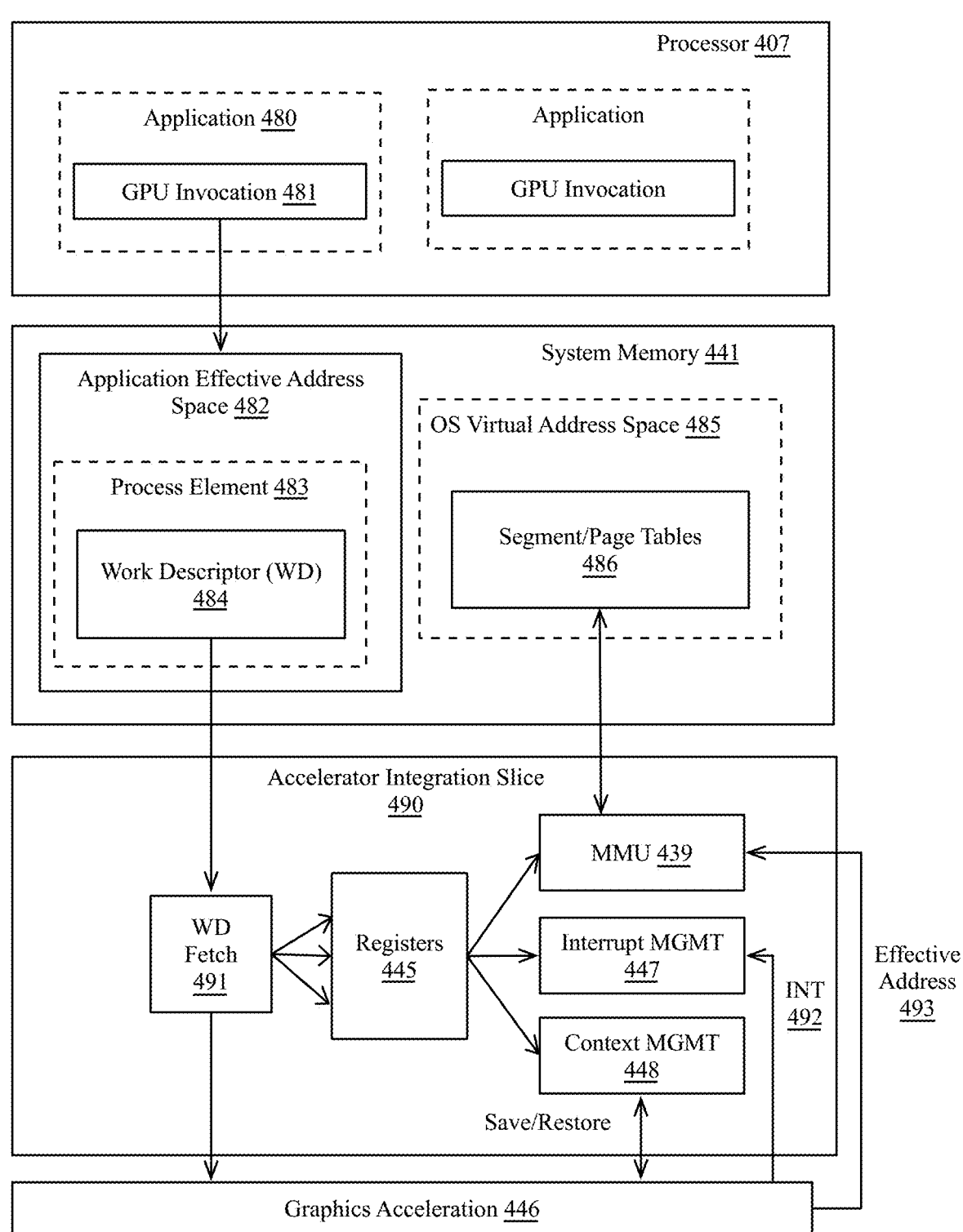

FIG. 4D illustrates an exemplary accelerator integration slice 490. As used herein, a "slice" comprises a specified portion of the processing resources of the accelerator integration circuit 436. Application effective address space 482 within system memory 441 stores process elements 483. The process elements 483 may be stored in response to GPU invocations 481 from applications 480 executed on the processor 407. A process element 483 contains the process state for the corresponding application 480. A work descriptor (WD) 484 contained in the process element 483 can be a single job requested by an application or may contain a pointer to a queue of jobs. In the latter case, the WD 484 is a pointer to the job request queue in the application's address space 482.

The graphics acceleration module 446 and/or the individual graphics processing engines 431-432, N can be shared by all or a subset of the processes in the system. For example, the technologies described herein may include an infrastructure for setting up the process state and sending a WD 484 to a graphics acceleration module 446 to start a job in a virtualized environment.

In one implementation, the dedicated-process programming model is implementation-specific. In this model, a single process owns the graphics acceleration module 446 or an individual graphics processing engine 431. Because the graphics acceleration module 446 is owned by a single process, the hypervisor initializes the accelerator integration circuit 436 for the owning partition and the operating system initializes the accelerator integration circuit 436 for the owning process at the time when the graphics acceleration module 446 is assigned.

In operation, a WD fetch unit 491 in the accelerator integration slice 490 fetches the next WD 484 which includes an indication of the work to be done by one of the graphics processing engines of the graphics acceleration module 446. Data from the WD 484 may be stored in registers 445 and used by the MMU 439, interrupt management circuit 447 and/or context management circuit 448 as illustrated. For example, the MMU 439 may include segment/page walk circuitry for accessing segment/page tables 486 within the OS virtual address space 485. The interrupt management circuit 447 may process interrupt events 492 received from the graphics acceleration module 446. When performing graphics operations, an effective address 493 generated by a graphics processing engine 431-432, N is translated to a real address by the MMU 439.

The same set of registers 445 may be duplicated for each graphics processing engine 431-432, N and/or graphics acceleration module 446 and may be initialized by the hypervisor or operating system. Each of these duplicated registers may be included in an accelerator integration slice 490. In one embodiment, each graphics processing engine 431-432, N may be presented to the hypervisor 496 as a distinct graphics processor device. QoS settings can be configured for clients of a specific graphics processing engine 431-432, N and data isolation between the clients of each engine can be enabled. Exemplary registers that may be initialized by the hypervisor are shown in Table 1.

TABLE 1

| Hypervisor Initialized Registers | |
| --- | --- |
| 1 | Slice Control Register |
| 2 | Real Address (RA) Scheduled Processes Area Pointer |
| 3 | Authority Mask Override Register |
| 4 | Interrupt Vector Table Entry Offset |
| 5 | Interrupt Vector Table Entry Limit |
| 6 | State Register |
| 7 | Logical Partition ID |
| 8 | Real address (RA) Hypervisor Accelerator Utilization Record Pointer |
| 9 | Storage Description Register |

Exemplary registers that may be initialized by the operating system are shown in Table 2.

TABLE 2

| Operating System Initialized Registers | |
| --- | --- |
| 1 | Process and Thread Identification |
| 2 | Effective Address (EA) Context Save/Restore Pointer |
| 3 | Virtual Address (VA) Accelerator Utilization Record Pointer |
| 4 | Virtual Address (VA) Storage Segment Table Pointer |

TABLE 2-continued

| Operating System Initialized Registers | |
|---|---|
| 5 | Authority Mask |
| 6 | Work descriptor |

Each WD 484 may be specific to a particular graphics acceleration module 446 and/or graphics processing engine 431-432, N. It contains all the information a graphics processing engine 431-432, N requires to do its work or it can be a pointer to a memory location where the application has set up a command queue of work to be completed.

Figure 4E:
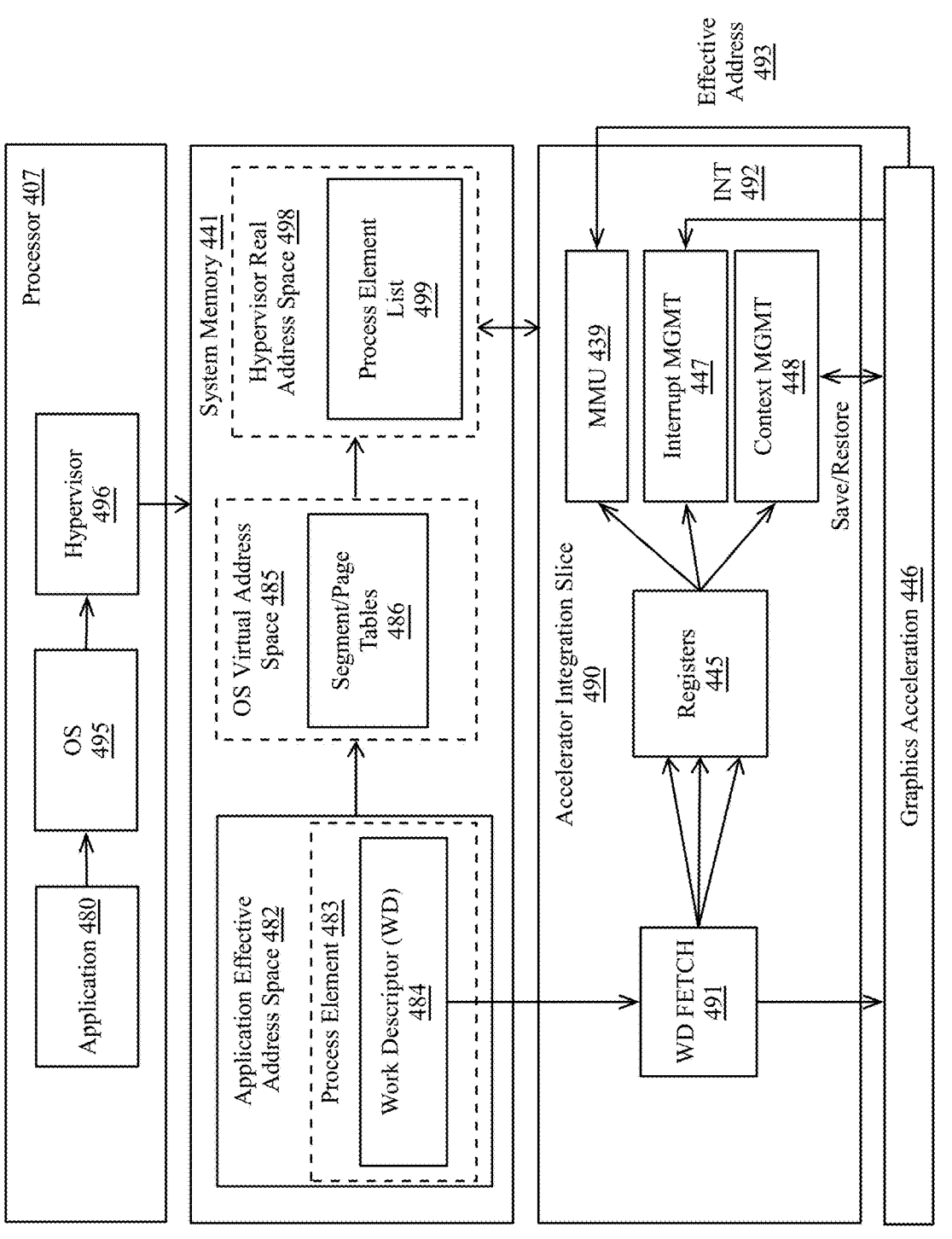

FIG. 4E illustrates additional optional details of a shared model. It includes a hypervisor real address space 498 in which a process element list 499 is stored. The hypervisor real address space 498 is accessible via a hypervisor 496 which virtualizes the graphics acceleration module engines for the operating system 495.

The shared programming models allow for all or a subset of processes from all or a subset of partitions in the system to use a graphics acceleration module 446. There are two programming models where the graphics acceleration module 446 is shared by multiple processes and partitions: time-sliced shared and graphics directed shared.

In this model, the system hypervisor 496 owns the graphics acceleration module 446 and makes its function available to all operating systems 495. For a graphics acceleration module 446 to support virtualization by the system hypervisor 496, the graphics acceleration module 446 may adhere to the following requirements: 1) An application's job request must be autonomous (that is, the state does not need to be maintained between jobs), or the graphics acceleration module 446 must provide a context save and restore mechanism. 2) An application's job request is guaranteed by the graphics acceleration module 446 to complete in a specified amount of time, including any translation faults, or the graphics acceleration module 446 provides the ability to preempt the processing of the job. 3) The graphics acceleration module 446 must be guaranteed fairness between processes when operating in the directed shared programming model.

For the shared model, the application 480 may be required to make an operating system 495 system call with a graphics acceleration module 446 type, a work descriptor (WD), an authority mask register (AMR) value, and a context save/restore area pointer (CSRP). The graphics acceleration module 446 type describes the targeted acceleration function for the system call. The graphics acceleration module 446 type may be a system-specific value. The WD is formatted specifically for the graphics acceleration module 446 and can be in the form of a graphics acceleration module 446 command, an effective address pointer to a user-defined structure, an effective address pointer to a queue of commands, or any other data structure to describe the work to be done by the graphics acceleration module 446. In one embodiment, the AMR value is the AMR state to use for the current process. The value passed to the operating system is similar to an application setting the AMR. If the accelerator integration circuit 436 and graphics acceleration module 446 implementations do not support a User Authority Mask Override Register (UAMOR), the operating system may apply the current UAMOR value to the AMR value before passing the AMR in the hypervisor call. The hypervisor 496 may optionally apply the current Authority Mask Override Register (AMOR) value before placing the AMR into the process element 483. The CSRP may be one of the registers 445 containing the effective address of an area in the application's address space 482 for the graphics acceleration module 446 to save and restore the context state. This pointer is optional if no state is required to be saved between jobs or when a job is preempted. The context save/restore area may be pinned system memory.

Upon receiving the system call, the operating system 495 may verify that the application 480 has registered and been given the authority to use the graphics acceleration module 446. The operating system 495 then calls the hypervisor 496 with the information shown in Table 3.

TABLE 3

| OS to Hypervisor Call Parameters | |
|---|---|
| 1 | A work descriptor (WD) |
| 2 | An Authority Mask Register (AMR) value (potentially masked). |
| 3 | An effective address (EA) Context Save/Restore Area Pointer (CSRP) |
| 4 | A process ID (PID) and optional thread ID (TID) |
| 5 | A virtual address (VA) accelerator utilization record pointer (AURP) |
| 6 | The virtual address of the storage segment table pointer (SSTP) |
| 7 | A logical interrupt service number (LISN) |

Upon receiving the hypervisor call, the hypervisor 496 verifies that the operating system 495 has registered and been given the authority to use the graphics acceleration module 446. The hypervisor 496 then puts the process element 483 into the process element linked list for the corresponding graphics acceleration module 446 type. The process element may include the information shown in Table 4.

TABLE 4

| Process Element Information | |
|---|---|
| 1 | A work descriptor (WD) |
| 2 | An Authority Mask Register (AMR) value (potentially masked). |
| 3 | An effective address (EA) Context Save/Restore Area Pointer (CSRP) |
| 4 | A process ID (PID) and optional thread ID (TID) |
| 5 | A virtual address (VA) accelerator utilization record pointer (AURP) |
| 6 | The virtual address of the storage segment table pointer (SSTP) |
| 7 | A logical interrupt service number (LISN) |
| 8 | Interrupt vector table, derived from the hypervisor call parameters. |
| 9 | A state register (SR) value |
| 10 | A logical partition ID (LPID) |
| 11 | A real address (RA) hypervisor accelerator utilization record pointer |
| 12 | The Storage Descriptor Register (SDR) |

The hypervisor may initialize a plurality of accelerator integration slice 490 registers 445.

Figure 4F:
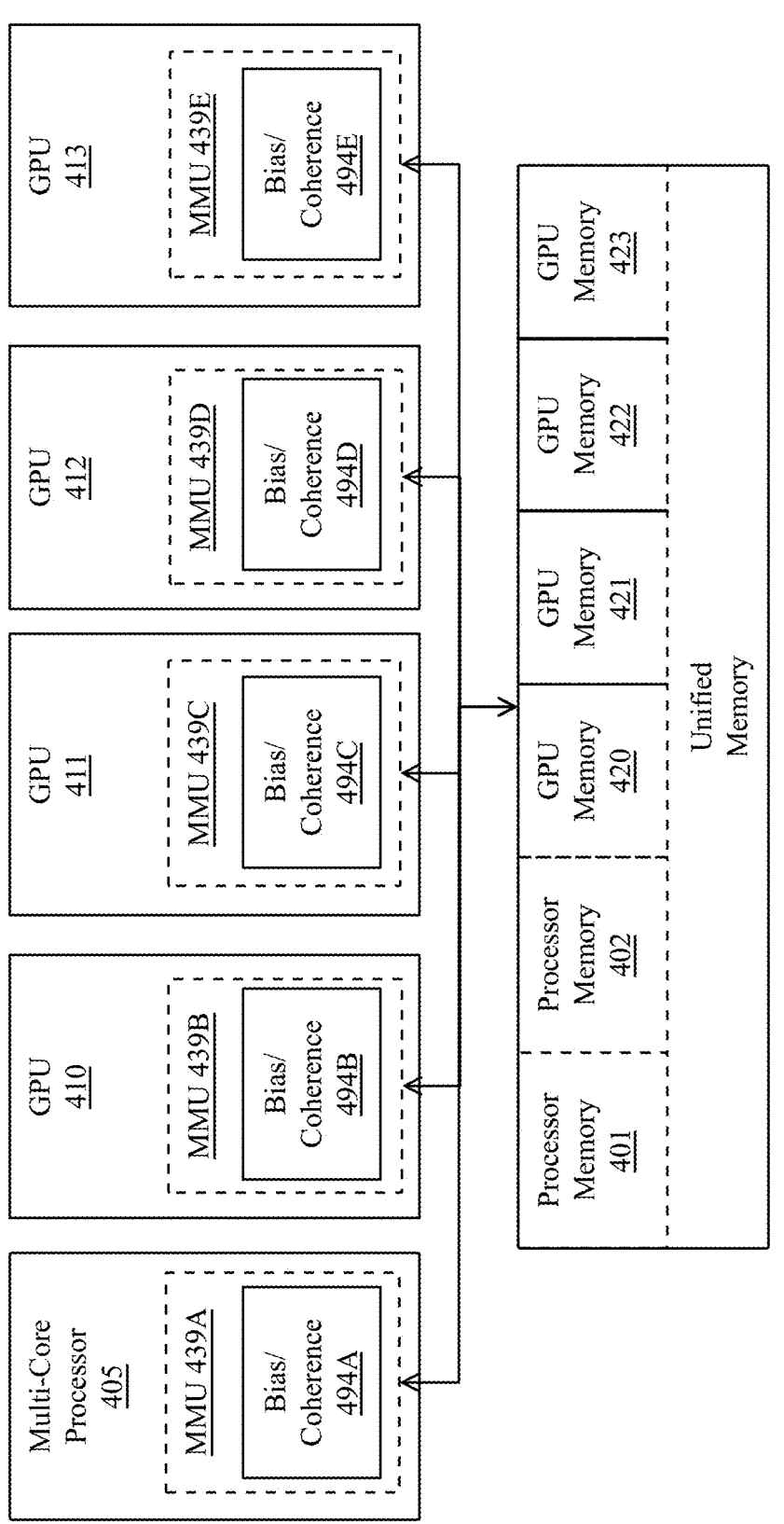

As illustrated in FIG. 4F, in one optional implementation a unified memory addressable via a common virtual memory address space used to access the physical processor memories 401-402 and GPU memories 420-423 is employed. In this implementation, operations executed on the GPUs 410-413 utilize the same virtual/effective memory address space to access the processors memories 401-402 and vice versa, thereby simplifying programmability. A first portion of the virtual/effective address space may be allocated to the processor memory 401, a second portion to the second processor memory 402, a third portion to the GPU memory 420, and so on. The entire virtual/effective memory space (sometimes referred to as the effective address space) may thereby be distributed across each of the processor memories 401-402 and GPU memories 420-423, allowing any processor or GPU to access any physical memory with a virtual address mapped to that memory.

Bias/coherence management circuitry 494A-494E within one or more of the MMUs 439A-439E may be provided that ensures cache coherence between the caches of the host processors (e.g., 405) and the GPUs 410-413 and implements biasing techniques indicating the physical memories in which certain types of data should be stored. While multiple instances of bias/coherence management circuitry 494A-494E are illustrated in FIG. 4F, the bias/coherence circuitry may be implemented within the MMU of one or more host processors 405 and/or within the accelerator integration circuit 436.

The GPU-attached memory 420-423 may be mapped as part of system memory, and accessed using shared virtual memory (SVM) technology, but without suffering the typical performance drawbacks associated with full system cache coherence. The ability to GPU-attached memory 420-423 to be accessed as system memory without onerous cache coherence overhead provides a beneficial operating environment for GPU offload. This arrangement allows the host processor 405 software to setup operands and access computation results, without the overhead of tradition I/O DMA data copies. Such traditional copies involve driver calls, interrupts and memory mapped I/O (MMIO) accesses that are all inefficient relative to simple memory accesses. At the same time, the ability to access GPU attached memory 420-423 without cache coherence overheads can be critical to the execution time of an offloaded computation. In cases with substantial streaming write memory traffic, for example, cache coherence overhead can significantly reduce the effective write bandwidth seen by a GPU 410-413. The efficiency of operand setup, the efficiency of results access, and the efficiency of GPU computation all play a role in determining the effectiveness of GPU offload.

A selection between GPU bias and host processor bias may be driven by a bias tracker data structure. A bias table may be used, for example, which may be a page-granular structure (i.e., controlled at the granularity of a memory page) that includes 1 or 2 bits per GPU-attached memory page. The bias table may be implemented in a stolen memory range of one or more GPU-attached memories 420-423, with or without a bias cache in the GPU 410-413 (e.g., to cache frequently/recently used entries of the bias table). Alternatively, the entire bias table may be maintained within the GPU.

In one implementation, the bias table entry associated with each access to the GPU-attached memory 420-423 is accessed prior the actual access to the GPU memory, causing the following operations. First, local requests from the GPU 410-413 that find their page in GPU bias are forwarded directly to a corresponding GPU memory 420-423. Local requests from the GPU that find their page in host bias are forwarded to the processor 405 (e.g., over a high-speed link as discussed above). Optionally, requests from the processor 405 that find the requested page in host processor bias complete the request like a normal memory read. Alternatively, requests directed to a GPU-biased page may be forwarded to the GPU 410-413. The GPU may then transition the page to a host processor bias if it is not currently using the page.

The bias state of a page can be changed either by a software-based mechanism, a hardware-assisted software-based mechanism, or, for a limited set of cases, a purely hardware-based mechanism.

One mechanism for changing the bias state employs an API call (e.g., OpenCL), which, in turn, calls the GPU's device driver which, in turn, sends a message (or enqueues a command descriptor) to the GPU directing it to change the bias state and, for some transitions, perform a cache flushing operation in the host. The cache flushing operation is required for a transition from host processor 405 bias to GPU bias, but is not required for the opposite transition.

Cache coherency may be maintained by temporarily rendering GPU-biased pages uncacheable by the host processor 405. To access these pages, the processor 405 may request access from the GPU 410 which may or may not grant access right away, depending on the implementation. Thus, to reduce communication between the host processor 405 and GPU 410 it is beneficial to ensure that GPU-biased pages are those which are required by the GPU but not the host processor 405 and vice versa.

Graphics Processing Pipeline

Figure 5:
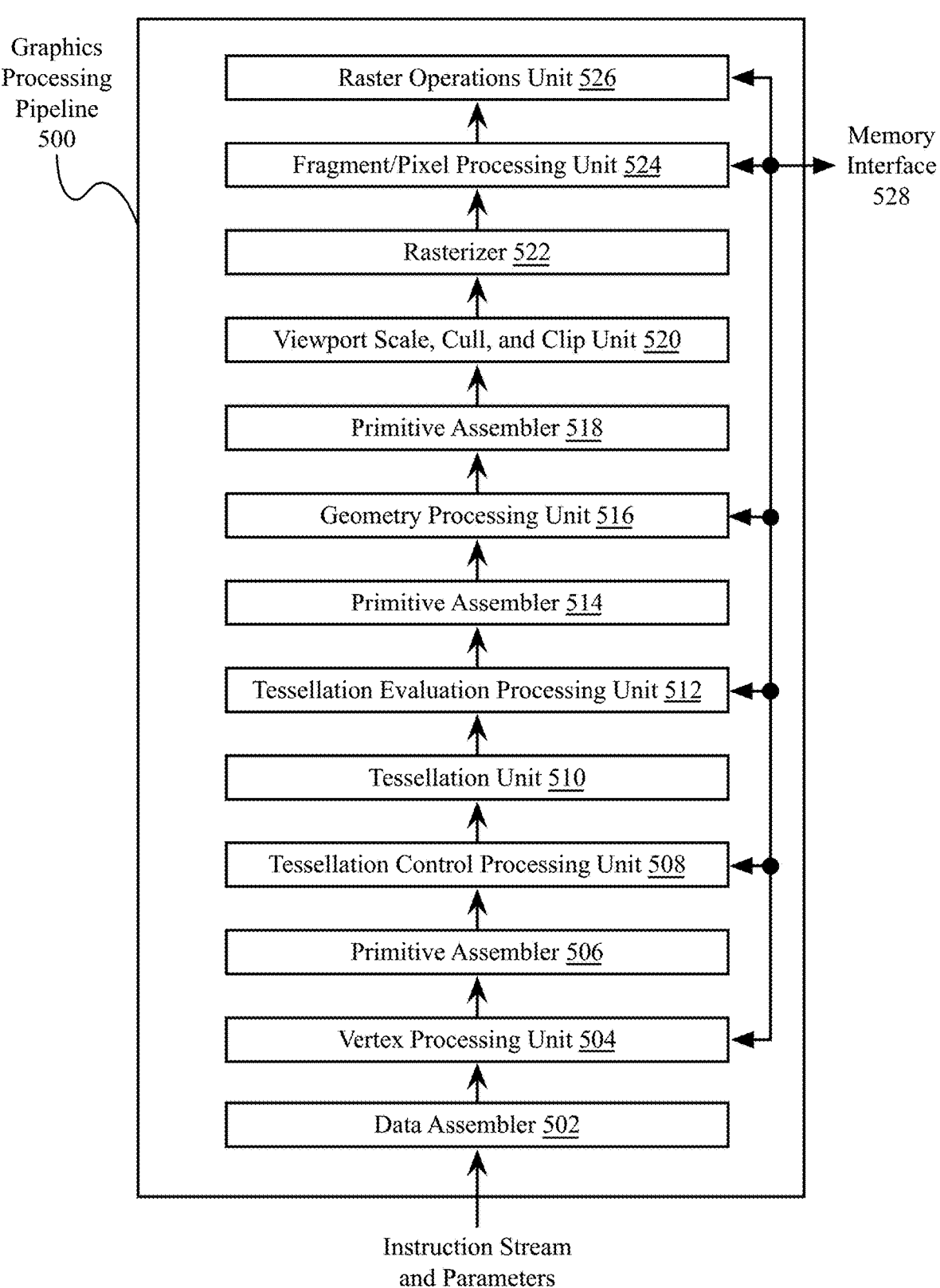
FIG. 5 illustrates a graphics processing pipeline.

FIG. 5 illustrates a graphics processing pipeline 500. A graphics multiprocessor, such as graphics multiprocessor 234 as in FIG. 2D, graphics multiprocessor 325 of FIG. 3A, graphics multiprocessor 350 of FIG. 3B can implement the illustrated graphics processing pipeline 500. The graphics multiprocessor can be included within the parallel processing subsystems as described herein, such as the parallel processor 200 of FIG. 2A, which may be related to the parallel processor(s) 112 of FIG. 1 and may be used in place of one of those. The various parallel processing systems can implement the graphics processing pipeline 500 via one or more instances of the parallel processing unit (e.g., parallel processing unit 202 of FIG. 2A) as described herein. For example, a shader unit (e.g., graphics multiprocessor 234 of FIG. 2C) may be configured to perform the functions of one or more of a vertex processing unit 504, a tessellation control processing unit 508, a tessellation evaluation processing unit 512, a geometry processing unit 516, and a fragment/pixel processing unit 524. The functions of data assembler 502, primitive assemblers 506, 514, 518, tessellation unit 510, rasterizer 522, and raster operations unit 526 may also be performed by other processing engines within a processing cluster (e.g., processing cluster 214 of FIG. 2A) and a corresponding partition unit (e.g., partition unit 220A-220N of FIG. 2A). The graphics processing pipeline 500 may also be implemented using dedicated processing units for one or more functions. It is also possible that one or more portions of the graphics processing pipeline 500 are performed by parallel processing logic within a general-purpose processor (e.g., CPU). Optionally, one or more portions of the graphics processing pipeline 500 can access on-chip memory (e.g., parallel processor memory 222 as in FIG. 2A) via a memory interface 528, which may be an instance of the memory interface 218 of FIG. 2A. The graphics processor pipeline 500 may also be implemented via a multi-core group 365A as in FIG. 3C.

The data assembler 502 is a processing unit that may collect vertex data for surfaces and primitives. The data assembler 502 then outputs the vertex data, including the vertex attributes, to the vertex processing unit 504. The vertex processing unit 504 is a programmable execution unit that executes vertex shader programs, lighting and transforming vertex data as specified by the vertex shader programs. The vertex processing unit 504 reads data that is stored in cache, local or system memory for use in processing the vertex data and may be programmed to transform the vertex data from an object-based coordinate representation to a world space coordinate space or a normalized device coordinate space.

A first instance of a primitive assembler 506 receives vertex attributes from the vertex processing unit 504. The primitive assembler 506 readings stored vertex attributes as needed and constructs graphics primitives for processing by tessellation control processing unit 508. The graphics primitives include triangles, line segments, points, patches, and so forth, as supported by various graphics processing application programming interfaces (APIs).

The tessellation control processing unit 508 treats the input vertices as control points for a geometric patch. The control points are transformed from an input representation from the patch (e.g., the patch's bases) to a representation that is suitable for use in surface evaluation by the tessellation evaluation processing unit 512. The tessellation control processing unit 508 can also compute tessellation factors for edges of geometric patches. A tessellation factor applies to a single edge and quantifies a view-dependent level of detail associated with the edge. A tessellation unit 510 is configured to receive the tessellation factors for edges of a patch and to tessellate the patch into multiple geometric primitives such as line, triangle, or quadrilateral primitives, which are transmitted to a tessellation evaluation processing unit 512. The tessellation evaluation processing unit 512 operates on parameterized coordinates of the subdivided patch to generate a surface representation and vertex attributes for each vertex associated with the geometric primitives.

A second instance of a primitive assembler 514 receives vertex attributes from the tessellation evaluation processing unit 512, reading stored vertex attributes as needed, and constructs graphics primitives for processing by the geometry processing unit 516. The geometry processing unit 516 is a programmable execution unit that executes geometry shader programs to transform graphics primitives received from primitive assembler 514 as specified by the geometry shader programs. The geometry processing unit 516 may be programmed to subdivide the graphics primitives into one or more new graphics primitives and calculate parameters used to rasterize the new graphics primitives.

The geometry processing unit 516 may be able to add or delete elements in the geometry stream. The geometry processing unit 516 outputs the parameters and vertices specifying new graphics primitives to primitive assembler 518. The primitive assembler 518 receives the parameters and vertices from the geometry processing unit 516 and constructs graphics primitives for processing by a viewport scale, cull, and clip unit 520. The geometry processing unit 516 reads data that is stored in parallel processor memory or system memory for use in processing the geometry data. The viewport scale, cull, and clip unit 520 performs clipping, culling, and viewport scaling and outputs processed graphics primitives to a rasterizer 522.

The rasterizer 522 can perform depth culling and other depth-based optimizations. The rasterizer 522 also performs scan conversion on the new graphics primitives to generate fragments and output those fragments and associated coverage data to the fragment/pixel processing unit 524. The fragment/pixel processing unit 524 is a programmable execution unit that is configured to execute fragment shader programs or pixel shader programs. The fragment/pixel processing unit 524 transforming fragments or pixels received from rasterizer 522, as specified by the fragment or pixel shader programs. For example, the fragment/pixel processing unit 524 may be programmed to perform operations included but not limited to texture mapping, shading, blending, texture correction and perspective correction to produce shaded fragments or pixels that are output to a raster operations unit 526. The fragment/pixel processing unit 524 can read data that is stored in either the parallel processor memory or the system memory for use when processing the fragment data. Fragment or pixel shader programs may be configured to shade at sample, pixel, tile, or other granularities depending on the sampling rate configured for the processing units.

The raster operations unit 526 is a processing unit that performs raster operations including, but not limited to stencil, z-test, blending, and the like, and outputs pixel data as processed graphics data to be stored in graphics memory (e.g., parallel processor memory 222 as in FIG. 2A, and/or system memory 104 as in FIG. 1), to be displayed on the one or more display device(s) 110A-110B or for further processing by one of the one or more processor(s) 102 or parallel processor(s) 112. The raster operations unit 526 may be configured to compress z or color data that is written to memory and decompress z or color data that is read from memory.

Machine Learning Overview

The architecture described above can be applied to perform training and inference operations using machine learning models. Machine learning has been successful at solving many kinds of tasks. The computations that arise when training and using machine learning algorithms (e.g., neural networks) lend themselves naturally to efficient parallel implementations. Accordingly, parallel processors such as general-purpose graphics processing units (GPGPUs) have played a significant role in the practical implementation of deep neural networks. Parallel graphics processors with single instruction, multiple thread (SIMT) architectures are designed to maximize the amount of parallel processing in the graphics pipeline. In an SIMT architecture, groups of parallel threads attempt to execute program instructions synchronously together as often as possible to increase processing efficiency. The efficiency provided by parallel machine learning algorithm implementations allows the use of high capacity networks and enables those networks to be trained on larger datasets.

A machine learning algorithm is an algorithm that can learn based on a set of data. For example, machine learning algorithms can be designed to model high-level abstractions within a data set. For example, image recognition algorithms can be used to determine which of several categories to which a given input belong; regression algorithms can output a numerical value given an input; and pattern recognition algorithms can be used to generate translated text or perform text to speech and/or speech recognition.

An exemplary type of machine learning algorithm is a neural network. There are many types of neural networks; a simple type of neural network is a feedforward network. A feedforward network may be implemented as an acyclic graph in which the nodes are arranged in layers. Typically, a feedforward network topology includes an input layer and an output layer that are separated by at least one hidden layer. The hidden layer transforms input received by the input layer into a representation that is useful for generating output in the output layer. The network nodes are fully connected via edges to the nodes in adjacent layers, but there are no edges between nodes within each layer. Data received at the nodes of an input layer of a feedforward network are propagated (i.e., "fed forward") to the nodes of the output layer via an activation function that calculates the states of the nodes of each successive layer in the network based on coefficients ("weights") respectively associated with each of the edges connecting the layers. Depending on the specific model being represented by the algorithm being executed, the output from the neural network algorithm can take various forms.

Before a machine learning algorithm can be used to model a particular problem, the algorithm is trained using a training data set. Training a neural network involves selecting a network topology, using a set of training data representing a problem being modeled by the network, and adjusting the weights until the network model performs with a minimal error for all instances of the training data set. For example, during a supervised learning training process for a neural network, the output produced by the network in response to the input representing an instance in a training data set is compared to the "correct" labeled output for that instance, an error signal representing the difference between the output and the labeled output is calculated, and the weights associated with the connections are adjusted to minimize that error as the error signal is backward propagated through the layers of the network. The network is considered "trained" when the errors for each of the outputs generated from the instances of the training data set are minimized.

The accuracy of a machine learning algorithm can be affected significantly by the quality of the data set used to train the algorithm. The training process can be computationally intensive and may require a significant amount of time on a conventional general-purpose processor. Accordingly, parallel processing hardware is used to train many types of machine learning algorithms. This is particularly useful for optimizing the training of neural networks, as the computations performed in adjusting the coefficients in neural networks lend themselves naturally to parallel implementations. Specifically, many machine learning algorithms and software applications have been adapted to make use of the parallel processing hardware within general-purpose graphics processing devices.

Figure 6:
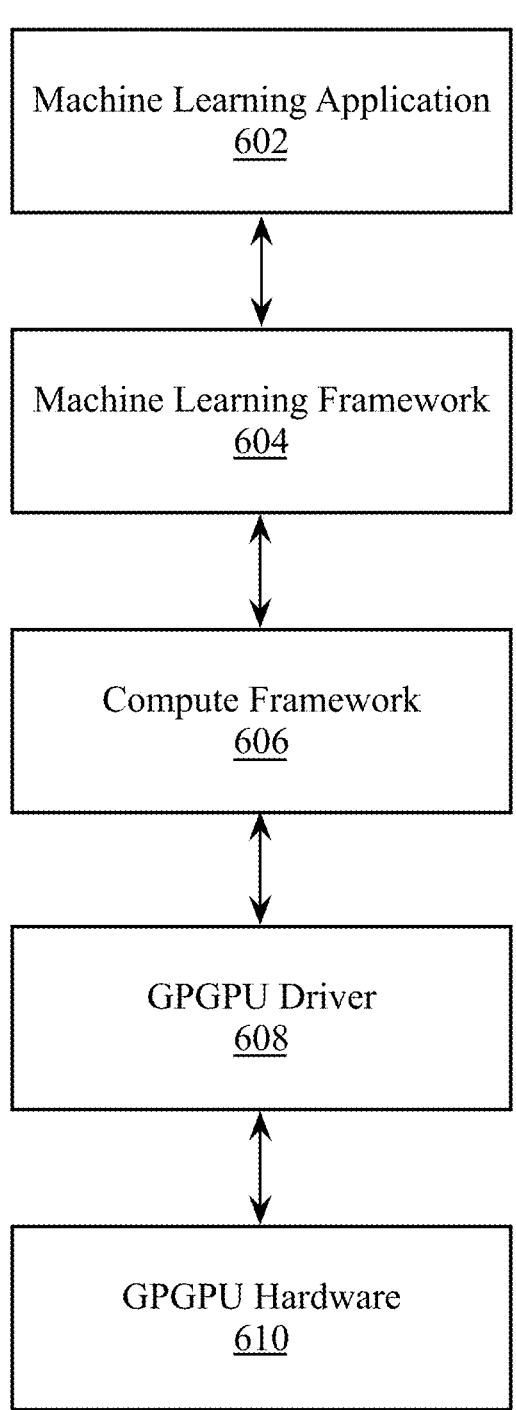
FIG. 6 illustrates a machine learning software stack.

FIG. 6 is a generalized diagram of a machine learning software stack 600. A machine learning application 602 is any logic that can be configured to train a neural network using a training dataset or to use a trained deep neural network to implement machine intelligence. The machine learning application 602 can include training and inference functionality for a neural network and/or specialized software that can be used to train a neural network before deployment. The machine learning application 602 can implement any type of machine intelligence including but not limited to image recognition, mapping and localization, autonomous navigation, speech synthesis, medical imaging, or language translation. Example machine learning applications 602 include, but are not limited to, voice-based virtual assistants, image or facial recognition algorithms, autonomous navigation, and the software tools that are used to train the machine learning models used by the machine learning applications 602.

Hardware acceleration for the machine learning application 602 can be enabled via a machine learning framework 604. The machine learning framework 604 can provide a library of machine learning primitives. Machine learning primitives are basic operations that are commonly performed by machine learning algorithms. Without the machine learning framework 604, developers of machine learning algorithms would be required to create and optimize the main computational logic associated with the machine learning algorithm, then re-optimize the computational logic as new parallel processors are developed.

Instead, the machine learning application can be configured to perform the necessary computations using the primitives provided by the machine learning framework 604. Exemplary primitives include tensor convolutions, activation functions, and pooling, which are computational operations that are performed while training a convolutional neural network (CNN). The machine learning framework 604 can also provide primitives to implement basic linear algebra subprograms performed by many machine-learning algorithms, such as matrix and vector operations. Examples of a machine learning framework 604 include, but are not limited to, TensorFlow, TensorRT, PyTorch, MXNet, Caffee, and other high-level machine learning frameworks.

The machine learning framework 604 can process input data received from the machine learning application 602 and generate the appropriate input to a compute framework 606. The compute framework 606 can abstract the underlying instructions provided to the GPGPU driver 608 to enable the machine learning framework 604 to take advantage of hardware acceleration via the GPGPU hardware 610 without requiring the machine learning framework 604 to have intimate knowledge of the architecture of the GPGPU hardware 610. Additionally, the compute framework 606 can enable hardware acceleration for the machine learning framework 604 across a variety of types and generations of the GPGPU hardware 610. Exemplary compute frameworks 606 include the CUDA compute framework and associated machine learning libraries, such as the CUDA Deep Neural Network (cuDNN) library. The machine learning software stack 600 can also include communication libraries or frameworks to facilitate multi-GPU and multi-node compute.

GPGPU Machine Learning Acceleration

Figure 7:
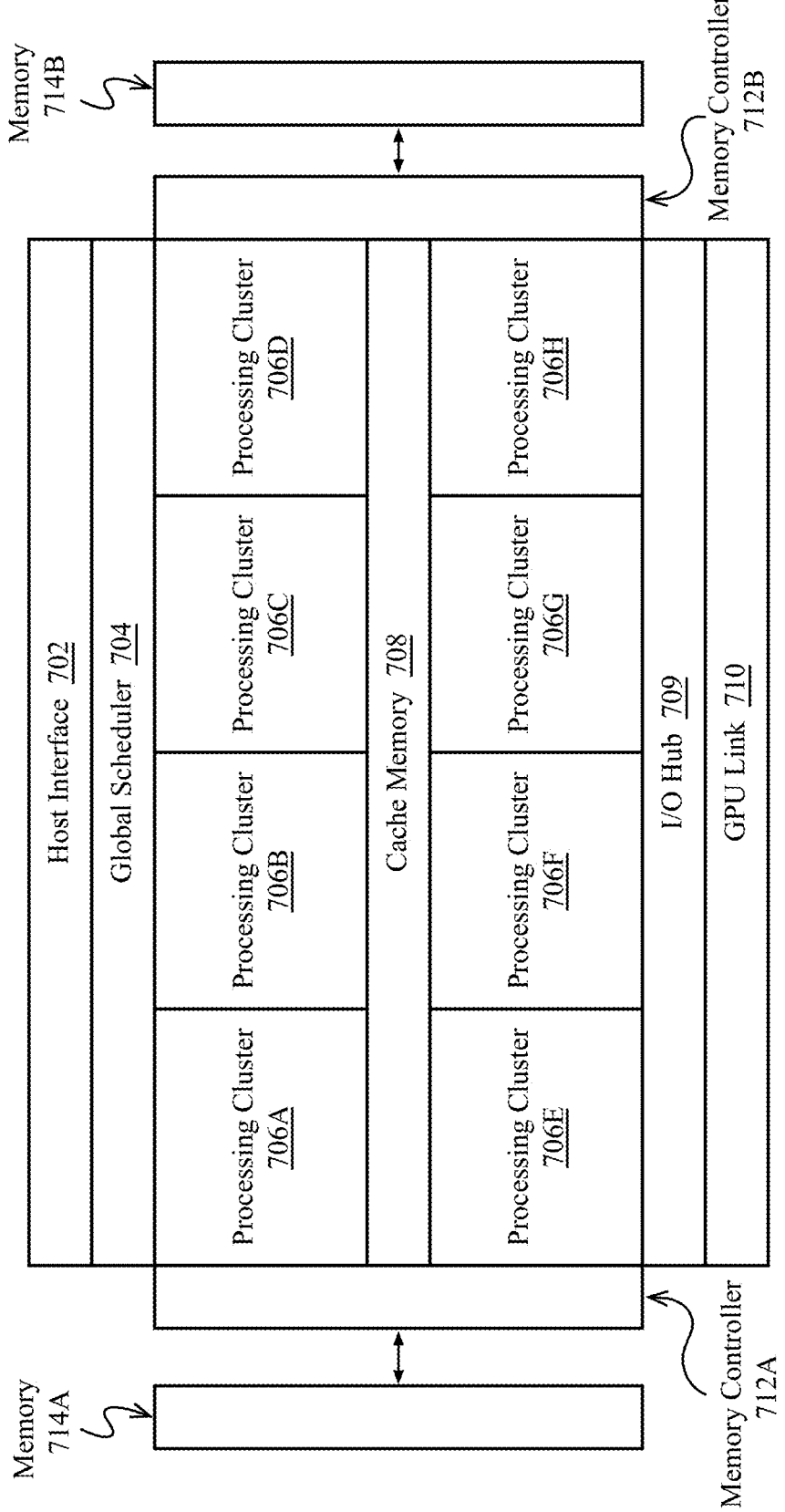
FIG. 7 illustrates a general-purpose graphics processing unit.

FIG. 7 illustrates a general-purpose graphics processing unit 700, which may be the parallel processor 200 of FIG. 2A or the parallel processor(s) 112 of FIG. 1. The general-purpose processing unit (GPGPU) 700 may be configured to provide support for hardware acceleration of primitives provided by a machine learning framework to accelerate the processing the type of computational workloads associated with training deep neural networks. Additionally, the GPGPU 700 can be linked directly to other instances of the GPGPU to create a multi-GPU cluster to improve training speed for particularly deep neural networks. Primitives are also supported to accelerate inference operations for deployed neural networks.

The GPGPU 700 includes a host interface 702 to enable a connection with a host processor. The host interface 702 may be a PCI Express interface. However, the host interface can also be a vendor specific communications interface or communications fabric. The GPGPU 700 receives commands from the host processor and uses a global scheduler 704 to distribute execution threads associated with those commands to a set of processing clusters 706A-706H. The processing clusters 706A-706H share a cache memory 708. The cache memory 708 can serve as a higher-level cache for cache memories within the processing clusters 706A-706H. The illustrated processing clusters 706A-706H may correspond with processing clusters 214A-214N as in FIG. 2A.

The GPGPU 700 includes memory 714A-714B coupled with the processing clusters 706A-706H via a set of memory controllers 712A-712B. The memory 714A-714B can include various types of memory devices including dynamic random-access memory (DRAM) or graphics random access memory, such as synchronous graphics random access memory (SGRAM), including graphics double data rate (GDDR) memory. The memory 714A-714B may also include 3D stacked memory, including but not limited to high bandwidth memory (HBM).

Each of the processing clusters 706A-706H may include a set of graphics multiprocessors, such as the graphics multiprocessor 234 of FIG. 2D, graphics multiprocessor 325 of FIG. 3A, graphics multiprocessor 350 of FIG. 3B, or may include a multi-core group 365A-365N as in FIG. 3C. The graphics multiprocessors of the compute cluster include multiple types of integer and floating-point logic units that can perform computational operations at a range of precisions including suited for machine learning computations. For example, at least a subset of the floating-point units in each of the processing clusters 706A-706H can be configured to perform 16-bit or 32-bit floating point operations, while a different subset of the floating-point units can be configured to perform 64-bit floating point operations.

Multiple instances of the GPGPU 700 can be configured to operate as a compute cluster. The communication mechanism used by the compute cluster for synchronization and data exchange varies across embodiments. For example, the multiple instances of the GPGPU 700 communicate over the host interface 702. In one embodiment the GPGPU 700 includes an I/O hub 709 that couples the GPGPU 700 with a GPU link 710 that enables a direct connection to other instances of the GPGPU. The GPU link 710 may be coupled to a dedicated GPU-to-GPU bridge that enables communication and synchronization between multiple instances of the GPGPU 700. Optionally, the GPU link 710 couples with a high-speed interconnect to transmit and receive data to other GPGPUs or parallel processors. The multiple instances of the GPGPU 700 may be located in separate data processing systems and communicate via a network device that is accessible via the host interface 702. The GPU link 710 may be configured to enable a connection to a host processor in addition to or as an alternative to the host interface 702.

While the illustrated configuration of the GPGPU 700 can be configured to train neural networks, an alternate configuration of the GPGPU 700 can be configured for deployment within a high performance or low power inferencing platform. In an inferencing configuration, the GPGPU 700 includes fewer of the processing clusters 706A-706H relative to the training configuration. Additionally, memory technology associated with the memory 714A-714B may differ between inferencing and training configurations. In one embodiment, the inferencing configuration of the GPGPU 700 can support inferencing specific instructions. For example, an inferencing configuration can provide support for one or more 8-bit integer dot product instructions, which are commonly used during inferencing operations for deployed neural networks.

Figure 8:
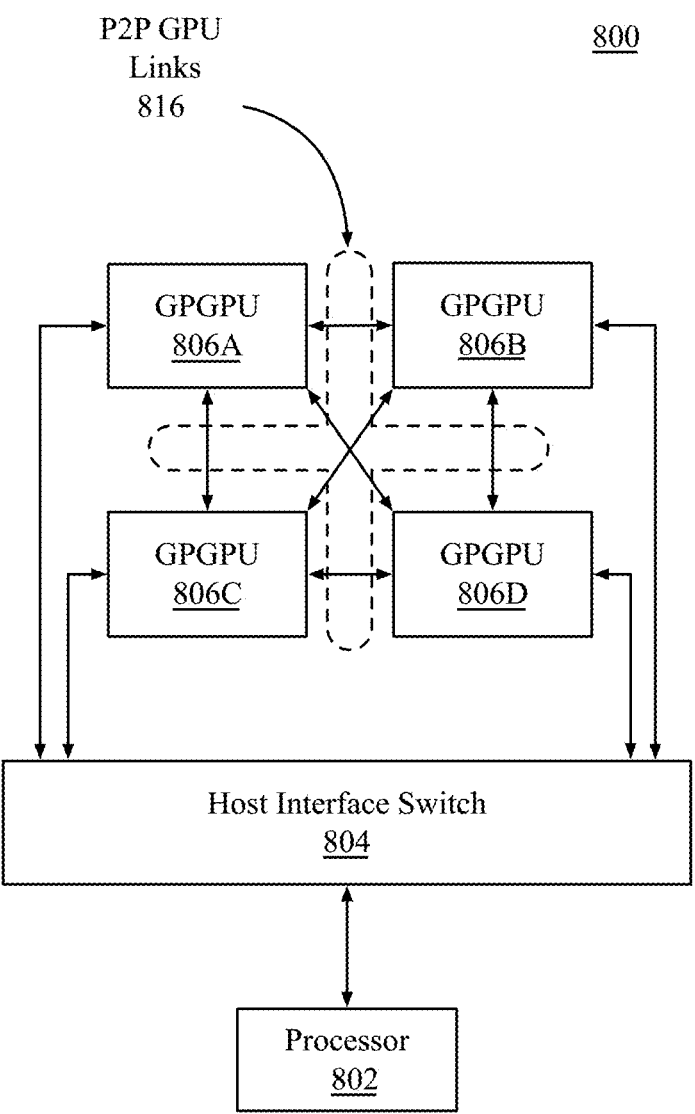
FIG. 8 illustrates a multi-GPU computing system.

FIG. 8 illustrates a multi-GPU computing system 800. The multi-GPU computing system 800 can include a processor 802 coupled to multiple GPGPUs 806A-806D via a host interface switch 804. The host interface switch 804 may be a PCI express switch device that couples the processor 802 to a PCI express bus over which the processor 802 can communicate with the set of GPGPUs 806A-806D. Each of the multiple GPGPUs 806A-806D can be an instance of the GPGPU 700 of FIG. 7. The GPGPUs 806A-806D can interconnect via a set of high-speed point to point GPU to GPU links 816. The high-speed GPU to GPU links can connect to each of the GPGPUs 806A-806D via a dedicated GPU link, such as the GPU link 710 as in FIG. 7. The P2P GPU links 816 enable direct communication between each of the GPGPUs 806A-806D without requiring communication over the host interface bus to which the processor 802 is connected. With GPU-to-GPU traffic directed to the P2P GPU links, the host interface bus remains available for system memory access or to communicate with other instances of the multi-GPU computing system 800, for example, via one or more network devices. While in FIG. 8 the GPGPUs 806A-806D connect to the processor 802 via the host interface switch 804, the processor 802 may alternatively include direct support for the P2P GPU links 816 and connect directly to the GPGPUs 806A-806D. In one embodiment the P2P GPU link 816 enable the multi-GPU computing system 800 to operate as a single logical GPU.

Machine Learning Neural Network Implementations

The computing architecture described herein can be configured to perform the types of parallel processing that is particularly suited for training and deploying neural networks for machine learning. A neural network can be generalized as a network of functions having a graph relationship. As is well-known in the art, there are a variety of types of neural network implementations used in machine learning. One exemplary type of neural network is the feedforward network, as previously described.

A second exemplary type of neural network is the Convolutional Neural Network (CNN). A CNN is a specialized feedforward neural network for processing data having a known, grid-like topology, such as image data. Accordingly, CNNs are commonly used for compute vision and image recognition applications, but they also may be used for other types of pattern recognition such as speech and language processing. The nodes in the CNN input layer are organized into a set of "filters" (feature detectors inspired by the receptive fields found in the retina), and the output of each set of filters is propagated to nodes in successive layers of the network. The computations for a CNN include applying the convolution mathematical operation to each filter to produce the output of that filter. Convolution is a specialized kind of mathematical operation performed by two functions to produce a third function that is a modified version of one of the two original functions. In convolutional network terminology, the first function to the convolution can be referred to as the input, while the second function can be referred to as the convolution kernel. The output may be referred to as the feature map. For example, the input to a convolution layer can be a multidimensional array of data that defines the various color components of an input image. The convolution kernel can be a multidimensional array of parameters, where the parameters are adapted by the training process for the neural network.

Recurrent neural networks (RNNs) are a family of feedforward neural networks that include feedback connections between layers. RNNs enable modeling of sequential data by sharing parameter data across different parts of the neural network. The architecture for an RNN includes cycles. The cycles represent the influence of a present value of a variable on its own value at a future time, as at least a portion of the output data from the RNN is used as feedback for processing subsequent input in a sequence. This feature makes RNNs particularly useful for language processing due to the variable nature in which language data can be composed.

The figures described below present exemplary feedforward, CNN, and RNN networks, as well as describe a general process for respectively training and deploying each of those types of networks. It will be understood that these descriptions are exemplary and non-limiting as to any specific embodiment described herein and the concepts illustrated can be applied generally to deep neural networks and machine learning techniques in general.

The exemplary neural networks described above can be used to perform deep learning. Deep learning is machine learning using deep neural networks. The deep neural networks used in deep learning are artificial neural networks composed of multiple hidden layers, as opposed to shallow neural networks that include only a single hidden layer. Deeper neural networks are generally more computationally intensive to train. However, the additional hidden layers of the network enable multistep pattern recognition that results in reduced output error relative to shallow machine learning techniques.

Deep neural networks used in deep learning typically include a front-end network to perform feature recognition coupled to a back-end network which represents a mathematical model that can perform operations (e.g., object classification, speech recognition, etc.) based on the feature representation provided to the model. Deep learning enables machine learning to be performed without requiring hand crafted feature engineering to be performed for the model. Instead, deep neural networks can learn features based on statistical structure or correlation within the input data. The learned features can be provided to a mathematical model that can map detected features to an output. The mathematical model used by the network is generally specialized for the specific task to be performed, and different models will be used to perform different task.

Once the neural network is structured, a learning model can be applied to the network to train the network to perform specific tasks. The learning model describes how to adjust the weights within the model to reduce the output error of the network. Backpropagation of errors is a common method used to train neural networks. An input vector is presented to the network for processing. The output of the network is compared to the desired output using a loss function and an error value is calculated for each of the neurons in the output layer. The error values are then propagated backwards until each neuron has an associated error value which roughly represents its contribution to the original output. The network can then learn from those errors using an algorithm, such as the stochastic gradient descent algorithm, to update the weights of the of the neural network.

Figure 9A:
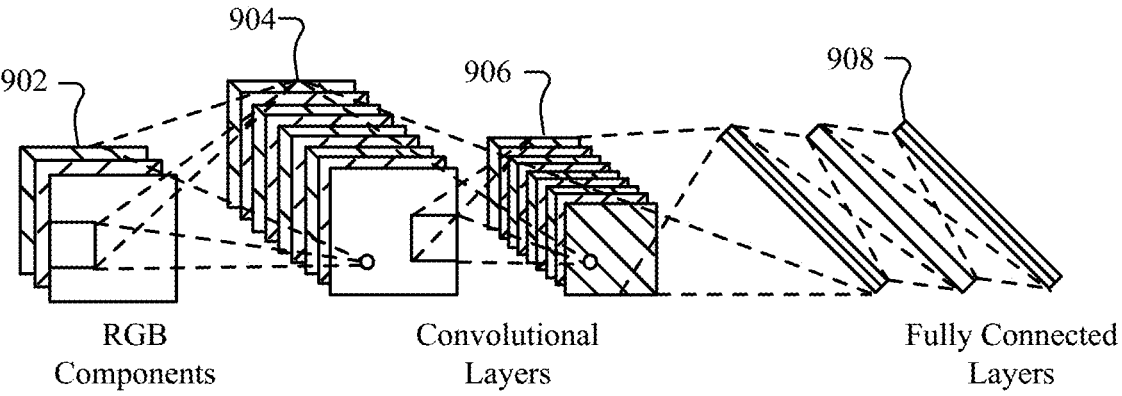
FIG. 9A-9B illustrate layers of exemplary deep neural networks.
Figure 9B:
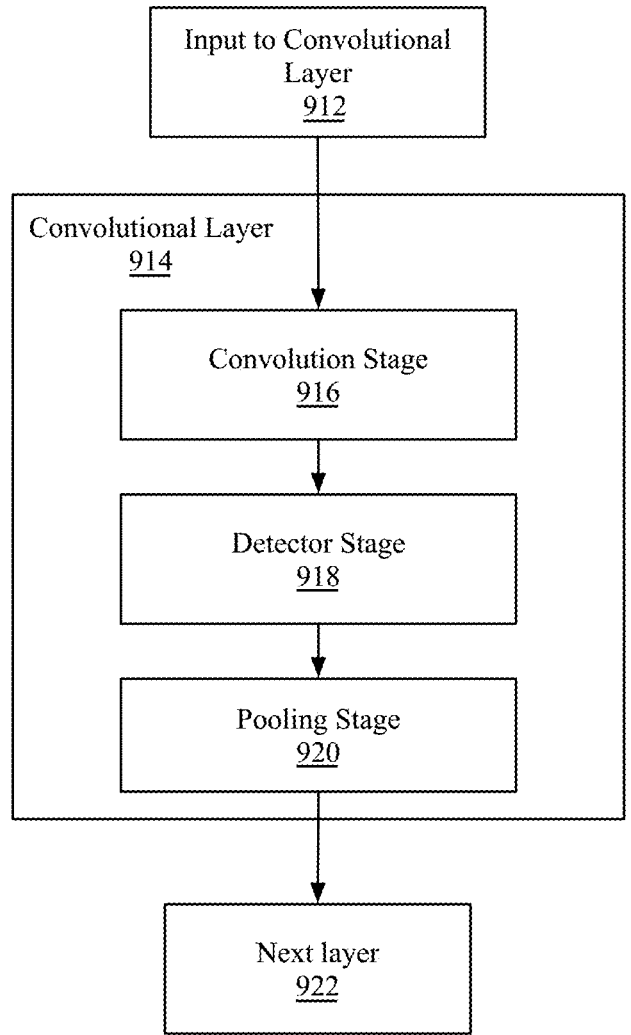

FIG. 9A-9B illustrate an exemplary convolutional neural network. FIG. 9A illustrates various layers within a CNN. As shown in FIG. 9A, an exemplary CNN used to model image processing can receive input 902 describing the red, green, and blue (RGB) components of an input image. The input 902 can be processed by multiple convolutional layers (e.g., convolutional layer 904, convolutional layer 906). The output from the multiple convolutional layers may optionally be processed by a set of fully connected layers 908. Neurons in a fully connected layer have full connections to all activations in the previous layer, as previously described for a feedforward network. The output from the fully connected layers 908 can be used to generate an output result from the network. The activations within the fully connected layers 908 can be computed using matrix multiplication instead of convolution. Not all CNN implementations make use of fully connected layers 908. For example, in some implementations the convolutional layer 906 can generate output for the CNN.

The convolutional layers are sparsely connected, which differs from traditional neural network configuration found in the fully connected layers 908. Traditional neural network layers are fully connected, such that every output unit interacts with every input unit. However, the convolutional layers are sparsely connected because the output of the convolution of a field is input (instead of the respective state value of each of the nodes in the field) to the nodes of the subsequent layer, as illustrated. The kernels associated with the convolutional layers perform convolution operations, the output of which is sent to the next layer. The dimensionality reduction performed within the convolutional layers is one aspect that enables the CNN to scale to process large images.

FIG. 9B illustrates exemplary computation stages within a convolutional layer of a CNN. Input to a convolutional layer 912 of a CNN can be processed in three stages of a convolutional layer 914. The three stages can include a convolution stage 916, a detector stage 918, and a pooling stage 920. The convolutional layer 914 can then output data to a successive convolutional layer. The final convolutional layer of the network can generate output feature map data or provide input to a fully connected layer, for example, to generate a classification value for the input to the CNN.

In the convolution stage 916 performs several convolutions in parallel to produce a set of linear activations. The convolution stage 916 can include an affine transformation, which is any transformation that can be specified as a linear transformation plus a translation. Affine transformations include rotations, translations, scaling, and combinations of these transformations. The convolution stage computes the output of functions (e.g., neurons) that are connected to specific regions in the input, which can be determined as the local region associated with the neuron. The neurons compute a dot product between the weights of the neurons and the region in the local input to which the neurons are connected. The output from the convolution stage 916 defines a set of linear activations that are processed by successive stages of the convolutional layer 914.

The linear activations can be processed by a detector stage 918. In the detector stage 918, each linear activation is processed by a non-linear activation function. The non-linear activation function increases the nonlinear properties of the overall network without affecting the receptive fields of the convolution layer. Several types of non-linear activation functions may be used. One particular type is the rectified linear unit (ReLU), which uses an activation function defined as $f(x)=\max (0, x)$, such that the activation is thresholded at zero.

The pooling stage 920 uses a pooling function that replaces the output of the convolutional layer 906 with a summary statistic of the nearby outputs. The pooling function can be used to introduce translation invariance into the neural network, such that small translations to the input do not change the pooled outputs. Invariance to local translation can be useful in scenarios where the presence of a feature in the input data is more important than the precise location of the feature. Various types of pooling functions can be used during the pooling stage 920, including max pooling, average pooling, and l2-norm pooling. Additionally, some CNN implementations do not include a pooling stage. Instead, such implementations substitute and additional convolution stage having an increased stride relative to previous convolution stages.

The output from the convolutional layer 914 can then be processed by the next layer 922. The next layer 922 can be an additional convolutional layer or one of the fully connected layers 908. For example, the first convolutional layer 904 of FIG. 9A can output to the second convolutional layer 906, while the second convolutional layer can output to a first layer of the fully connected layers 908.

Figure 10:
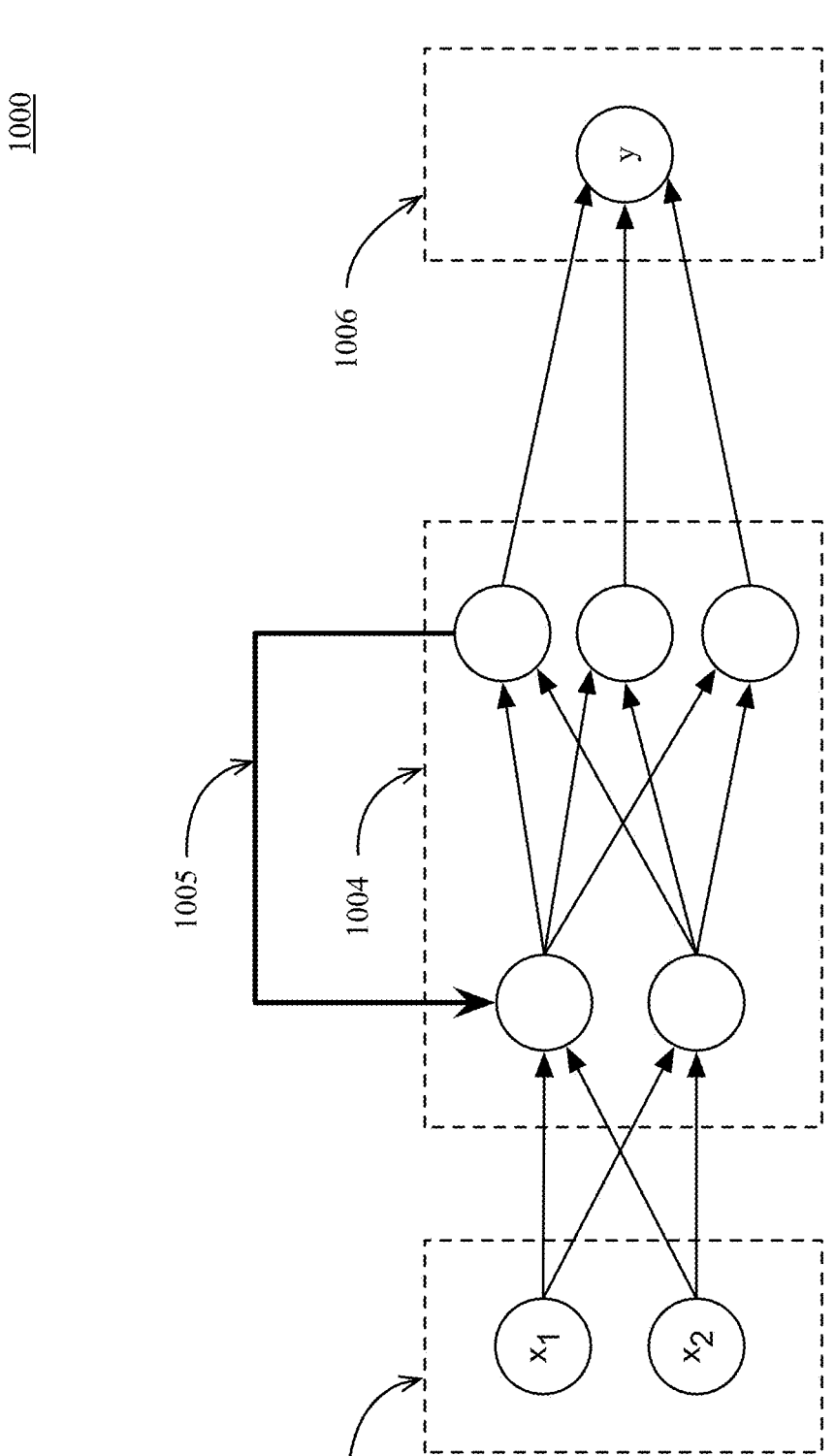
FIG. 10 illustrates an exemplary recurrent neural network.

FIG. 10 illustrates an exemplary recurrent neural network 1000. In a recurrent neural network (RNN), the previous state of the network influences the output of the current state of the network. RNNs can be built in a variety of ways using a variety of functions. The use of RNNs generally revolves around using mathematical models to predict the future based on a prior sequence of inputs. For example, an RNN may be used to perform statistical language modeling to predict an upcoming word given a previous sequence of words. The illustrated RNN 1000 can be described has having an input layer 1002 that receives an input vector, a hidden layers 1004 to implement a recurrent function, a feedback mechanism 1005 to enable a 'memory' of previous states, and an output layer 1006 to output a result. The RNN 1000 operates based on time-steps. The state of the RNN at a given time step is influenced based on the previous time step via the feedback mechanism 1005. For a given time step, the state of the hidden layers 1004 is defined by the previous state and the input at the current time step. An initial input ($x_1$) at a first time step can be processed by the hidden layer 1004. A second input ($x_2$) can be processed by the hidden layer 1004 using state information that is determined during the processing of the initial input ($x_1$). A given state can be computed as $s_t=f(Ux_t+Ws_{t-1})$, where U and W are parameter matrices. The function $f$ is generally a non-linearity, such as the hyperbolic tangent function (Tanh) or a variant of the rectifier function $f(x)=\max(0, x)$. However, the specific mathematical function used in the hidden layers 1004 can vary depending on the specific implementation details of the RNN 1000.

In addition to the basic CNN and RNN networks described, acceleration for variations on those networks may be enabled. One example RNN variant is the long short term memory (LSTM) RNN. LSTM RNNs are capable of learning long-term dependencies that may be necessary for processing longer sequences of language. A variant on the CNN is a convolutional deep belief network, which has a structure similar to a CNN and is trained in a manner similar to a deep belief network. A deep belief network (DBN) is a generative neural network that is composed of multiple layers of stochastic (random) variables. DBNs can be trained layer-by-layer using greedy unsupervised learning. The learned weights of the DBN can then be used to provide pre-train neural networks by determining an optimal initial set of weights for the neural network. In further embodiments, acceleration for reinforcement learning is enabled. In reinforcement learning, an artificial agent learn by interacting with its environment. The agent is configured to optimize certain objectives to maximize cumulative rewards.

Figure 11:
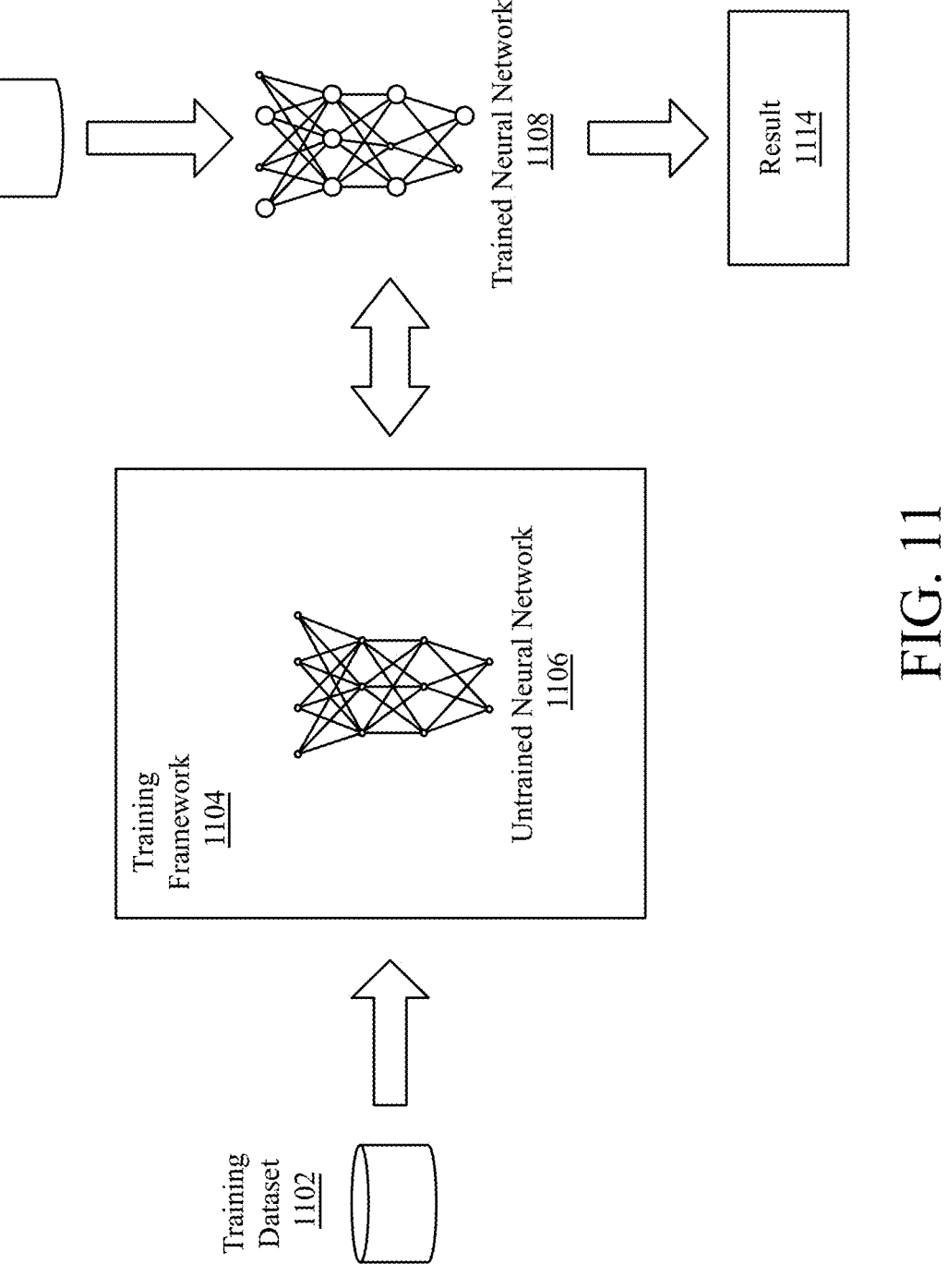
FIG. 11 illustrates training and deployment of a deep neural network.

FIG. 11 illustrates training and deployment of a deep neural network. Once a given network has been structured for a task the neural network is trained using a training dataset 1102. Various training frameworks 1104 have been developed to enable hardware acceleration of the training process. For example, the machine learning framework 604 of FIG. 6 may be configured as a training framework 1104. The training framework 1104 can hook into an untrained neural network 1106 and enable the untrained neural net to be trained using the parallel processing resources described herein to generate a trained neural network 1108.

To start the training process the initial weights may be chosen randomly or by pre-training using a deep belief network. The training cycle then be performed in either a supervised or unsupervised manner.

Supervised learning is a learning method in which training is performed as a mediated operation, such as when the training dataset 1102 includes input paired with the desired output for the input, or where the training dataset includes input having known output and the output of the neural network is manually graded. The network processes the inputs and compares the resulting outputs against a set of expected or desired outputs. Errors are then propagated back through the system. The training framework 1104 can adjust to adjust the weights that control the untrained neural network 1106. The training framework 1104 can provide tools to monitor how well the untrained neural network 1106 is converging towards a model suitable to generating correct answers based on known input data. The training process occurs repeatedly as the weights of the network are adjusted to refine the output generated by the neural network. The training process can continue until the neural network reaches a statistically desired accuracy associated with a trained neural net 1108. The trained neural network 1108 can then be deployed to implement any number of machine learning operations to generate an inference result 1114 based on input of new data 1112.

Unsupervised learning is a learning method in which the network attempts to train itself using unlabeled data. Thus, for unsupervised learning the training dataset 1102 will include input data without any associated output data. The untrained neural network 1106 can learn groupings within the unlabeled input and can determine how individual inputs are related to the overall dataset. Unsupervised training can be used to generate a self-organizing map, which is a type of trained neural network 1108 capable of performing operations useful in reducing the dimensionality of data. Unsupervised training can also be used to perform anomaly detection, which allows the identification of data points in an input dataset that deviate from the normal patterns of the data.

Variations on supervised and unsupervised training may also be employed. Semi-supervised learning is a technique in which in the training dataset 1102 includes a mix of labeled and unlabeled data of the same distribution. Incremental learning is a variant of supervised learning in which input data is continuously used to further train the model. Incremental learning enables the trained neural network 1108 to adapt to the new data 1112 without forgetting the knowledge instilled within the network during initial training.

Whether supervised or unsupervised, the training process for particularly deep neural networks may be too computationally intensive for a single compute node. Instead of using a single compute node, a distributed network of computational nodes can be used to accelerate the training process.

Figure 12A:
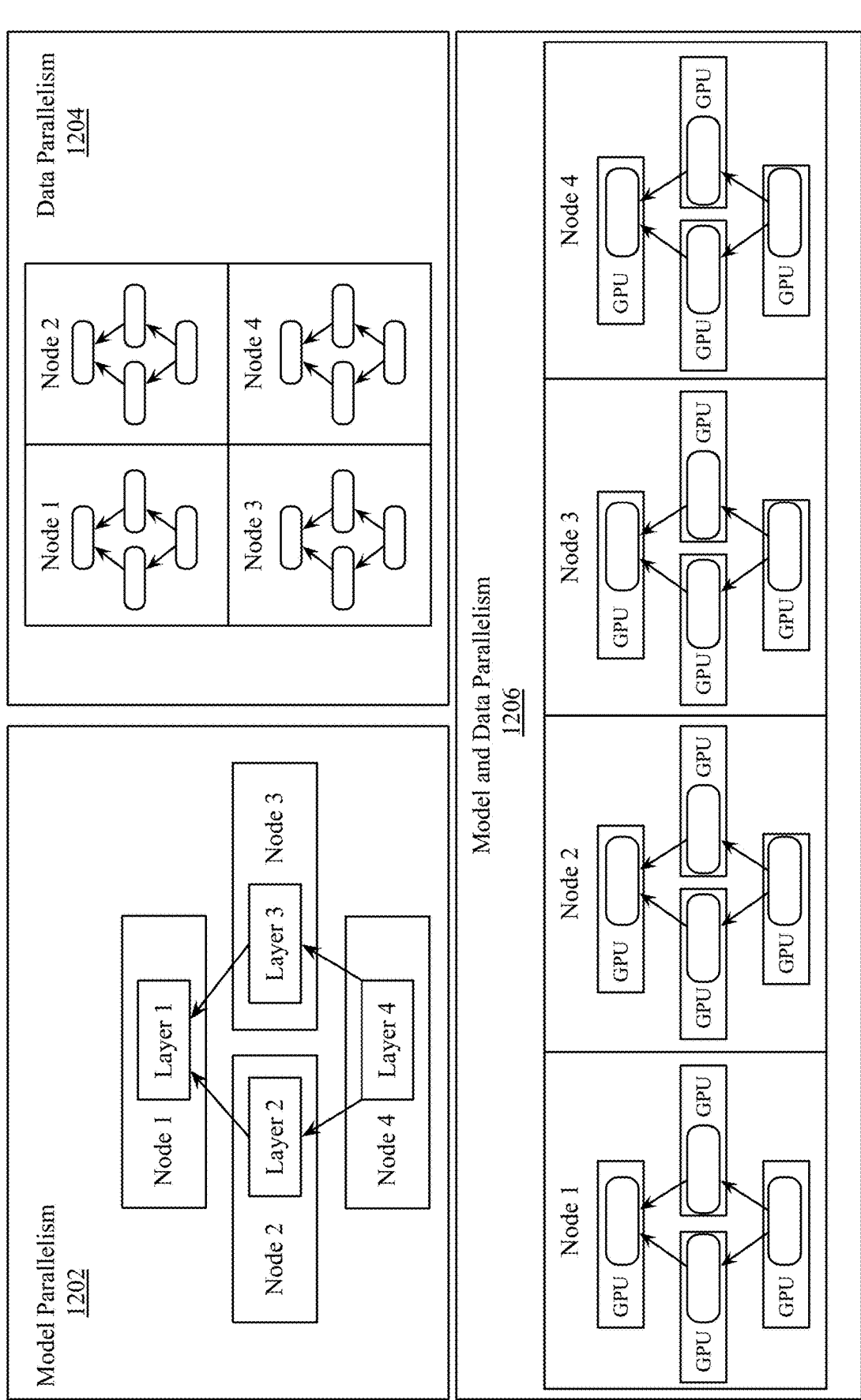
FIG. 12A is a block diagram illustrating distributed learning.

FIG. 12A is a block diagram illustrating distributed learning. Distributed learning is a training model that uses multiple distributed computing nodes to perform supervised or unsupervised training of a neural network. The distributed computational nodes can each include one or more host processors and one or more of the general-purpose processing nodes, such as the highly parallel general-purpose graphics processing unit 700 as in FIG. 7. As illustrated, distributed learning can be performed with model parallelism 1202, data parallelism 1204, or a combination of model and data parallelism 1206.

In model parallelism 1202, different computational nodes in a distributed system can perform training computations for different parts of a single network. For example, each layer of a neural network can be trained by a different processing node of the distributed system. The benefits of model parallelism include the ability to scale to particularly large models. Splitting the computations associated with different layers of the neural network enables the training of very large neural networks in which the weights of all layers would not fit into the memory of a single computational node. In some instances, model parallelism can be particularly useful in performing unsupervised training of large neural networks.

In data parallelism 1204, the different nodes of the distributed network have a complete instance of the model and each node receives a different portion of the data. The results from the different nodes are then combined. While different approaches to data parallelism are possible, data parallel training approaches all require a technique of combining results and synchronizing the model parameters between each node. Exemplary approaches to combining data include parameter averaging and update based data parallelism. Parameter averaging trains each node on a subset of the training data and sets the global parameters (e.g., weights, biases) to the average of the parameters from each node. Parameter averaging uses a central parameter server that maintains the parameter data. Update based data parallelism is similar to parameter averaging except that instead of transferring parameters from the nodes to the parameter server, the updates to the model are transferred. Additionally, update based data parallelism can be performed in a decentralized manner, where the updates are compressed and transferred between nodes.

Combined model and data parallelism 1206 can be implemented, for example, in a distributed system in which each computational node includes multiple GPUs. Each node can have a complete instance of the model with separate GPUs within each node are used to train different portions of the model.

Distributed training has increased overhead relative to training on a single machine. However, the parallel processors and GPGPUs described herein can each implement various techniques to reduce the overhead of distributed training, including techniques to enable high bandwidth GPU-to-GPU data transfer and accelerated remote data synchronization.

Figure 12B:
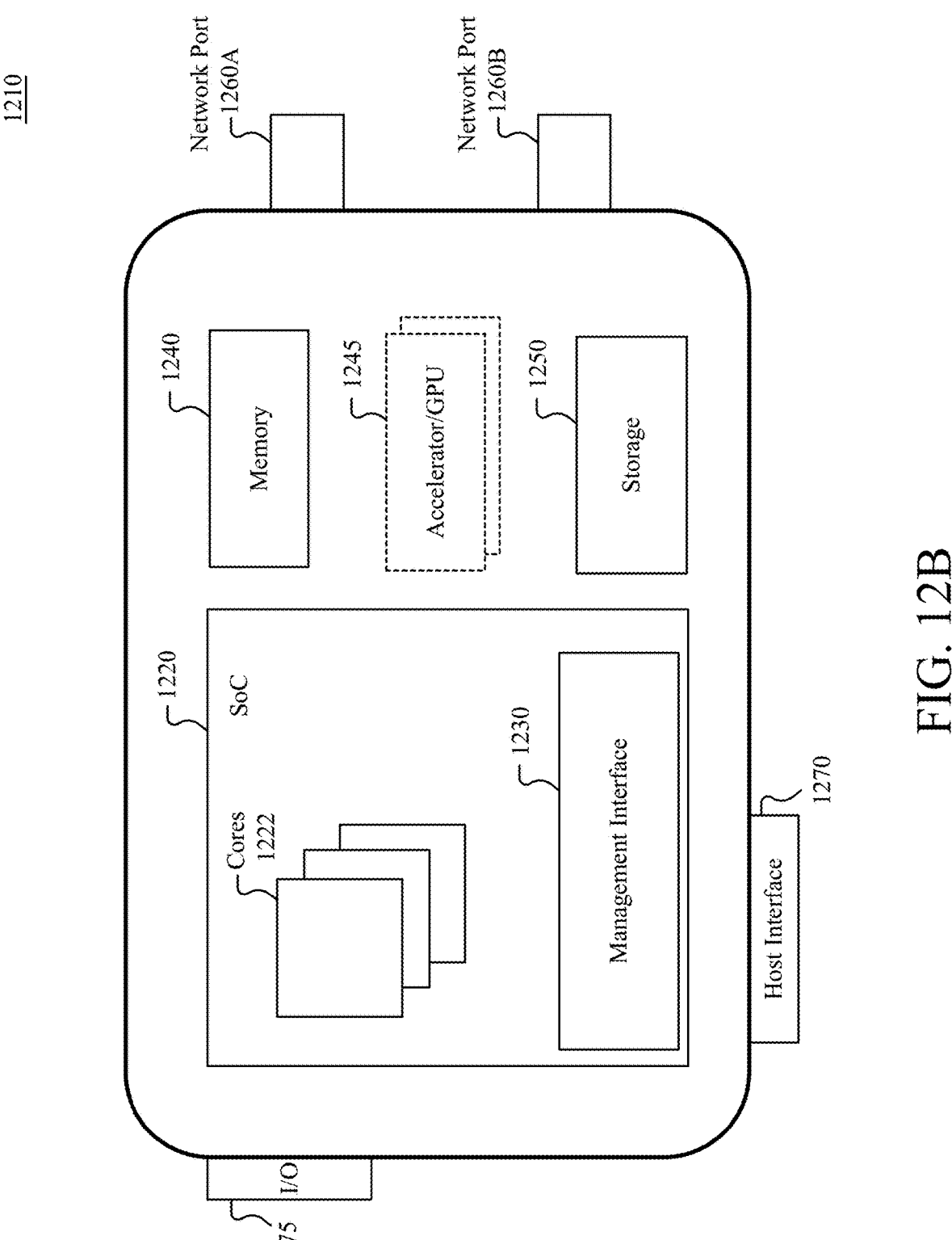
FIG. 12B is a block diagram illustrating a programmable network interface and data processing unit.

FIG. 12B is a block diagram illustrating a programmable network interface 1210 and data processing unit. The programmable network interface 1210 is a programmable network engine that can be used to accelerate network-based compute tasks within a distributed environment. The programmable network interface 1210 can couple with a host system via host interface 1270. The programmable network interface 1210 can be used to accelerate network or storage operations for CPUs or GPUs of the host system. The host system can be, for example, a node of a distributed learning system used to perform distributed training, for example, as shown in FIG. 12A. The host system can also be a data center node within a data center.

In one embodiment, access to remote storage containing model data can be accelerated by the programmable network interface 1210. For example, the programmable network interface 1210 can be configured to present remote storage devices as local storage devices to the host system. The programmable network interface 1210 can also accelerate remote direct memory access (RDMA) operations performed between GPUs of the host system with GPUs of remote systems. In one embodiment, the programmable network interface 1210 can enable storage functionality such as, but not limited to NVME-oF. The programmable network interface 1210 can also accelerate encryption, data integrity, compression, and other operations for remote storage on behalf of the host system, allowing remote storage to approach the latencies of storage devices that are directly attached to the host system.

The programmable network interface 1210 can also perform resource allocation and management on behalf of the host system. Storage security operations can be offloaded to the programmable network interface 1210 and performed in concert with the allocation and management of remote storage resources. Network-based operations to manage access to the remote storage that would otherwise by performed by a processor of the host system can instead be performed by the programmable network interface 1210.

In one embodiment, network and/or data security operations can be offloaded from the host system to the programmable network interface 1210. Data center security policies for a data center node can be handled by the programmable network interface 1210 instead of the processors of the host system. For example, the programmable network interface 1210 can detect and mitigate against an attempted network-based attack (e.g., DDoS) on the host system, preventing the attack from compromising the availability of the host system.

The programmable network interface 1210 can include a system on a chip (SoC 1220) that executes an operating system via multiple processor cores 1222. The processor cores 1222 can include general-purpose processor (e.g., CPU) cores. In one embodiment the processor cores 1222 can also include one or more GPU cores. The SoC 1220 can execute instructions stored in a memory device 1240. A storage device 1250 can store local operating system data. The storage device 1250 and memory device 1240 can also be used to cache remote data for the host system. Network ports 1260A-1260B enable a connection to a network or fabric and facilitate network access for the SoC 1220 and, via the host interface 1270, for the host system. The programmable network interface 1210 can also include an I/O interface 1275, such as a USB interface. The I/O interface 1275 can be used to couple external devices to the programmable network interface 1210 or as a debug interface. The programmable network interface 1210 also includes a management interface 1230 that enables software on the host device to manage and configure the programmable network interface 1210 and/or SoC 1220. In one embodiment the programmable network interface 1210 may also include one or more accelerators or GPUs 1245 to accept offload of parallel compute tasks from the SoC 1220, host system, or remote systems coupled via the network ports 1260A-1260B.

Exemplary Machine Learning Applications

Machine learning can be applied to solve a variety of technological problems, including but not limited to computer vision, autonomous driving and navigation, speech recognition, and language processing. Computer vision has traditionally been one of the most active research areas for machine learning applications. Applications of computer vision range from reproducing human visual abilities, such as recognizing faces, to creating new categories of visual abilities. For example, computer vision applications can be configured to recognize sound waves from the vibrations induced in objects visible in a video. Parallel processor accelerated machine learning enables computer vision applications to be trained using significantly larger training dataset than previously feasible and enables inferencing systems to be deployed using low power parallel processors.

Parallel processor accelerated machine learning has autonomous driving applications including lane and road sign recognition, obstacle avoidance, navigation, and driving control. Accelerated machine learning techniques can be used to train driving models based on datasets that define the appropriate responses to specific training input. The parallel processors described herein can enable rapid training of the increasingly complex neural networks used for autonomous driving solutions and enables the deployment of low power inferencing processors in a mobile platform suitable for integration into autonomous vehicles.

Parallel processor accelerated deep neural networks have enabled machine learning approaches to automatic speech recognition (ASR). ASR includes the creation of a function that computes the most probable linguistic sequence given an input acoustic sequence. Accelerated machine learning using deep neural networks have enabled the replacement of the hidden Markov models (HMMs) and Gaussian mixture models (GMMs) previously used for ASR.

Parallel processor accelerated machine learning can also be used to accelerate natural language processing. Automatic learning procedures can make use of statistical inference algorithms to produce models that are robust to erroneous or unfamiliar input. Exemplary natural language processor applications include automatic machine translation between human languages.

The parallel processing platforms used for machine learning can be divided into training platforms and deployment platforms. Training platforms are generally highly parallel and include optimizations to accelerate multi-GPU single node training and multi-node, multi-GPU training. Exemplary parallel processors suited for training include the general-purpose graphics processing unit 700 of FIG. 7 and the multi-GPU computing system 800 of FIG. 8. On the contrary, deployed machine learning platforms generally include lower power parallel processors suitable for use in products such as cameras, autonomous robots, and autonomous vehicles.

Additionally, machine learning techniques can be applied to accelerate or enhance graphics processing activities. For example, a machine learning model can be trained to recognize output generated by a GPU accelerated application and generate an upscaled version of that output. Such techniques can be applied to accelerate the generation of high resolution images for a gaming application. Various other graphics pipeline activities can benefit from the use of machine learning. For example, machine learning models can be trained to perform tessellation operations on geometry data to increase the complexity of geometric models, allowing fine-detailed geometry to be automatically generated from geometry of relatively lower detail.

Figure 13:
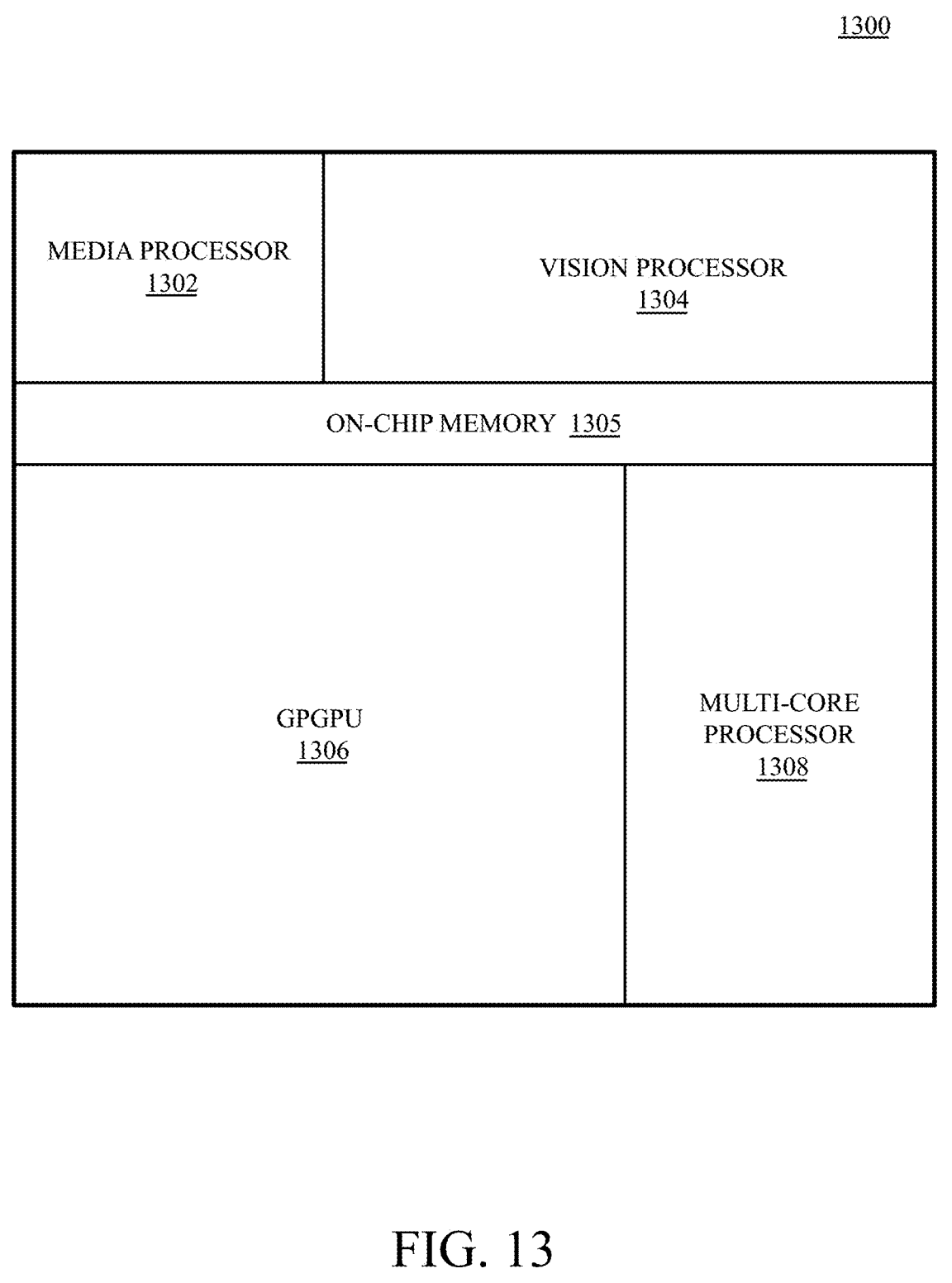

FIG. 13 illustrates an exemplary inferencing system on a chip (SOC) 1300 suitable for performing inferencing using a trained model. The SOC 1300 can integrate processing components including a media processor 1302, a vision processor 1304, a GPGPU 1306 and a multi-core processor 1308. The GPGPU 1306 may be a GPGPU as described herein, such as the GPGPU 700, and the multi-core processor 1308 may be a multi-core processor described herein, such as the multi-core processors 405-406. The SOC 1300 can additionally include on-chip memory 1305 that can enable a shared on-chip data pool that is accessible by each of the processing components. The processing components can be optimized for low power operation to enable deployment to a variety of machine learning platforms, including autonomous vehicles and autonomous robots. For example, one implementation of the SOC 1300 can be used as a portion of the main control system for an autonomous vehicle. Where the SOC 1300 is configured for use in autonomous vehicles the SOC is designed and configured for compliance with the relevant functional safety standards of the deployment jurisdiction.

During operation, the media processor 1302 and vision processor 1304 can work in concert to accelerate computer vision operations. The media processor 1302 can enable low latency decode of multiple high-resolution (e.g., 4K, 8K)

video streams. The decoded video streams can be written to a buffer in the on-chip memory 1305. The vision processor 1304 can then parse the decoded video and perform preliminary processing operations on the frames of the decoded video in preparation of processing the frames using a trained image recognition model. For example, the vision processor 1304 can accelerate convolution operations for a CNN that is used to perform image recognition on the high-resolution video data, while back end model computations are performed by the GPGPU 1306.

The multi-core processor 1308 can include control logic to assist with sequencing and synchronization of data transfers and shared memory operations performed by the media processor 1302 and the vision processor 1304. The multi-core processor 1308 can also function as an application processor to execute software applications that can make use of the inferencing compute capability of the GPGPU 1306. For example, at least a portion of the navigation and driving logic can be implemented in software executing on the multi-core processor 1308. Such software can directly issue computational workloads to the GPGPU 1306 or the computational workloads can be issued to the multi-core processor 1308, which can offload at least a portion of those operations to the GPGPU 1306.

The GPGPU 1306 can include compute clusters such as a low power configuration of the processing clusters 706A-706H within general-purpose graphics processing unit 700. The compute clusters within the GPGPU 1306 can support instruction that are specifically optimized to perform inferencing computations on a trained neural network. For example, the GPGPU 1306 can support instructions to perform low precision computations such as 8-bit and 4-bit integer vector operations.

Additional System Overview

Figure 14:
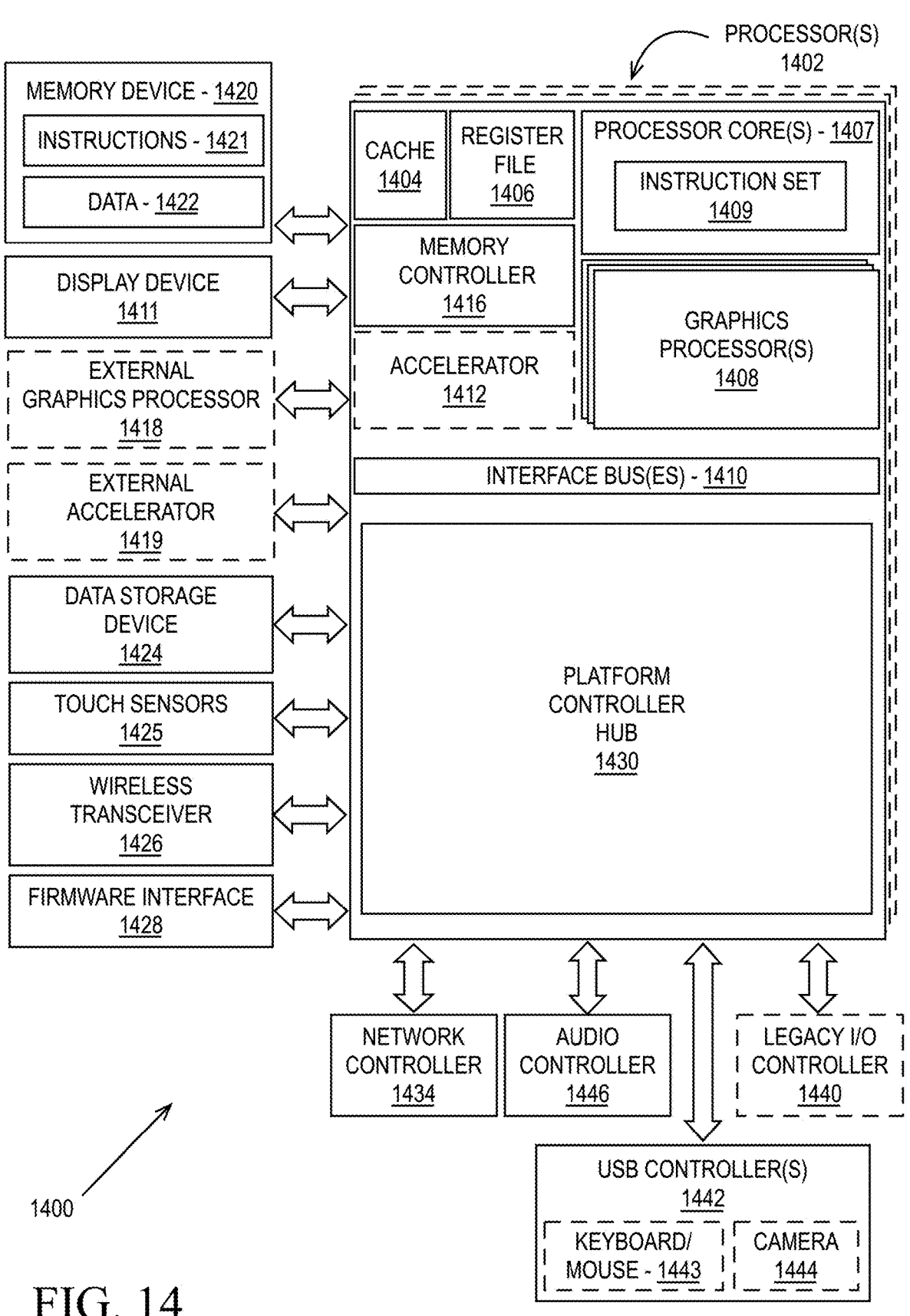
FIG. 14 is a block diagram of a processing system.

FIG. 14 is a block diagram of a processing system 1400. The elements of FIG. 14 having the same or similar names as the elements of any other figure herein describe the same elements as in the other figures, can operate or function in a manner similar to that, can comprise the same components, and can be linked to other entities, as those described elsewhere herein, but are not limited to such. System 1400 may be used in a single processor desktop system, a multiprocessor workstation system, or a server system having a large number of processors 1402 or processor cores 1407. The system 1400 may be a processing platform incorporated within a system-on-a-chip (SoC) integrated circuit for use in mobile, handheld, or embedded devices such as within Internet-of-things (IoT) devices with wired or wireless connectivity to a local or wide area network.

The system 1400 may be a processing system having components that correspond with those of FIG. 1. For example, in different configurations, processor(s) 1402 or processor core(s) 1407 may correspond with processor(s) 102 of FIG. 1. Graphics processor(s) 1408 may correspond with parallel processor(s) 112 of FIG. 1. External graphics processor 1418 may be one of the add-in device(s) 120 of FIG. 1.

The system 1400 can include, couple with, or be integrated within: a server-based gaming platform; a game console, including a game and media console; a mobile gaming console, a handheld game console, or an online game console. The system 1400 may be part of a mobile phone, smart phone, tablet computing device or mobile Internet-connected device such as a laptop with low internal storage capacity. Processing system 1400 can also include, couple with, or be integrated within: a wearable device, such as a smart watch wearable device; smart eyewear or clothing enhanced with augmented reality (AR) or virtual reality (VR) features to provide visual, audio or tactile outputs to supplement real world visual, audio or tactile experiences or otherwise provide text, audio, graphics, video, holographic images or video, or tactile feedback; other augmented reality (AR) device; or other virtual reality (VR) device. The processing system 1400 may include or be part of a television or set top box device. The system 1400 can include, couple with, or be integrated within a self-driving vehicle such as a bus, tractor trailer, car, motor or electric power cycle, plane or glider (or any combination thereof). The self-driving vehicle may use system 1400 to process the environment sensed around the vehicle.

The one or more processors 1402 may include one or more processor cores 1407 to process instructions which, when executed, perform operations for system or user software. The least one of the one or more processor cores 1407 may be configured to process a specific instruction set 1409. The instruction set 1409 may facilitate Complex Instruction Set Computing (CISC), Reduced Instruction Set Computing (RISC), or computing via a Very Long Instruction Word (VLIW). One or more processor cores 1407 may process a different instruction set 1409, which may include instructions to facilitate the emulation of other instruction sets. Processor core 1407 may also include other processing devices, such as a Digital Signal Processor (DSP).

The processor 1402 may include cache memory 1404. Depending on the architecture, the processor 1402 can have a single internal cache or multiple levels of internal cache. In some embodiments, the cache memory is shared among various components of the processor 1402. In some embodiments, the processor 1402 also uses an external cache (e.g., a Level-3 (L3) cache or Last Level Cache (LLC)) (not shown), which may be shared among processor cores 1407 using known cache coherency techniques. A register file 1406 can be additionally included in processor 1402 and may include different types of registers for storing different types of data (e.g., integer registers, floating point registers, status registers, and an instruction pointer register). Some registers may be general-purpose registers, while other registers may be specific to the design of the processor 1402.

The one or more processor(s) 1402 may be coupled with one or more interface bus(es) 1410 to transmit communication signals such as address, data, or control signals between processor 1402 and other components in the system 1400. The interface bus 1410, in one of these embodiments, can be a processor bus, such as a version of the Direct Media Interface (DMI) bus. However, processor busses are not limited to the DMI bus, and may include one or more Peripheral Component Interconnect buses (e.g., PCI, PCI express), memory busses, or other types of interface busses. For example, the processor(s) 1402 may include an integrated memory controller 1416 and a platform controller hub 1430. The memory controller 1416 facilitates communication between a memory device and other components of the system 1400, while the platform controller hub (PCH) 1430 provides connections to I/O devices via a local I/O bus.

The memory device 1420 can be a dynamic random-access memory (DRAM) device, a static random-access memory (SRAM) device, flash memory device, phase-change memory device, or some other memory device having suitable performance to serve as process memory. The memory device 1420 can, for example, operate as system memory for the system 1400, to store data 1422 and instructions 1421 for use when the one or more processors 1402 executes an application or process. Memory controller 1416 also couples with an optional external graphics processor 1418, which may communicate with the one or more graphics processors 1408 in processors 1402 to perform graphics and media operations. In some embodiments, graphics, media, and or compute operations may be assisted by an accelerator 1412 which is a coprocessor that can be configured to perform a specialized set of graphics, media, or compute operations. For example, the accelerator 1412 may be a matrix multiplication accelerator used to optimize machine learning or compute operations. The accelerator 1412 can be a ray-tracing accelerator that can be used to perform ray-tracing operations in concert with the graphics processor 1408. In one embodiment, an external accelerator 1419 may be used in place of or in concert with the accelerator 1412.

A display device 1411 may be provided that can connect to the processor(s) 1402. The display device 1411 can be one or more of an internal display device, as in a mobile electronic device or a laptop device or an external display device attached via a display interface (e.g., DisplayPort, etc.). The display device 1411 can be a head mounted display (HMD) such as a stereoscopic display device for use in virtual reality (VR) applications or augmented reality (AR) applications.

The platform controller hub 1430 may enable peripherals to connect to memory device 1420 and processor 1402 via a high-speed I/O bus. The I/O peripherals include, but are not limited to, an audio controller 1446, a network controller 1434, a firmware interface 1428, a wireless transceiver 1426, touch sensors 1425, a data storage device 1424 (e.g., non-volatile memory, volatile memory, hard disk drive, flash memory, NAND, 3D NAND, 3D XPoint/Optane, etc.). The data storage device 1424 can connect via a storage interface (e.g., SATA) or via a peripheral bus, such as a Peripheral Component Interconnect bus (e.g., PCI, PCI express). The touch sensors 1425 can include touch screen sensors, pressure sensors, or fingerprint sensors. The wireless transceiver 1426 can be a Wi-Fi transceiver, a Bluetooth transceiver, or a mobile network transceiver such as a 3G, 4G, 5G, or Long-Term Evolution (LTE) transceiver. The firmware interface 1428 enables communication with system firmware, and can be, for example, a unified extensible firmware interface (UEFI). The network controller 1434 can enable a network connection to a wired network. In some embodiments, a high-performance network controller (not shown) couples with the interface bus 1410. The audio controller 1446 may be a multi-channel high definition audio controller. In some of these embodiments the system 1400 includes an optional legacy I/O controller 1440 for coupling legacy (e.g., Personal System 2 (PS/2)) devices to the system. The platform controller hub 1430 can also connect to one or more Universal Serial Bus (USB) controllers 1442 connect input devices, such as keyboard and mouse 1443 combinations, a camera 1444, or other USB input devices.

It will be appreciated that the system 1400 shown is exemplary and not limiting, as other types of data processing systems that are differently configured may also be used. For example, an instance of the memory controller 1416 and platform controller hub 1430 may be integrated into a discrete external graphics processor, such as the external graphics processor 1418. The platform controller hub 1430 and/or memory controller 1416 may be external to the one or more processor(s) 1402. For example, the system 1400 can include an external memory controller 1416 and platform controller hub 1430, which may be configured as a memory controller hub and peripheral controller hub within a system chipset that is in communication with the processor(s) 1402.

For example, circuit boards ("sleds") can be used on which components such as CPUs, memory, and other components are placed are designed for increased thermal performance. Processing components such as the processors may be located on a top side of a sled while near memory, such as DIMMs, are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in a rack, thereby enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

A data center can utilize a single network architecture ("fabric") that supports multiple other network architectures including Ethernet and Omni-Path. The sleds can be coupled to switches via optical fibers, which provide higher bandwidth and lower latency than typical twisted pair cabling (e.g., Category 5, Category 5e, Category 6, etc.). Due to the high bandwidth, low latency interconnections and network architecture, the data center may, in use, pool resources, such as memory, accelerators (e.g., GPUs, graphics accelerators, FPGAs, ASICs, neural network and/or artificial intelligence accelerators, etc.), and data storage drives that are physically disaggregated, and provide them to compute resources (e.g., processors) on an as needed basis, enabling the compute resources to access the pooled resources as if they were local.

A power supply or source can provide voltage and/or current to system 1400 or any component or system described herein. In one example, the power supply includes an AC to DC (alternating current to direct current) adapter to plug into a wall outlet. Such AC power can be renewable energy (e.g., solar power) power source. In one example, the power source includes a DC power source, such as an external AC to DC converter. A power source or power supply may also include wireless charging hardware to charge via proximity to a charging field. The power source can include an internal battery, alternating current supply, motion-based power supply, solar power supply, or fuel cell source.

Figure 15A:
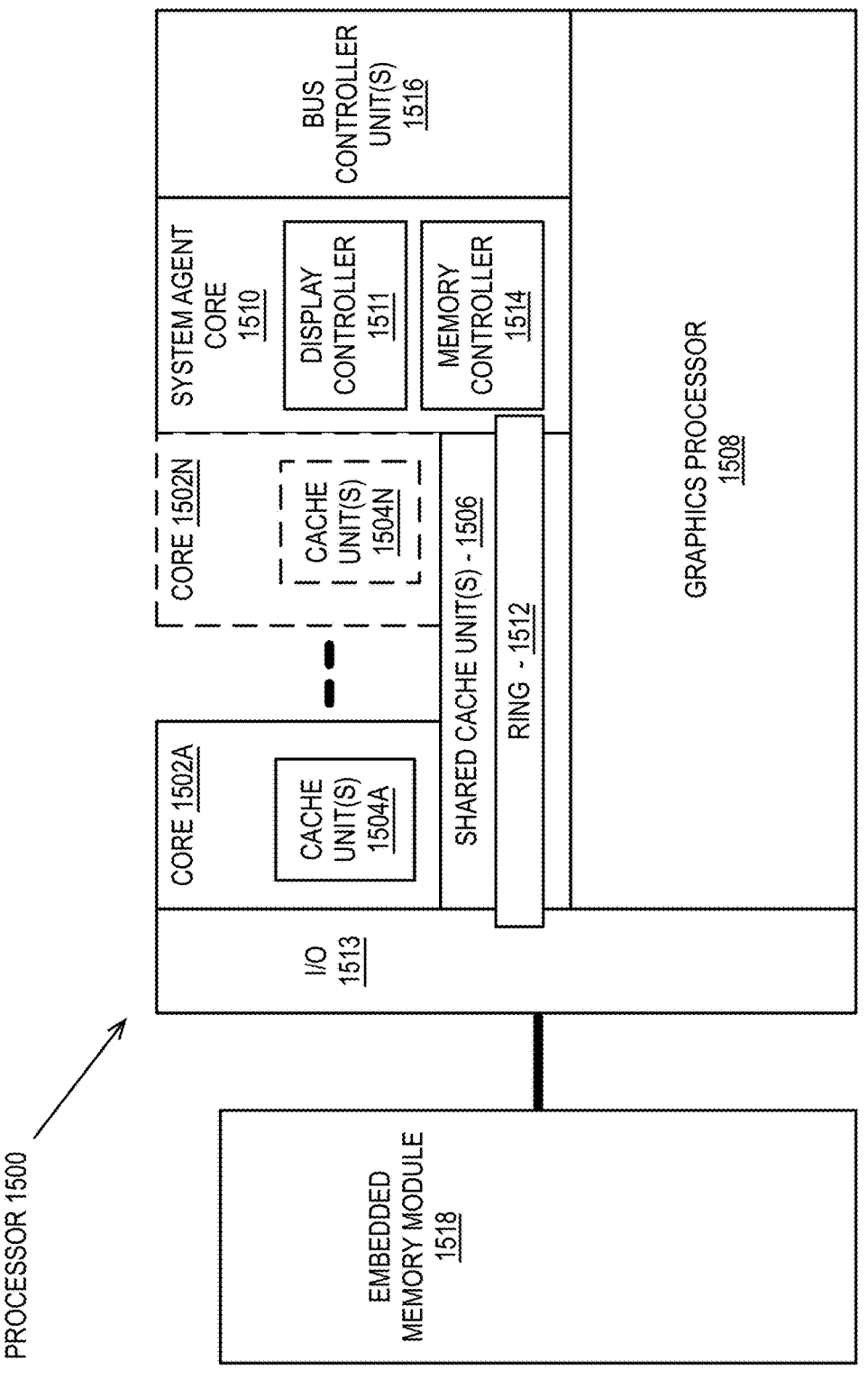
Figure 15C:
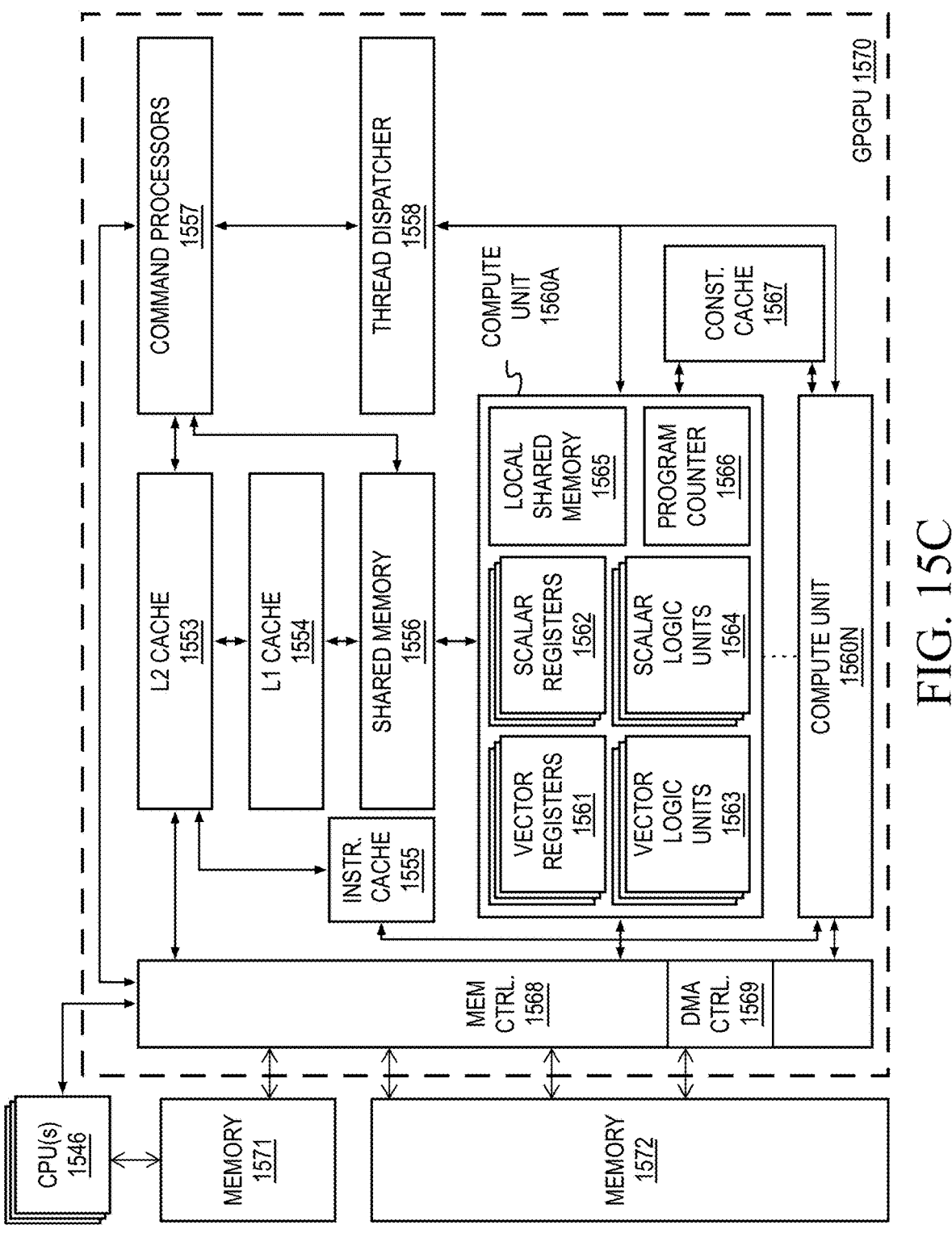

FIG. 15A-15C illustrate computing systems and graphics processors. The elements of FIG. 15A-15C having the same or similar names as the elements of any other figure herein describe the same elements as in the other figures, can operate or function in a manner similar to that, can comprise the same components, and can be linked to other entities, as those described elsewhere herein, but are not limited to such.

FIG. 15A is a block diagram of a processor 1500, which may be a variant of one of the processors 1402 and may be used in place of one of those. Therefore, the disclosure of any features in combination with the processor 1500 herein also discloses a corresponding combination with the processor(s) 1402, but is not limited to such. The processor 1500 may have one or more processor cores 1502A-1502N, an integrated memory controller 1514, and an integrated graphics processor 1508. Where an integrated graphics processor 1508 is excluded, the system that includes the processor will include a graphics processor device within a system chipset or coupled via a system bus. Processor 1500 can include additional cores up to and including additional core 1502N represented by the dashed lined boxes. Each of processor cores 1502A-1502N includes one or more internal cache units 1504A-1504N. In some embodiments each processor core 1502A-1502N also has access to one or more shared cache units 1506. The internal cache units 1504A-1504N and shared cache units 1506 represent a cache memory hierarchy within the processor 1500. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 1506 and 1504A-1504N.

The processor 1500 may also include a set of one or more bus controller units 1516 and a system agent core 1510. The one or more bus controller units 1516 manage a set of peripheral buses, such as one or more PCI or PCI express busses. System agent core 1510 provides management functionality for the various processor components. The system agent core 1510 may include one or more integrated memory controllers 1514 to manage access to various external memory devices (not shown).

For example, one or more of the processor cores 1502A-1502N may include support for simultaneous multi-threading. The system agent core 1510 includes components for coordinating and operating cores 1502A-1502N during multi-threaded processing. System agent core 1510 may additionally include a power control unit (PCU), which includes logic and components to regulate the power state of processor cores 1502A-1502N and graphics processor 1508.

The processor 1500 may additionally include graphics processor 1508 to execute graphics processing operations. In some of these embodiments, the graphics processor 1508 couples with the set of shared cache units 1506, and the system agent core 1510, including the one or more integrated memory controllers 1514. The system agent core 1510 may also include a display controller 1511 to drive graphics processor output to one or more coupled displays. The display controller 1511 may also be a separate module coupled with the graphics processor via at least one interconnect, or may be integrated within the graphics processor 1508.

A ring-based interconnect unit 1512 may be used to couple the internal components of the processor 1500. However, an alternative interconnect unit may be used, such as a point-to-point interconnect, a switched interconnect, or other techniques, including techniques well known in the art. In some of these embodiments with a ring-based interconnect 1512, the graphics processor 1508 couples with the ring-based interconnect 1512 via an I/O link 1513.

The exemplary I/O link 1513 represents at least one of multiple varieties of I/O interconnects, including an on package I/O interconnect which facilitates communication between various processor components and a high-performance embedded memory module 1518, such as an eDRAM module. Optionally, each of the processor cores 1502A-1502N and graphics processor 1508 can use embedded memory modules 1518 as a shared Last Level Cache.

The processor cores 1502A-1502N may, for example, be homogenous cores executing the same instruction set architecture. Alternatively, the processor cores 1502A-1502N are heterogeneous in terms of instruction set architecture (ISA), where one or more of processor cores 1502A-1502N execute a first instruction set, while at least one of the other cores executes a subset of the first instruction set or a different instruction set. The processor cores 1502A-1502N may be heterogeneous in terms of microarchitecture, where one or more cores having a relatively higher power consumption couple with one or more power cores having a lower power consumption. As another example, the processor cores 1502A-1502N are heterogeneous in terms of computational capability. Additionally, processor 1500 can be implemented on one or more chips or as an SoC integrated circuit having the illustrated components, in addition to other components.

FIG. 15B is a block diagram of hardware logic of a graphics processor core 1519, according to some embodiments described herein. The graphics processor core 1519, sometimes referred to as a core slice, can be one or multiple graphics cores within a modular graphics processor. The graphics processor core 1519 is exemplary of one graphics core slice, and a graphics processor as described herein may include multiple graphics core slices based on target power and performance envelopes. Each graphics processor core 1519 can include a fixed function block 1530 coupled with multiple sub-cores 1521A-1521F, also referred to as sub-slices, that include modular blocks of general-purpose and fixed function logic. In one configuration, a sub-core (sub-slice) of the multiple sub-cores 1521A-1521F is an architectural equivalent to a graphics multiprocessor 234 of FIG. 2D, graphics multiprocessor 325 of FIG. 3A, and/or a multi-core group of the multi-core groups 365A-365N of FIG. 3C.

The fixed function block 1530 may include a geometry/ fixed function pipeline 1531 that can be shared by all sub-cores in the graphics processor core 1519, for example, in lower performance and/or lower power graphics processor implementations. The geometry/fixed function pipeline 1531 may include a 3D fixed function pipeline (e.g., 3D pipeline 1612 as in FIG. 16A described below) a video front-end unit, a thread spawner and thread dispatcher, and a unified return buffer manager, which manages unified return buffers (e.g., unified return buffer 1718 in FIG. 17, as described below).

The fixed function block 1530 may also include a graphics SoC interface 1532, a graphics microcontroller 1533, and a media pipeline 1534. The graphics SoC interface 1532 provides an interface between the graphics processor core 1519 and other processor cores within a system on a chip integrated circuit. The graphics microcontroller 1533 is a programmable sub-processor that is configurable to manage various functions of the graphics processor core 1519, including thread dispatch, scheduling, and pre-emption. The media pipeline 1534 (e.g., media pipeline 1616 of FIG. 16A and FIG. 17) includes logic to facilitate the decoding, encoding, pre-processing, and/or post-processing of multimedia data, including image and video data. The media pipeline 1534 implement media operations via requests to compute or sampling logic within the sub-cores 1521-1521F.

The SoC interface 1532 may enable the graphics processor core 1519 to communicate with general-purpose application processor cores (e.g., CPUs) and/or other components within an SoC, including memory hierarchy elements such as a shared last level cache memory, the system RAM, and/or embedded on-chip or on-package DRAM. The SoC interface 1532 can also enable communication with fixed function devices within the SoC, such as camera imaging pipelines, and enables the use of and/or implements global memory atomics that may be shared between the graphics processor core 1519 and CPUs within the SoC. The SoC interface 1532 can also implement power management controls for the graphics processor core 1519 and enable an interface between a clock domain of the graphics processor core 1519 and other clock domains within the SoC. Optionally, the SoC interface 1532 enables receipt of command buffers from a command streamer and global thread dispatcher that are configured to provide commands and instructions to each of one or more graphics cores within a graphics processor. The commands and instructions can be dispatched to the media pipeline 1534, when media operations are to be performed, or a geometry and fixed function pipeline (e.g., geometry and fixed function pipeline 1531, geometry and fixed function pipeline 1537) when graphics processing operations are to be performed.

The graphics microcontroller 1533 can be configured to perform various scheduling and management tasks for the graphics processor core 1519. In one configuration the graphics microcontroller 1533 can, for example, perform graphics and/or compute workload scheduling on the various graphics parallel engines within execution unit (EU) arrays 1522A-1522F, 1524A-1524F within the sub-cores 1521A-1521F. In this workload scheduling, host software executing on a CPU core of an SoC including the graphics processor core 1519 can submit workloads to one of multiple graphics processor doorbells, which invokes a scheduling operation on the appropriate graphics engine. Scheduling operations include determining which workload to run next, submitting a workload to a command streamer, preempting existing workloads running on an engine, monitoring progress of a workload, and notifying host software when a workload is complete. Optionally, the graphics microcontroller 1533 can also facilitate low-power or idle states for the graphics processor core 1519, providing the graphics processor core 1519 with the ability to save and restore registers within the graphics processor core 1519 across low-power state transitions independently from the operating system and/or graphics driver software on the system.

The graphics processor core 1519 may have more than or fewer than the illustrated sub-cores 1521A-1521F, up to N modular sub-cores. For each set of N sub-cores, the graphics processor core 1519 can also include shared function logic 1535, shared and/or cache memory 1536, a geometry/fixed function pipeline 1537, as well as additional fixed function logic 1538 to accelerate various graphics and compute processing operations. The shared function logic 1535 can include logic units associated with the shared function logic 1720 of FIG. 17 (e.g., sampler, math, and/or inter-thread communication logic) that can be shared by each N sub-cores within the graphics processor core 1519. The shared and/or cache memory 1536 can be a last-level cache for the set of N sub-cores 1521A-1521F within the graphics processor core 1519, and can also serve as shared memory that is accessible by multiple sub-cores. The geometry/fixed function pipeline 1537 can be included instead of the geometry/fixed function pipeline 1531 within the fixed function block 1530 and can include the same or similar logic units.

The graphics processor core 1519 may include additional fixed function logic 1538 that can include various fixed function acceleration logic for use by the graphics processor core 1519. Optionally, the additional fixed function logic 1538 includes an additional geometry pipeline for use in position only shading. In position-only shading, two geometry pipelines exist, the full geometry pipeline within the geometry/fixed function pipeline 1538, 1531, and a cull pipeline, which is an additional geometry pipeline which may be included within the additional fixed function logic 1538. For example, the cull pipeline may be a trimmed down version of the full geometry pipeline. The full pipeline and the cull pipeline can execute different instances of the same application, each instance having a separate context. Position only shading can hide long cull runs of discarded triangles, enabling shading to be completed earlier in some instances. For example, the cull pipeline logic within the additional fixed function logic 1538 can execute position shaders in parallel with the main application and generally generates critical results faster than the full pipeline, as the cull pipeline fetches and shades only the position attribute of the vertices, without performing rasterization and rendering of the pixels to the frame buffer. The cull pipeline can use the generated critical results to compute visibility information for all the triangles without regard to whether those triangles are culled. The full pipeline (which in this instance may be referred to as a replay pipeline) can consume the visibility information to skip the culled triangles to shade only the visible triangles that are finally passed to the rasterization phase.

Optionally, the additional fixed function logic 1538 can also include machine-learning acceleration logic, such as fixed function matrix multiplication logic, for implementations including optimizations for machine learning training or inferencing.

Within each graphics sub-core 1521A-1521F a set of execution resources is included that may be used to perform graphics, media, and compute operations in response to requests by graphics pipeline, media pipeline, or shader programs. The graphics sub-cores 1521A-1521F include multiple EU arrays 1522A-1522F, 1524A-1524F, thread dispatch and inter-thread communication (TD/IC) logic 1523A-1523F, a 3D (e.g., texture) sampler 1525A-1525F, a media sampler 1526A-1526F, a shader processor 1527A-1527F, and shared local memory (SLM) 1528A-1528F. The EU arrays 1522A-1522F, 1524A-1524F each include multiple execution units, which are general-purpose graphics processing units capable of performing floating-point and integer/fixed-point logic operations in service of a graphics, media, or compute operation, including graphics, media, or compute shader programs. The TD/IC logic 1523A-1523F performs local thread dispatch and thread control operations for the execution units within a sub-core and facilitate communication between threads executing on the execution units of the sub-core. The 3D sampler 1525A-1525F can read texture or other 3D graphics related data into memory. The 3D sampler can read texture data differently based on a configured sample state and the texture format associated with a given texture. The media sampler 1526A-1526F can perform similar read operations based on the type and format associated with media data. For example, each graphics sub-core 1521A-1521F can alternately include a unified 3D and media sampler. Threads executing on the execution units within each of the sub-cores 1521A-1521F can make use of shared local memory 1528A-1528F within each sub-core, to enable threads executing within a thread group to execute using a common pool of on-chip memory.

FIG. 15C is a block diagram of general-purpose graphics processing unit (GPGPU) 1570 that can be configured as a graphics processor, e.g. the graphics processor 1508, and/or compute accelerator, according to embodiments described herein. The GPGPU 1570 can interconnect with host processors (e.g., one or more CPU(s) 1546) and memory 1571, 1572 via one or more system and/or memory busses. Memory 1571 may be system memory that can be shared with the one or more CPU(s) 1546, while memory 1572 is device memory that is dedicated to the GPGPU 1570. For example, components within the GPGPU 1570 and memory

1572 may be mapped into memory addresses that are accessible to the one or more CPU(s) 1546. Access to memory 1571 and 1572 may be facilitated via a memory controller 1568. The memory controller 1568 may include an internal direct memory access (DMA) controller 1569 or can include logic to perform operations that would otherwise be performed by a DMA controller.

The GPGPU 1570 includes multiple cache memories, including an L2 cache 1553, L1 cache 1554, an instruction cache 1555, and shared memory 1556, at least a portion of which may also be partitioned as a cache memory. The GPGPU 1570 also includes multiple compute units 1560A-1560N. Each compute unit 1560A-1560N includes a set of vector registers 1561, scalar registers 1562, vector logic units 1563, and scalar logic units 1564. The compute units 1560A-1560N can also include local shared memory 1565 and a program counter 1566. The compute units 1560A-1560N can couple with a constant cache 1567, which can be used to store constant data, which is data that will not change during the run of kernel or shader program that executes on the GPGPU 1570. The constant cache 1567 may be a scalar data cache and cached data can be fetched directly into the scalar registers 1562.

During operation, the one or more CPU(s) 1546 can write commands into registers or memory in the GPGPU 1570 that has been mapped into an accessible address space. The command processors 1557 can read the commands from registers or memory and determine how those commands will be processed within the GPGPU 1570. A thread dispatcher 1558 can then be used to dispatch threads to the compute units 1560A-1560N to perform those commands. Each compute unit 1560A-1560N can execute threads independently of the other compute units. Additionally, each compute unit 1560A-1560N can be independently configured for conditional computation and can conditionally output the results of computation to memory. The command processors 1557 can interrupt the one or more CPU(s) 1546 when the submitted commands are complete.

Figure 16A:
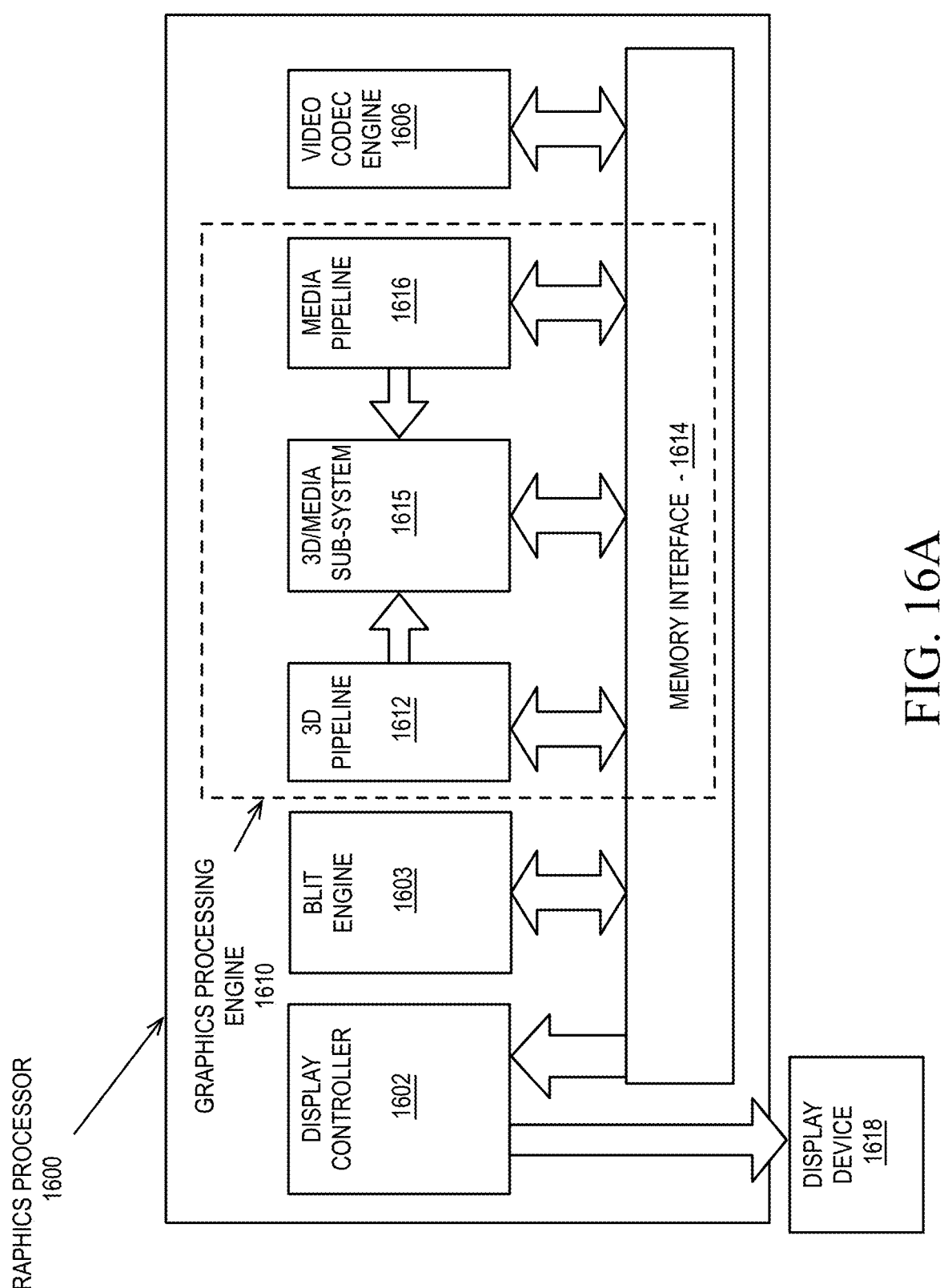
FIG. 16A-16C illustrate block diagrams of additional graphics processor and compute accelerator architectures.
Figure 16B:
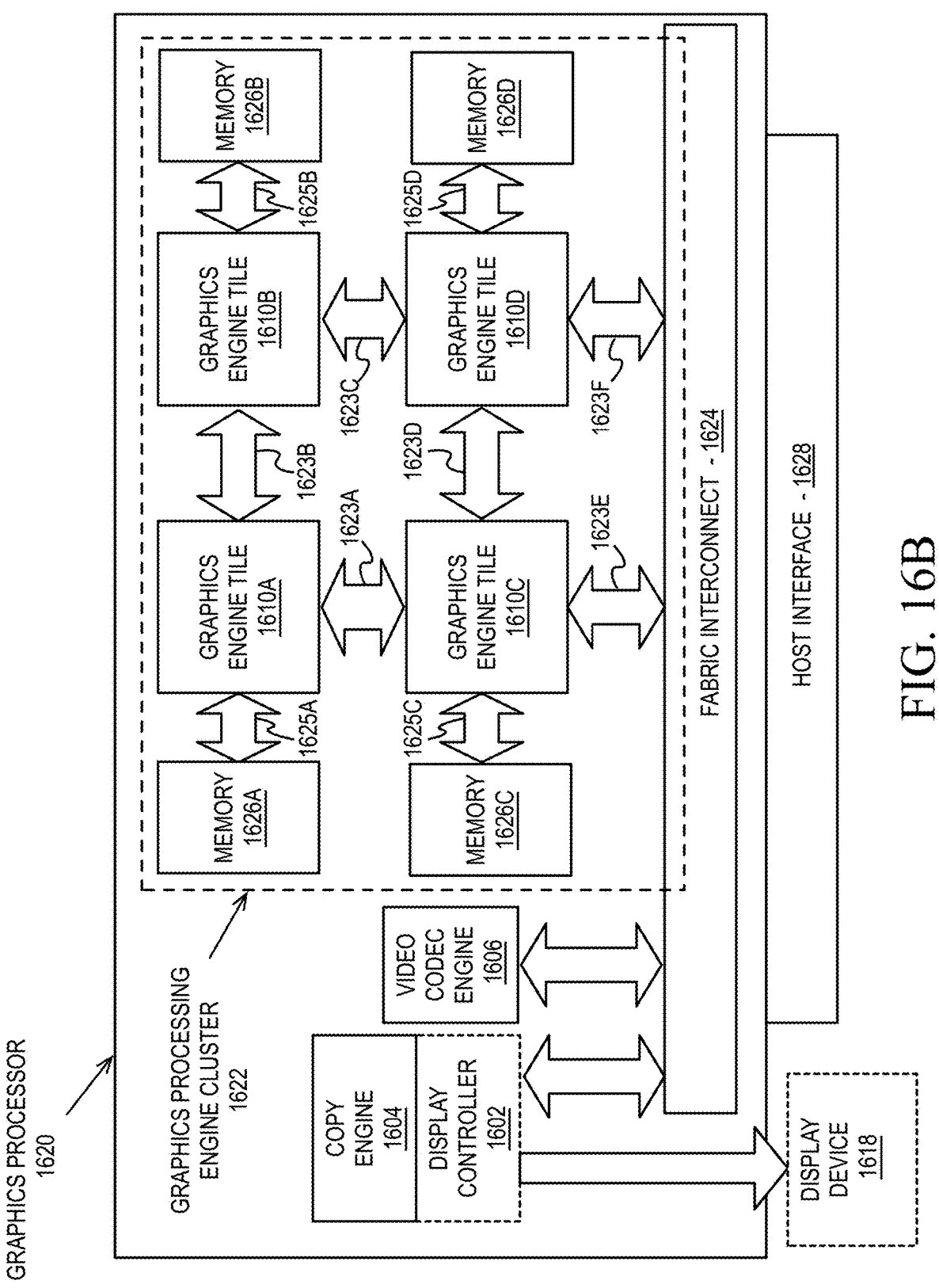
Figure 16C:
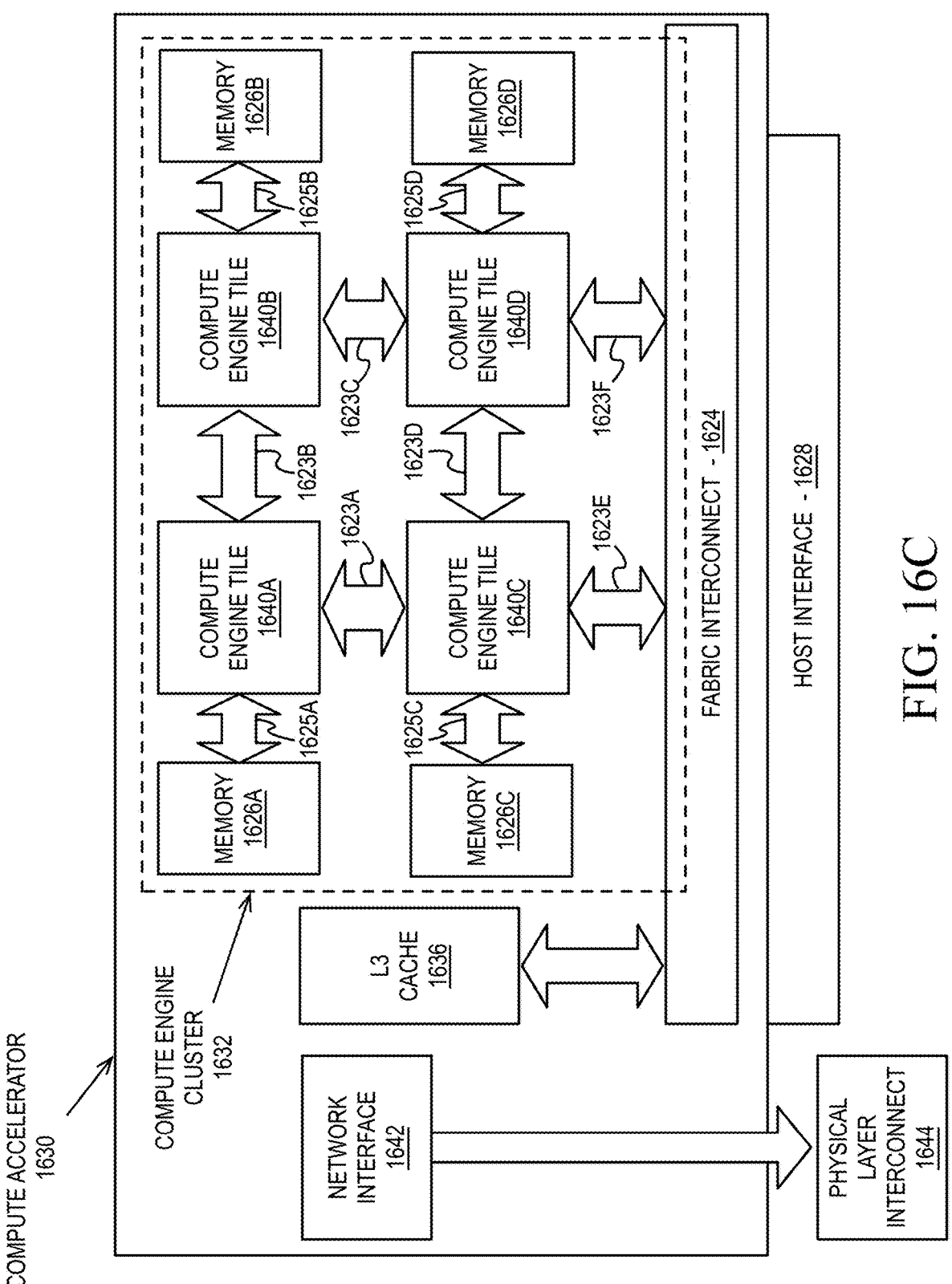

FIG. 16A-16C illustrate block diagrams of additional graphics processor and compute accelerator architectures provided by embodiments described herein, e.g. in accordance with FIG. 15A-15C. The elements of FIG. 16A-16C having the same or similar names as the elements of any other figure herein describe the same elements as in the other figures, can operate or function in a manner similar to that, can comprise the same components, and can be linked to other entities, as those described elsewhere herein, but are not limited to such.

FIG. 16A is a block diagram of a graphics processor 1600, which may be a discrete graphics processing unit, or may be a graphics processor integrated with a plurality of processing cores, or other semiconductor devices such as, but not limited to, memory devices or network interfaces. The graphics processor 1600 may be a variant of the graphics processor 1508 and may be used in place of the graphics processor 1508. Therefore, the disclosure of any features in combination with the graphics processor 1508 herein also discloses a corresponding combination with the graphics processor 1600, but is not limited to such. The graphics processor may communicate via a memory mapped I/O interface to registers on the graphics processor and with commands placed into the processor memory. Graphics processor 1600 may include a memory interface 1614 to access memory. Memory interface 1614 can be an interface to local memory, one or more internal caches, one or more shared external caches, and/or to system memory.

Optionally, graphics processor 1600 also includes a display controller 1602 to drive display output data to a display device 1618. Display controller 1602 includes hardware for one or more overlay planes for the display and composition of multiple layers of video or user interface elements. The display device 1618 can be an internal or external display device. In one embodiment the display device 1618 is a head mounted display device, such as a virtual reality (VR) display device or an augmented reality (AR) display device. Graphics processor 1600 may include a video codec engine 1606 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, H.265/HEVC, Alliance for Open Media (AOMedia) VP8, VP9, as well as the Society of Motion Picture & Television Engineers (SMPTE) 421M/VC-1, and Joint Photographic Experts Group (JPEG) formats such as JPEG, and Motion JPEG (MJPEG) formats.

Graphics processor 1600 may include a block image transfer (BLIT) engine 1603 to perform two-dimensional (2D) rasterizer operations including, for example, bit-boundary block transfers. However, alternatively, 2D graphics operations may be performed using one or more components of graphics processing engine (GPE) 1610. In some embodiments, GPE 1610 is a compute engine for performing graphics operations, including three-dimensional (3D) graphics operations and media operations.

GPE 1610 may include a 3D pipeline 1612 for performing 3D operations, such as rendering three-dimensional images and scenes using processing functions that act upon 3D primitive shapes (e.g., rectangle, triangle, etc.). The 3D pipeline 1612 includes programmable and fixed function elements that perform various tasks within the element and/or spawn execution threads to a 3D/Media subsystem 1615. While 3D pipeline 1612 can be used to perform media operations, an embodiment of GPE 1610 also includes a media pipeline 1616 that is specifically used to perform media operations, such as video post-processing and image enhancement.

Media pipeline 1616 may include fixed function or programmable logic units to perform one or more specialized media operations, such as video decode acceleration, video de-interlacing, and video encode acceleration in place of, or on behalf of video codec engine 1606. Media pipeline 1616 may additionally include a thread spawning unit to spawn threads for execution on 3D/Media subsystem 1615. The spawned threads perform computations for the media operations on one or more graphics execution units included in 3D/Media subsystem 1615.

The 3D/Media subsystem 1615 may include logic for executing threads spawned by 3D pipeline 1612 and media pipeline 1616. The pipelines may send thread execution requests to 3D/Media subsystem 1615, which includes thread dispatch logic for arbitrating and dispatching the various requests to available thread execution resources. The execution resources include an array of graphics execution units to process the 3D and media threads. The 3D/Media subsystem 1615 may include one or more internal caches for thread instructions and data. Additionally, the 3D/Media subsystem 1615 may also include shared memory, including registers and addressable memory, to share data between threads and to store output data.

FIG. 16B illustrates a graphics processor 1620, being a variant of the graphics processor 1600 and may be used in place of the graphics processor 1600 and vice versa. Therefore, the disclosure of any features in combination with the graphics processor 1600 herein also discloses a corresponding combination with the graphics processor 1620, but is not limited to such. The graphics processor 1620 has a tiled architecture, according to embodiments described herein. The graphics processor 1620 may include a graphics processing engine cluster 1622 having multiple instances of the graphics processing engine 1610 of FIG. 16A within a graphics engine tile 1610A-1610D. Each graphics engine tile 1610A-1610D can be interconnected via a set of tile interconnects 1623A-1623F. Each graphics engine tile 1610A-1610D can also be connected to a memory module or memory device 1626A-1626D via memory interconnects 1625A-1625D. The memory devices 1626A-1626D can use any graphics memory technology. For example, the memory devices 1626A-1626D may be graphics double data rate (GDDR) memory. The memory devices 1626A-1626D may be high-bandwidth memory (HBM) modules that can be on-die with their respective graphics engine tile 1610A-1610D. The memory devices 1626A-1626D may be stacked memory devices that can be stacked on top of their respective graphics engine tile 1610A-1610D. Each graphics engine tile 1610A-1610D and associated memory 1626A-1626D may reside on separate chiplets, which are bonded to a base die or base substrate, as described in further detail in FIG. 24B-24D.

The graphics processor 1620 may be configured with a non-uniform memory access (NUMA) system in which memory devices 1626A-1626D are coupled with associated graphics engine tiles 1610A-1610D. A given memory device may be accessed by graphics engine tiles other than the tile to which it is directly connected. However, access latency to the memory devices 1626A-1626D may be lowest when accessing a local tile. In one embodiment, a cache coherent NUMA (ccNUMA) system is enabled that uses the tile interconnects 1623A-1623F to enable communication between cache controllers within the graphics engine tiles 1610A-1610D to keep a consistent memory image when more than one cache stores the same memory location.

The graphics processing engine cluster 1622 can connect with an on-chip or on-package fabric interconnect 1624. In one embodiment the fabric interconnect 1624 includes a network processor, network on a chip (NoC), or another switching processor to enable the fabric interconnect 1624 to act as a packet switched fabric interconnect that switches data packets between components of the graphics processor 1620. The fabric interconnect 1624 can enable communication between graphics engine tiles 1610A-1610D and components such as the video codec engine 1606 and one or more copy engines 1604. The copy engines 1604 can be used to move data out of, into, and between the memory devices 1626A-1626D and memory that is external to the graphics processor 1620 (e.g., system memory). The fabric interconnect 1624 can also be used to interconnect the graphics engine tiles 1610A-1610D. The graphics processor 1620 may optionally include a display controller 1602 to enable a connection with an external display device 1618. The graphics processor may also be configured as a graphics or compute accelerator. In the accelerator configuration, the display controller 1602 and display device 1618 may be omitted.

The graphics processor 1620 can connect to a host system via a host interface 1628. The host interface 1628 can enable communication between the graphics processor 1620, system memory, and/or other system components. The host interface 1628 can be, for example, a PCI express bus or another type of host system interface. For example, the host interface 1628 may be an NVLink or NVSwitch interface.

The host interface 1628 and fabric interconnect 1624 can cooperate to enable multiple instances of the graphics processor 1620 to act as single logical device. Cooperation between the host interface 1628 and fabric interconnect 1624 can also enable the individual graphics engine tiles 1610A-1610D to be presented to the host system as distinct logical graphics devices.

FIG. 16C illustrates a compute accelerator 1630, according to embodiments described herein. The compute accelerator 1630 can include architectural similarities with the graphics processor 1620 of FIG. 16B and is optimized for compute acceleration. A compute engine cluster 1632 can include a set of compute engine tiles 1640A-1640D that include execution logic that is optimized for parallel or vector-based general-purpose compute operations. The compute engine tiles 1640A-1640D may not include fixed function graphics processing logic, although in some embodiments one or more of the compute engine tiles 1640A-1640D can include logic to perform media acceleration. The compute engine tiles 1640A-1640D can connect to memory 1626A-1626D via memory interconnects 1625A-1625D. The memory 1626A-1626D and memory interconnects 1625A-1625D may be similar technology as in graphics processor 1620, or can be different. The graphics compute engine tiles 1640A-1640D can also be interconnected via a set of tile interconnects 1623A-1623F and may be connected with and/or interconnected by a fabric interconnect 1624. In one embodiment the compute accelerator 1630 includes a large L3 cache 1636 that can be configured as a device-wide cache. The compute accelerator 1630 can also connect to a host processor and memory via a host interface 1628 in a similar manner as the graphics processor 1620 of FIG. 16B.

The compute accelerator 1630 can also include an integrated network interface 1642. In one embodiment the integrated network interface 1642 includes a network processor and controller logic that enables the compute engine cluster 1632 to communicate over a physical layer interconnect 1644 without requiring data to traverse memory of a host system. In one embodiment, one of the compute engine tiles 1640A-1640D is replaced by network processor logic and data to be transmitted or received via the physical layer interconnect 1644 may be transmitted directly to or from memory 1626A-1626D. Multiple instances of the compute accelerator 1630 may be joined via the physical layer interconnect 1644 into a single logical device. Alternatively, the various compute engine tiles 1640A-1640D may be presented as distinct network accessible compute accelerator devices.

Graphics Processing Engine

Figure 17:
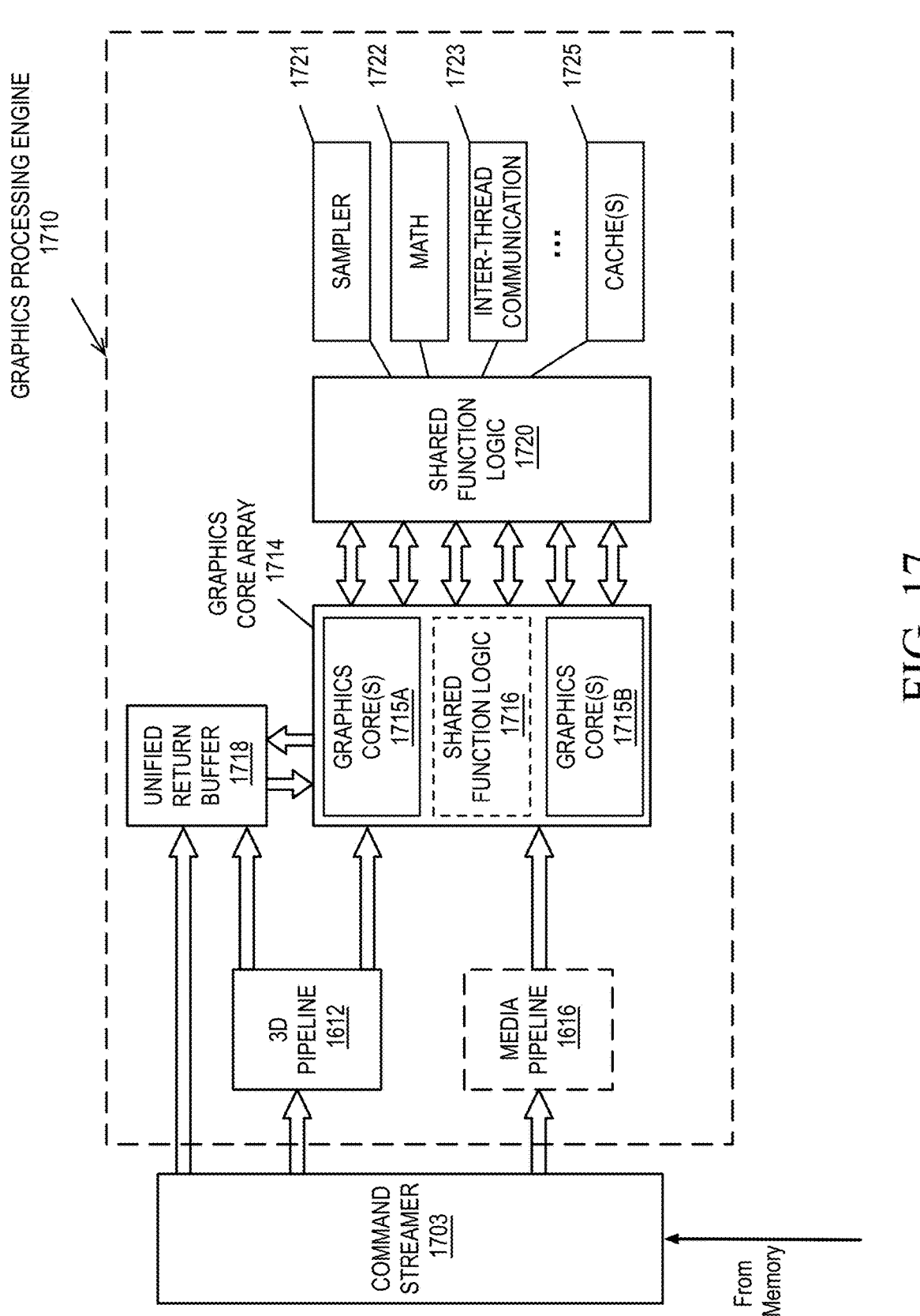
FIG. 17 is a block diagram of a graphics processing engine of a graphics processor.

FIG. 17 is a block diagram of a graphics processing engine 1710 of a graphics processor in accordance with some embodiments. The graphics processing engine (GPE) 1710 may be a version of the GPE 1610 shown in FIG. 16A, and may also represent a graphics engine tile 1610A-1610D of FIG. 16B. The elements of FIG. 17 having the same or similar names as the elements of any other figure herein describe the same elements as in the other figures, can operate or function in a manner similar to that, can comprise the same components, and can be linked to other entities, as those described elsewhere herein, but are not limited to such. For example, the 3D pipeline 1612 and media pipeline 1616 of FIG. 16A are also illustrated in FIG. 17. The media pipeline 1616 is optional in some embodiments of the GPE 1710 and may not be explicitly included within the GPE 1710. For example and in at least one embodiment, a separate media and/or image processor is coupled to the GPE 1710.

GPE 1710 may couple with or include a command streamer 1703, which provides a command stream to the 3D pipeline 1612 and/or media pipelines 1616. Alternatively or additionally, the command streamer 1703 may be directly coupled to a unified return buffer 1718. The unified return buffer 1718 may be communicatively coupled to a graphics core array 1714. Optionally, the command streamer 1703 is coupled with memory, which can be system memory, or one or more of internal cache memory and shared cache memory. The command streamer 1703 may receive commands from the memory and sends the commands to 3D pipeline 1612 and/or media pipeline 1616. The commands are directives fetched from a ring buffer, which stores commands for the 3D pipeline 1612 and media pipeline 1616. The ring buffer can additionally include batch command buffers storing batches of multiple commands. The commands for the 3D pipeline 1612 can also include references to data stored in memory, such as but not limited to vertex and geometry data for the 3D pipeline 1612 and/or image data and memory objects for the media pipeline 1616. The 3D pipeline 1612 and media pipeline 1616 process the commands and data by performing operations via logic within the respective pipelines or by dispatching one or more execution threads to the graphics core array 1714. The graphics core array 1714 may include one or more blocks of graphics cores (e.g., graphics core(s) 1715A, graphics core (s) 1715B), each block including one or more graphics cores. Each graphics core includes a set of graphics execution resources that includes general-purpose and graphics specific execution logic to perform graphics and compute operations, as well as fixed function texture processing and/or machine learning and artificial intelligence acceleration logic.

In various embodiments the 3D pipeline 1612 can include fixed function and programmable logic to process one or more shader programs, such as vertex shaders, geometry shaders, pixel shaders, fragment shaders, compute shaders, or other shader programs, by processing the instructions and dispatching execution threads to the graphics core array 1714. The graphics core array 1714 provides a unified block of execution resources for use in processing these shader programs. Multi-purpose execution logic (e.g., execution units) within the graphics core(s) 1715A-1715B of the graphics core array 1714 includes support for various 3D API shader languages and can execute multiple simultaneous execution threads associated with multiple shaders.

The graphics core array 1714 may include execution logic to perform media functions, such as video and/or image processing. The execution units may include general-purpose logic that is programmable to perform parallel general-purpose computational operations, in addition to graphics processing operations. The general-purpose logic can perform processing operations in parallel or in conjunction with general-purpose logic within the processor core(s) 1407 of FIG. 14 or core 1502A-1502N as in FIG. 15A.

Output data generated by threads executing on the graphics core array 1714 can output data to memory in a unified return buffer (URB) 1718. The URB 1718 can store data for multiple threads. The URB 1718 may be used to send data between different threads executing on the graphics core array 1714. The URB 1718 may additionally be used for synchronization between threads on the graphics core array 1714 and fixed function logic within the shared function logic 1720.

Optionally, the graphics core array 1714 may be scalable, such that the array includes a variable number of graphics cores, each having a variable number of execution units based on the target power and performance level of GPE 1710. The execution resources may be dynamically scalable, such that execution resources may be enabled or disabled as needed.

The graphics core array 1714 couples with shared function logic 1720 that includes multiple resources that are shared between the graphics cores in the graphics core array. The shared functions within the shared function logic 1720 are hardware logic units that provide specialized supplemental functionality to the graphics core array 1714. In various embodiments, shared function logic 1720 includes but is not limited to sampler 1721, math 1722, and interthread communication (ITC) 1723 logic. Additionally, one or more cache(s) 1725 within the shared function logic 1720 may be implemented.

A shared function is implemented at least in a case where the demand for a given specialized function is insufficient for inclusion within the graphics core array 1714. Instead a single instantiation of that specialized function is implemented as a stand-alone entity in the shared function logic 1720 and shared among the execution resources within the graphics core array 1714. The precise set of functions that are shared between the graphics core array 1714 and included within the graphics core array 1714 varies across embodiments. Specific shared functions within the shared function logic 1720 that are used extensively by the graphics core array 1714 may be included within shared function logic 1716 within the graphics core array 1714. Optionally, the shared function logic 1716 within the graphics core array 1714 can include some or all logic within the shared function logic 1720. All logic elements within the shared function logic 1720 may be duplicated within the shared function logic 1716 of the graphics core array 1714. Alternatively, the shared function logic 1720 is excluded in favor of the shared function logic 1716 within the graphics core array 1714.

Execution Units

Figure 18A:
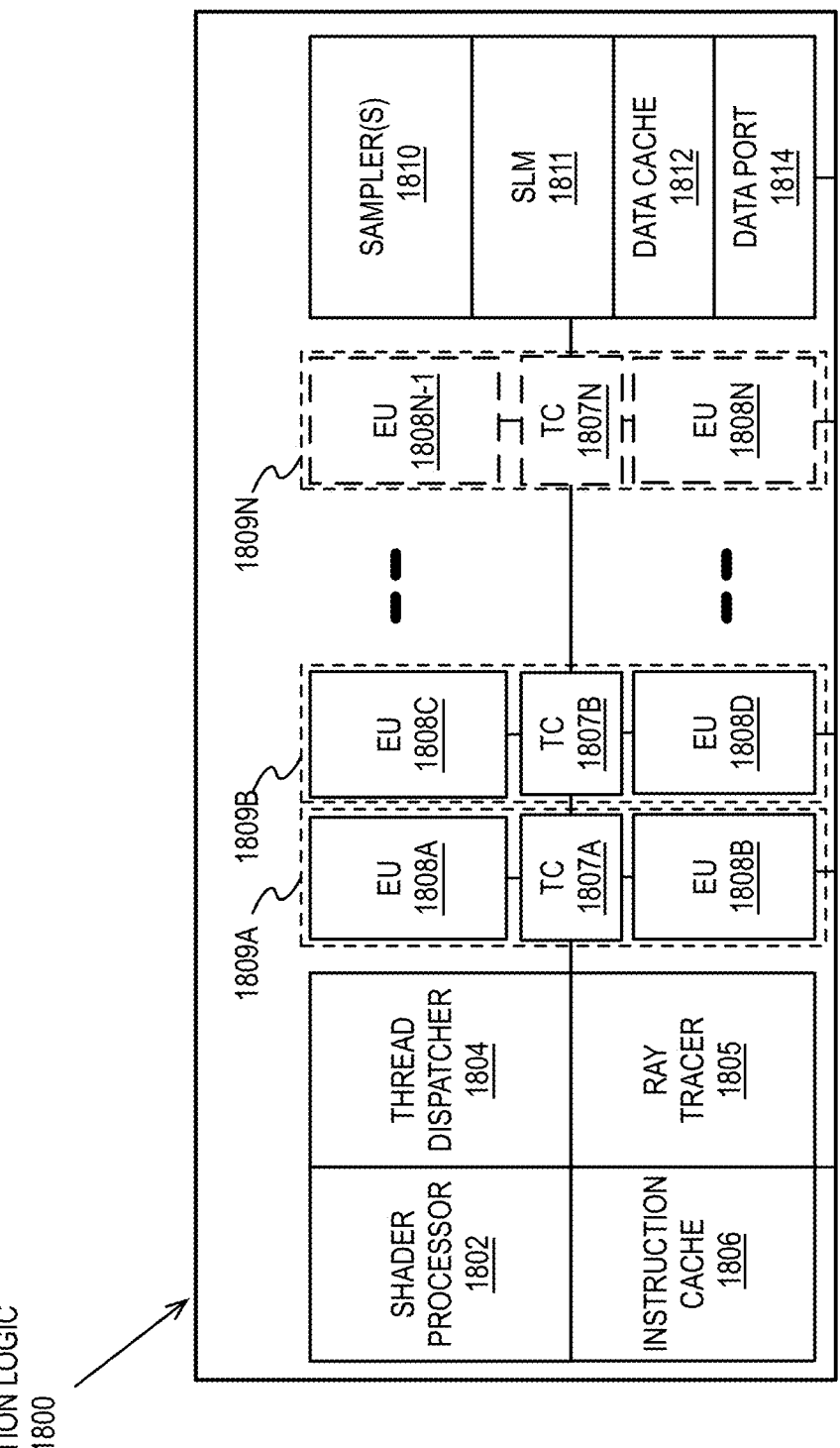
FIG. 18A-18B illustrate thread execution logic including an array of processing elements employed in a graphics processor core.
Figure 18B:
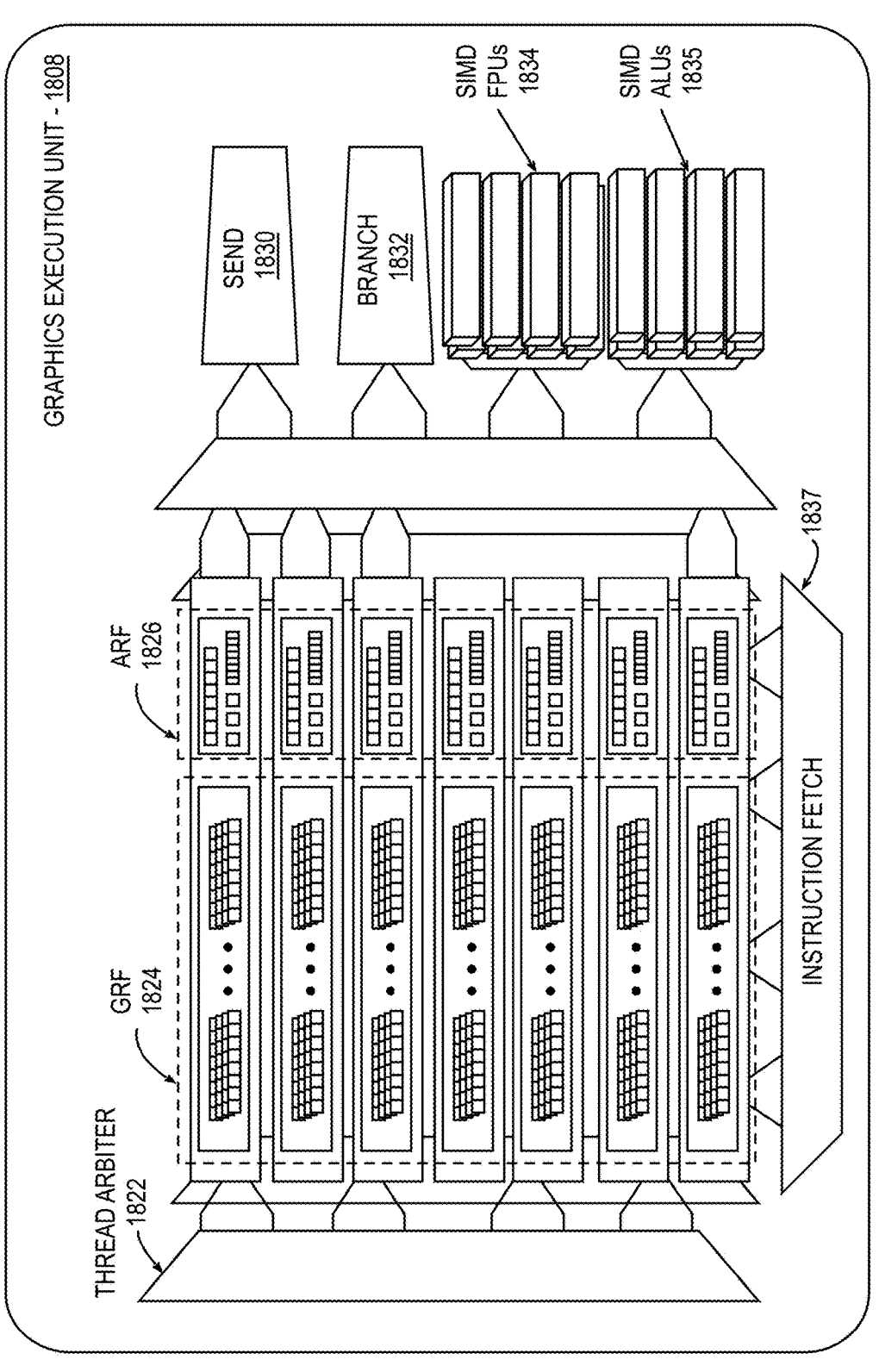

FIG. 18A-18B illustrate thread execution logic 1800 including an array of processing elements employed in a graphics processor core according to embodiments described herein. The elements of FIG. 18A-18B having the same or similar names as the elements of any other figure herein describe the same elements as in the other figures, can operate or function in a manner similar to that, can comprise the same components, and can be linked to other entities, as those described elsewhere herein, but are not limited to such. FIG. 18A-18B illustrates an overview of thread execution logic 1800, which may be representative of hardware logic illustrated with each sub-core 1521A-1521F of FIG. 15B. FIG. 18A is representative of an execution unit within a general-purpose graphics processor, while FIG. 18B is representative of an execution unit that may be used within a compute accelerator.

As illustrated in FIG. 18A, thread execution logic 1800 may include a shader processor 1802, a thread dispatcher 1804, instruction cache 1806, a scalable execution unit array including a plurality of graphics execution units 1808A-1808N, a sampler 1810, shared local memory 1811, a data cache 1812, and a data port 1814. Optionally, the scalable execution unit array can dynamically scale by enabling or disabling one or more execution units (e.g., any of graphics execution units 1808A, 1808B, 1808C, 1808D, through 1808N-1 and 1808N) based on the computational requirements of a workload. The included components may be interconnected via an interconnect fabric that links to each of the components. Thread execution logic 1800 may include one or more connections to memory, such as system memory or cache memory, through one or more of instruction cache 1806, data port 1814, sampler 1810, and graphics execution units 1808A-1808N. Each execution unit (e.g. 1808A) may be a stand-alone programmable general-purpose computational unit that is capable of executing multiple simultaneous hardware threads while processing multiple data elements in parallel for each thread. In various embodiments, the array of execution units 1808A-1808N is scalable to include any number individual execution units.

In some embodiments the graphics execution units 1808A-1808N may be primarily used to execute shader programs. A shader processor 1802 can process the various shader programs and dispatch execution threads associated with the shader programs via a thread dispatcher 1804. The thread dispatcher may include logic to arbitrate thread initiation requests from the graphics and media pipelines and instantiate the requested threads on one or more execution units in the graphics execution units 1808A-1808N. For example, a geometry pipeline can dispatch vertex, tessellation, or geometry shaders to the thread execution logic for processing. Optionally, the thread dispatcher 1804 can also process runtime thread spawning requests from the executing shader programs.

In some embodiments, the graphics execution units 1808A-1808N may support an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders). Each of the graphics execution units 1808A-1808N is capable of multi-issue single instruction multiple data (SIMD) execution and multi-threaded operation enables an efficient execution environment in the face of higher latency memory accesses. Each hardware thread within each execution unit has a dedicated high-bandwidth register file and associated independent thread-state. Execution is multi-issue per clock to pipelines capable of integer, single and double precision floating point operations, SIMD branch capability, logical operations, transcendental operations, and other miscellaneous operations. While waiting for data from memory or one of the shared functions, dependency logic within the execution units 1808A-1808N causes a waiting thread to sleep until the requested data has been returned. While the waiting thread is sleeping, hardware resources may be devoted to processing other threads. For example, during a delay associated with a vertex shader operation, an execution unit can perform operations for a pixel shader, fragment shader, or another type of shader program, including a different vertex shader, such as vertex shader 2107 illustrated in FIG. 21. Various embodiments can apply to use execution by use of Single Instruction Multiple Thread (SIMT) as an alternate to use of SIMD or in addition to use of SIMD. Reference to a SIMD core or operation can apply also to SIMT or apply to SIMD in combination with SIMT.

Each execution unit in graphics execution units 1808A-1808N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs), Floating-Point Units (FPUs), or other logic units (e.g., tensor cores, ray tracing cores, etc.)

for a particular graphics processor. Additionally, the graphics execution units 1808A-1808N may support integer and floating-point data types.

The execution unit instruction set includes SIMD instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

Optionally, one or more execution units can be combined into a fused graphics execution unit 1809A-1809N having thread control logic (1807A-1807N) that is common to the fused EUs. Multiple EUs can be fused into an EU group. Each EU in the fused EU group can be configured to execute a separate SIMD hardware thread. The number of EUs in a fused EU group can vary according to embodiments. Additionally, various SIMD widths can be performed per-EU, including but not limited to SIMD8, SIMD16, and SIMD32. Each fused graphics execution unit 1809A-1809N includes at least two execution units. For example, fused execution unit 1809A includes a first EU 1808A, second EU 1808B, and thread control logic 1807A that is common to the first EU 1808A and the second EU 1808B. The thread control logic 1807A controls threads executed on the fused graphics execution unit 1809A, allowing each EU within the fused execution units 1809A-1809N to execute using a common instruction pointer register.

One or more internal instruction caches (e.g., 1806) are included in the thread execution logic 1800 to cache thread instructions for the execution units. One or more data caches (e.g., 1812) may be included in the thread execution logic 1800 to cache thread data during thread execution. Threads executing on the execution logic 1800 can also store explicitly managed data in the shared local memory 1811. A sampler 1810 may be included to provide texture sampling for 3D operations and media sampling for media operations. Sampler 1810 may include specialized texture or media sampling functionality to process texture or media data during the sampling process before providing the sampled data to an execution unit.

During execution, the graphics and media pipelines send thread initiation requests to thread execution logic 1800 via thread spawning and dispatch logic. Once a group of geometric objects has been processed and rasterized into pixel data, pixel processor logic (e.g., pixel shader logic, fragment shader logic, etc.) within the shader processor 1802 is invoked to further compute output information and cause results to be written to output surfaces (e.g., color buffers, depth buffers, stencil buffers, etc.). A pixel shader or fragment shader may calculate the values of the various vertex attributes that are to be interpolated across the rasterized object. The pixel processor logic within the shader processor 1802 may then execute an application programming interface (API)-supplied pixel or fragment shader program. To execute the shader program, the shader processor 1802 dispatches threads to an execution unit (e.g., 1808A) via thread dispatcher 1804. Shader processor 1802 may use texture sampling logic in the sampler 1810 to access texture data in texture maps stored in memory. Arithmetic operations on the texture data and the input geometry data compute pixel color data for each geometric fragment, or discards one or more pixels from further processing.

In addition, the data port 1814 may provide a memory access mechanism for the thread execution logic 1800 to output processed data to memory for further processing on a graphics processor output pipeline. The data port 1814 may include or couple to one or more cache memories (e.g., data cache 1812) to cache data for memory access via the data port 1814.

Optionally, the execution logic 1800 can also include a ray tracer 1805 that can provide ray tracing acceleration functionality. The ray tracer 1805 can support a ray tracing instruction set that includes instructions/functions for ray generation. The ray tracing instruction set can be similar to or different from the ray-tracing instruction set supported by the ray tracing cores 372 in FIG. 3C.

FIG. 18B illustrates exemplary internal details of an execution unit 1808. A graphics execution unit 1808 can include an instruction fetch unit 1837, a general register file array (GRF) 1824, an architectural register file array (ARF) 1826, a thread arbiter 1822, a send unit 1830, a branch unit 1832, a set of SIMD floating point units (FPUs) 1834, and optionally a set of dedicated integer SIMD ALUs 1835. The GRF 1824 and ARF 1826 includes the set of general register files and architecture register files associated with each simultaneous hardware thread that may be active in the graphics execution unit 1808. Per thread architectural state may be maintained in the ARF 1826, while data used during thread execution is stored in the GRF 1824. The execution state of each thread, including the instruction pointers for each thread, can be held in thread-specific registers in the ARF 1826.

The graphics execution unit 1808 may have an architecture that is a combination of Simultaneous Multi-Threading (SMT) and fine-grained Interleaved Multi-Threading (IMT). The architecture may have a modular configuration that can be fine-tuned at design time based on a target number of simultaneous threads and number of registers per execution unit, where execution unit resources are divided across logic used to execute multiple simultaneous threads. The number of logical threads that may be executed by the graphics execution unit 1808 is not limited to the number of hardware threads, and multiple logical threads can be assigned to each hardware thread.

Optionally, the graphics execution unit 1808 can co-issue multiple instructions, which may each be different instructions. The thread arbiter 1822 of the graphics execution unit 1808 can dispatch the instructions to one of the send unit 1830, branch unit 1832, or SIMD FPU(s) 1834 for execution. Each execution thread can access 128 general-purpose registers within the GRF 1824, where each register can store 32 bytes, accessible as a SIMD 8-element vector of 32-bit data elements. Each execution unit thread may have access to 4 Kbytes within the GRF 1824, although embodiments are not so limited, and greater or fewer register resources may be provided in other embodiments. The graphics execution unit 1808 may be partitioned into seven hardware threads that can independently perform computational operations, although the number of threads per execution unit can also vary according to embodiments, for example, up to 16 hardware threads may be supported. In an exemplary embodiment, in which seven threads may access 4 Kbytes, the GRF 1824 can store a total of 28 Kbytes. In another exemplary embodiment, where 16 threads may access 4 Kbytes, the GRF 1824 can store a total of 64 Kbytes. The number of threads per execution unit are, however, not limited to those examples and may be more or less than the given numbers. Flexible addressing modes can permit registers to be addressed together to build effectively wider registers or to represent strided rectangular block data structures.

Additionally or alternatively, memory operations, sampler operations, and other longer-latency system communications may be dispatched via "send" instructions that are executed by the message passing send unit 1830. Branch instructions may be dispatched to a dedicated branch unit 1832 to facilitate SIMD divergence and eventual convergence.

The graphics execution unit 1808 may include one or more SIMD floating point units (FPU(s)) 1834 to perform floating-point operations. The FPU(s) 1834 may also support integer computation. In some instances, the FPU(s) 1834 can SIMD execute up to M number of 32-bit floating-point (or integer) operations, or SIMD execute up to 2M 16-bit integer or 16-bit floating-point operations. Optionally, at least one of the FPU(s) provides extended math capability to support high-throughput transcendental math functions and double precision 64-bit floating-point. A set of 8-bit integer SIMD ALUs 1835 may also be present, and may be specifically optimized to perform operations associated with machine learning computations.

Optionally, arrays of multiple instances of the graphics execution unit 1808 can be instantiated in a graphics sub-core grouping (e.g., a sub-slice). For scalability, product architects can choose the exact number of execution units per sub-core grouping. The execution unit 1808 may execute instructions across a plurality of execution channels. In addition, each thread executed on the graphics execution unit 1808 may be executed on a different channel.

Figure 19:
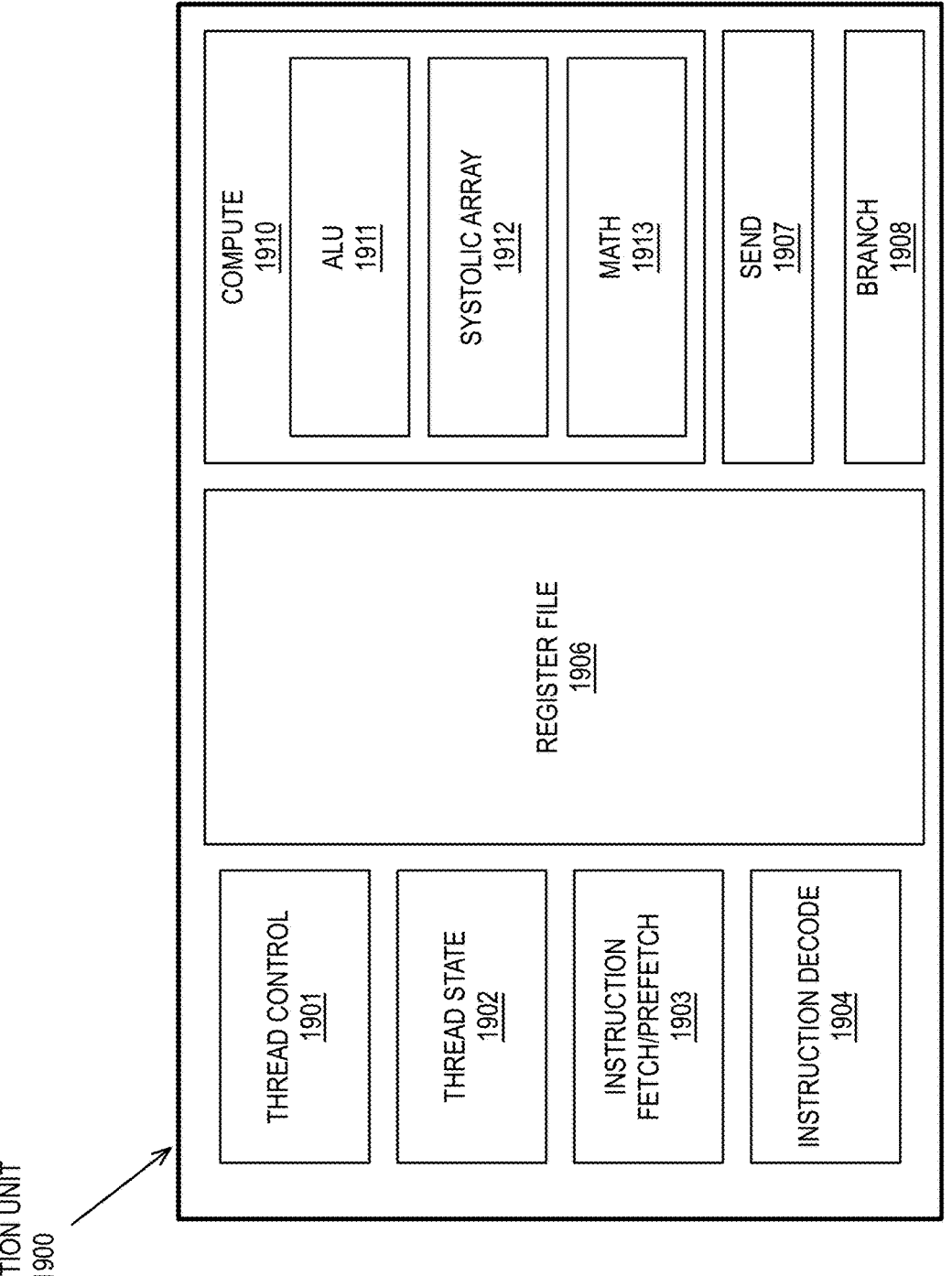
FIG. 19 illustrates an additional execution unit.

FIG. 19 illustrates a further exemplary execution unit 1900. The elements of FIG. 19 having the same or similar names as the elements of any other figure herein describe the same elements as in the other figures, can operate or function in a manner similar to that, can comprise the same components, and can be linked to other entities, as those described elsewhere herein, but are not limited to such. The execution unit 1900 may be a compute-optimized execution unit for use in, for example, a compute engine tile 1640A-1640D as in FIG. 16C, but is not limited as such. The execution unit 1900 may also be used in a graphics engine tile 1610A-1610D as in FIG. 16B. The execution unit 1900 may include a thread control unit 1901, a thread state unit 1902, an instruction fetch/prefetch unit 1903, and an instruction decode unit 1904. The execution unit 1900 may additionally include a register file 1906 that stores registers that can be assigned to hardware threads within the execution unit. The execution unit 1900 may additionally include a send unit 1907 and a branch unit 1908. The send unit 1907 and branch unit 1908 may operate similarly as the send unit 1830 and a branch unit 1832 of the graphics execution unit 1808 of FIG. 18B.

The execution unit 1900 can also include a compute unit 1910 that includes multiple different types of functional units. The compute unit 1910 may also include an ALU 1911, a systolic array 1912, and a math unit 1913. The ALU 1911 includes an array of arithmetic logic units. The ALU 1911 can be configured to perform 64-bit, 32-bit, and 16-bit integer and floating-point operations across multiple processing lanes and data channels and for multiple hardware and/or software threads. The ALU 1911 can perform integer and floating-point operations simultaneously (e.g., within the same clock cycle).

The systolic array 1912 includes a W wide and D deep network of data processing units that can be used to perform vector or other data-parallel operations in a systolic manner. The systolic array 1912 can be configured to perform various matrix operations, including as dot product, outer product, and general matrix-matrix multiplication (GEMM) operations. The systolic array 1912 may support 16-bit floating point operations, as well as 8-bit, 4-bit, 2-bit, and binary integer operations. The systolic array 1912 may be configured to accelerate machine learning operations. The systolic array 1912 can be configured with support for bfloat16, (brain floating point) 16-bit floating point format or a tensor float 32-bit floating point format (TF32) that have different numbers of mantissa and exponent bits relative to Institute of Electrical and Electronics Engineers (IEEE) 754 formats. FP64 formats can also be supported.

In one embodiment, the systolic array 1912 includes hardware to accelerate sparse matrix operations. Multiplication operations for sparse regions of input data can be bypassed without sacrificing throughput. Block sparsity within input matrices can be detected and operations having known output values can be bypassed. In one embodiment, the systolic array 1912 includes hardware to enable operations on sparse data having a compressed representation. A compressed representation of a sparse matrix stores non-zero values and metadata that defines the position of the non-zero values within the matrix. Exemplary compressed representations include but are not limited to compressed tensor representations such as compressed sparse row (CSR), compressed sparse column (CSC), compressed sparse fiber (CSF) representations. Support for compressed representations enable operations to be performed on input in a compressed tensor format without requiring the compressed representation to be decompressed or decoded. In such embodiment, operations can be performed only on non-zero input values and the resulting non-zero output values can be mapped into an output matrix. In some embodiments, hardware support is also provided for machine-specific lossless data compression formats that are used when transmitting data within hardware or across system busses. Such data may be retained in a compressed format for sparse input data and the systolic array 1912 can used the compression metadata for the compressed data to enable operations to be performed on only non-zero values, or to enable blocks of zero data input to be bypassed for multiply operations.

The math unit 1913 can be configured to perform a specific subset of mathematical operations in an efficient and lower-power manner than then ALU unit 1911. The math unit 1913 can include math logic found in shared function logic of a graphics processing engine provided by other embodiments described, e.g., the math logic 1722 of the shared function logic 1720 of FIG. 17. The math unit 1913 can be configured to perform 32-bit and 64-bit floating point operations.

The thread control unit 1901 includes logic to control the execution of threads within the execution unit. The thread control unit 1901 can include thread arbitration logic to start, stop, and preempt execution of threads within the execution unit 1900. The thread state unit 1902 can be used to store thread state for threads assigned to execute on the execution unit 1900. Storing the thread state within the execution unit 1900 enables the rapid pre-emption of threads when those threads become blocked or idle. The instruction fetch/prefetch unit 1903 can fetch instructions from an instruction cache of higher-level execution logic (e.g., instruction cache 1806 as in FIG. 18A). The instruction fetch/prefetch unit

1903 can also issue prefetch requests for instructions to be loaded into the instruction cache based on an analysis of currently executing threads. The instruction decode unit 1904 can be used to decode instructions to be executed by the compute units. The instruction decode unit 1904 can be used as a secondary decoder to decode complex instructions into constituent micro-operations.

The execution unit 1900 additionally includes a register file 1906 that can be used by hardware threads executing on the execution unit 1900. Registers in the register file 1906 can be divided across the logic used to execute multiple simultaneous threads within the compute unit 1910 of the execution unit 1900. The number of logical threads that may be executed by the graphics execution unit 1900 is not limited to the number of hardware threads, and multiple logical threads can be assigned to each hardware thread. The size of the register file 1906 can vary across embodiments based on the number of supported hardware threads. Register renaming may be used to dynamically allocate registers to hardware threads.

Figure 20:
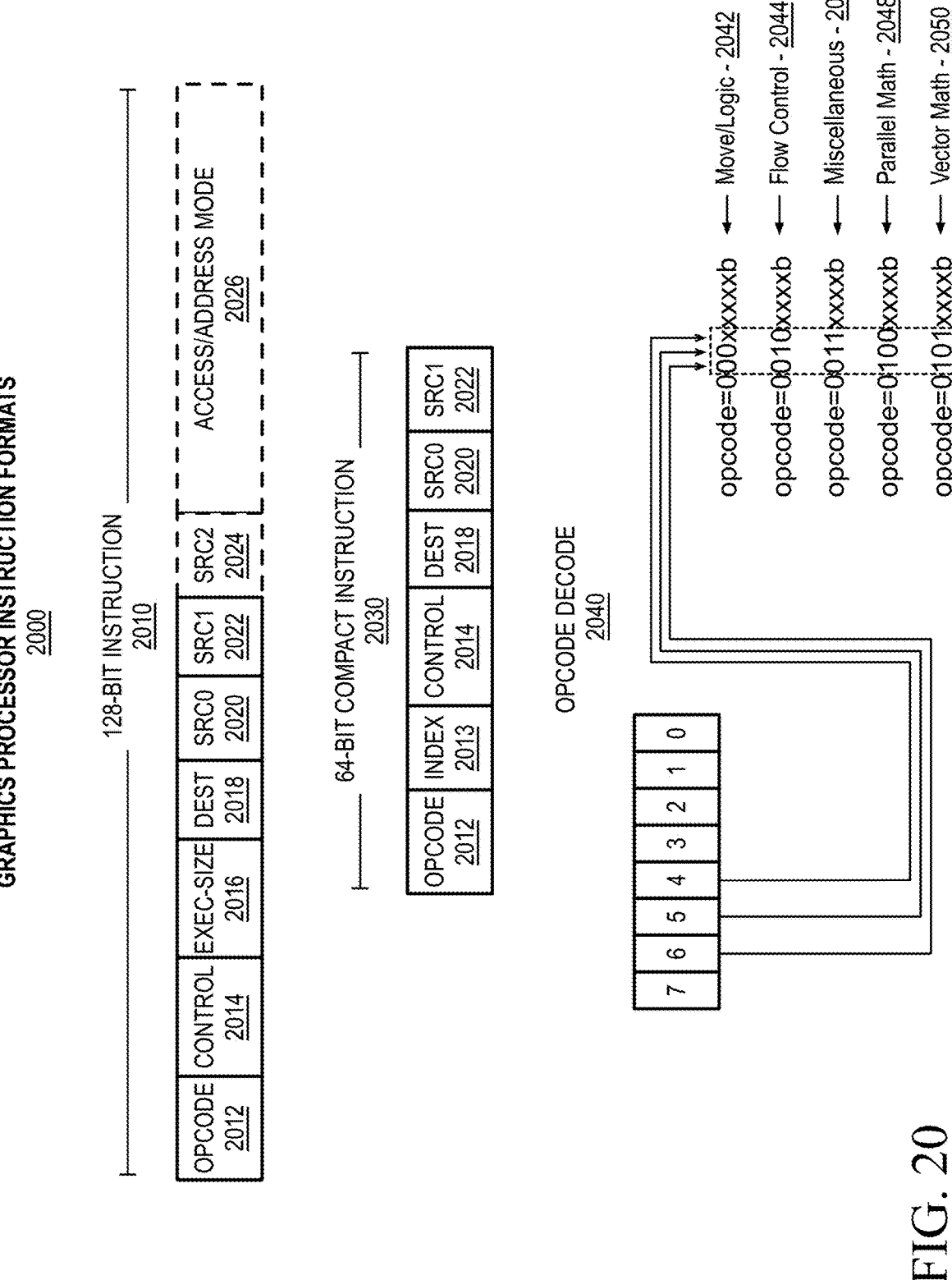
FIG. 20 is a block diagram illustrating a graphics processor instruction formats.

FIG. 20 is a block diagram illustrating graphics processor instruction formats 2000. The graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments the graphics processor instruction formats 2000 described and illustrated are macro-instructions, in that they are instructions supplied to the execution unit, as opposed to micro-operations resulting from instruction decode once the instruction is processed. Thus, a single instructions may cause hardware to perform multiple micro-operations The graphics processor execution units as described herein may natively support instructions in a 128-bit instruction format 2010. A 64-bit compacted instruction format 2030 is available for some instructions based on the selected instruction, instruction options, and number of operands. The native 128-bit instruction format 2010 provides access to all instruction options, while some options and operations are restricted in the 64-bit format 2030. The native instructions available in the 64-bit format 2030 vary by embodiment. The instruction is compacted in part using a set of index values in an index field 2013. The execution unit hardware references a set of compaction tables based on the index values and uses the compaction table outputs to reconstruct a native instruction in the 128-bit instruction format 2010. Other sizes and formats of instruction can be used.

For each format, instruction opcode 2012 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. Instruction control field 2014 may enable control over certain execution options, such as channels selection (e.g., predication) and data channel order (e.g., swizzle). For instructions in the 128-bit instruction format 2010 an exec-size field 2016 limits the number of data channels that will be executed in parallel. An exec-size field 2016 may not be available for use in the 64-bit compact instruction format 2030.

Some execution unit instructions have up to three operands including two source operands, src0 2020, src1 2022, and one destination operand (dest 2018). Other instructions, such as, for example, data manipulation instructions, dot product instructions, multiply-add instructions, or multiply-accumulate instructions, can have a third source operand (e.g., SRC2 2024). The instruction opcode 2012 determines the number of source operands. An instruction's last source operand can be an immediate (e.g., hard-coded) value passed with the instruction. The execution units may also support multiple destination instructions, where one or more of the destinations is implied or implicit based on the instruction and/or the specified destination.

The 128-bit instruction format 2010 may include an access/address mode field 2026 specifying, for example, whether direct register addressing mode or indirect register addressing mode is used. When direct register addressing mode is used, the register address of one or more operands is directly provided by bits in the instruction.

The 128-bit instruction format 2010 may also include an access/address mode field 2026, which specifies an address mode and/or an access mode for the instruction. The access mode may be used to define a data access alignment for the instruction. Access modes including a 16-byte aligned access mode and a 1-byte aligned access mode may be supported, where the byte alignment of the access mode determines the access alignment of the instruction operands. For example, when in a first mode, the instruction may use byte-aligned addressing for source and destination operands and when in a second mode, the instruction may use 16-byte-aligned addressing for all source and destination operands.

The address mode portion of the access/address mode field 2026 may determine whether the instruction is to use direct or indirect addressing. When direct register addressing mode is used bits in the instruction directly provide the register address of one or more operands. When indirect register addressing mode is used, the register address of one or more operands may be computed based on an address register value and an address immediate field in the instruction.

Instructions may be grouped based on opcode 2012 bit-fields to simplify Opcode decode 2040. For an 8-bit opcode, bits 4, 5, and 6 allow the execution unit to determine the type of opcode. The precise opcode grouping shown is merely an example. A move and logic opcode group 2042 may include data movement and logic instructions (e.g., move (mov), compare (cmp)). Move and logic group 2042 may share the five least significant bits (LSB), where move (mov) instructions are in the form of 0000xxxxb and logic instructions are in the form of 0001xxxxb. A flow control instruction group 2044 (e.g., call, jump (jmp)) includes instructions in the form of 0010xxxxb (e.g., 0x20). A miscellaneous instruction group 2046 includes a mix of instructions, including synchronization instructions (e.g., wait, send) in the form of 0011xxxxb (e.g., 0x30). A parallel math instruction group 2048 includes component-wise arithmetic instructions (e.g., add, multiply (mul)) in the form of 0100xxxxb (e.g., 0x40). The parallel math instruction group 2048 performs the arithmetic operations in parallel across data channels. The vector math group 2050 includes arithmetic instructions (e.g., dp4) in the form of 0101xxxxb (e.g., 0x50). The vector math group performs arithmetic such as dot product calculations on vector operands. The illustrated opcode decode 2040, in one embodiment, can be used to determine which portion of an execution unit will be used to execute a decoded instruction. For example, some instructions may be designated as systolic instructions that will be performed by a systolic array. Other instructions, such as ray-tracing instructions (not shown) can be routed to a ray-tracing core or ray-tracing logic within a slice or partition of execution logic.

Graphics Pipeline

Figure 21:
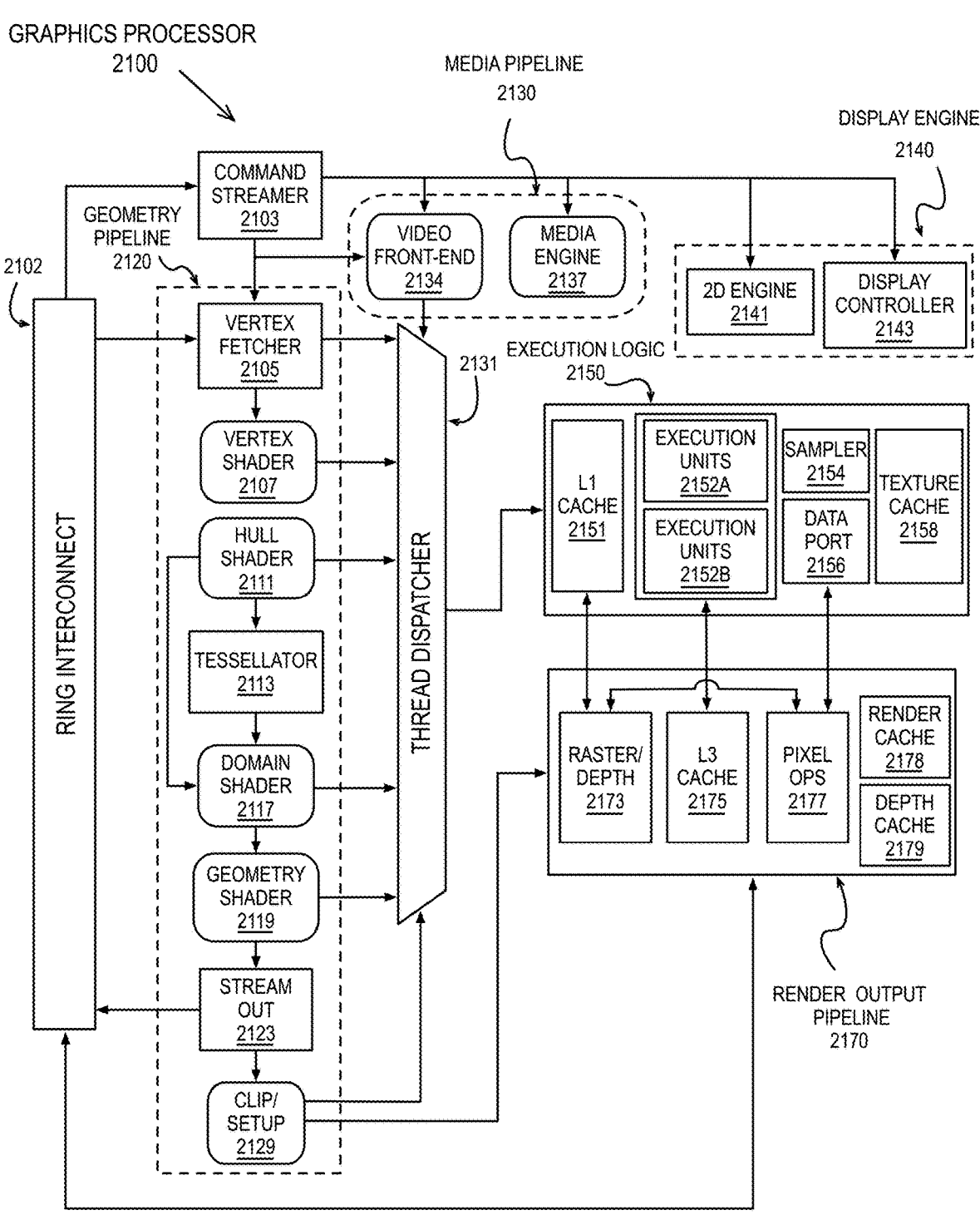
FIG. 21 is a block diagram of an additional graphics processor architecture.

FIG. 21 is a block diagram of graphics processor 2100, according to another embodiment. The elements of FIG. 21 having the same or similar names as the elements of any other figure herein describe the same elements as in the other figures, can operate or function in a manner similar to that, can comprise the same components, and can be linked to other entities, as those described elsewhere herein, but are not limited to such.

The graphics processor 2100 may include different types of graphics processing pipelines, such as a geometry pipeline 2120, a media pipeline 2130, a display engine 2140, thread execution logic 2150, and a render output pipeline 2170. Graphics processor 2100 may be a graphics processor within a multi-core processing system that includes one or more general-purpose processing cores. The graphics processor may be controlled by register writes to one or more control registers (not shown) or via commands issued to graphics processor 2100 via a ring interconnect 2102. Ring interconnect 2102 may couple graphics processor 2100 to other processing components, such as other graphics processors or general-purpose processors. Commands from ring interconnect 2102 are interpreted by a command streamer 2103, which supplies instructions to individual components of the geometry pipeline 2120 or the media pipeline 2130.

Command streamer 2103 may direct the operation of a vertex fetcher 2105 that reads vertex data from memory and executes vertex-processing commands provided by command streamer 2103. The vertex fetcher 2105 may provide vertex data to a vertex shader 2107, which performs coordinate space transformation and lighting operations to each vertex. Vertex fetcher 2105 and vertex shader 2107 may execute vertex-processing instructions by dispatching execution threads to execution units 2152A-2152B via a thread dispatcher 2131.

The execution units 2152A-2152B may be an array of vector processors having an instruction set for performing graphics and media operations. The execution units 2152A-2152B may have an attached L1 cache 2151 that is specific for each array or shared between the arrays. The cache can be configured as a data cache, an instruction cache, or a single cache that is partitioned to contain data and instructions in different partitions.

A geometry pipeline 2120 may include tessellation components to perform hardware-accelerated tessellation of 3D objects. A programmable hull shader 2111 may configure the tessellation operations. A programmable domain shader 2117 may provide back-end evaluation of tessellation output. A tessellator 2113 may operate at the direction of hull shader 2111 and contain special purpose logic to generate a set of detailed geometric objects based on a coarse geometric model that is provided as input to geometry pipeline 2120. In addition, if tessellation is not used, tessellation components (e.g., hull shader 2111, tessellator 2113, and domain shader 2117) can be bypassed. The tessellation components can operate based on data received from the vertex shader 2107.

Complete geometric objects may be processed by a geometry shader 2119 via one or more threads dispatched to execution units 2152A-2152B, or can proceed directly to the clipper 2129. The geometry shader may operate on entire geometric objects, rather than vertices or patches of vertices as in previous stages of the graphics pipeline. If the tessellation is disabled the geometry shader 2119 receives input from the vertex shader 2107. The geometry shader 2119 may be programmable by a geometry shader program to perform geometry tessellation if the tessellation units are disabled.

Before rasterization, a clipper 2129 processes vertex data. The clipper 2129 may be a fixed function clipper or a programmable clipper having clipping and geometry shader functions. A rasterizer and depth test component 2173 in the render output pipeline 2170 may dispatch pixel shaders to convert the geometric objects into per pixel representations. The pixel shader logic may be included in thread execution logic 2150. Optionally, an application can bypass the rasterizer and depth test component 2173 and access unrasterized vertex data via a stream out unit 2123.

The graphics processor 2100 has an interconnect bus, interconnect fabric, or some other interconnect mechanism that allows data and message passing amongst the major components of the processor. In some embodiments, execution units 2152A-2152B and associated logic units (e.g., L1 cache 2151, sampler 2154, texture cache 2158, etc.) interconnect via a data port 2156 to perform memory access and communicate with render output pipeline components of the processor. A sampler 2154, caches 2151, 2158 and execution units 2152A-2152B each may have separate memory access paths. Optionally, the texture cache 2158 can also be configured as a sampler cache.

The render output pipeline 2170 may contain a rasterizer and depth test component 2173 that converts vertex-based objects into an associated pixel-based representation. The rasterizer logic may include a windower/masker unit to perform fixed function triangle and line rasterization. An associated render cache 2178 and depth cache 2179 are also available in some embodiments. A pixel operations component 2177 performs pixel-based operations on the data, though in some instances, pixel operations associated with 2D operations (e.g., bit block image transfers with blending) are performed by the 2D engine 2141, or substituted at display time by the display controller 2143 using overlay display planes. A shared L3 cache 2175 may be available to all graphics components, allowing the sharing of data without the use of main system memory.

The media pipeline 2130 may include a media engine 2137 and a video front-end 2134. Video front-end 2134 may receive pipeline commands from the command streamer 2103. The media pipeline 2130 may include a separate command streamer. Video front-end 2134 may process media commands before sending the command to the media engine 2137. Media engine 2137 may include thread spawning functionality to spawn threads for dispatch to thread execution logic 2150 via thread dispatcher 2131.

The graphics processor 2100 may include a display engine 2140. This display engine 2140 may be external to processor 2100 and may couple with the graphics processor via the ring interconnect 2102, or some other interconnect bus or fabric. Display engine 2140 may include a 2D engine 2141 and a display controller 2143. Display engine 2140 may contain special purpose logic capable of operating independently of the 3D pipeline. Display controller 2143 may couple with a display device (not shown), which may be a system integrated display device, as in a laptop computer, or an external display device attached via a display device connector.

The geometry pipeline 2120 and media pipeline 2130 may be configurable to perform operations based on multiple graphics and media programming interfaces and are not specific to any one application programming interface (API). A driver software for the graphics processor may translate API calls that are specific to a particular graphics or media library into commands that can be processed by the graphics processor. Support may be provided for the Open Graphics Library (OpenGL), Open Computing Language (OpenCL), and/or Vulkan graphics and compute API, all from the Khronos Group. Support may also be provided for the Direct3D library from the Microsoft Corporation. A combination of these libraries may be supported. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

Figures 22A, 22B:
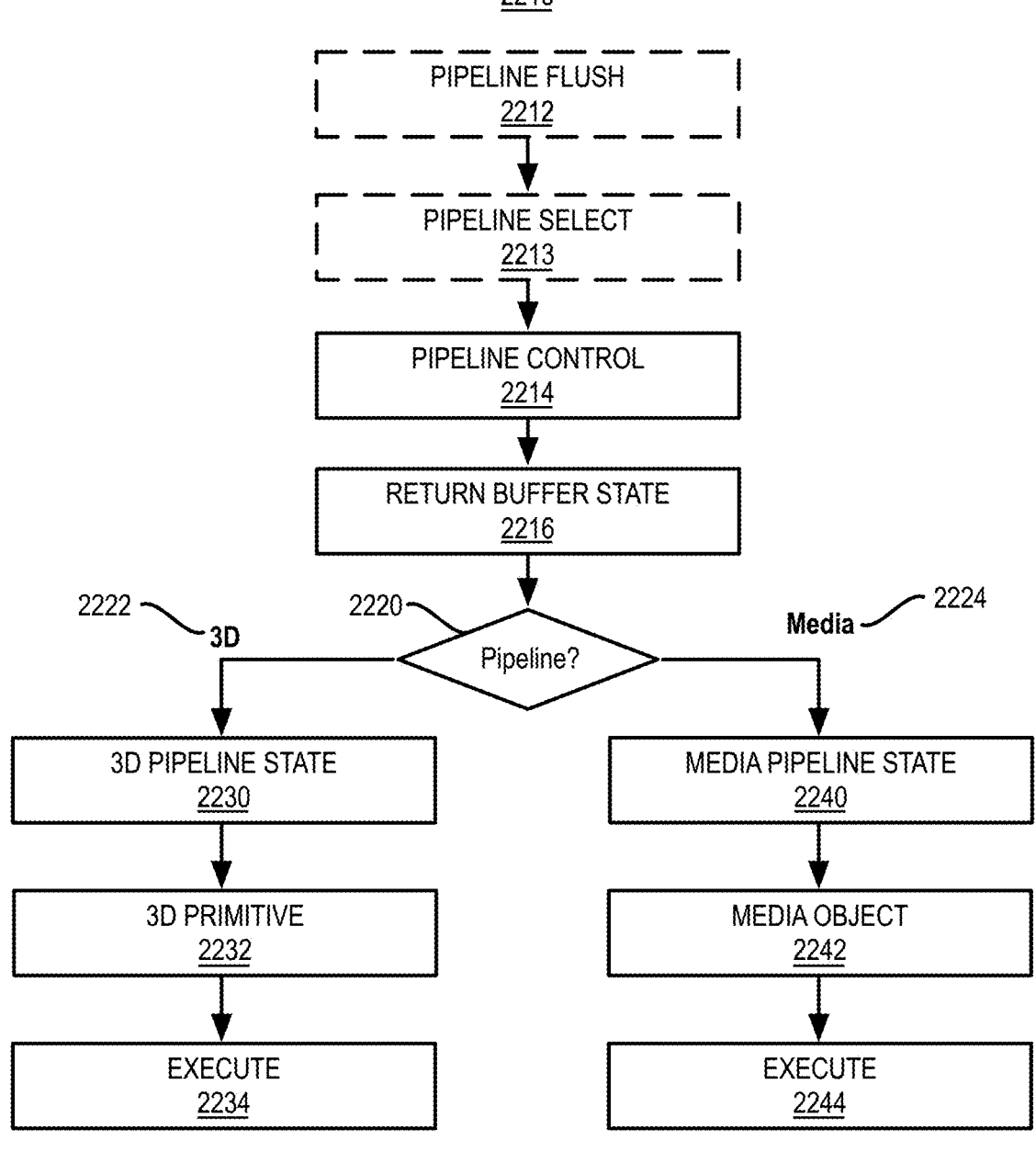
FIG. 22A-22B illustrate a graphics processor command format and command sequence.

FIG. 22A is a block diagram illustrating a graphics processor command format 2200 used for programming graphics processing pipelines, such as, for example, the pipelines described herein in conjunction with FIG. 16A, 17, 21. FIG. 22B is a block diagram illustrating a graphics processor command sequence 2210 according to an embodiment. The solid lined boxes in FIG. 22A illustrate the components that are generally included in a graphics command while the dashed lines include components that are optional or that are only included in a sub-set of the graphics commands. The exemplary graphics processor command format 2200 of FIG. 22A includes data fields to identify a client 2202, a command operation code (opcode) 2204, and data 2206 for the command. A sub-opcode 2205 and a command size 2208 are also included in some commands.

Client 2202 may specify the client unit of the graphics device that processes the command data. A graphics processor command parser may examine the client field of each command to condition the further processing of the command and route the command data to the appropriate client unit. The graphics processor client units may include a memory interface unit, a render unit, a 2D unit, a 3D unit, and a media unit. Each client unit may have a corresponding processing pipeline that processes the commands. Once the command is received by the client unit, the client unit reads the opcode 2204 and, if present, sub-opcode 2205 to determine the operation to perform. The client unit performs the command using information in data field 2206. For some commands, an explicit command size 2208 is expected to specify the size of the command. The command parser may automatically determine the size of at least some of the commands based on the command opcode. Commands may be aligned via multiples of a double word. Other command formats can also be used.

The flow diagram in FIG. 22B illustrates an exemplary graphics processor command sequence 2210. Software or firmware of a data processing system that features an exemplary graphics processor may use a version of the command sequence shown to set up, execute, and terminate a set of graphics operations. A sample command sequence is shown and described for purposes of example only and is not limited to these specific commands or to this command sequence. Moreover, the commands may be issued as batch of commands in a command sequence, such that the graphics processor will process the sequence of commands in at least partially concurrence.

The graphics processor command sequence 2210 may begin with a pipeline flush command 2212 to cause any active graphics pipeline to complete the currently pending commands for the pipeline. Optionally, the 3D pipeline 2222 and the media pipeline 2224 may not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. Pipeline flush command 2212 can be used for pipeline synchronization or before placing the graphics processor into a low power state.

A pipeline select command 2213 may be used when a command sequence requires the graphics processor to explicitly switch between pipelines. A pipeline select command 2213 may be required only once within an execution context before issuing pipeline commands unless the context is to issue commands for both pipelines. A pipeline flush command 2212 may be required immediately before a pipeline switch via the pipeline select command 2213.

A pipeline control command 2214 may configure a graphics pipeline for operation and may be used to program the 3D pipeline 2222 and the media pipeline 2224. The pipeline control command 2214 may configure the pipeline state for the active pipeline. The pipeline control command 2214 may be used for pipeline synchronization and to clear data from one or more cache memories within the active pipeline before processing a batch of commands.

Commands related to the return buffer state 2216 may be used to configure a set of return buffers for the respective pipelines to write data. Some pipeline operations require the allocation, selection, or configuration of one or more return buffers into which the operations write intermediate data during processing. The graphics processor may also use one or more return buffers to store output data and to perform cross thread communication. The return buffer state 2216 may include selecting the size and number of return buffers to use for a set of pipeline operations.

The remaining commands in the command sequence differ based on the active pipeline for operations. Based on a pipeline determination 2220, the command sequence is tailored to the 3D pipeline 2222 beginning with the 3D pipeline state 2230 or the media pipeline 2224 beginning at the media pipeline state 2240.

The commands to configure the 3D pipeline state 2230 include 3D state setting commands for vertex buffer state, vertex element state, constant color state, depth buffer state, and other state variables that are to be configured before 3D primitive commands are processed. The values of these commands are determined at least in part based on the particular 3D API in use. The 3D pipeline state 2230 commands may also be able to selectively disable or bypass certain pipeline elements if those elements will not be used.

A 3D primitive 2232 command may be used to submit 3D primitives to be processed by the 3D pipeline. Commands and associated parameters that are passed to the graphics processor via the 3D primitive 2232 command are forwarded to the vertex fetch function in the graphics pipeline. The vertex fetch function uses the 3D primitive 2232 command data to generate vertex data structures. The vertex data structures are stored in one or more return buffers. The 3D primitive 2232 command may be used to perform vertex operations on 3D primitives via vertex shaders. To process vertex shaders, 3D pipeline 2222 dispatches shader execution threads to graphics processor execution units.

The 3D pipeline 2222 may be triggered via an execute 2234 command or event. A register may write trigger command executions. An execution may be triggered via a 'go' or 'kick' command in the command sequence. Command execution may be triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

The graphics processor command sequence 2210 may follow the media pipeline 2224 path when performing media operations. In general, the specific use and manner of programming for the media pipeline 2224 depends on the media or compute operations to be performed. Specific media decode operations may be offloaded to the media pipeline during media decode. The media pipeline can also be bypassed and media decode can be performed in whole or in part using resources provided by one or more general-purpose processing cores. The media pipeline may also include elements for general-purpose graphics processor unit (GPGPU) operations, where the graphics processor is used to perform SIMD vector operations using computational shader programs that are not explicitly related to the rendering of graphics primitives.

Media pipeline 2224 may be configured in a similar manner as the 3D pipeline 2222. A set of commands to configure the media pipeline state 2240 are dispatched or placed into a command queue before the media object commands 2242. Commands for the media pipeline state 2240 may include data to configure the media pipeline elements that will be used to process the media objects. This includes data to configure the video decode and video encode logic within the media pipeline, such as encode or decode format. Commands for the media pipeline state 2240 may also support the use of one or more pointers to "indirect" state elements that contain a batch of state settings.

Media object commands 2242 may supply pointers to media objects for processing by the media pipeline. The media objects include memory buffers containing video data to be processed. Optionally, all media pipeline states must be valid before issuing a media object command 2242. Once the pipeline state is configured and media object commands 2242 are queued, the media pipeline 2224 is triggered via an execute command 2244 or an equivalent execute event (e.g., register write). Output from media pipeline 2224 may then be post processed by operations provided by the 3D pipeline 2222 or the media pipeline 2224. GPGPU operations may be configured and executed in a similar manner as media operations.

Graphics Software Architecture

Figure 23:
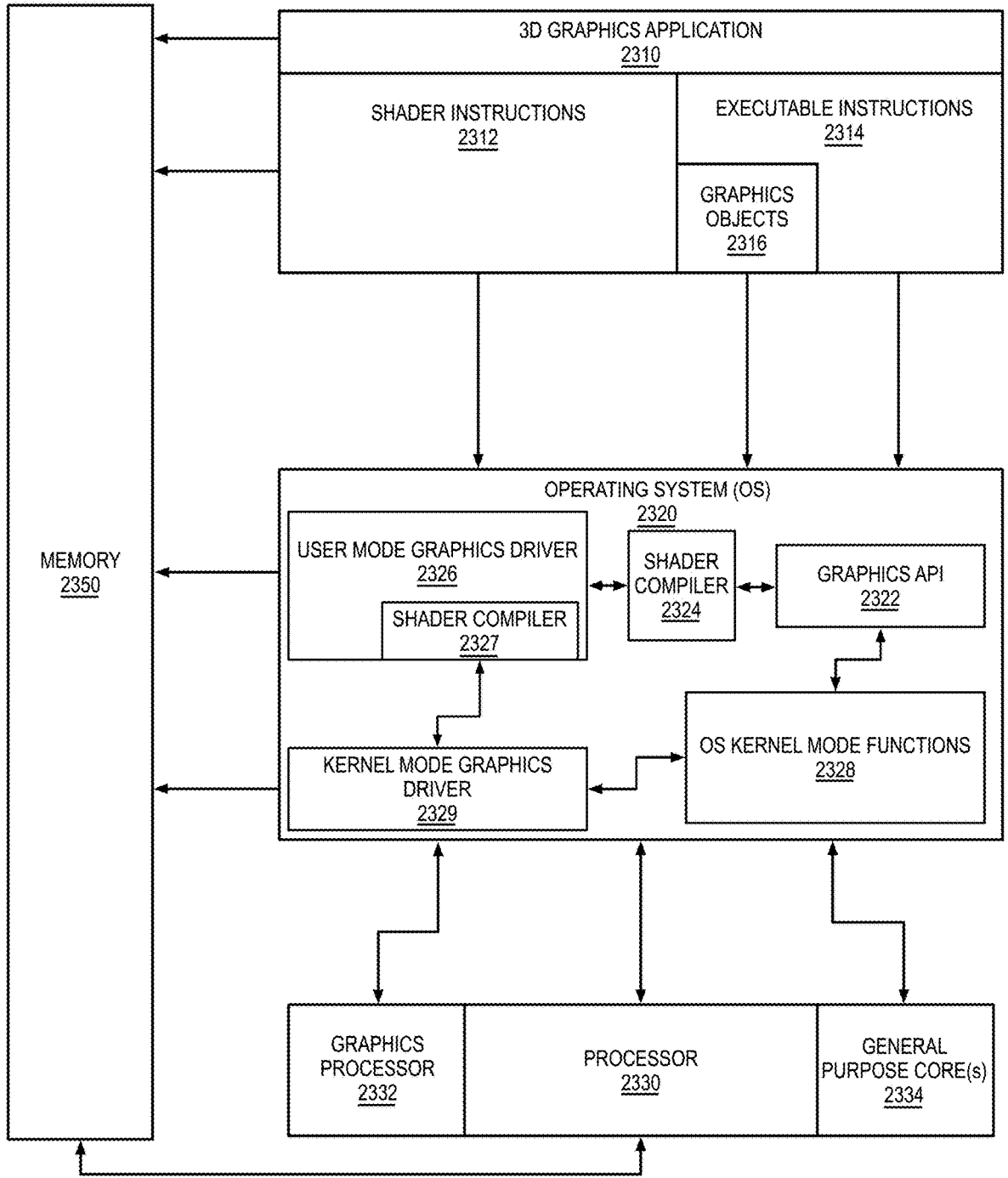
FIG. 23 illustrates exemplary graphics software architecture for a data processing system.

FIG. 23 illustrates an exemplary graphics software architecture for a data processing system 2300. Such a software architecture may include a 3D graphics application 2310, an operating system 2320, and at least one processor 2330. Processor 2330 may include a graphics processor 2332 and one or more general-purpose processor core(s) 2334. The processor 2330 may be a variant of the processor 1402 or any other of the processors described herein. The processor 2330 may be used in place of the processor 1402 or any other of the processors described herein. Therefore, the disclosure of any features in combination with the processor 1402 or any other of the processors described herein also discloses a corresponding combination with the graphics processor 2332, but is not limited to such. Moreover, the elements of FIG. 23 having the same or similar names as the elements of any other figure herein describe the same elements as in the other figures, can operate or function in a manner similar to that, can comprise the same components, and can be linked to other entities, as those described elsewhere herein, but are not limited to such. The graphics application 2310 and operating system 2320 are each executed in the system memory 2350 of the data processing system.

3D graphics application 2310 may contain one or more shader programs including shader instructions 2312. The shader language instructions may be in a high-level shader language, such as the High-Level Shader Language (HLSL) of Direct3D, the OpenGL Shader Language (GLSL), and so forth. The application may also include executable instructions 2314 in a machine language suitable for execution by the general-purpose processor core 2334. The application may also include graphics objects 2316 defined by vertex data.

The operating system 2320 may be a Microsoft® Windows® operating system from the Microsoft Corporation, a proprietary UNIX-like operating system, or an open source UNIX-like operating system using a variant of the Linux kernel. The operating system 2320 can support a graphics API 2322 such as the Direct3D API, the OpenGL API, or the Vulkan API. When the Direct3D API is in use, the operating system 2320 uses a front-end shader compiler 2324 to compile any shader instructions 2312 in HLSL into a lower-level shader language. The compilation may be a just-in-time (JIT) compilation or the application can perform shader pre-compilation. High-level shaders may be compiled into low-level shaders during the compilation of the 3D graphics application 2310. The shader instructions 2312 may be provided in an intermediate form, such as a version of the Standard Portable Intermediate Representation (SPIR) used by the Vulkan API.

User mode graphics driver 2326 may contain a back-end shader compiler 2327 to convert the shader instructions 2312 into a hardware specific representation. When the OpenGL API is in use, shader instructions 2312 in the GLSL high-level language are passed to a user mode graphics driver 2326 for compilation. The user mode graphics driver 2326 may use operating system kernel mode functions 2328 to communicate with a kernel mode graphics driver 2329. The kernel mode graphics driver 2329 may communicate with graphics processor 2332 to dispatch commands and instructions.

IP Core Implementations

One or more aspects may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

FIG. 24A is a block diagram illustrating an IP core development system 2400 that may be used to manufacture an integrated circuit to perform operations according to an embodiment. The IP core development system 2400 may be used to generate modular, re-usable designs that can be incorporated into a larger design or used to construct an entire integrated circuit (e.g., an SOC integrated circuit). A design facility 2430 can generate a software simulation 2410 of an IP core design in a high-level programming language (e.g., C/C++). The software simulation 2410 can be used to design, test, and verify the behavior of the IP core using a simulation model 2412. The simulation model 2412 may include functional, behavioral, and/or timing simulations. A register transfer level (RTL) design 2415 can then be created or synthesized from the simulation model 2412. The RTL design 2415 is an abstraction of the behavior of the integrated circuit that models the flow of digital signals between hardware registers, including the associated logic performed using the modeled digital signals. In addition to an RTL design 2415, lower-level designs at the logic level or transistor level may also be created, designed, or synthesized. Thus, the particular details of the initial design and simulation may vary.

The RTL design 2415 or equivalent may be further synthesized by the design facility into a hardware model 2420, which may be in a hardware description language (HDL), or some other representation of physical design data. The HDL may be further simulated or tested to verify the IP core design. The IP core design can be stored for delivery to a 3$^{rd}$ party fabrication facility 2465 using non-volatile memory 2440 (e.g., hard disk, flash memory, or any non-volatile storage medium). Alternatively, the IP core design may be transmitted (e.g., via the Internet) over a wired connection 2450 or wireless connection 2460. The fabrication facility 2465 may then fabricate an integrated circuit that is based at least in part on the IP core design. The fabricated integrated circuit can be configured to perform operations in accordance with at least one embodiment described herein.

Figure 24B:
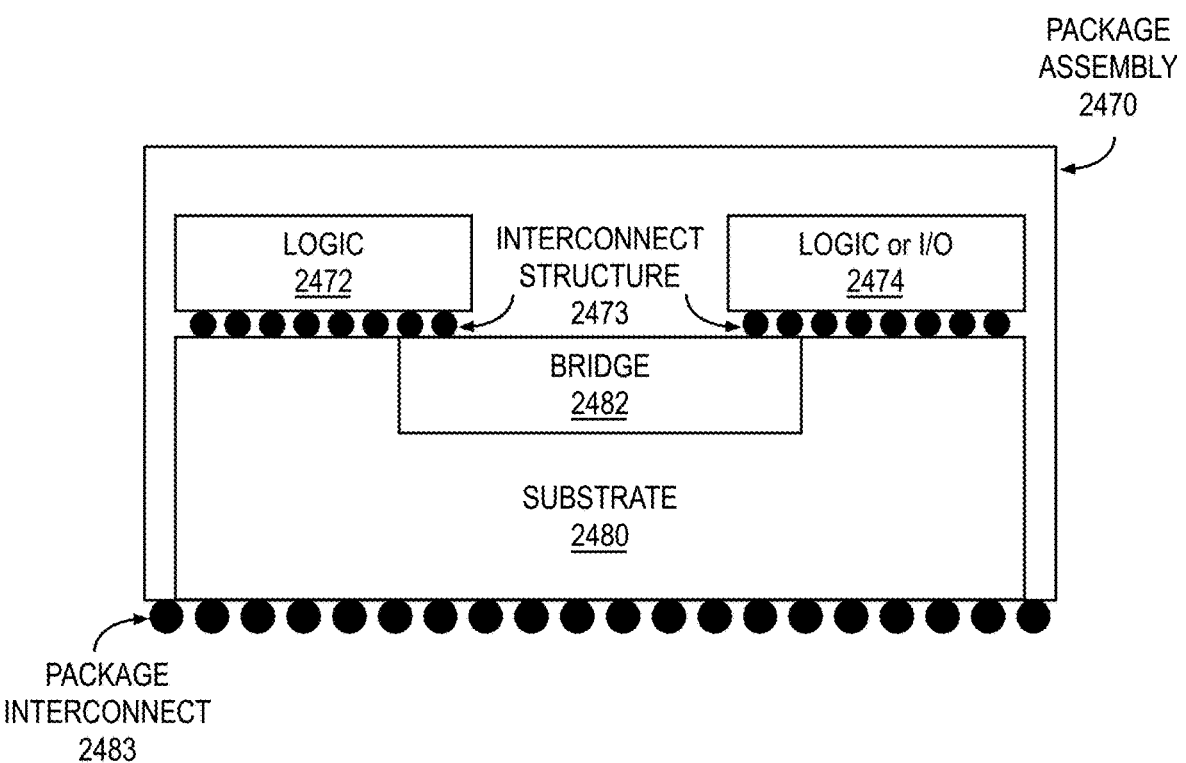
FIG. 24B illustrates a cross-section side view of an integrated circuit package assembly.

FIG. 24B illustrates a cross-section side view of an integrated circuit package assembly 2470. The integrated circuit package assembly 2470 illustrates an implementation of one or more processor or accelerator devices as described herein. The package assembly 2470 includes multiple units of hardware logic 2472, 2474 connected to a substrate 2480. The logic 2472, 2474 may be implemented at least partly in configurable logic or fixed-functionality logic hardware, and can include one or more portions of any of the processor core(s), graphics processor(s), or other accelerator devices described herein. Each unit of logic 2472, 2474 can be implemented within a semiconductor die and coupled with the substrate 2480 via an interconnect structure 2473. The interconnect structure 2473 may be configured to route electrical signals between the logic 2472, 2474 and the substrate 2480, and can include interconnects such as, but not limited to bumps or pillars. The interconnect structure 2473 may be configured to route electrical signals such as, for example, input/output (I/O) signals and/or power or ground signals associated with the operation of the logic 2472, 2474. Optionally, the substrate 2480 may be an epoxy-based laminate substrate. The substrate 2480 may also include other suitable types of substrates. The package assembly 2470 can be connected to other electrical devices via a package interconnect 2483. The package interconnect 2483 may be coupled to a surface of the substrate 2480 to route electrical signals to other electrical devices, such as a motherboard, other chipset, or multi-chip module.

The units of logic 2472, 2474 may be electrically coupled with a bridge 2482 that is configured to route electrical signals between the logic 2472, 2474. The bridge 2482 may be a dense interconnect structure that provides a route for electrical signals. The bridge 2482 may include a bridge substrate composed of glass or a suitable semiconductor material. Electrical routing features can be formed on the bridge substrate to provide a chip-to-chip connection between the logic 2472, 2474.

Although two units of logic 2472, 2474 and a bridge 2482 are illustrated, embodiments described herein may include more or fewer logic units on one or more dies. The one or more dies may be connected by zero or more bridges, as the bridge 2482 may be excluded when the logic is included on a single die. Alternatively, multiple dies or units of logic can be connected by one or more bridges. Additionally, multiple logic units, dies, and bridges can be connected together in other possible configurations, including three-dimensional configurations.

Figure 24C:
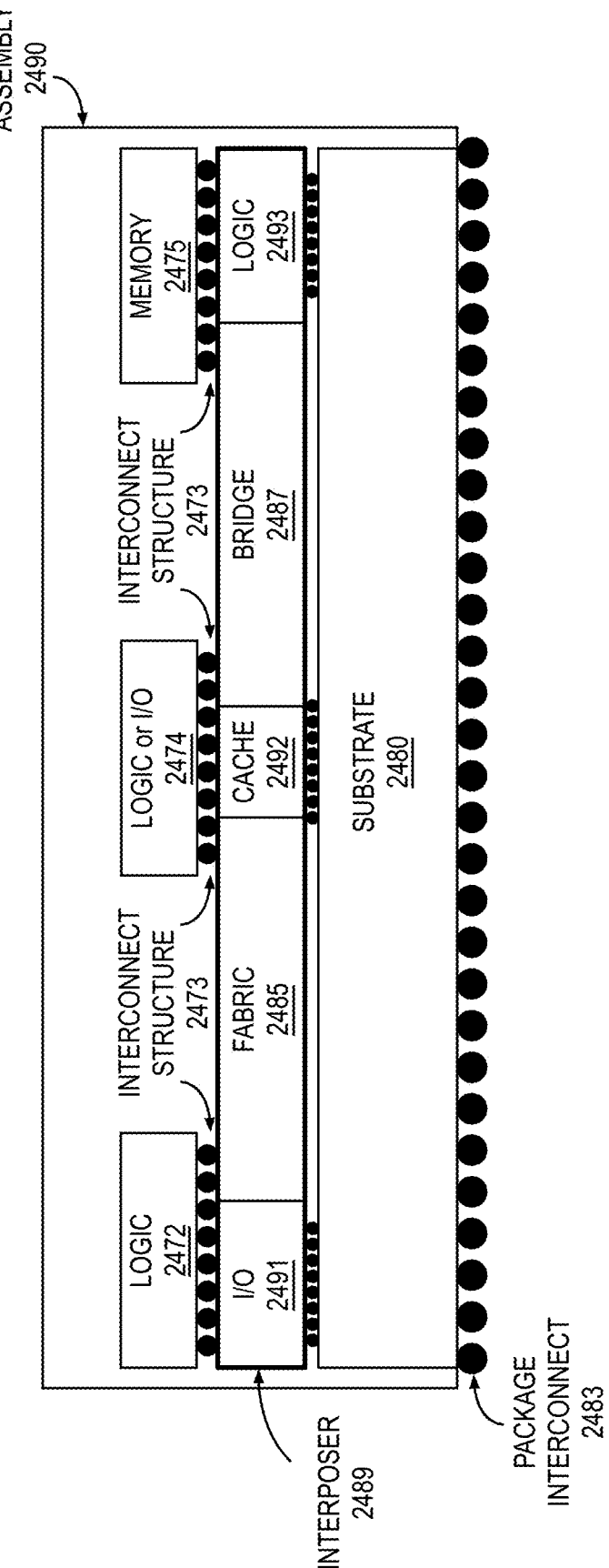
FIG. 24C illustrates a package assembly that includes multiple units of hardware logic chiplets connected to a substrate (e.g., base die)

FIG. 24C illustrates a package assembly 2490 that includes multiple units of hardware logic chiplets connected to a substrate 2480 (e.g., base die). A graphics processing unit, parallel processor, and/or compute accelerator as described herein can be composed from diverse silicon chiplets that are separately manufactured. In this context, a chiplet is an at least partially packaged integrated circuit that includes distinct units of logic that can be assembled with other chiplets into a larger package. A diverse set of chiplets with different IP core logic can be assembled into a single device. Additionally the chiplets can be integrated into a base die or base chiplet using active interposer technology. The concepts described herein enable the interconnection and communication between the different forms of IP within the GPU. IP cores can be manufactured using different process technologies and composed during manufacturing, which avoids the complexity of converging multiple IPs, especially on a large SoC with several flavors IPs, to the same manufacturing process. Enabling the use of multiple process technologies improves the time to market and provides a cost-effective way to create multiple product SKUs. Additionally, the disaggregated IPs are more amenable to being power gated independently, components that are not in use on a given workload can be powered off, reducing overall power consumption.

In various embodiments a package assembly 2490 can include fewer or greater number of components and chiplets that are interconnected by a fabric 2485 or one or more bridges 2487. The chiplets within the package assembly 2490 may have a 2.5D arrangement using Chip-on-Wafer-on-Substrate stacking in which multiple dies are stacked side-by-side on a silicon interposer that includes through-silicon vias (TSVs) to couple the chiplets with the substrate 2480, which includes electrical connections to the package interconnect 2483.

In one embodiment, silicon interposer is an active interposer 2489 that includes embedded logic in addition to TSVs. In such embodiment, the chiplets within the package assembly 2490 are arranged using 3D face to face die stacking on top of the active interposer 2489. The active interposer 2489 can include hardware logic for I/O 2491, cache memory 2492, and other hardware logic 2493, in addition to interconnect fabric 2485 and a silicon bridge 2487. The fabric 2485 enables communication between the various logic chiplets 2472, 2474 and the logic 2491, 2493 within the active interposer 2489. The fabric 2485 may be an NoC interconnect or another form of packet switched fabric that switches data packets between components of the package assembly. For complex assemblies, the fabric 2485 may be a dedicated chiplet enables communication between the various hardware logic of the package assembly 2490.

Bridge structures 2487 within the active interposer 2489 may be used to facilitate a point to point interconnect between, for example, logic or I/O chiplets 2474 and memory chiplets 2475. In some implementations, bridge structures 2487 may also be embedded within the substrate 2480.

The hardware logic chiplets can include special purpose hardware logic chiplets 2472, logic or I/O chiplets 2474, and/or memory chiplets 2475. The hardware logic chiplets 2472 and logic or I/O chiplets 2474 may be implemented at least partly in configurable logic or fixed-functionality logic hardware and can include one or more portions of any of the processor core(s), graphics processor(s), parallel processors, or other accelerator devices described herein. The memory chiplets 2475 can be DRAM (e.g., GDDR, HBM) memory or cache (SRAM) memory. Cache memory 2492 within the active interposer 2489 (or substrate 2480) can act as a global cache for the package assembly 2490, part of a distributed global cache, or as a dedicated cache for the fabric 2485

Each chiplet can be fabricated as separate semiconductor die and coupled with a base die that is embedded within or coupled with the substrate 2480. The coupling with the substrate 2480 can be performed via an interconnect structure 2473. The interconnect structure 2473 may be configured to route electrical signals between the various chiplets and logic within the substrate 2480. The interconnect structure 2473 can include interconnects such as, but not limited to bumps or pillars. In some embodiments, the interconnect structure 2473 may be configured to route electrical signals such as, for example, input/output (I/O) signals and/or power or ground signals associated with the operation of the logic, I/O and memory chiplets. In one embodiment, an additional interconnect structure couples the active interposer 2489 with the substrate 2480.

The substrate 2480 may be an epoxy-based laminate substrate, however, it is not limited to that and the substrate 2480 may also include other suitable types of substrates. The package assembly 2490 can be connected to other electrical devices via a package interconnect 2483. The package interconnect 2483 may be coupled to a surface of the substrate 2480 to route electrical signals to other electrical devices, such as a motherboard, other chipset, or multi-chip module.

A logic or I/O chiplet 2474 and a memory chiplet 2475 may be electrically coupled via a bridge 2487 that is configured to route electrical signals between the logic or I/O chiplet 2474 and a memory chiplet 2475. The bridge 2487 may be a dense interconnect structure that provides a route for electrical signals. The bridge 2487 may include a bridge substrate composed of glass or a suitable semiconductor material. Electrical routing features can be formed on the bridge substrate to provide a chip-to-chip connection between the logic or I/O chiplet 2474 and a memory chiplet 2475. The bridge 2487 may also be referred to as a silicon bridge or an interconnect bridge. For example, the bridge 2487 is an Embedded Multi-die Interconnect Bridge (EMIB). Alternatively, the bridge 2487 may simply be a direct connection from one chiplet to another chiplet.

Figure 24D:
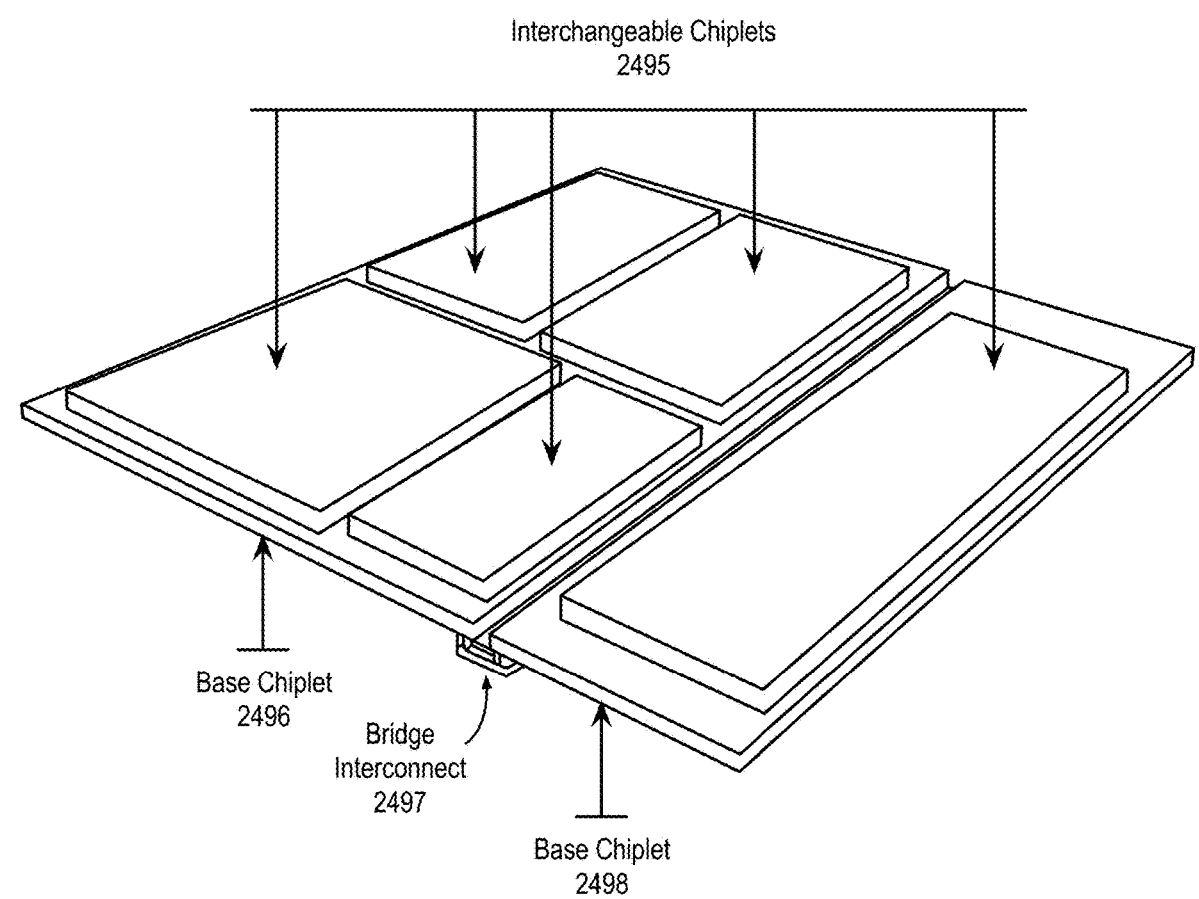
FIG. 24D illustrates a package assembly including interchangeable chiplets.

FIG. 24D illustrates a package assembly 2494 including interchangeable chiplets 2495, according to an embodiment. The interchangeable chiplets 2495 can be assembled into standardized slots on one or more base chiplets 2496, 2498. The base chiplets 2496, 2498 can be coupled via a bridge interconnect 2497, which can be similar to the other bridge interconnects described herein and may be, for example, an EMIB. Memory chiplets can also be connected to logic or I/O chiplets via a bridge interconnect. I/O and logic chiplets can communicate via an interconnect fabric. The base chiplets can each support one or more slots in a standardized format for one of logic or I/O or memory/cache.

SRAM and power delivery circuits may be fabricated into one or more of the base chiplets 2496, 2498, which can be fabricated using a different process technology relative to the interchangeable chiplets 2495 that are stacked on top of the base chiplets. For example, the base chiplets 2496, 2498 can be fabricated using a larger process technology, while the interchangeable chiplets can be manufactured using a smaller process technology. One or more of the interchangeable chiplets 2495 may be memory (e.g., DRAM) chiplets. Different memory densities can be selected for the package assembly 2494 based on the power, and/or performance targeted for the product that uses the package assembly 2494. Additionally, logic chiplets with a different number of type of functional units can be selected at time of assembly based on the power, and/or performance targeted for the product. Additionally, chiplets containing IP logic cores of differing types can be inserted into the interchangeable chiplet slots, enabling hybrid processor designs that can mix and match different technology IP blocks.

Exemplary System on a Chip Integrated Circuit

Figure 25:
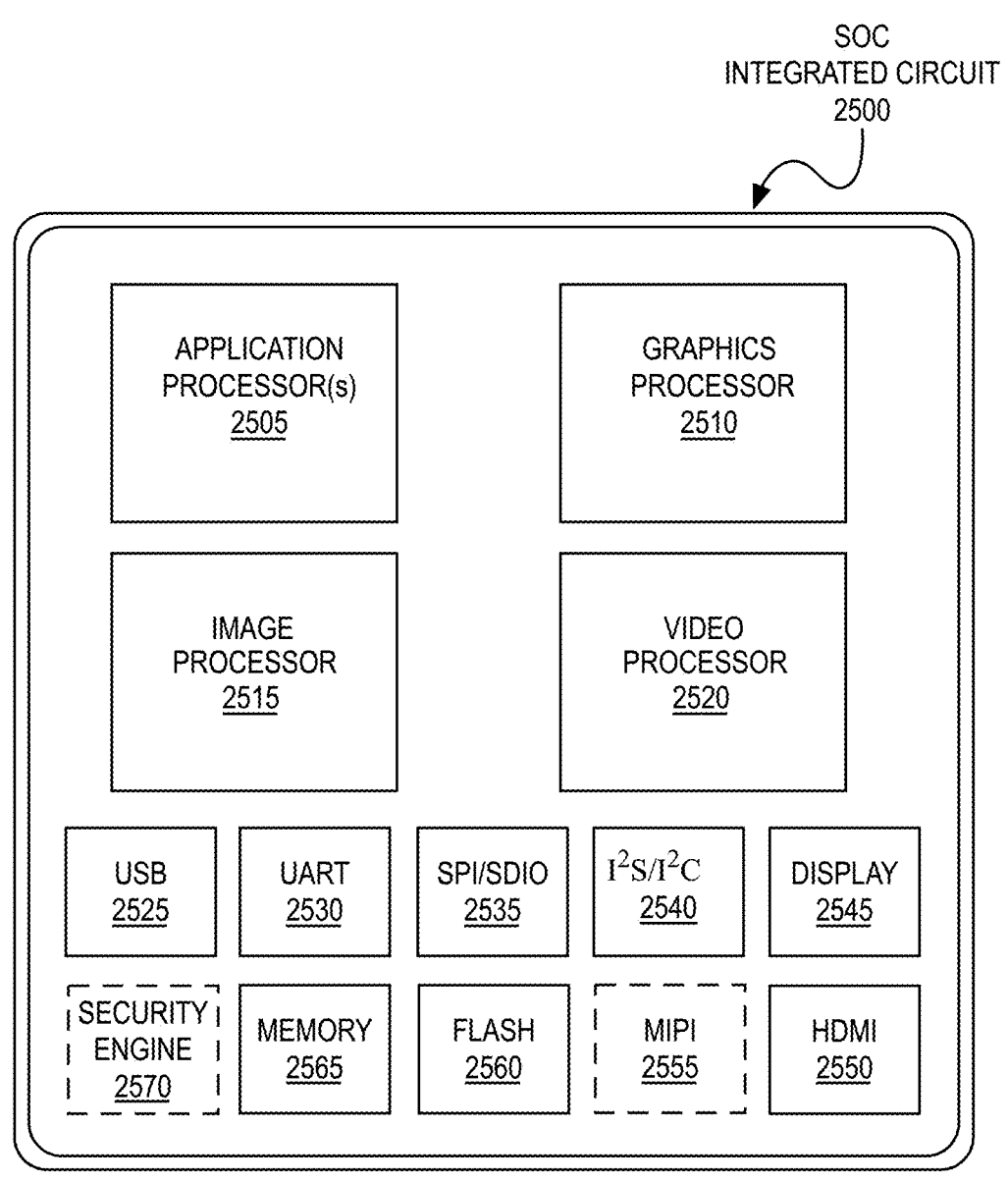
FIG. 25 is a block diagram illustrating an exemplary system on a chip integrated circuit.
Figure 26A:
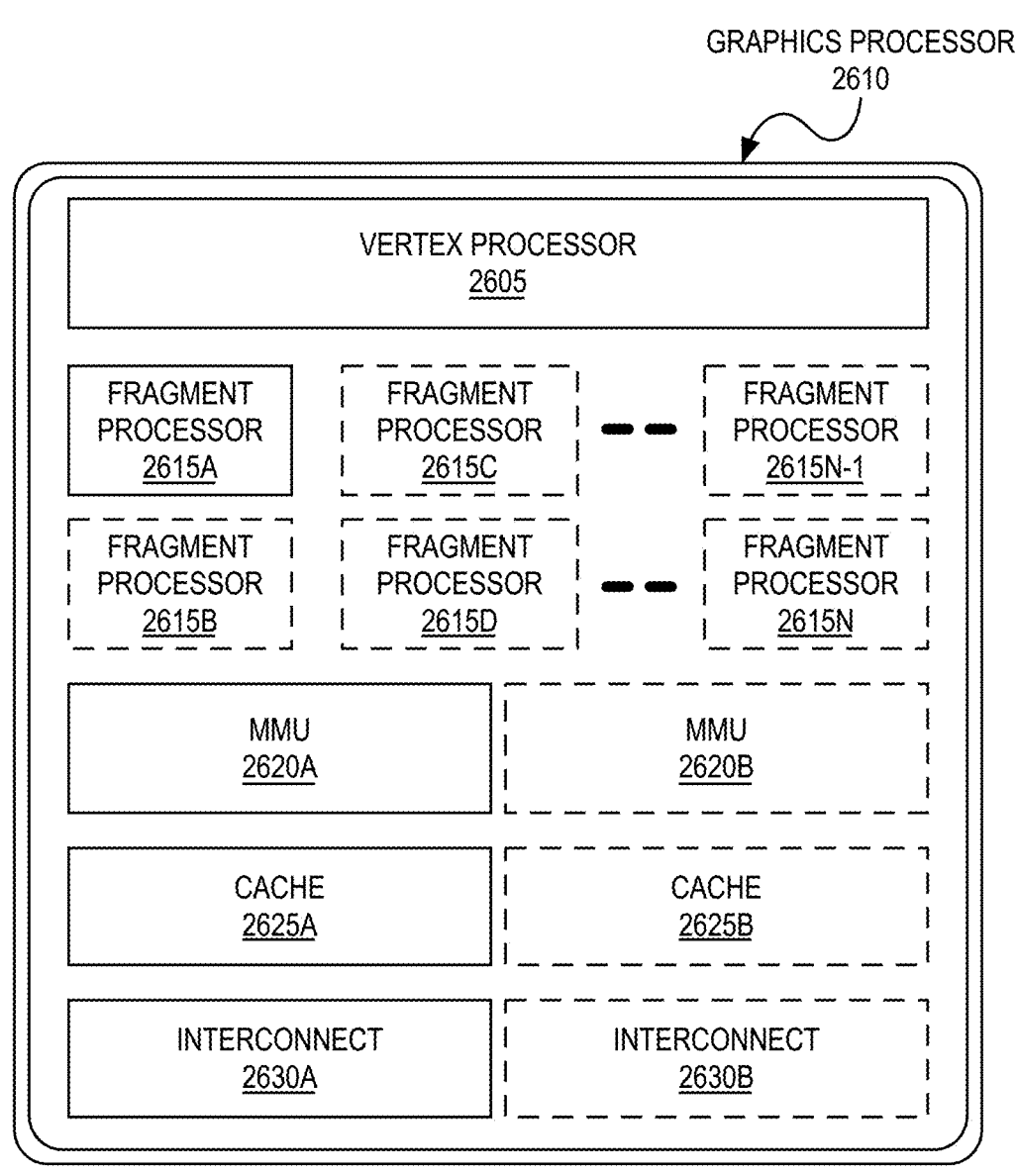
FIG. 26A-26B are block diagrams illustrating exemplary graphics processors for use within an SoC.
Figure 26B:
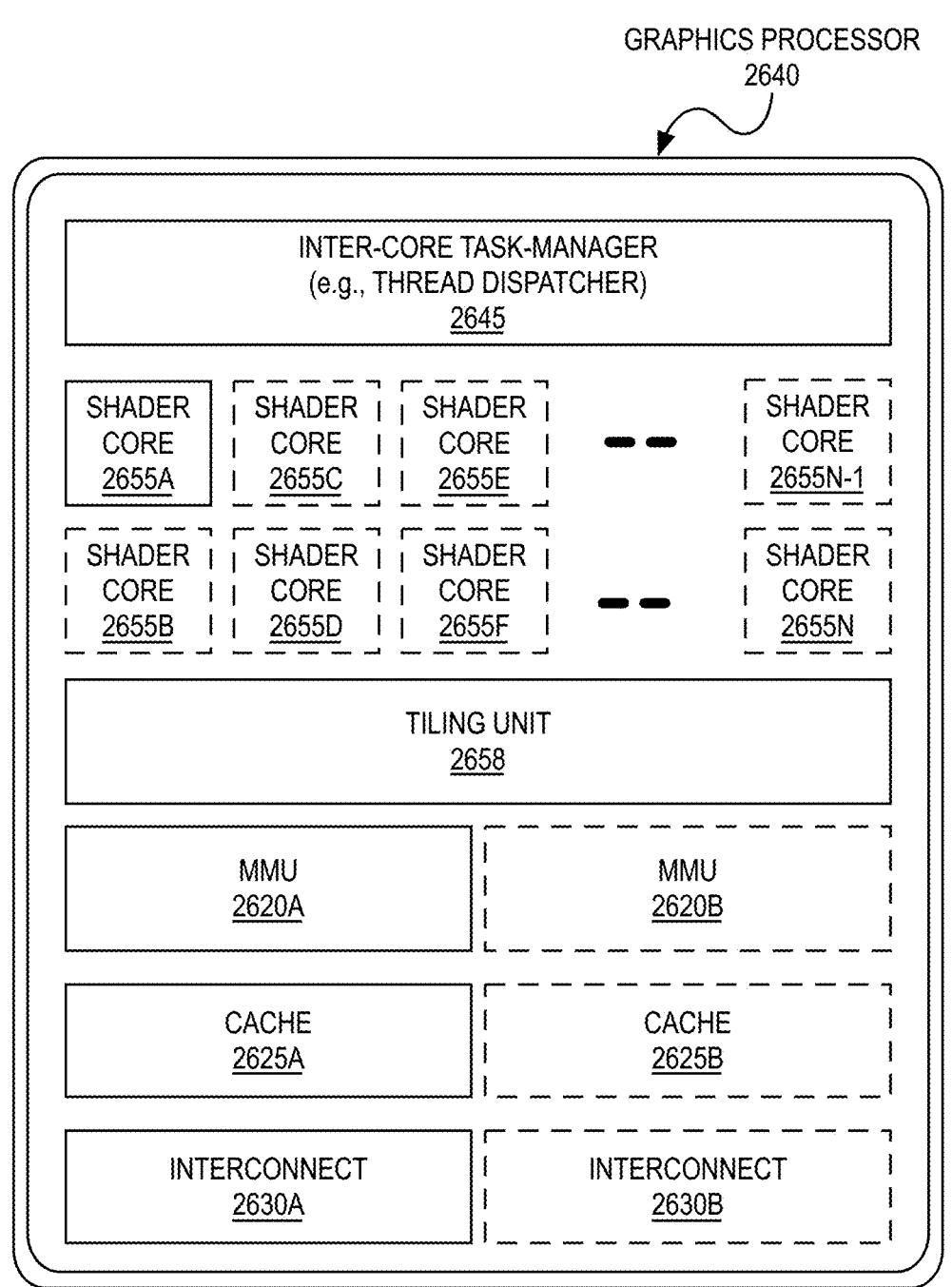

FIG. 25-26B illustrate exemplary integrated circuits and associated graphics processors that may be fabricated using one or more IP cores. In addition to what is illustrated, other logic and circuits may be included, including additional graphics processors/cores, peripheral interface controllers, or general-purpose processor cores. The elements of FIG. 25-26B having the same or similar names as the elements of any other figure herein describe the same elements as in the other figures, can operate or function in a manner similar to that, can comprise the same components, and can be linked to other entities, as those described elsewhere herein, but are not limited to such.

FIG. 25 is a block diagram illustrating an exemplary system on a chip integrated circuit 2500 that may be fabricated using one or more IP cores. Exemplary integrated circuit 2500 includes one or more application processor(s) 2505 (e.g., CPUs), at least one graphics processor 2510, which may be a variant of the graphics processor 1408, 1508, 2510, or of any graphics processor described herein and may be used in place of any graphics processor described. Therefore, the disclosure of any features in combination with a graphics processor herein also discloses a corresponding combination with the graphics processor 2510, but is not limited to such. The integrated circuit 2500 may additionally include an image processor 2515 and/or a video processor 2520, any of which may be a modular IP core from the same or multiple different design facilities. Integrated circuit 2500 may include peripheral or bus logic including a USB controller 2525, UART controller 2530, an SPI/SDIO controller 2535, and an I$^2$S/I$^2$C controller 2540. Additionally, the integrated circuit can include a display device 2545 coupled to one or more of a high-definition multimedia interface (HDMI) controller 2550 and a mobile industry processor interface (MIPI) display interface 2555. Storage may be provided by a flash memory subsystem 2560 including flash memory and a flash memory controller. Memory interface may be provided via a memory controller 2565 for access to SDRAM or SRAM memory devices. Some integrated circuits additionally include an embedded security engine 2570.

FIG. 26A-26B are block diagrams illustrating exemplary graphics processors for use within an SoC, according to embodiments described herein. The graphics processors may be variants of the graphics processor 1408, 1508, 2510, or any other graphics processor described herein. The graphics processors may be used in place of the graphics processor 1408, 1508, 2510, or any other of the graphics processors described herein. Therefore, the disclosure of any features in combination with the graphics processor 1408, 1508, 2510, or any other of the graphics processors described herein also discloses a corresponding combination with the graphics processors of FIG. 26A-26B, but is not limited to such. FIG. 26A illustrates an exemplary graphics processor 2610 of a system on a chip integrated circuit that may be fabricated using one or more IP cores, according to an embodiment. FIG. 26B illustrates an additional exemplary graphics processor 2640 of a system on a chip integrated circuit that may be fabricated using one or more IP cores, according to an embodiment. Graphics processor 2610 of FIG. 26A is an example of a low power graphics processor core. Graphics processor 2640 of FIG. 26B is an example of a higher performance graphics processor core. For example, each of graphics processor 2610 and graphics processor 2640 can be a variant of the graphics processor 2510 of FIG. 25, as mentioned at the outset of this paragraph.

As shown in FIG. 26A, graphics processor 2610 includes a vertex processor 2605 and one or more fragment processor (s) 2615A-2615N (e.g., 2615A, 2615B, 2615C, 2615D, through 2615N-1, and 2615N). Graphics processor 2610 can execute different shader programs via separate logic, such that the vertex processor 2605 is optimized to execute operations for vertex shader programs, while the one or more fragment processor(s) 2615A-2615N execute fragment (e.g., pixel) shading operations for fragment or pixel shader programs. The vertex processor 2605 performs the vertex processing stage of the 3D graphics pipeline and generates primitives and vertex data. The fragment processor(s) 2615A-2615N use the primitive and vertex data generated by the vertex processor 2605 to produce a framebuffer that is displayed on a display device. The fragment processor(s) 2615A-2615N may be optimized to execute fragment shader programs as provided for in the OpenGL API, which may be used to perform similar operations as a pixel shader program as provided for in the Direct 3D API.

Graphics processor 2610 additionally includes one or more memory management units (MMUs) 2620A-2620B, cache(s) 2625A-2625B, and circuit interconnect(s) 2630A-2630B. The one or more MMU(s) 2620A-2620B provide for virtual to physical address mapping for the graphics processor 2610, including for the vertex processor 2605 and/or fragment processor(s) 2615A-2615N, which may reference vertex or image/texture data stored in memory, in addition to vertex or image/texture data stored in the one or more cache(s) 2625A-2625B. The one or more MMU(s) 2620A-2620B may be synchronized with other MMUs within the system, including one or more MMUs associated with the one or more application processor(s) 2505, image processor 2515, and/or video processor 2520 of FIG. 25, such that each processor 2505-2520 can participate in a shared or unified virtual memory system. Components of graphics processor 2610 may correspond with components of other graphics processors described herein. The one or more MMU(s) 2620A-2620B may correspond with MMU 245 of FIG. 2C. Vertex processor 2605 and fragment processor 2615A-2615N may correspond with graphics multiprocessor 234. The one or more circuit interconnect(s) 2630A-2630B enable graphics processor 2610 to interface with other IP cores within the SoC, either via an internal bus of the SoC or via a direct connection, according to embodiments. The one or more circuit interconnect(s) 2630A-2630B may correspond with the data crossbar 240 of FIG. 2C. Further correspondence may be found between analogous components of the graphics processor 2610 and the various graphics processor architectures described herein.

As shown FIG. 26B, graphics processor 2640 includes the one or more MMU(s) 2620A-2620B, cache(s) 2625A-2625B, and circuit interconnect(s) 2630A-2630B of the graphics processor 2610 of FIG. 26A. Graphics processor 2640 includes one or more shader cores 2655A-2655N (e.g., 2655A, 2655B, 2655C, 2655D, 2655E, 2655F, through 2655N-1, and 2655N), which provides for a unified shader core architecture in which a single core or type or core can execute all types of programmable shader code, including shader program code to implement vertex shaders, fragment shaders, and/or compute shaders. The exact number of shader cores present can vary among embodiments and implementations. Additionally, graphics processor 2640 includes an inter-core task manager 2645, which acts as a thread dispatcher to dispatch execution threads to one or more shader cores 2655A-2655N and a tiling unit 2658 to accelerate tiling operations for tile-based rendering, in which rendering operations for a scene are subdivided in image space, for example to exploit local spatial coherence within a scene or to optimize use of internal caches. Shader cores 2655A-2655N may correspond with, for example, graphics multiprocessor 234 as in FIG. 2D, or graphics multiprocessors 325, 350 of FIGS. 3A and 3B respectively, or multi-core group 365A of FIG. 3C.

Tensor Acceleration Logic for Graphics and Machine Learning Workloads

Figure 27:
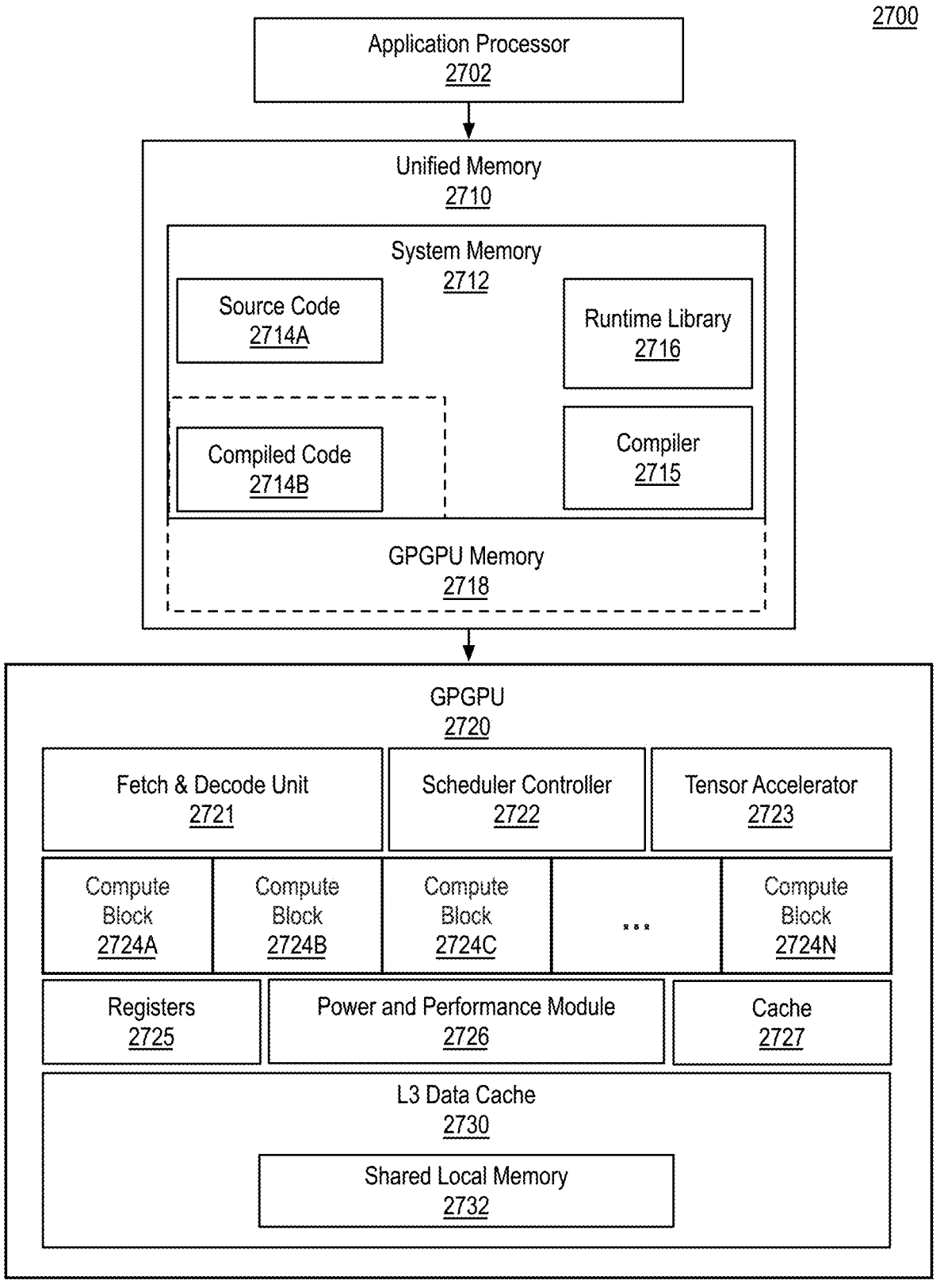
FIG. 27 is a block diagram of a data processing system, according to an embodiment.

FIG. 27 is a block diagram of a data processing system 2700, according to an embodiment. The data processing system 2700 is a heterogeneous processing system having a processor 2702, unified memory 2710, and a GPGPU 2720 including machine learning acceleration logic. The processor 2702 and the GPGPU 2720 can be any of the processors and GPGPU/parallel processors as described herein. For example, with additional reference to FIG. 1, processor 2702 can be a variant of and/or share an architecture with a processor of the illustrated one or more processor(s) 102 and the GPGPU 2720 can be a variant of and/or share an architecture with a parallel processor of the illustrated one or more parallel processor(s) 112. With additional reference to FIG. 14, processor 2702 can be a variant of and/or share an architecture with one of the illustrated processor(s) 1402 and the GPGPU 2720 can be a variant of and/or share an architecture with one of the illustrated graphics processor(s) 1408.

The processor 2702 can execute instructions for a compiler 2715 stored in system memory 2712. The compiler 2715 executes on the processor 2702 to compile source code 2714A into compiled code 2714B. The compiled code 2714B can include instructions that may be executed by the processor 2702 and/or instructions that may be executed by the GPGPU 2720. Compilation of instructions to be executed by the GPGPU can be facilitated using shader or compute program compilers, such as shader compiler 2327 and/or shader compiler 2324 as in FIG. 23. During compilation, the compiler 2715 can perform operations to insert metadata, including hints as to the level of data parallelism present in the compiled code 2714B and/or hints regarding the data locality associated with threads to be dispatched based on the compiled code 2714B. The compiler 2715 can include the information necessary to perform such operations or the operations can be performed with the assistance of a runtime library 2716. The runtime library 2716 can also assist the compiler 2715 in the compilation of the source code 2714A and can also include instructions that are linked at runtime with the compiled code 2714B to facilitate execution of the compiled instructions on the GPGPU 2720. The compiler 2715 can also facilitate register allocation for variables via a register allocator (RA) and generate load and store instructions to move data for variables between memory and the register assigned for the variable.

The unified memory 2710 represents a unified address space that may be accessed by the processor 2702 and the GPGPU 2720. The unified memory can include system memory 2712 as well as GPGPU memory 2718. The GPGPU memory 2718 is memory within an address pace of the GPGPU 2720 and can include some or all of system memory 2712. In one embodiment the GPGPU memory 2718 can also include at least a portion of any memory dedicated for use exclusively by the GPGPU 2720. In one embodiment, compiled code 2714B stored in system memory 2712 can be mapped into GPGPU memory 2718 for access by the GPGPU 2720.

The GPGPU 2720 includes multiple compute blocks 2724A-2724N, which can include one or more of a variety of processing resources described herein. The processing resources can be or include a variety of different computational resources such as, for example, execution units, compute units, streaming multiprocessors, graphics multiprocessors, or multi-core groups. In one embodiment the GPGPU 2720 additionally includes a tensor accelerator 2723 (e.g., matrix accelerator), which can include one or more special function compute units that are designed to accelerate a subset of matrix operations (e.g., dot product, etc.). The tensor accelerator 2723 may also be referred to as a tensor accelerator or tensor core. In one embodiment, logic components within the tensor accelerator 2723 may be distributed across the processing resources of the multiple compute blocks 2724A-2724N.

The GPGPU 2720 can also include a set of resources that can be shared by the compute blocks 2724A-2724N and the tensor accelerator 2723, including but not limited to a set of registers 2725, a power and performance module 2726, and a cache 2727. In one embodiment the registers 2725 include directly and indirectly accessible registers, where the indirectly accessible registers are optimized for use by the tensor accelerator 2723. The power and performance module 2726 can be configured to adjust power delivery and clock frequencies for the compute blocks 2724A-2724N to power gate idle components within the compute blocks 2724A-2724N. In various embodiments the cache 2727 can include an instruction cache and/or a lower-level data cache.

The GPGPU 2720 can additionally include an L3 data cache 2730, which can be used to cache data accessed from the unified memory 2710 by the tensor accelerator 2723 and/or the compute elements within the compute blocks 2724A-2724N. In one embodiment the L3 data cache 2730 includes shared local memory 2732 that can be shared by the compute elements within the compute blocks 2724A-2724N and the tensor accelerator 2723.

In one embodiment the GPGPU 2720 includes instruction handling logic, such as a fetch and decode unit 2721 and a scheduler controller 2722. The fetch and decode unit 2721 includes a fetch unit and decode unit to fetch and decode instructions for execution by one or more of the compute blocks 2724A-2724N or the tensor accelerator 2723. The instructions can be scheduled to the appropriate functional unit within the compute block 2724A-2724N or the tensor accelerator via the scheduler controller 2722. In one embodiment the scheduler controller 2722 is an ASIC configurable to perform advanced scheduling operations. In one embodiment the scheduler controller 2722 is a micro-controller or a low energy-per-instruction processing core capable of executing scheduler instructions loaded from a firmware module.

In one embodiment some functions to be performed by the compute blocks 2724A-2724N can be directly scheduled to or offloaded to the tensor accelerator 2723. In various embodiments the tensor accelerator 2723 includes processing element logic configured to efficiently perform matrix compute operations, such as multiply and add operations and dot product operations used by 3D graphics or compute shader programs. In one embodiment the tensor accelerator 2723 can be configured to accelerate operations used by machine learning frameworks. In one embodiment the tensor accelerator 2723 is an application specific integrated circuit explicitly configured to perform a specific set of parallel matrix multiplication and/or addition operations. In one embodiment the tensor accelerator 2723 is a field programmable gate array (FPGA) that provides fixed function logic that can updated between workloads. In one embodiment, the set of compute operations that can be performed by the tensor accelerator 2723 may be limited relative to the operations that can be performed by the compute block 2724A-2724N. However, the tensor accelerator 2723 can perform parallel tensor operations at a significantly higher throughput relative to the compute block 2724A-2724N.

Figure 28A:
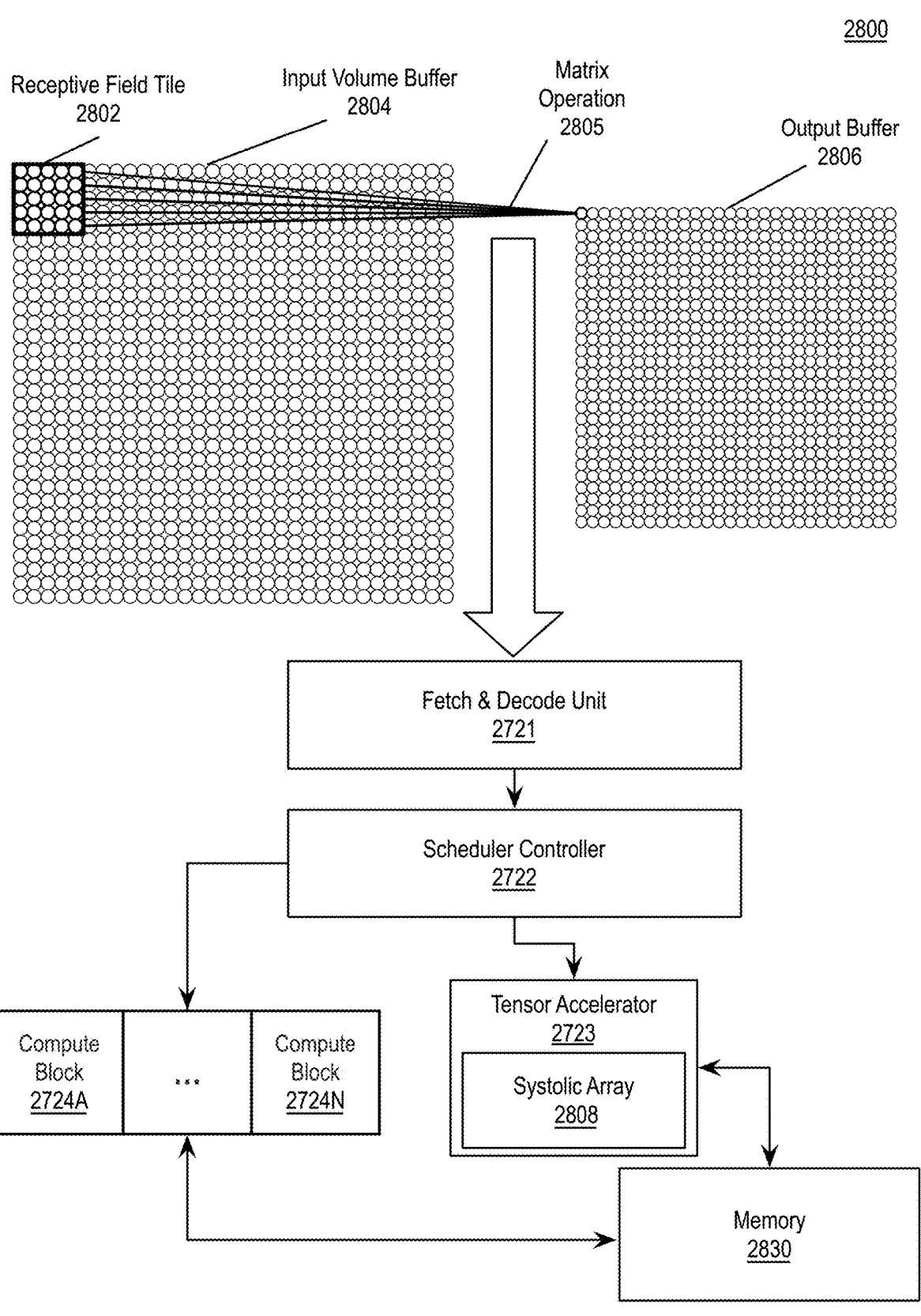
FIG. 28A-28B illustrate a matrix operation performed by an instruction pipeline, according to an embodiment.
Figure 28B:
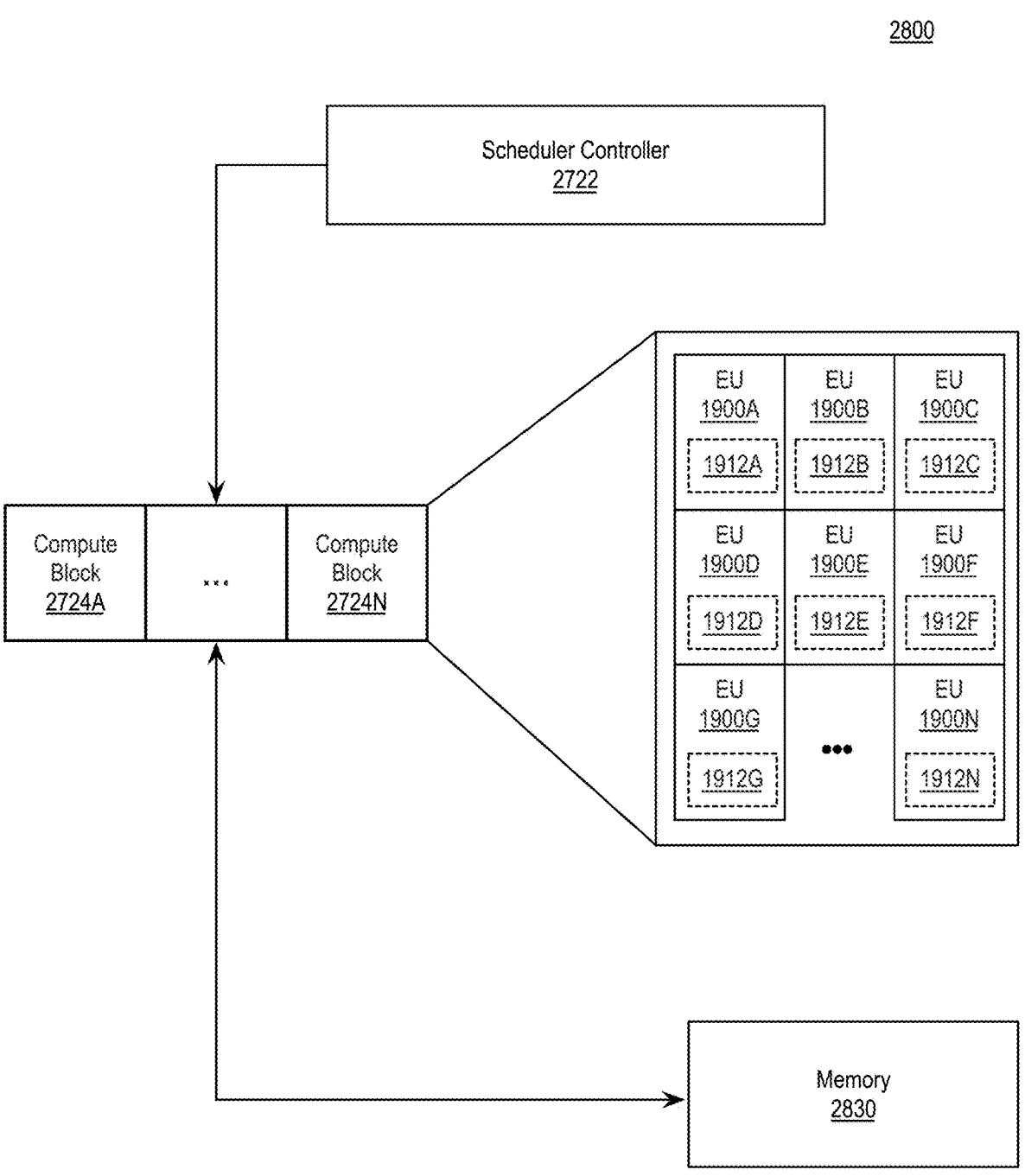

FIG. 28A-28B illustrate a matrix operation 2805 performed by an instruction pipeline 2800, according to embodiments. FIG. 28A illustrates the instruction pipeline 2800 when configured with a systolic array 2808 within the tensor accelerator 2723. FIG. 28B illustrates the instruction pipeline when configured with an execution unit 1900 that includes a systolic array 1912.

As shown in FIG. 28A, the instruction pipeline 2800 can be configured to perform a matrix operation 2805, such as, but not limited to a dot product operation. The dot product of two vectors is a scalar value that is equal to sum of products of corresponding components of the vectors. The dot product can be calculated as shown in equation (1) below.

$$\vec{a} \cdot \vec{b} = \sum_{i=1}^{n} a_i b_i = a_1 b_1 + \ldots + a_n b_n \qquad (1)$$

The dot product can be used in a convolution operation for a convolutional neural network (CNN). While 2D convolution is illustrated, N-dimensional convolution can be performed on an N-dimensional volume using N-dimensional filters. A receptive field tile 2802 highlights a portion of an input volume in an input volume buffer 2804. The input volume buffer can be stored in memory 2830. A dot product matrix operation 2805 can be performed between the data within the receptive field tile 2802 and a convolutional filter to generate a data point within output buffer 2806, which can also be stored in memory 2830. The memory 2830 can be any of the memory described herein, including system memory 2712, GPGPU memory 2718, or one or more cache memories 2727, 2730 as in FIG. 27.

The combination of the data points within the output buffer 2806 represents an activation map generated by the convolution operation. Each point within the activation map is generated by sliding the receptive field tile across the input volume buffer 2804. The activation map data can be input to an activation function to determine an output activation value. In one embodiment, convolution of the input volume buffer 2804 can be defined within a framework as high-level matrix operation 2805. The high-level matrix operations can be performed via primitive operations, such as a basic linear algebra subprogram (BLAS) operation. The primitive operations can be accelerated via hardware instructions executed by the instruction pipeline 2800.

The instruction pipeline 2800 used to accelerate hardware instructions can include the instruction fetch and decode unit 2721, which can fetch and decode hardware instructions, and the scheduler controller 2722 which can schedule decoded instructions to one or more processing resources within the compute blocks 2724A-2724N and/or the tensor accelerator 2723. In one embodiment, a hardware instruction can be scheduled to the compute blocks 2724A-2724N and offloaded to the tensor accelerator 2723. The one or more hardware instructions and associated data to perform the matrix operation 2805 can be stored in the memory 2830. Output of the hardware instruction can also be stored in the memory 2830.

In one embodiment, the tensor accelerator 2723 can execute one or more hardware instructions to perform the matrix operation 2805 using a systolic array 2808 of processing elements. The systolic array 2808 includes a combination of programmable and fixed function hardware that is configurable to perform matrix-matrix and matrix-vector dot product operations, as well as other operations, such as matrix-matrix and matrix-vector fused multiply-add operations.

In various embodiment, as an alternative or in addition to the tensor accelerator 2723, matrix acceleration logic can also be included within the processing resources of the compute blocks 2724A-2724N. For example, as shown in FIG. 28B, in one embodiment each compute block (e.g., compute block 2724N) includes an array of execution units 1900A-1900N. In one embodiment, each execution unit in the array of execution units 1900A-1900N can include systolic arrays 1912A-1912N. In one embodiment, one or more of a subset of the execution units is configured with a systolic array. The number of systolic arrays and the throughput of the available systolic arrays can vary based on the power and performance targets for a device. The scheduler controller 2722 can schedule systolic matrix operations (dot products, fused multiply-adds, etc.) to available systolic arrays 1912A-1912N within the execution units 1900A-1900N of the various compute blocks 2724A-2724N.

While in one embodiment each of the compute blocks 2724A-2724N include an array of execution units 1900A-1900N, in another embodiment the compute blocks 2724A-2724N share an architecture with the processing clusters 214A-214N of the processing cluster array in FIG. 2A. In such embodiment, the compute blocks 2724A-2724N include multiple graphics multiprocessors 234 as in FIG. 2C, which include internal components as illustrated in FIG. 2D. Thus, the graphics multiprocessors within the compute blocks can include a load/store unit 266, GPGPU cores 262, and tensor/RT cores 263. In one embodiment the compute blocks 2724A-2724N can include multi-core group 365A-365N of the GPU 380 of FIG. 3C and include multiple sets of GFX cores 370, tensor cores 371, and ray tracing cores 372. In such embodiment, the scheduler controller 2722 can schedule instructions to perform matrix operations to the tensor/RT cores 263 and/or tensor cores 371 within the compute blocks 2724A-2724N. Accelerated matrix operations include dot product operations, matrix multiply operations, and/or fused multiply-add operations, which can be performed on integer or floating-point matrix elements and various levels of precision. Additionally, in one embodiment the compute blocks 2724A-2724N can include a variant of the compute units 1560A-1560N of FIG. 15C, where such variants include matrix acceleration logic as described herein (e.g., systolic array, tensor core, systolic tensor core) that can execute integer or floating-point matrix acceleration instructions.

Figure 29:
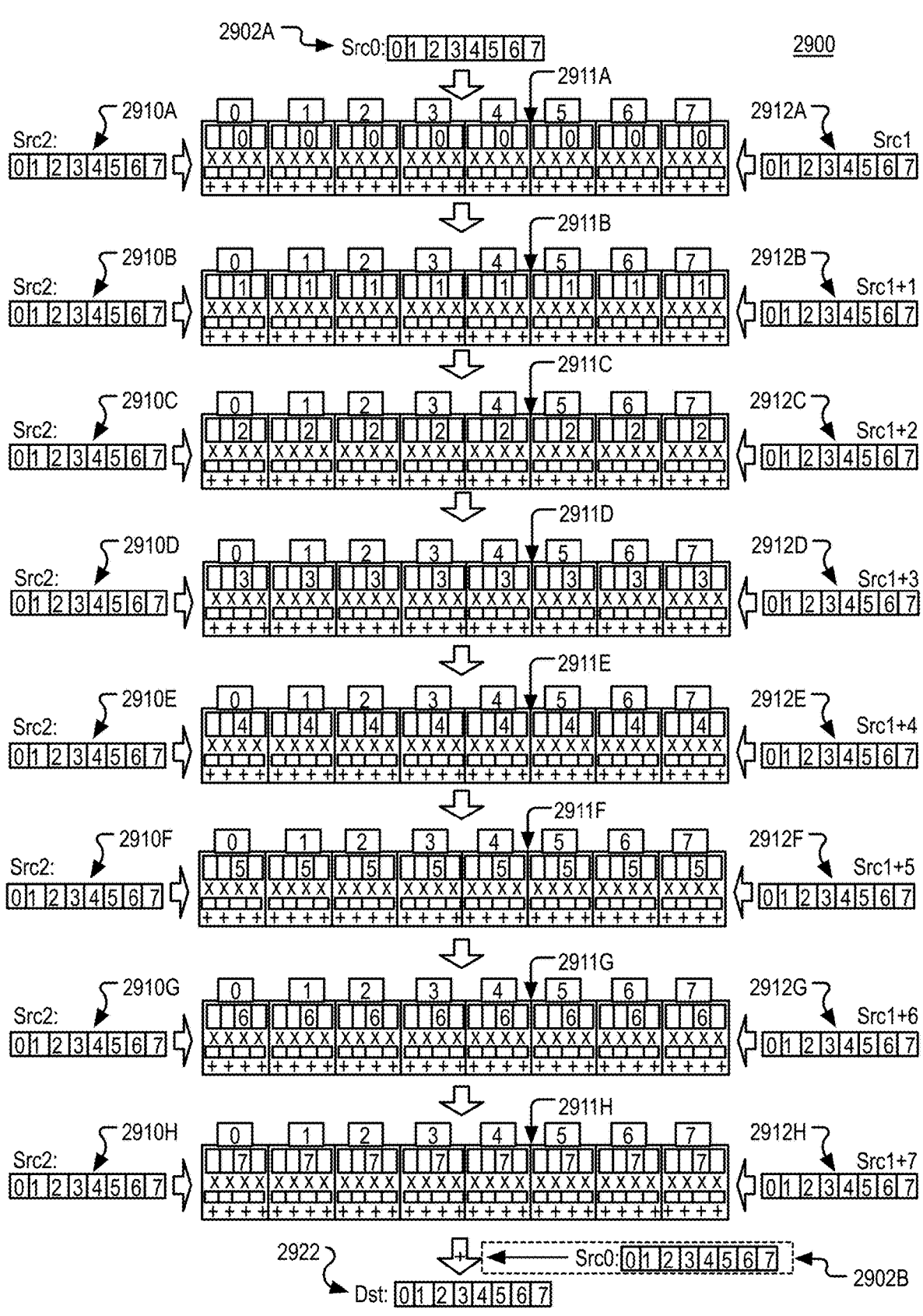
FIG. 29 illustrates a systolic array including multiplier and adder circuits organized in a pipelined fashion.

FIG. 29 illustrates a systolic array 2900 including multiplier and adder circuits organized in a pipelined fashion. In one embodiment, systolic array 2900 is representative of the physical pipeline stages included in the systolic array 1912 and includes capabilities described in relation to that systolic array 1912, including support for sparse and block sparse operations, and may additionally be configured to support structured sparsity within a vector of elements or across a set of channels. Inputs 2912A-2912H for the first input matrix are represented by the data elements contained in the inputs labeled Src1 and Src1+1 through Src1+7. Inputs 2910A-2910H correspond to the second input matrix and are labeled as Src2. Inputs 2902A-2902B, which may include initial accumulator values, can be provided as Src0. An array of processing elements make up the physical pipeline stages 2911A-2911H of the systolic array 2900. Matrix-Matrix or Matrix-Vector operations, including fused multiply-add and/or dot product operations, can be performed at each pipeline stage 2911A-2911H during each clock cycle. On each cycle, every pipeline stage can receive a new Src2 input can be used by the processing elements of the pipeline stage to compute a value using either the new Src1 input or an older Src1 input that was previously read, although during initial startup it may take several cycles before all of the pipeline stages 2911A-2911H become active as the initial set of computed values propagate through the stages.

Input 2902A can provide a Src0 value to processing element of pipeline stage 2911A, for use as an initial accumulator value. Alternatively, input 2902B can provide the Src0 value to be added to the values computed by pipeline stage 2911H of the systolic array, which enables partial pass operation for systolic array 2900 using the lower stages of the array while the unused upper stages are power gated. During operation, the data elements of a selected channel of the Src2 input are broadcast across all channels of the processing elements of the pipeline stages 2911A-2911H, where each channel represents a vector of multiple elements. The number of elements per channel can vary based on the size of the elements. The processing elements of a stage then perform operations using the selected Src2 channel and all channels of a given Src1 input. A Src2 input operates with eight Src1 inputs (e.g., one Src1 input per stage). The data elements of a channel of the Src2 input are broadcast across all channels of processing elements 2911A-2911H. The processing elements then operate the Src2 channel with all channels of a Src1 input. In a first clock cycle, a Src1 input is operated with data elements of the first channel of Src2. In the next cycle, a second Src1 (labeled as Src1+1) operates with the data elements of the second channel of Src2. This sequence repeats on the eight stages of the pipeline. Each stage adds its operation to the output of the previous stage. Across the pipeline stages, multiple Src2 inputs are operated in a pipelined fashion. As successive channels of a first Src2 input are pushed through the pipeline stages, a new Src2 input can be provided at the first stage.

Output 2922 from the final stage is labeled as Dst. Where d=the systolic depth and e the number of data elements per channel, the output of a channel is described by equation (2) below:

$$Dst_i = Src0_i + \sum_{j=0}^{d}\sum_{k=0}^{e}(Src1 + j)_{element\ k\ of\ channel\ i} * Src2_{element\ k\ of\ channel\ j} \qquad (2)$$

As shown in equation (2), each channel can include multiple data elements on which operations are performed in parallel. In one embodiment, each channel represents a four element data vector, although a different number of elements can be configured for each channel. In one embodiment, the number of data elements within a channel can vary based on the size of each data element. Dot products can be performed using, for example, four element vectors with 8-bit data types per element, two element vectors with 16-bit data types, eight element vectors with 4-bit data types (e.g., INT4), or 16 element vectors with 2-bit data types (e.g., INT2). The number of channels can be automatically adjusted depending on the datatype of Src1 and Src2. An instruction can also specify a required systolic depth to be used for the instruction.

In one embodiment the processing elements 2911A-2911H may read inputs 2910A-2910H, 2912A-2912H directly from the general-purpose register file. In one embodiment systolic array 2900 includes logic to read inputs 2910A-2910H, 2912A-2912H from the general-purpose register file and store input data in registers, buffers, or memory that is internal to the systolic array. Internal logic can then feed the input data elements to the processing elements 2911A-2911H for processing. Output 2922 can be written to internal registers or memory of the systolic array 2900 and/or written directly to the general-purpose register file.

Figure 30A:
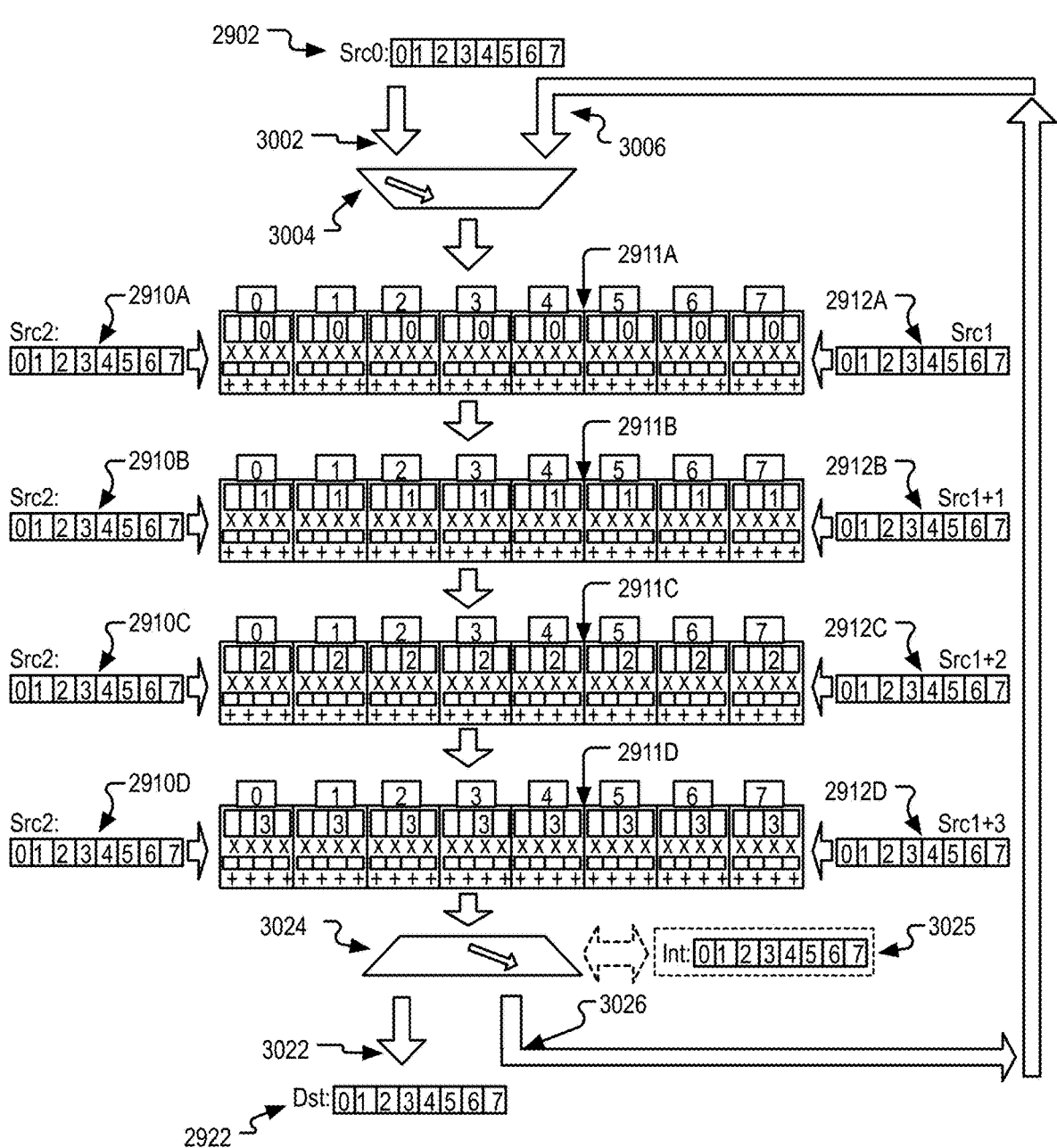
FIG. 30A-30B illustrates the use of a systolic array that can be configured to execute operations at an arbitrary systolic depth.
Figure 30B:
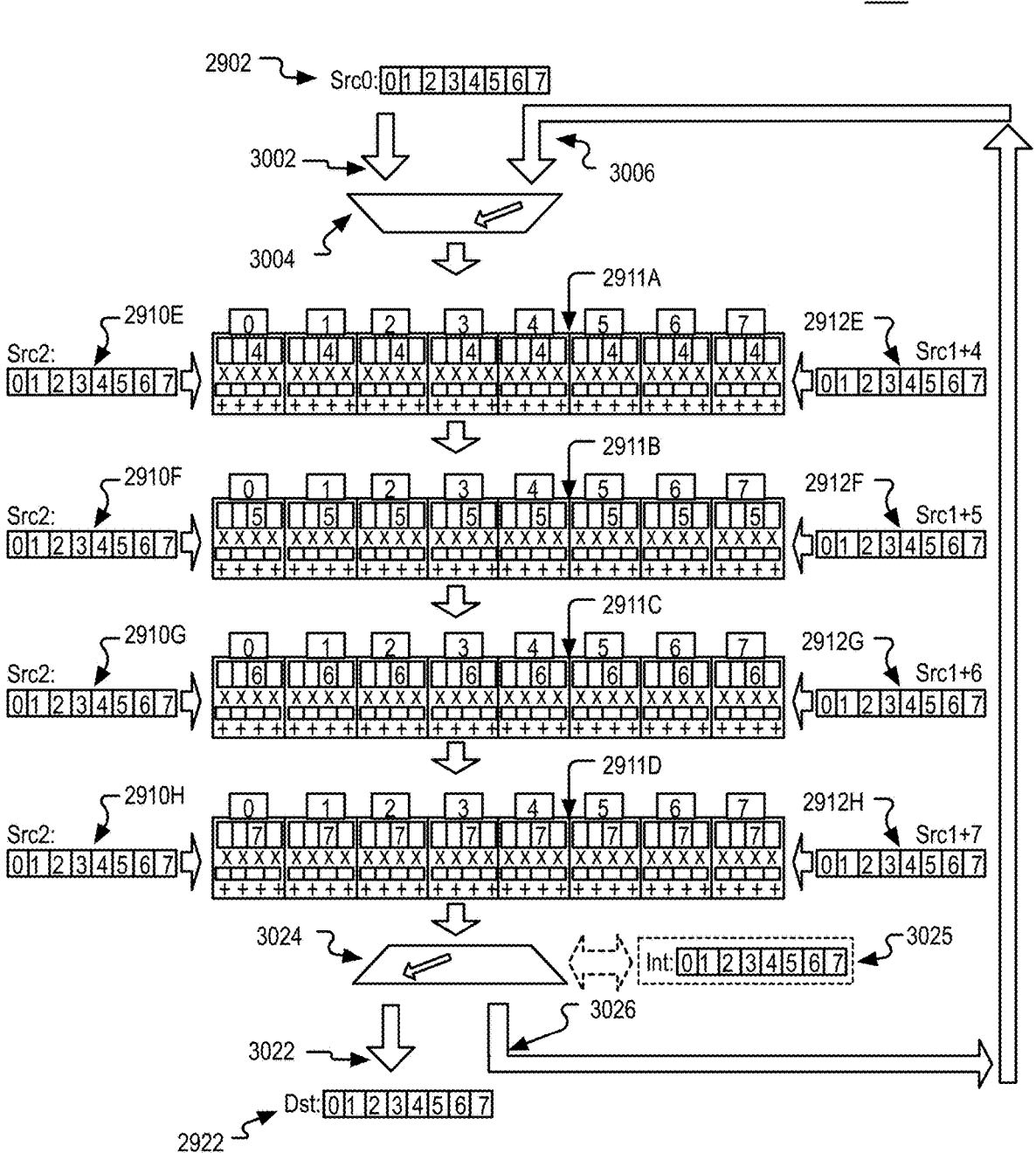

FIG. 30A-30B illustrates the use of a systolic array 3000 that can be configured to execute operations at an arbitrary systolic depth. In the illustrated example, the systolic array 3000 has a physical depth of four, which corresponds with four physical pipeline stages. The systolic array can be configured to operate using an arbitrary number of logical stages, including four, eight, twelve, or sixteen logical stages, or other numbers of logical stages that are not divisible by the number of physical stages using partial-pass operations as in FIG. 31 described below. FIG. 30A shows the array receiving Src0 inputs from an external source and processing the first four stages with Src1 and Src2 inputs. The output of this array is fed back into the second step shown in FIG. 30B. FIG. 30B shows that the next four stages are calculated using the loopback data that includes the already processed values and the Src1 and Src2 inputs.

As shown in FIG. 30A, systolic array 3000 can accept input 2902, as Src0 input, which is read (3002) via data selector 3004. Data selector 3004 selects between the input 2902 and loopback input 3006. Processing elements 2911A-2911D can process inputs 2910A-2910D and 2912A-2912D in a similar manner as systolic array 2900. If four stages are sufficient to complete an operation, pipeline stage 2911D can write (3022) output 2922 to a specified Dst register or memory via data selector 3024. Where further stages are required, data selector 3024 can write loopback output 3026, which is provided as loopback input 3006 to processing elements of pipeline stage 2911A.

As shown in FIG. 30B, in one embodiment, loopback input 3006 can be further processed by processing elements 2911A-2911D. Loopback input 3006 includes the already processed values. In one embodiment, loopback input 3006 can also include input 2910E-2910H, input 2912E-2912H, which can be pre-fetched while processing the first four stages. Data selector 3004 select loopback input 3006 for input by pipeline stage 2911A. Processing elements of the pipeline stages 2911A-2911D can then process inputs 2910E-2910H and 2912E-2912H. Data selector 3024 can then write (3022) the eighth stage result as output 2922 to the specified Dst register.

In one embodiment, the systolic array 3000 is modified to exclude the loopback output 3026 and loopback input 3006 and instead include intermediate storage 3025, as shown in FIG. 30A-30B. The intermediate storage 3025 may be a memory device or register that is internal to the systolic array 3000 or may be a register in a register file that is external to the systolic array 3000. During the operations shown in FIG. 30A, output from pipeline stage 2911D can be stored in the intermediate storage 3025 instead of being output by loopback output 3026 and read by loopback input 3006 before the operations shown in FIG. 30B. During the operations shown in FIG. 30B, output from pipeline stage 2911D can be added to the data stored in the intermediate storage 3025 and written to output 2922. The systolic array 3000 can also be configured to perform multi-pass operations using at least one partial pass, as described below, to enable logical depths that are not divisible by the physical depth of the array.

Scalable Matrix Multiply Accelerator with Feedback Inputs

Figure 31:
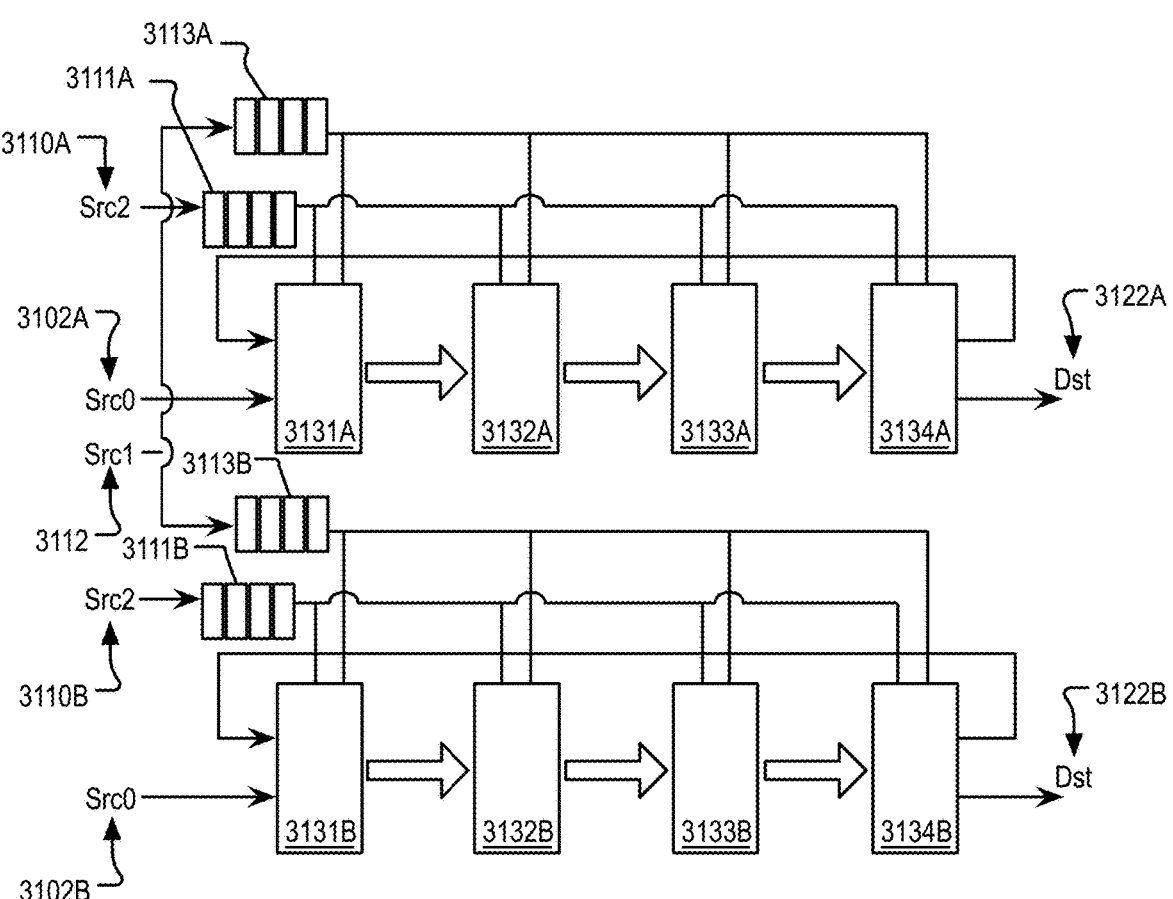
FIG. 31 illustrates a two-path matrix multiply accelerator in which each path has a depth of four stages.
Figure 32:
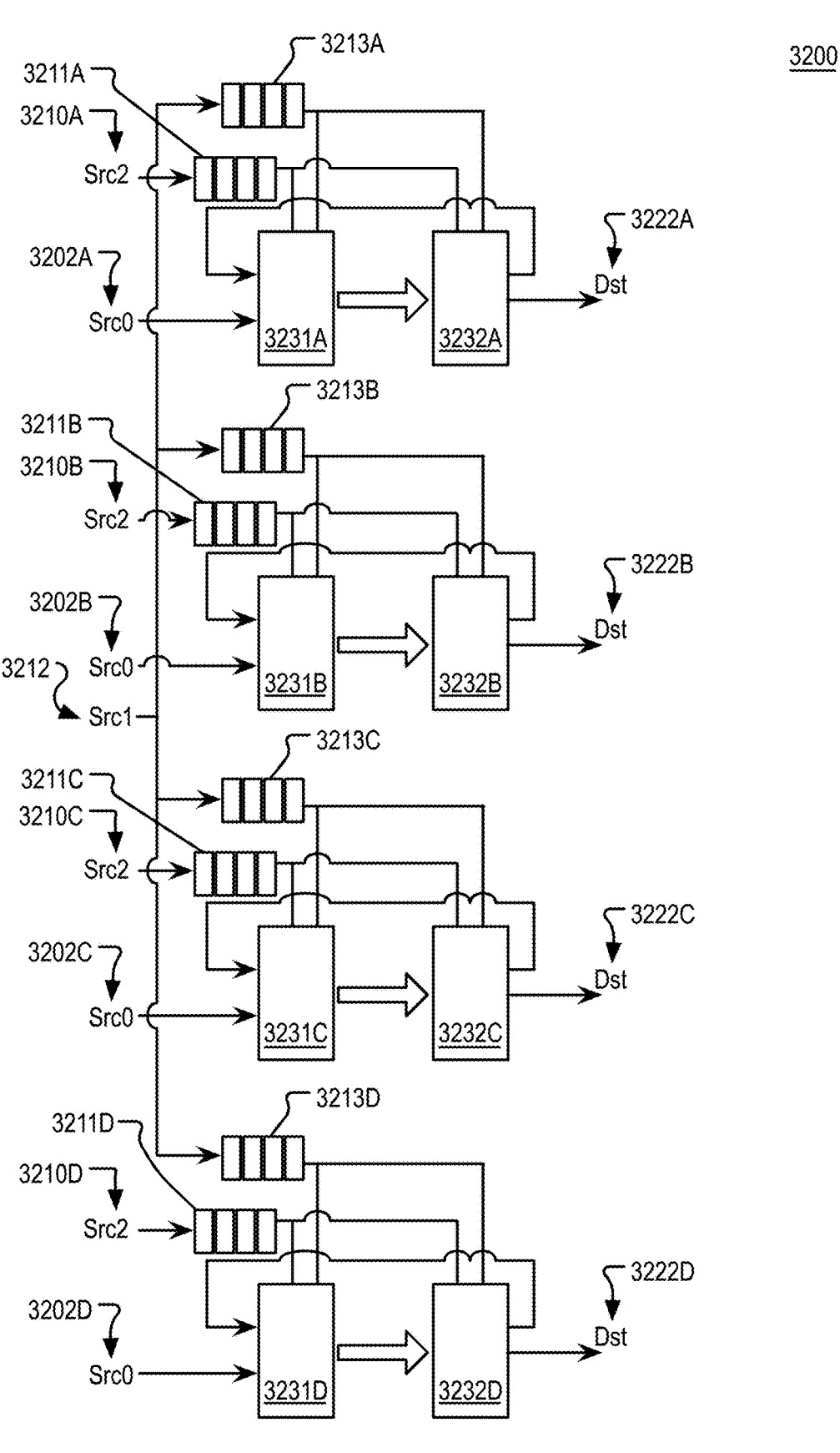
FIG. 32 illustrates a four-path matrix multiply accelerator in which each path has a depth of two stages.

A second embodiment enables increased throughput using simultaneous instructions executed using parallel units. Several instances or paths of the multiply accelerator are run in parallel. These instances can share Src1, or they can have independent Src1 inputs. Each path will have their own Src2 and Src0 inputs. These instances will have their own src2 and src0 inputs. A version showing two paths with a depth of four stages is shown in FIG. 31. Alternatively, a version using four paths of depth of two stages is shown in FIG. 32.

FIG. 31 illustrates a two-path matrix multiply accelerator 3100 in which each path has a depth of four stages. The two-path matrix multiply accelerator 3100 includes input logic 3102A-3102B for Src0 inputs, input buffers 3111A-3111B to store data elements received from input logic 3110A-3110B, and input buffers 3113A-3113B to store data elements received from shared input logic 3112 for Src1. Each stage includes a pair of processing elements, which may operate in parallel. Stage one includes processing elements 3131A-3131B, stage two includes processing elements 3132A-3132B, stage three includes processing elements 3133A-3133B, stage four includes processing elements 3134A-3134B. Hardware logic of each of the processing elements 3131A-3131B, 3132A-3132B, 3131A-3133B, 3134A-3134B can be the same as or similar to the hardware logic of processing elements of systolic array 2900 or systolic array 3000 and may be manufactured with the same process technology or a more advanced process technology. The processing elements of the two-path matrix multiply accelerator 3100 may also operate at a higher frequency relative to implementations of systolic array 2900. The processing elements and may be manufactured using more advanced process technology.

Feedback may be implemented using data selectors that are the same as or similar to data selectors 3004, 3024. Depending on the configuration of the read logic, input data can be pre-fetched into the input buffer in advance or read from registers or a cache within the two-path matrix multiply accelerator 3100 one or more cycles before input into the processing elements 3131A-3131B. Processing elements 3134A-3134B of stage four can feed back into the corresponding processing elements 3131A-3131B stage one. Dynamic logical depth may be enabled in multiples of four.

After a configured number of logical stages, results may be written by output logic 3122A-3122B to a specified destination.

FIG. 32 illustrates a four-path matrix multiply accelerator 3200 in which each path has a depth of two stages. Four-path matrix multiply accelerator 3200 includes the same number of processing elements as two-path matrix multiply accelerator 3100, with the processing elements configured with twice as many paths, but each path is half as deep. Four-path matrix multiply accelerator 3200 includes input logic 3202A-3202D for Src0, input buffers 3211A-3211D to store input elements read by input logic 3210A-3210D for Src2, and input buffers 3213A-3213D to store input elements read by shared input logic 3212 for Src1. Processing elements 3231A-3231B enable parallel processing for stage 1. Processing elements 3232A-3232B enable parallel processing for stage 2. Stage 2 of each path can feed back into stage 1 or write results via output logic 3222A-3222D to a specified destination. Processing elements 3231A-3231B, 3232A-3232B may include hardware logic similar to that of processing elements 3131A-3131B, 3132A-3132B, 3131A-3133B, 3134A-3134B and can implement loopback functionality using similar hardware logic.

The advantages of a two-path matrix multiply accelerator 3100 or a four-path matrix multiply accelerator 3200 include scalability, software compatibility, and throughput. The modular architecture of these accelerators enables more efficient scaling relative to an 8-deep systolic array. Different configurations of a matrix multiply accelerator can be tailored for different product needs or use cases without redesign. Additionally, the same software model that is used is independent of the hardware implementation. Algorithms designed for an instruction intended to be executed by a systolic pipeline of eight stages can be used in an implementation using a Matrix Multiply accelerator of four stages. Hardware will use feedback to simulate a pipeline of eight stages in a way that is transparent to the software. Multiple paths can be used in a design requiring high DPAS instruction throughput. Implementations with a greater number of paths can be coupled with higher bandwidth input logic and output logic. In one embodiment, the two-path matrix multiply accelerator 3100 and a four-path matrix multiply accelerator 3200 are configured to bypass inputs with block sparsity at a greater efficiency and/or finer granularity than possible with an 8-deep systolic array.

Sparse Multiplications on the Scalable Matrix Multiply Accelerator

A third embodiment facilitates increased instruction throughput when processing for data with irregular sparsity. Elements of Src1 and Src2 inputs can be individually selected via input multiplexer logic and processing can be performed using only non-zero values.

Figure 33:
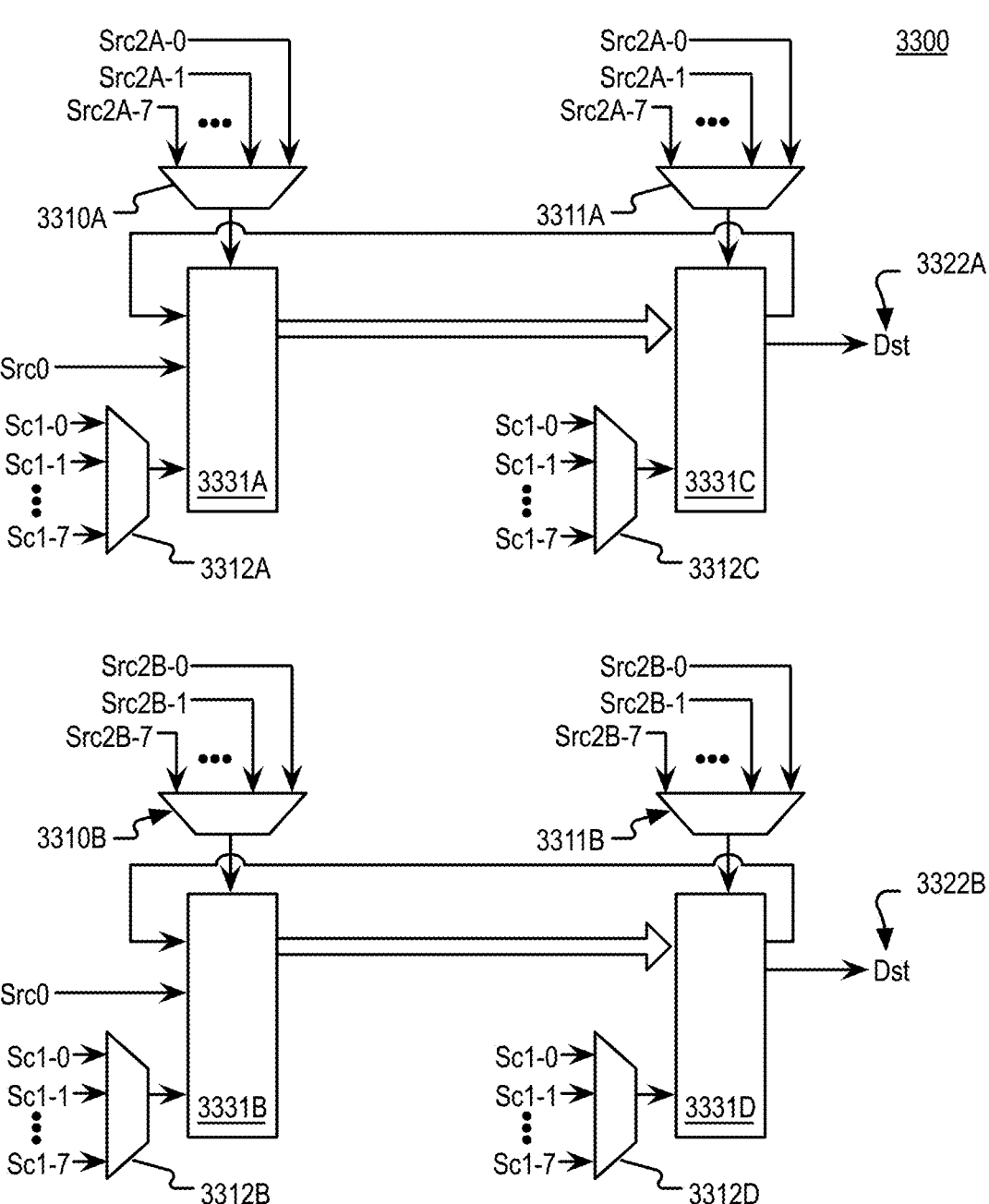
FIG. 33 illustrates a scalable sparse matrix multiply accelerator using systolic arrays with feedback inputs.

FIG. 33 illustrates a scalable sparse matrix multiply accelerator 3300 using systolic arrays with feedback inputs. Scalable sparse matrix multiply accelerator 3300 can include processing elements 3231A-3231D as in four-path matrix multiply accelerator 3200, or any other processing elements described herein. Processing elements 3231A-3221B at the beginning of each path include input logic for Src0. Each stage of each path of scalable sparse matrix multiply accelerator 3300 can receive any element of an independent or shared Src1 via input selectors 3312A-3312D. Each stage of each path can also receive any element of a Src2. Independent Src2 inputs are provided via separate input element selectors (e.g., Src2A via input selector 3310A and input selector 3311A, Src2B via input selector 3310B and input selector 3311B). The separate Src2 input enables the separate paths to compute different instructions. Separate output logic 3322A-3322B is present for each path to enable output for the different instructions.

Figure 34:
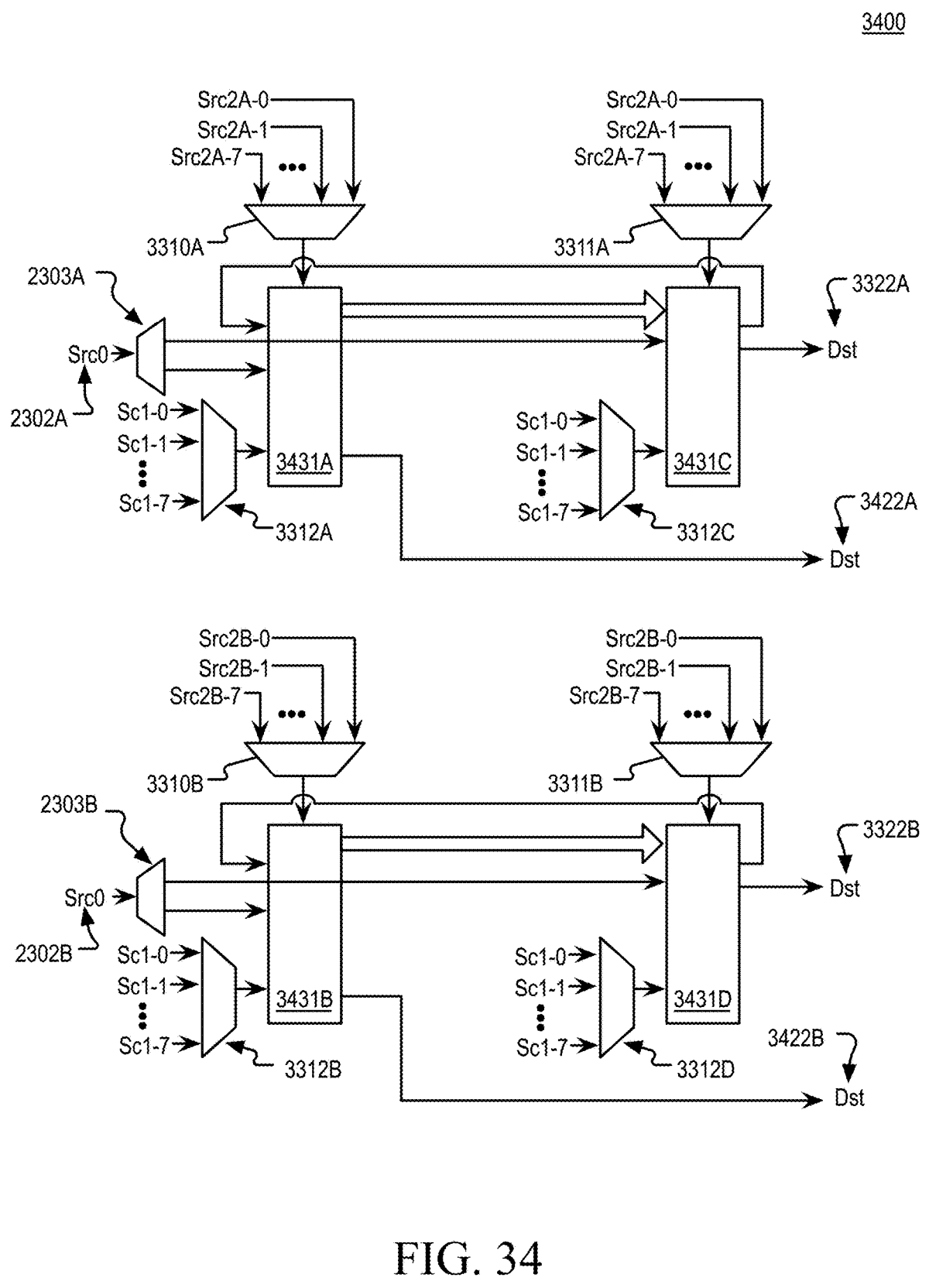

FIG. 34 shows a scalable sparse matrix multiply accelerator 3400 using systolic arrays with feedback inputs and outputs on each stage. Scalable sparse matrix multiply accelerator 3400 includes similar hardware logic as scalable sparse matrix multiply accelerator 3300, along with additional input and output logic to enable Src0 elements to be provided to each stage of each path and to provide separate outputs for each stage of each path. In addition to input selectors 3310A and 3311A to select Src2A elements for the first path and input selectors 3310A and 3311B to select Src2B input for the second path, an input splitter 3403A-3403B is added for each path for Src0 input. Each input splitter 340A-3402B can include a demultiplexer or similar hardware logic to enable Src0 input elements that are read by input logic 3402A-3402B to be sent to each stage. Input selectors 3312A-3312D are also included to enable Src1 input to be elected by each stage of each path. In addition to output logic 3322A-3322B from the second stage of each path (processing element 3431C-3431D), additional output logic 3422A-3422B is provided to enable output from the first stage of each path (3431A-3431B). The processing elements 3431A-3431C may be otherwise similar to other processing elements described herein.

During operation, scalable sparse matrix multiply accelerator 3400 is configurable to accept groups of only one element. Given Src2 input {B0, 0, B2, B3, 0, 0, 0, 0}, two groups ([B0,B2], [B3,0]) are made for the non-zero elements on Src2 for the third embodiment (e.g., scalable sparse matrix multiply accelerator 3300), with the second group including a zero padding. The optimizations shown in FIG. 34 enable the groups to be formed as [B0,B2], [B3]. B0 and B2 will be assigned to the first and second stage of a path (e.g., either of a first set including of processing element 3431A and processing element 3431C or a second set including processing element 3431B and processing element 3431D). After the feedback, B3 will be assigned to the first stage of that path. As the first stage of a path can provide output (e.g., via either output logic 3422A or 3422B), there is no need to consume the second stage of the path (either of processing element 3431C or processing element 3431D). Moreover, the next Src2 input accepted for that path can start from the second stage, so a group of two elements will be assigned to the second and first stage, respectively. Src0 for processing the new Src2 input can be assigned to the second stage of the path (e.g., via either output logic 3422A or 3422B)

In addition to the hardware logic of scalable sparse matrix multiply accelerator 3300 illustrated in FIG. 33 and scalable sparse matrix multiply accelerator 3400 illustrated FIG. 34, some embodiments additionally include input and output hardware memory buffers. Input memory buffers can be used to store and have ready groups of Src0 and Src2 inputs, which reduces the need for high bandwidth input logic. The output buffer allows Dst outputs generated in a same cycle to be steadily written to memory at a slower rate, which reduces the need for high bandwidth output logic.

Additionally, some embodiments include a bypass for inputs in which all elements are zero. The bypass allows a direct write of Src0 as by output logic without passing through the systolic array. This bypass is used in concert with a data dependency strategy to prevent read-after-write (RAW) risks among instructions can damage the integrity of the data.

Matrix Accelerator Having a Dual Pipeline Parallel Systolic Array

Figure 35:
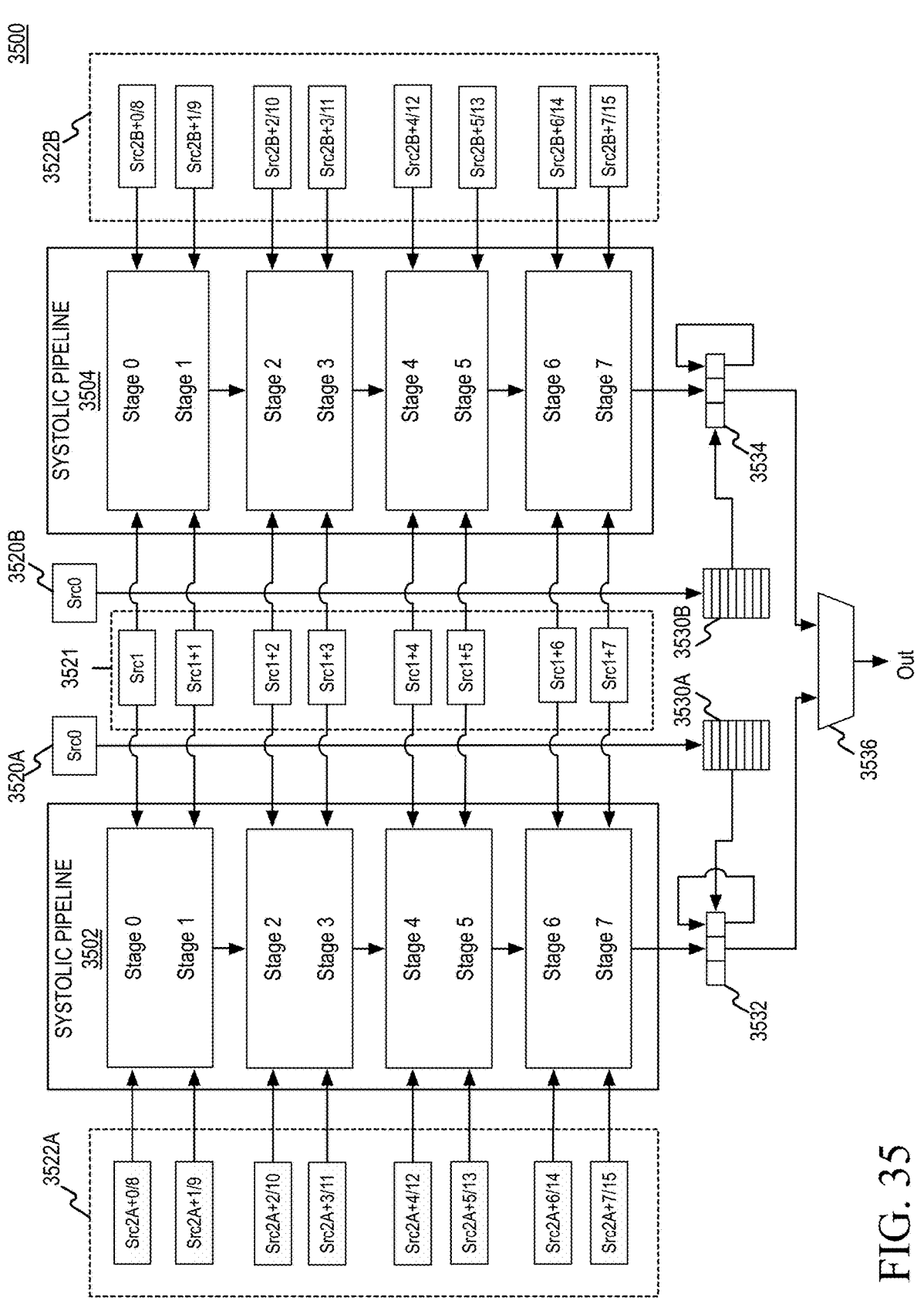
FIG. 35 illustrates a dual pipeline parallel systolic array for a matrix accelerator, according to an embodiment.

FIG. 35 illustrates a dual pipeline parallel systolic array 3500 for a matrix accelerator, according to an embodiment. A matrix accelerator as described herein (e.g., tensor accelerator 2723, tensor/RT cores 263, tensor cores 371), or execution unit (e.g., execution unit 1900) can include a dual pipeline parallel systolic array 3500 that includes two systolic array pipelines (systolic pipeline 3502, systolic pipeline 3504) that operate in parallel to execute instructions. The dual pipeline parallel systolic array 3500 enables the row data that is provided as Src2 input to be partitioned, with the partitions being processed in parallel using a common Src1 input. Such configuration enables increased throughput for matrix operations without incurring the power and area costs associated with two separate and fully independent systolic arrays.

Input for matrix operations can be read from a register file (e.g., register file(s) 258, 334A-334B, 369, vector registers 1561, GRF 1821, register file 1906, etc.) that is associated with the matrix accelerator. The dual pipeline parallel systolic array 3500 includes an input 3521 for a Src1 operand that is shared between the two systolic array pipelines. The Src1 input inputs column data that is used by the two systolic array pipelines to perform matrix multiply operations in which two sets of matrix row data (Src2 input 3522A-3522B) are multiplied by a single set of column data. A single Src2 register can store input for two stages of operation. For example, data from inputs 3522A-3522B can be read in 64-bit blocks, with the lower 32-bits being used for operations at a stage of the systolic array and the upper 32-bits being used for operations at the next successive stage of the systolic array. As one Src2 read can be used for two operations on an array, the second cycle of a pair of Src2 read cycles can be used to read a new Src2 for the second array. The common input 3521 for Src1 data and the use of Src2 register data for multiple operations reduces read demand on the GRF relative to two fully independent systolic arrays. The reduce register read demand relative to the use of independent systolic arrays can reduce the potential negative impact on performance caused for other processing elements that share the register file with the systolic array when those processing elements are operating concurrently with the systolic arrays.

Separate inputs 3520A-3520B are provided for Src0 (accumulator value) inputs. The data from inputs 3520A-2020B is stored in a Src0 data buffer 3530A-3530B and added to output from the systolic array pipelines, as opposed to being added at Stage 0 as in other systolic array designs. Output from each array can be stored in accumulator/adder circuits that include memory (e.g., an accumulator register) and an adder circuit. Accumulator/adder circuit 3532 can store output from systolic pipeline 3502 and add the output to data stored in Src0 data buffer 3530A. Accumulator/adder circuit 3534 can store output from systolic pipeline 3504 and add the output to data stored in Src0 data buffer 3530B.

In one embodiment, multi-pass operation is enabled, such that the eight physical stages of the array operate as sixteen logical states. The eight stages of each of systolic pipeline 3502 and systolic pipeline 3504 can operate as sixteen logical stages by respectively storing the output of a first pass to the first accumulator/adder circuit 3532 and second accumulator/adder circuit 3534. The values stored in the circuits can be accumulated with output generated by a second pass through each of systolic pipeline 3502 and systolic pipeline 3504. For a given stage i, the stage operates as stage i during a first pass and stage i+8 during a second pass. The appropriate input data is provided to the arrays depending on whether the array is performing first pass operations or second pass operation. In one embodiment, operations for instructions of any number of logical stages may be supported via single pass and/or multiple or partial pass operation. A selector circuit 3536 enables data within the first accumulator/adder circuit 3532 and second accumulator/adder circuit 3534 to be output to a destination register.

Figure 36:
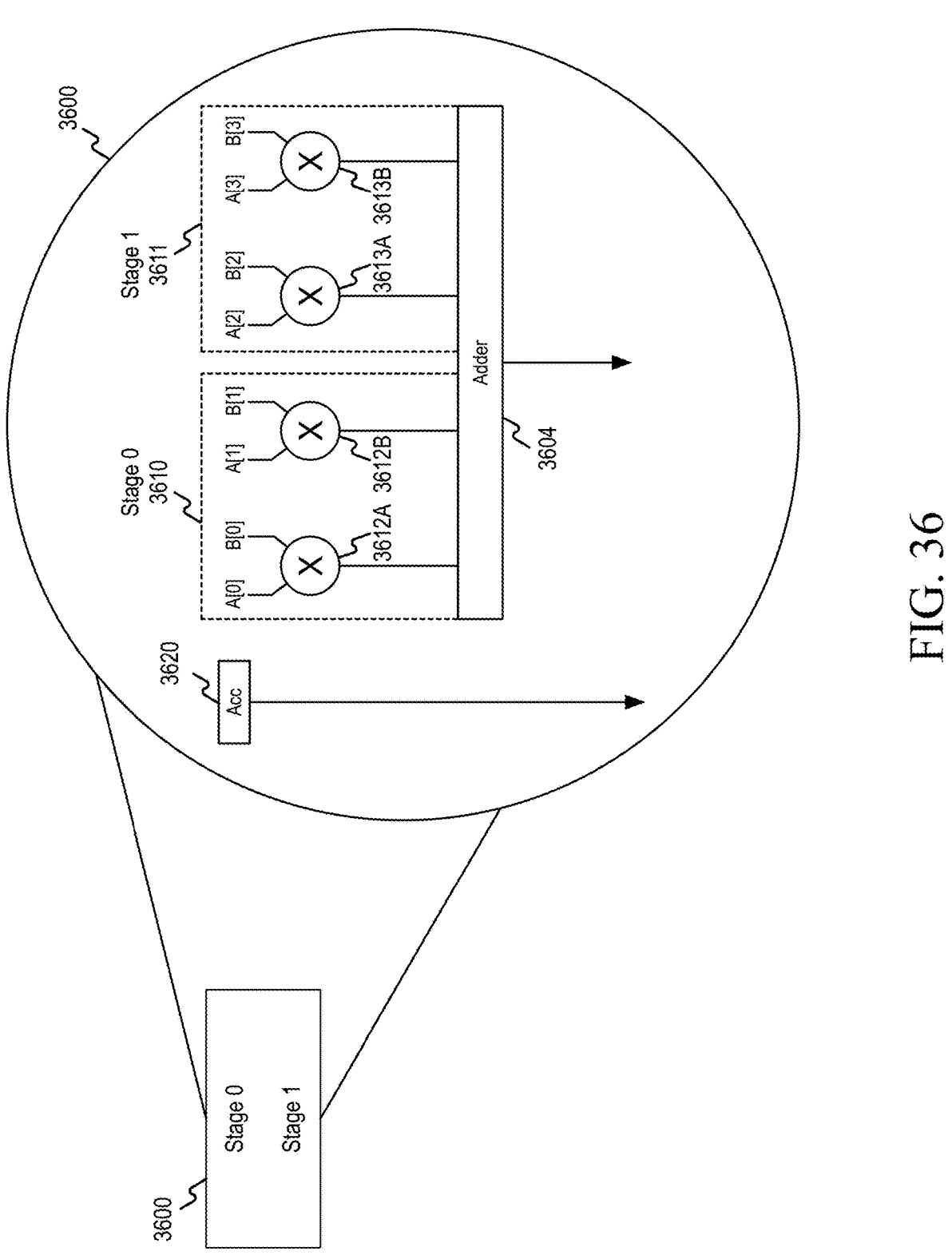
FIG. 36 illustrates a stage pair for a channel of a systolic array.

FIG. 36 illustrates a stage pair 3600 for a channel of a systolic array. In one embodiment the physical pipeline stages for each array of the dual pipeline parallel systolic array 3500 of FIG. 35 are grouped as a stage pair 3600. A stage pair 3600 for Stage 0 (3610) and Stage 1 (3611) is illustrated, with other pairs of stages (e.g., [2,3], [4,5], [6,7]) being configured similarly. Each channel of each stage includes a pair of multipliers (e.g., multipliers 3612A-3612B for Stage 0, multipliers 3613A-3613B for Stage 1) and a common adder 3604. The accumulator input 3620 (Src0) is passed through to Src0 data buffer 3530A-3530B shown in FIG. 35 and is not operated on by the stage pair 3600. The appropriate Src1 register data is provided as input to the appropriate stage. A single Src2 register read can store data for both stages in the stage pair 3600.

Figure 37:
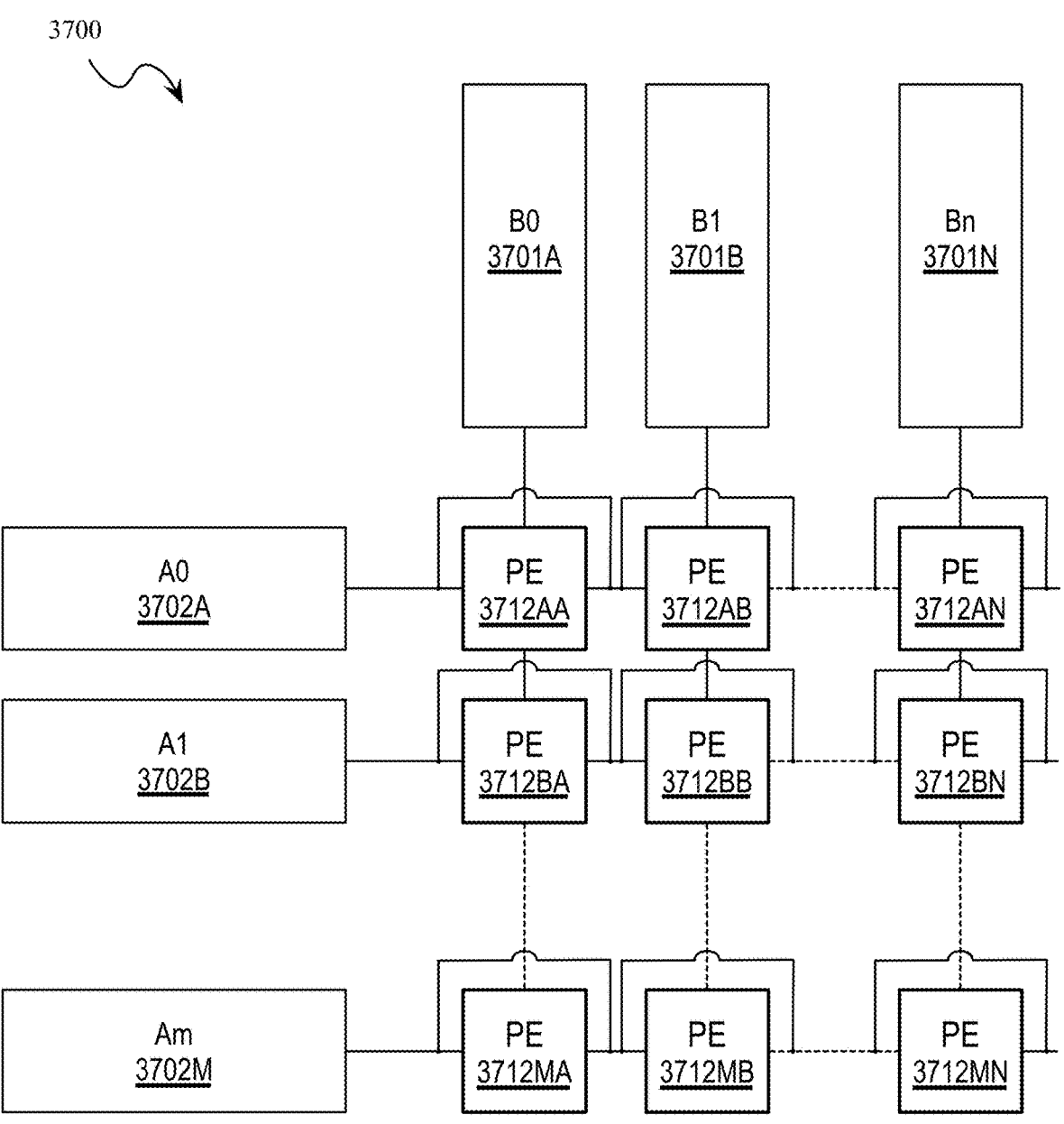
FIG. 37 illustrates a systolic array including partial sum loopback and circuitry to accelerate sparse matrix multiply.

FIG. 37 illustrates a systolic array 3700 including partial sum loopback and circuitry to accelerate sparse matrix multiply. In the systolic array 2808 described above, operands that include weight data may be stationary within the array and a partial sum is propagated throughout the array structure. While other details with respect to systolic array 2808 may be applicable, in systolic array 3700 a partial sum is recirculated instead of being propagated to a next systolic layer. In one embodiment a systolic array 3700 can be configured with M rows and N columns of processing elements (PE 3712AA-PE 3712MN). The processing elements can access registers storing input data in the form of row and column data for input matrices. The registers may be stored in a register file that is local to the systolic array 3700 or in a register file of a processing resource that is coupled with or includes the systolic array 3700. The registers may store row elements of matrix A 3702A-3702M, which are to be multiplied by column elements of matrix B 3701A-3702N.

In one embodiment a fused multiply-add (FMA) can be performed at each processing element PE 3712AA-PE 3712MN each clock cycle. An element of matrix A is multiplied by a corresponding element of matrix B and then added to an accumulator value or, for the first cycle, an optional initial input value (e.g., SRCO). Partial sum loopback can be configured at each processing element. After each cycle, the accumulator value may be looped back within the processing element and used as input for the next cycle. Once operations are performed for an entire row, the result may be stored to a register file. Data movement between the processing elements PE 3712AA-PE 3712MN after a set of computational cycles can vary based on the instruction or macro-operation being performed.

Data Aware Sparsity with Compression

Embodiments described herein provide an encoding layout that enables sample blocks of sparse neural network data to be encoded in a reduced-bit formal that reduces the amount of data that is required to be transmitted or stored when processing neural networks associated with the data. The number of non-zero values in a sample block is indicated in a header, followed by a significance map indicating a map of the non-zero values within the block. The non-zero values of the sample are encoded in order of appearance within the stream. In one embodiment, compression can be based on other values beyond zero values. For example, a specified value within a data set may be encoded and excluded from a compressed data stream, enabling compression based on ones, twos, or other specified values. In one embodiment compression is enabled based on near values. Values within a data set that are within a threshold of zero, or within a threshold of a specified value, may be compressed as though those values were zero or within a threshold of the specified value. Data aware sparsity with compression can be enabled via codec logic coupled with or within matrix accelerator logic.

Figure 38A:
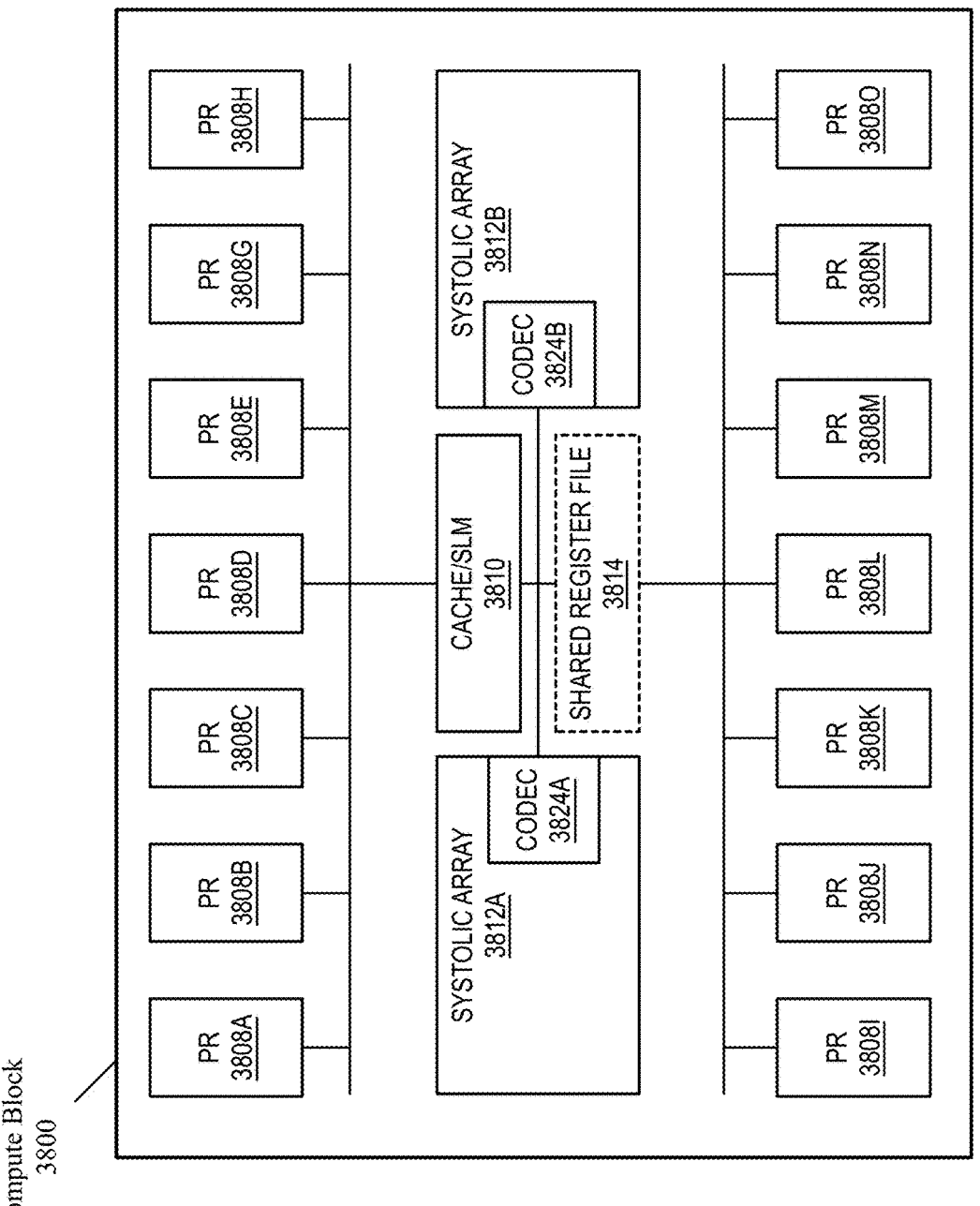
FIG. 38A-38B illustrate matrix acceleration circuitry including codecs to enable the reading of sparse data in a compressed format.
Figure 38B:
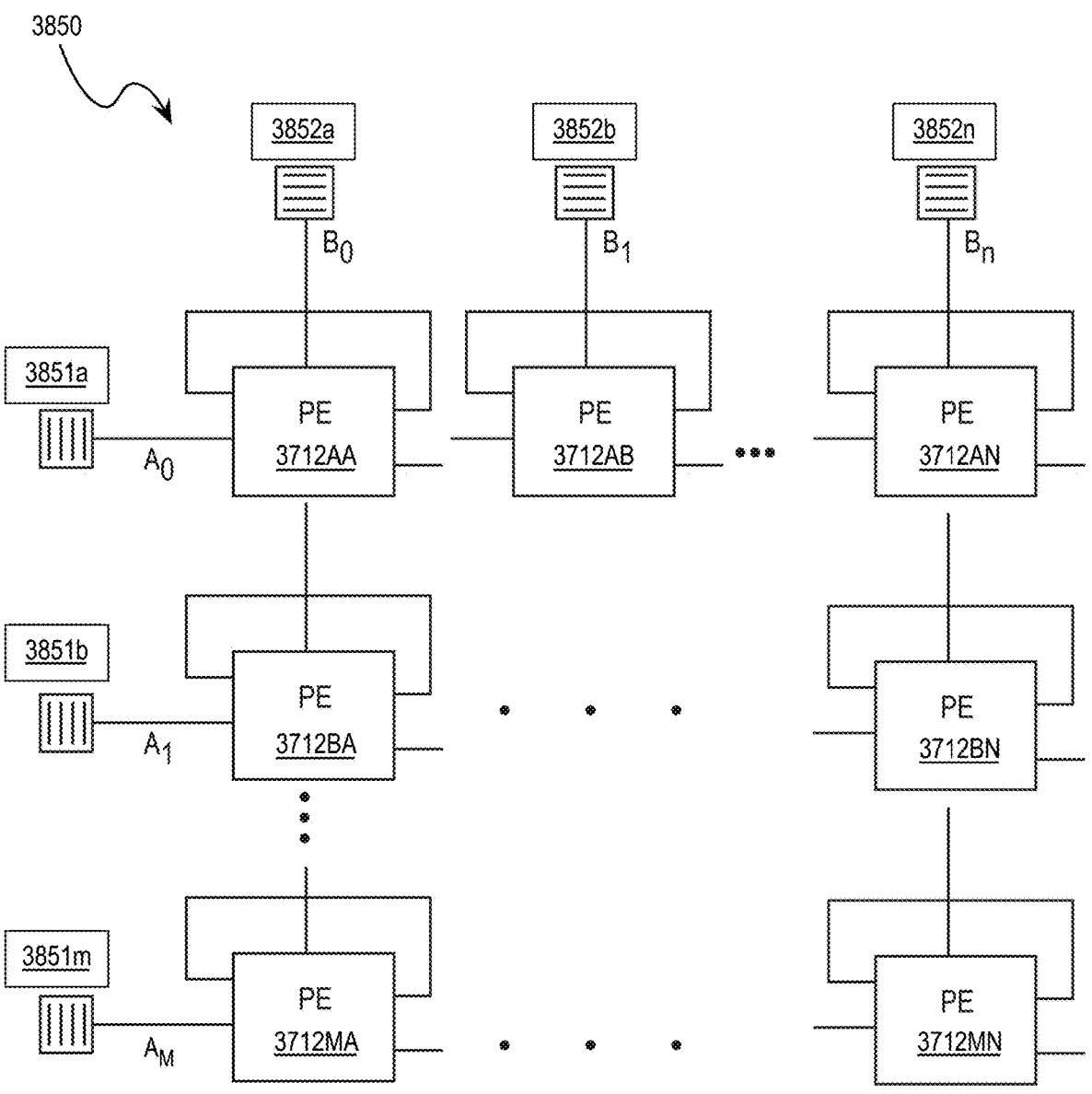

FIG. 38A-38B illustrate matrix acceleration circuitry including codecs to enable the reading of sparse data in a compressed format. FIG. 38A illustrates a compute block 3800 including codec enabled disaggregated systolic logic. FIG. 38B illustrates processing elements within a systolic array that are coupled with codecs to decompress input data.

As shown in FIG. 38A, instead of including a systolic array 2808 in a separate tensor accelerator 2723, as in FIG. 28A, or including a systolic array 1912 in each execution unit 1900 as in FIG. 19, a disaggregated set of systolic arrays 3812A-3812B can be included in a compute block 3800 that is analogous to one of the compute blocks 2724A-2724N of FIG. 27. The compute block 3800 can also include components of execution logic 1800 of FIG. 18A, including multiple interconnected processing resources (PR 3808A-3808O) that may be similar to EU 1808A-1808N or any other processing resource as described herein. In one embodiment the systolic arrays 3812A-3812B include codecs 3824A-3824B that enable the encoding and decoding of input and output data that is received for processing.

The systolic arrays 3812A-3812B include a W wide and D deep network of data processing units that can be used to perform vector or other data-parallel operations in a systolic manner, similar to other systolic arrays described herein. In one embodiment the systolic arrays 3812A-3812B can be configured to perform matrix operations, such as matrix dot product operations. In one embodiment the systolic arrays 3812A-3812B support 16-bit floating point operations, as well as 8-bit and 4-bit integer operations. In one embodiment the systolic arrays 3812A-3812B can be configured to accelerate machine learning operations. In such embodiments, the systolic arrays 3812A-3812B can be configured with support for the bfloat 16-bit floating point format. By including systolic arrays 3812A-3812B within the compute block 3800 but outside of the PRs 3808A-3808O, the size and number of systolic arrays 3812A-3812B can be scaled independently from the number of PRs 3808A-3808O. Additionally, communication bandwidth within an PR that would otherwise be consumed by systolic array activity may be preserved. Furthermore, the systolic arrays 3812A-3812B may be clock/power gated when matrix workloads are not being performed.

Communication between the systolic arrays 3812A-3812B and the PRs 3808A-3808O may be performed via a cache or shared local memory (cache/SLM 3810) and/or a shared register file 3814. In one embodiment, instead of a distinct shared register file 3814, the cache/SLM 3810 may be partitioned for use as a shared register file. The shared register file 3814 may be structured similarly to other GPGPU register files, such as register file 1906 as in FIG. 19. The shared register file may also include a set of special purpose registers that are used to configure the interaction between the systolic arrays 3812A-3812B and the PRs 3808A-3808O. The cache/SLM 3810 may be an L1 cache, an L2 cache, and/or a block of explicitly addressable on-die memory.

Matrix data for processing by the systolic arrays 3812A-3812B may be stored in the cache/SLM 3810. Processing commands or instructions can be provided to the systolic arrays 3812A-3812B via the shared register file 3814. Processing results may be read from the cache/SLM 3810 by the PRs 3808A-3808O or from destination/output registers within the shared register file. During operation, instead of consuming bus/fabric bandwidth within the PRs 3808A-3808O, communication traffic may be localized to the systolic arrays 3812A-3812B, the cache/SLM 3810, and/or shared register file 3814. Any of the PRs 3808A-3808O within the compute block 3800 may offload a matrix workload to one or both systolic arrays 3812A-3812B. A message may be sent from a PR to a systolic array with a command that specifies an operation to be performed and operands for the operation. The systolic arrays 3812A-3812B can perform the requested operations (multiply/add, fused multiply/add, multiply/accumulate, dot product, etc.) and output the results to the shared register file 3814. Input, intermediate and/or output data for requested operations may be stored in the cache/SLM 3810 and multiple dependent operations may be chained. In one embodiment when processing operations for training or inference for a neural network are performed, the systolic arrays 3828A-3828B may also perform activation functions including but not limited to sigmoid, ReLU, and hyperbolic tangent (TanH) activations. In such embodiment, operations for neural networks may be offloaded to the systolic arrays 3812A-3812B at coarse granularity.

The PRs 3808A-3808O can provide input data to the systolic arrays 3812A-3812B in a compressed format and the codecs 3824A-3824B can be used to decompress the data. When output data is ready to be provided to the PRs 3808A-3808O, the data may remain decompressed if the PRs will perform operations and the data and do not support the direct read of compressed data. If the PRs 3808A-3808O support the reading of compressed data or will not perform additional operations on the data, the output data may be re-encoded. Zero-based encoding may be used and compression may be enabled or disabled based on the degree of data sparsity. Alternatively, other forms of encoding may be used based on the distribution of the data set to be processed or output. For example, the codecs 3824A-3824B can be configured to decode sparse data that is encoded based on zero-based compression or using another form of compression described herein (e.g., one-based, two-based, near-zero, near-one, near-two, etc.).

As shown in FIG. 38B, system 3850 illustrates processing elements of systolic array 3700, where the systolic array is configured to decode compressed sparse data. As described with respect to FIG. 37, each PE 3712AA-3713MN includes hardware logic to perform computations for matrix operations. A (A0, A1, through $A_M$) and B (B0, B1, through $B_N$) are elements of input matrices with associated with dot product, matrix multiply, multiply/add, or multiply accumulate operations. In one embodiment each PE 3712AA-3713MN is associated with codecs (3851a, 3851b, . . . , 3851m; 3852a, 3852b, . . . , 3852n) to decode compressed input operands associated with operations to be performed. The codecs can be configured to decode sparse data that is encoded based on zero-based compression or using another form of compression described herein.

Sparse neural network data can be encoded (e.g., compressed) using a variety of encoding techniques, such as but not limited to unique absolute value (UAV) table encoding, significance map (SM) encoding, table encoding (TE), unique value coordinate (UVC) encoding, and mean encoding (ME). Metadata for the encoded data indicates the type of encoding format used for the data. In one embodiment, specific encoding formats can be selected for specific types of data, such as kernel data or feature data. In one embodiment, statistical analysis is performed on the data prior to encoding to enable an appropriate encoder to be selected for each block of data. The encoding may be zero-based encoding, near-zero encoding or based on other values (ones, twos, etc.).

In one embodiment data generated during SM encoding can be used to facilitate provision of compressed data to a systolic tensor array. In zero-based SM encoding mode, only non-zero values in a block are encoded. The number of non-zero values in a sample block is indicated in the header, followed by a significance map indicating a map of the non-zero values within the block. The non-zero values of the sample are then encoded in order of appearance within the stream.

Temporally Amortized Supersampling Using Mixed Precision Convolutional Neural Network Described herein are embodiments that provide a machine learning-based temporally amortized supersampling technique that replaces temporal anti-aliasing (TAA). A mixed low precision convolutional neural network is used that applied different computational precisions at different stages to enable the high performance generation of high quality images based on source images rendered at a relatively lower resolution than the target output resolution. The network model enables anti-aliasing and upscaling with support for multiple scale factors, including fractional scale factors such as, but not limited to 1.3×, 1.5×, 1.7×, 2×, or 2.2×. Other scale factors are also possible. Temporally stable upscaled output can be generated that has an image quality that is better than or equal to native rendering at the target resolution. In various embodiments, different versions are provided that can be implemented on a variety of different graphics processing architectures, including architectures with matrix acceleration hardware as described above in FIG. 28A through FIG. 34, as well as graphics processor architectures that lack dedicated matrix acceleration hardware.

Figure 39:
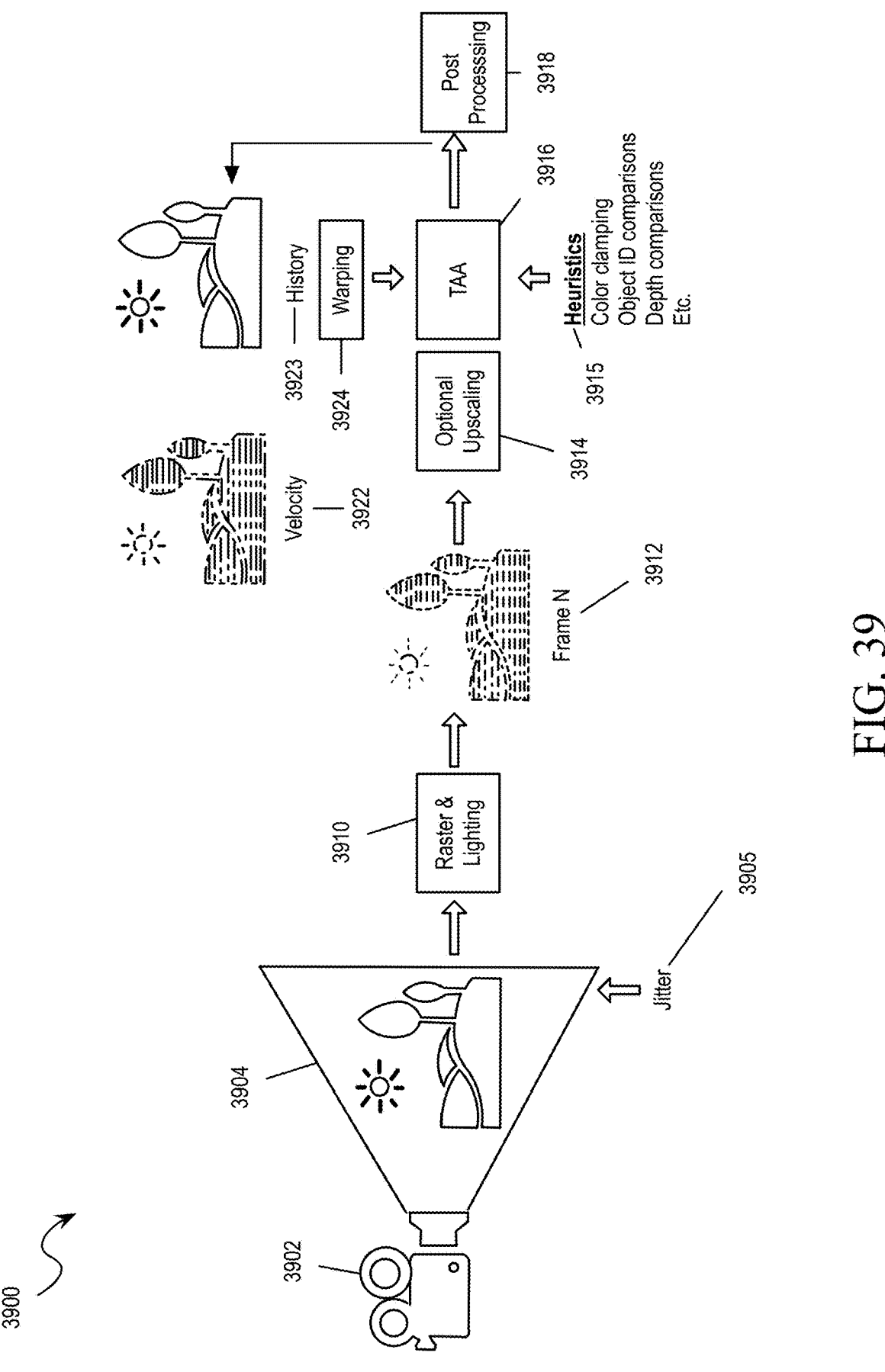
FIG. 39 illustrates a conventional renderer with Temporal Anti-aliasing (TAA)

FIG. 39 illustrates a conventional renderer 3900 with Temporal Anti-aliasing (TAA). The renderer within the rasterization and lighting stage 3910 can jitter (3905) the camera 3902 during rendering for every frame to sample different coordinates in screen space 3904. Different pixels can be sampled from different frames over time. The TAA stage 3916 accumulates these samples temporally to produce a supersampled image. A warping operation 3924 is applied to the previously accumulated frame (History 3923) using renderer generated velocity/motion vectors 3922 to align the previously accumulated frame with the current frame 3912 (frame N) before accumulation. Optional upscaling 3914 can be performed on the current frame before input to the TAA stage 3916, such that the current frame can be rendered at a lower resolution than the target resolution. The output frame can then be added to the history 3923 for use in processing the next frame. Post processing operations 3918 can then be performed at the upscaled target resolution. While applying upscaling with TAA can improve rendering performance, the output images are of lower quality than images rendered natively at the target resolution. Some TAA implementations can use heuristics 3915 such as but not limited to neighborhood color clamping, object identifier comparisons, and depth value comparisons to detect mismatches between current and history frames and reject the history pixels. However, these heuristics often fail and produce a noticeable amount of ghosting, over-blurring and/or flickering.

Figure 40:
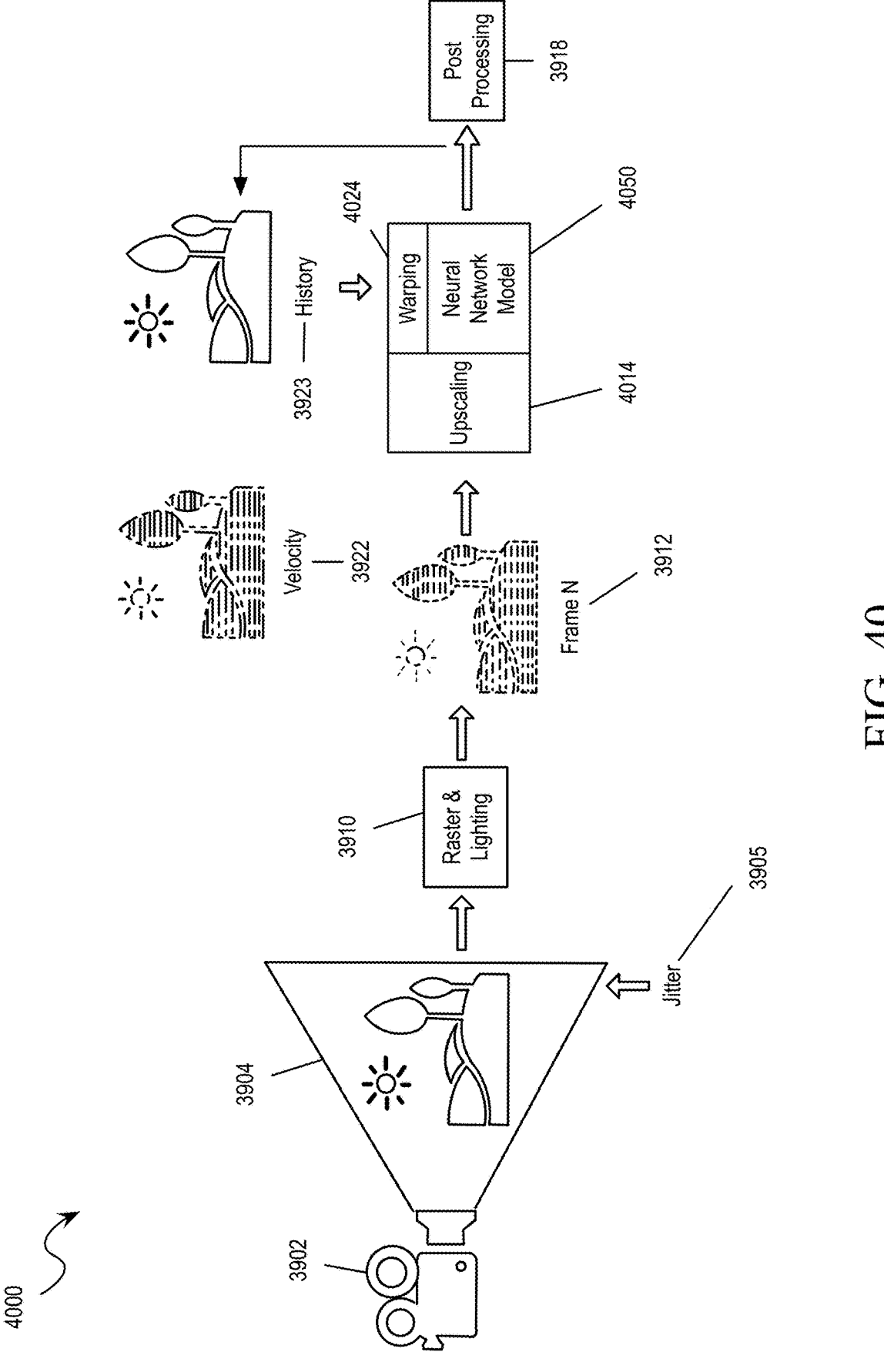
FIG. 40 illustrates a renderer that replaces the TAA stage with a temporally amortized supersampling stage.

FIG. 40 illustrates a renderer 4000 that replaces the TAA stage with a temporally amortized supersampling stage, according to embodiments provided herein. Renderer 4000 differs from renderer 3900 of FIG. 39 in that, in renderer 4000, temporally amortized supersampling is performed using a mixed, low-precision convolutional neural network 4050 that replaces the TAA stage in the game renderer, achieving significantly better image quality than conventional TAA-based techniques, as well as providing a performance boost by enabling rendering to be performed at lower resolution. The renderer 4000 can render the current frame 3912 at a lower than target resolution. An upscaling filter 4014 is applied to the rendered image to upscale the image to the target resolution. In one embodiment, the upscaling filter 4014 is applied by the renderer 4000 before the current frame 3912 is provided to the supersampling stage. In one embodiment, the upscaling filter is performed by the neural network model 4050 during pre-processing operations. The upscaling filter 4014 can include optimizations to enhance the image quality of temporal stability of images that result from the processing performed by the neural network model 4050. Warping operations 4024 on the history 3923 can be performed by an input block of the neural network model 4050. In one embodiment the history 3923 is a multi-frame history that includes data from multiple previous frames.

The mixed, low-precision convolutional neural network is implemented via a neural network model 4050 that consists of multiple convolution layers, as well as other operations that are performed at low precisions, such as INT8, mixed with operations performed at a higher precision, such as FP16. The mix of precisions enable the network to achieve a fast computational speed while generating high quality output images. The lower precision values are not limited to INT8 and different low-precision data formats (e.g., INT4, binary, bipolar binary, ternary, etc.) can be used for variations. The majority of the neural network model 4050 and the operations associated with the neural network model are performed at the lower precision to enable high inference performance. A computationally smaller part is performed at a relatively higher precision to preserve output quality. In addition to using FP16 for higher precision operations, other floating-point precisions may also be used, such as FP8, BF16 or TF32. Additionally, the majority of the neural network model 4050 is also in a reduced spatial dimension to provide fast inference performance by shuffling input pixels from the spatial (width, height) dimension to a depth or feature map channel dimension with no pixel information loss. The spatial dimension is shuffled back from the channel dimension during generating an output image.

Temporally amortized supersampling is performed by combining the current frame and the previous output frame warped with the current motion vectors. The neural network model 4050 determines the manner in which to combine the upscaled current frame 3912 and the history 3923. In various embodiments, multiple different approaches are applied to preserve output quality. In one embodiment, high precision combining of the upscaled current frame 3912 and the history is performed using 1×1 or 3×3 output convolution. In another embodiment, pixel prediction and high precision filtering of the upscaled image is performed to generate a high-quality upscaled image. The neural network model 4050 is used to generate input that is provided to the kernel prediction and filtering operations.

During training of the neural network model 4050, both perceptual and temporal loss functions are optimized to enhance both the image quality and the temporal stability of the upsampling and anti-aliasing. In one embodiment, generalized training is sufficient to enable high quality output across a variety of games without requiring extensive per-game, per-upscale factor, or per-target resolution training.

Figure 41:
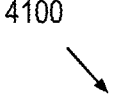
FIG. 41 illustrate components of the neural network model, according to an embodiment.

FIG. 41 illustrates an implementation of a neural network model 4100, according to an embodiment. The neural network model 4100 is an implementation of the neural network model 4050 of FIG. 40. In one embodiment, the neural network model 4100 is composed of three components: an input block 4108, a feature extraction network 4110, and an output block 4120. Lower precision (e.g., Integer) operations are used for the majority of the neural network model to achieve fast inference performance. Output of the neural network model is generated using higher precision (e.g., floating-point) operations to enable the generation of high-quality output images. For example, the encoders (encoder block 1 through encoder block N), bottleneck block, and decoder blocks (decoder block 1 through decoder block N) in the feature extraction network 4110 are executed with relatively lower precision (e.g., INT8) compared to the output block 4120, which is executed at a relatively higher precision (e.g., FP16). Utilizing lower precision in the feature extraction network 4110 significantly reduces the complexity of computation and improves memory bandwidth for fast inference performance. Utilizing higher precision in the output block 4120 enables the generation of output images having an image quality that is as good as, or in some cases better than images that are natively rendered at the target resolution. As noted above, other precisions or data types in addition to INT8 and FP16 can be used, such as but not limited to INT4 for lower precision operations and BF16 or TF32 for higher precision operations.

The input block 4108 receives, as input, history data 4102, velocity data 4104, the current frame 4106, and a jitter offset 4107 for the camera. The history data 4102 includes previously generated output. The previously generated output includes at least the immediate previous frame (frame N−1), which is warped using the velocity data 4104 to align the frame with the current frame 4106 for temporal accumulation. In various embodiments, in addition to the previous frame, the history data 4102 can also include one or more additional frames of previous generated output (e.g., frame N−2, etc.), which can also be provided as input to the feature extraction network 4110. The jitter offset 4107 is the camera offset that is applied to jitter the scene, with different jitter values being used for successive frames. The jitter offset 4107, in one embodiment, is a sub-pixel offset. The input block generates both lower and higher precision tensors. Lower precision tensors are provided to the feature extraction network 4110. Higher precision tensors are provided to the output block 4120. Further details on the input block 4108 are shown in FIG. 42.

The feature extraction network 4110 is built upon a U-shaped network architecture, such as, for example, the U-net architecture. The feature extraction network 4110 differs from the conventional U-net architecture in that the feature extraction network 4110 includes an asymmetric structure in the encoder 4112 and decoder 4116. The encoder 4112 of the feature extraction network 4110 includes a series of encoder blocks that downsample the spatial dimension of an input tensor while increasing the number of channels (depth or feature maps) until the production of a latent representation 4114 at a bottleneck block in the middle of the network. The latent representation 4114 is the abstract multi-dimensional space that encodes the meaningful features of the input data. The decoder blocks of the decoder 4116 reverse this process by upsampling spatial dimension and decreasing the number of channels. The encoder blocks have a skip connection to a corresponding decoder block, which enables high-frequency details to be relayed between the encoder 4112 and the decoder 4116. Output from encoder block 1 is provided to decoder block 2 for to be processed in conjunction with output from decoder block 3. Output from encoder block 2 is provided to encoder block 3 to be processed in conjunction with output from the previous decoder block in the network. The input for encoder block N is provided to decoder block N. Decoder block 1, the final decoder block, receives input from the input block 4108 and decoder block 2. The decoder 4116, from decoder block 1, provides data to the output block 4120 in either a higher precision format or a lower precision format depending on the implementation approach used for the output block 4120. Further details on the output block are shown in FIG. 43A and FIG. 43B.

Figure 42:
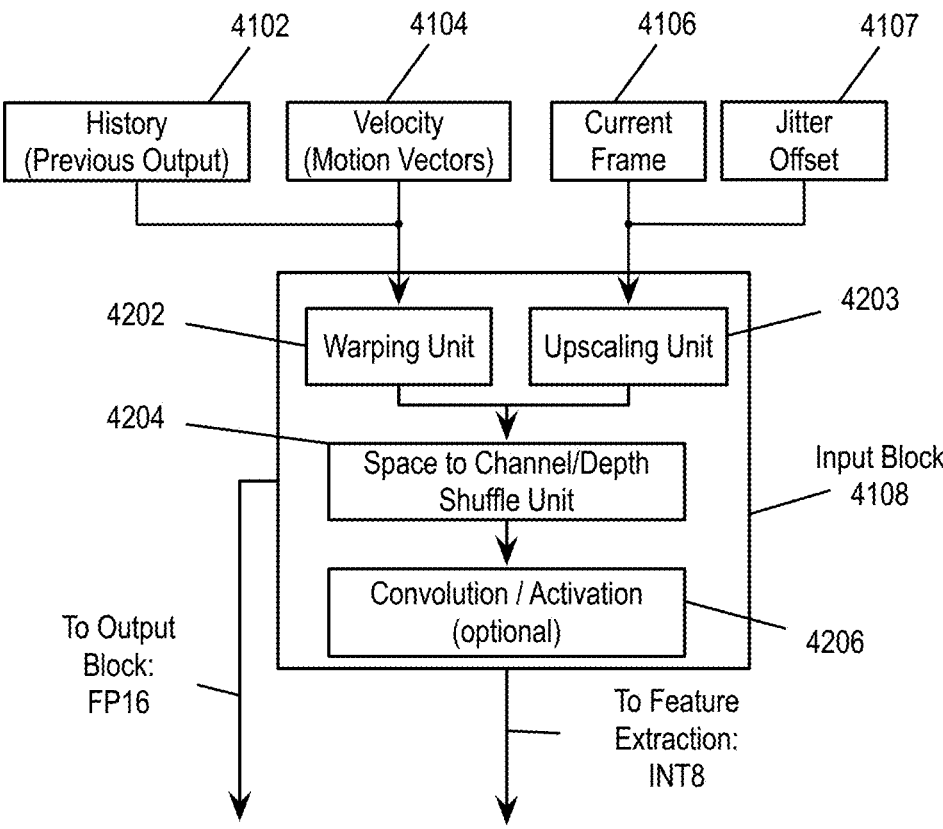
FIG. 42 illustrates the input block of the neural network model, according to an embodiment.

FIG. 42 illustrates further details for the input block 4108 of the neural network model 4100, according to embodiments. The input block 4108 receives input including history data 4102, velocity data 4104, the current frame 4106, and the jitter offset 4107. The input block 4108 includes a warping unit 4202 to warp the previous output within the history data 4102 using motion vectors within the velocity data 4104. The input block 4108 also include an upscaling unit 4203 to upscale the current frame 4106. In one embodiment, the upscaling filter applied by the upscaling unit 4203 is an adaptive filter that adjusts the upscaling based on the jitter offset 4107. A space to channel/depth shuffle unit 4204 shuffles pixels from the spatial dimension (width, height) to a channel (e.g., feature map) or depth dimension, which facilitates high performance inferencing via reduction of numerical precision and spatial dimension during feature extraction. For example, for an input image having (channel, height, width) pixels of data in the spatial dimension, the pixel data can be shuffled to $$\left( channel \times r^2, \frac{height}{r}, \frac{width}{r} \right),$$

which reduces the spatial dimension in which the feature extraction is performed, which improves the performance of the feature extraction network 4110. The input block 4108 generates both lower precision (e.g., INT8) and higher precision (e.g., FP16) tensors. The lower precision tensors are provided as input to the feature extraction network 4110, while the higher precision tensors are passed to the output block 4120, 4320A-4320B. The input block 4108 also include an optional convolution/activation layer 4206 that can be applied before data is output to the feature extraction network.

Figure 43A:
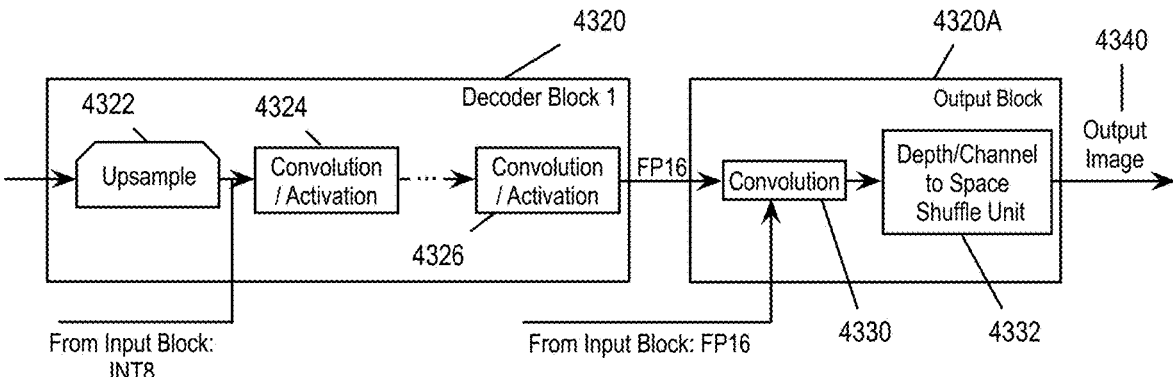
FIG. 43A-43B illustrates output block variants for the neural network model, according to embodiments.
Figure 43B:
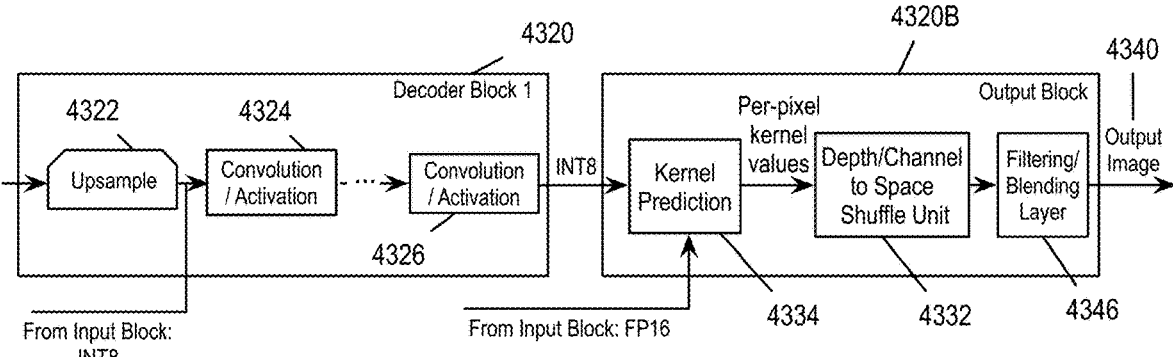

FIG. 43A-43B illustrates output block variants for the neural network model, according to embodiments. FIG. 43A illustrates a decoder block 4320 and a variant of the output block 4320A that is configured to perform direct generation of pixel data for the output image. FIG. 43B illustrates a decoder block 4320 and a variant of the output block 4320B that is configured as a kernel prediction network that applies kernel pixel prediction and filtering to generate the output image. In FIG. 43A-43B, a decoder block 4320 (decoder block 1) is shown as an example. While each encoder block of the encoder 4112 includes a downsample block and one or more convolution/activation layers that facilitate feature extraction, each decoder block of the decoder 4116 includes an upsample block 4322 to increase spatial dimension and one or more convolution/activation layer(s) 4324, 4326 to restore features. Decoder block 1 receives data from decoder block 2 as well as skip connection data from the input block. For the output block 4320A-4320B, two different approaches can be taken to preserve quality with higher precision. One embodiment provides an output block 4320A, as shown in FIG. 43A, which configures the neural network 4100 to operate as a direct reconstruction network. One embodiment provides an output block 4320B, as shown in FIG. 43B, which configures the neural network 4100 to operate as a kernel prediction network.

For output block 4320A of FIG. 43A, data from the input block 4108 and the feature extraction network 4110 is combined using a 1×1 or 3×3 output convolution layer 4330 to directly generate data for the output image. The output convolution layer 4330 receives, as input, higher precision (e.g., FP16) output from the convolution/activation layer(s) 4326 of the final decoder block 4320, as well as higher precision input from the input block 4108. Data generated by the output convolution layer 4330 is provided to the depth/channel to space shuffle unit 4332, which shuffles the data back into the spatial dimension to generate an output image 4340. The output image 4340 can be output via a display or further post-processed before output via the display.

For output block 4320B of FIG. 43B, kernel prediction and filtering are performed. Instead of directly generating an output image, per-pixel kernel values (e.g., weights) are predicted by a kernel prediction layer 4334. Lower precision (INT8) tensors are output by the decoder block 4320 for use by the kernel prediction layer 4334, which uses the lower precision tensors in combination with the higher precision tensors provided by the input block 4108. The depth/channel to space shuffle unit 4332 shuffles frame data back into the spatial dimension to generate an intermediate output image. The intermediate output image is then filtered by the filter/blend layer 4346 using the per-pixel kernel values generated by the kernel prediction layer 4334 and blending with the previous output using blend weights generated by the kernel prediction layer 4334. The filtered and blended image is then provided as the output image 4340.

FIG. 44 illustrates a method 4400 to perform temporally amortized supersampling. The method 4400 includes to receive, at an input block of a neural network model described herein (e.g., neural network model 4050), history data, velocity data, and current frame data (4402). The history data includes one or more previously generated frames. The velocity data includes renderer generated motion vectors that are used to align the one or more previously generated frames with the pixel data of the current frame. The current frame data includes a frame of a 3D graphics program, such as a 3D game application, that is output by a raster and lighting stage of the render pipeline of the graphics processor. In one embodiment, the current frame is an upscaled frame that has been upscaled by an upscaling filter from an initial rendering resolution to a target resolution. In one embodiment, the current frame is upscaled to the target resolution during pre-processing. The input block provides output at multiple precisions, with a first set of output being provided to the output block at high precision and a second set of output being provided to the feature extraction network at a relatively lower precision. In one embodiment, the first set of output is provided as floating-point data (e.g., FP16, BF16), while the second set of output is provided as integer data (e.g., INT4, INT8).

The neural network model can then pre-process the history data, velocity data, and current frame data at the input block and provide the pre-processed data to a feature extraction network (4404). The pre-processed data that is provided to the feature extraction network includes aligned history data and current frame data. The history data is warped using the velocity data to generate warped history data. The warped history data is then aligned with the current frame data to generate aligned history data. The aligned history data provides additional sample data that can be used to generate a supersampled anti-aliased output image via temporal accumulation. In one embodiment, the pre-processing includes upscaling the current frame data from the resolution output by the raster and lighting stage to the target resolution.

The neural network model processes the pre-processed data at the feature extraction network via one or more encoder stages and one or more decoder stages (4406). The encoder stages reduce the spatial resolution of the input data and extracts the most salient features within the input data. The spatial resolution is then expanded via the decoder stages to generate tensor data that is used to process the current upscaled frame in view of the aligned history to generate a high quality upscaled frame that has an image quality that is, at the least, equal to an image that is natively rendered at the target resolution. The features extracted are used to determine an optimized combination of the current and previous frames during temporal accumulation.

The neural network model can then generate an output frame via an output block of the neural network model via temporal accumulation using direct reconstruction or kernel prediction (4408). The output frame is an anti-aliased image that has a higher resolution than the rendering resolution of the render pipeline, with additionally generated pixels to enhance the image quality beyond that of the originally upscaled image. In one embodiment, the neural network model is configured as a direct reconstruction network which, via one or more convolution layers, generates a high-quality output image for display. When configured as a direct reconstruction network, the feature extraction network provides higher precision tensors (e.g., FP16, BF16) as input to the output block. The output block uses the higher precision output from the feature extraction network in combination with the higher precision output from the input block to generate the output image. In one embodiment, the neural network model is configured as a kernel prediction network that generates per-pixel kernel values that applied to a high-precision filter. When configured as a kernel prediction network, the feature extraction network provides power precision tenors (e.g., INT4, INT8) to the output block. The output block uses the lower precision output from the feature extraction network in combination with the higher precision output from the input block to predict the pre-pixel kernels/blend weights used to filter the upscaled input and blend the filtered input with the previous output.

Figure 45:
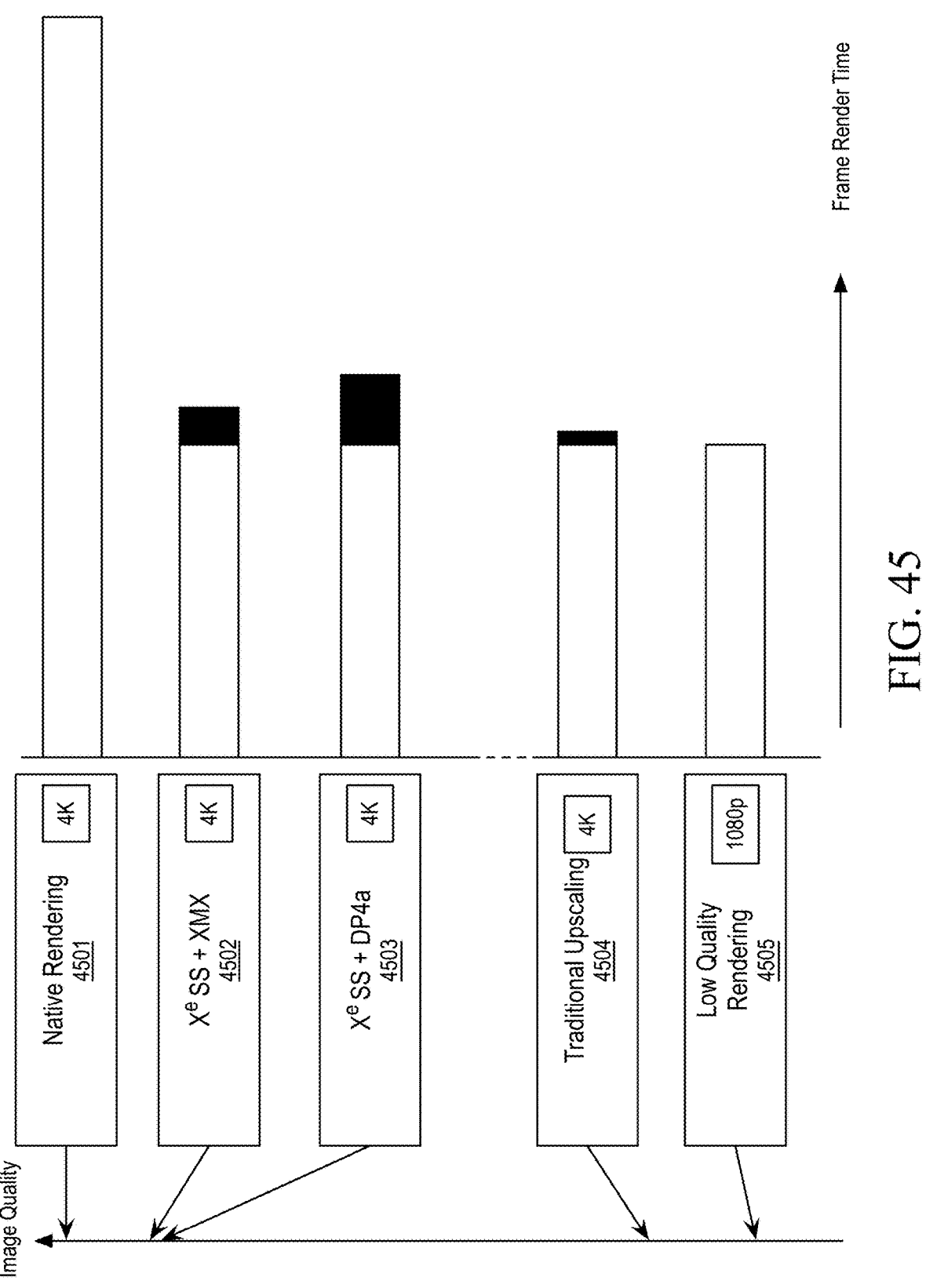
FIG. 45 illustrates exemplary rendering performance comparisons for multiple rendering techniques described herein.

FIG. 45 illustrates exemplary rendering performance comparisons for multiple rendering techniques described herein. Rendering time for a low-quality rendering 4505, for example, at 1080p resolution, is significantly lower than the rendering time for a high-quality rendering 4501, for example, at 4K resolution. Traditional upscaling 4504 (TAA Upsampling, Temporal Super Resolution, FidelityFX Super Resolution) renders frames at low resolution and the low-resolution image is upsampled to the target display resolution to achieve performance boost and potentially an image quality improvement over low-quality rendering 4505.

One implementation of temporally amortized supersampling using a mixed precision convolutional neural network is $X^e$ SS provided by Intel® Incorporated. $X^e$ SS can be performed on hardware that includes a matrix accelerator (e.g., tensor accelerator 2723) via the use of Intel $X^e$ Matrix Extensions (XMX). Rendering via $X^e$ SS+XMX 4502 can produce an image that is significantly higher quality that low quality rendering 4505 or traditional upscaling 4504 and with significantly lower rendering times than high quality rendering 4501 at native 4K resolutions. Rendering via $X^e$ SS+DP4a 4503 replaces XMX with a dot product instruction (DP4a) that can be executed by a variety of graphics processor architectures from a variety of vendors and results in a high-quality image and a rendering time that is still significantly lower than high quality rendering 4501 at native 4K resolutions. In one embodiment, $X^e$ SS+XMX 4502 is performed using direct reconstruction via output block 4320A of FIG. 43A, while $X^e$ SS+DP4a 4503 is performed using kernel prediction and filtering via output block 4320B of FIG. 43B.

Additional Exemplary Computing Device

Figure 46:
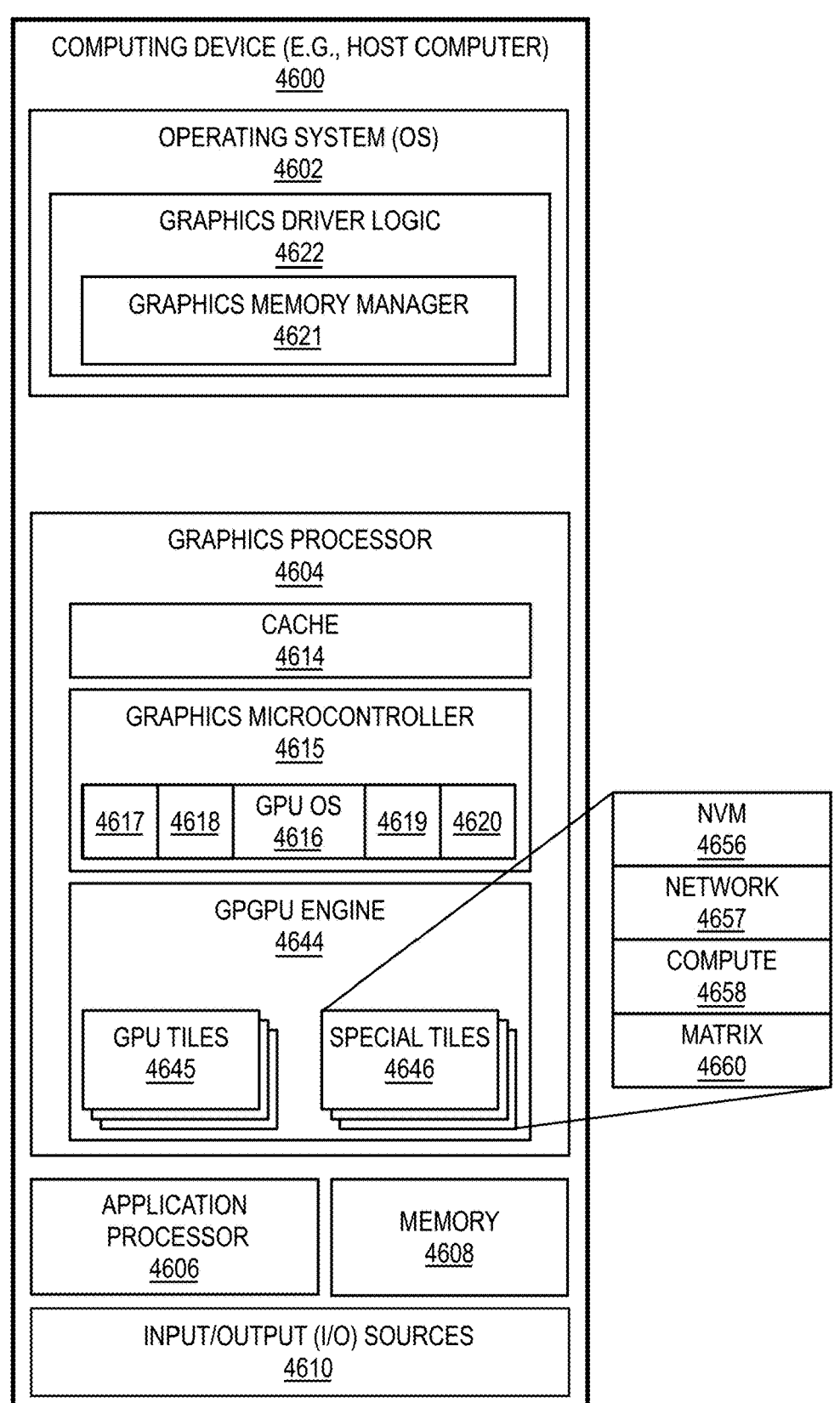
FIG. 46 is a block diagram of a computing device including a graphics processor, according to an embodiment.

FIG. 46 is a block diagram of a computing device 4600 including a graphics processor 4604, according to an embodiment. Versions of the computing device 4600 may be or be included within a communication device such as a set-top box (e.g., Internet-based cable television set-top boxes, etc.), global positioning system (GPS)-based devices, etc. The computing device 4600 may also be or be included within mobile computing devices such as cellular phones, smartphones, personal digital assistants (PDAs), tablet computers, laptop computers, e-readers, smart televisions, television platforms, wearable devices (e.g., glasses, watches, bracelets, smartcards, jewelry, clothing items, etc.), media players, etc. For example, in one embodiment, the computing device 4600 includes a mobile computing device employing an integrated circuit ("IC"), such as system on a chip ("SoC" or "SOC"), integrating various hardware and/or software components of computing device 4600 on a single chip. The computing device 4600 can be a computing device including components illustrated in the data processing system 2700 as in of FIG. 27.

The computing device 4600 includes a graphics processor 4604. The graphics processor 4604 represents any graphics processor described herein. In one embodiment, the graphics processor 4604 includes a cache 4614, which can be a single cache or divided into multiple segments of cache memory, including but not limited to any number of L1, L2, L3, or L4 caches, render caches, depth caches, sampler caches, and/or shader unit caches. In one embodiment the cache 4614 may be a last level cache that is shared with the application processor 4606.

In one embodiment the graphics processor 4604 includes a graphics microcontroller that implements control and scheduling logic for the graphics processor. The control and scheduling logic can be firmware executed by the graphics microcontroller 4615. The firmware may be loaded at boot by the graphics driver logic 4622. The firmware may also be programmed to an electronically erasable programmable read only memory or loaded from a flash memory device within the graphics microcontroller 4615. The firmware may enable a GPU OS 4616 that includes device management logic 4617 and driver logic 4618, and a scheduler 4619. The GPU OS 4616 may also include a graphics memory manager 4620 that can supplement or replace the graphics memory manager 4621 within the graphics driver logic 4622.

The graphics processor 4604 also includes a GPGPU engine 4644 that includes one or more graphics engine(s), graphics processor cores, and other graphics execution resources as described herein. Such graphics execution resources can be presented in the forms including but not limited to execution units, shader engines, fragment processors, vertex processors, streaming multiprocessors, graphics processor clusters, or any collection of computing resources suitable for the processing of graphics resources or image resources or performing general purpose computational operations in a heterogeneous processor. The processing resources of the GPGPU engine 4644 can be included within multiple tiles of hardware logic connected to a substrate, as illustrated in FIG. 24B-24D. The GPGPU engine 4644 can include GPU tiles 4645 that include graphics processing and execution resources, caches, samplers, etc. The GPU tiles 4645 may also include local volatile memory or can be coupled with one or more memory tiles, such as memory tiles 1626A-1626D as in FIG. 16B-16C.

The GPGPU engine 4644 can also include and one or more special tiles 4646 that include, for example, a non-volatile memory tile 4656, a network processor tile 4657, and/or a general-purpose compute tile 4658. The GPGPU engine 4644 also includes a matrix multiply accelerator 4660. The general-purpose compute tile 4658 may also include logic to accelerate matrix multiplication operations. The non-volatile memory tile 4656 can include non-volatile memory cells and controller logic. The controller logic of the non-volatile memory tile 4656 may be managed by one of device management logic 4617 or driver logic 4618. The network processor tile 4657 can include network processing resources that are coupled to a physical interface within the input/output (I/O) sources 4610 of the computing device 4600. The network processor tile 4657 may be managed by one or more of device management logic 4617 or driver logic 4618.

In one embodiment, the matrix multiply accelerator 4660 is a modular scalable sparse matrix multiply accelerator. The matrix multiply accelerator 4660 can includes multiple processing paths, with each processing path including multiple pipeline stages. Each processing path can execute a separate instruction. In various embodiments, the matrix multiply accelerator 4660 can have architectural features of any one of more of the matrix multiply accelerators described herein. For example, in one embodiment, the matrix multiply accelerator 4660 is a systolic array 3000 that is configurable to operate with a multiple of four number of logical stages (e.g., four, eight, twelve, sixteen, etc.). In one embodiment the matrix multiply accelerator 4660 includes one or more instances of a two-path matrix multiply accelerator 3100 with a four-stage pipeline or a four-path matrix multiply accelerator 3200 with a two-stage pipeline. In one embodiment the matrix multiply accelerator 4660 includes processing elements configured as a scalable sparse matrix multiply accelerator. The matrix multiply accelerator 4660 can be used to accelerate matrix operations performed via XMX extensions, or another compute library that facilitates the acceleration of matrix compute operations. For example, the matrix multiply accelerator 4660 can perform tensor computations for training or inference of the neural network models 4050, 4100 described herein.

As illustrated, in one embodiment, and in addition to the graphics processor 4604, the computing device 4600 may further include any number and type of hardware components and/or software components, including, but not limited to an application processor 4606, memory 4608, and input/output (I/O) sources 4610. The application processor 4606 can interact with a hardware graphics pipeline to share graphics pipeline functionality. Processed data is stored in a buffer in the hardware graphics pipeline and state information is stored in memory 4608. The resulting data can be transferred to a display controller for output via a display device. The display device may be of various types, such as Cathode Ray Tube (CRT), Thin Film Transistor (TFT), Liquid Crystal Display (LCD), Organic Light Emitting Diode (OLED) array, etc., and may be configured to display information to a user via a graphical user interface.

The application processor 4606 can include one or processors, such as processor(s) 102 of FIG. 1 and may be the central processing unit (CPU) that is used at least in part to execute an operating system (OS) 4602 for the computing device 4600. The OS 4602 can serve as an interface between hardware and/or physical resources of the computing device 4600 and one or more users. The OS 4602 can include driver logic for various hardware devices in the computing device 4600. The driver logic can include graphics driver logic 4622, which can include the user mode graphics driver 2326 and/or kernel mode graphics driver 2329 of FIG. 23. The graphics driver logic can include a graphics memory manager 4621 to manage a virtual memory address space for the graphics processor 4604. The graphics memory manager 4621 can facilitate a unified virtual address space that may be accessed by the application processor 4606 and the graphics processor 4604.

It is contemplated that in some embodiments the graphics processor 4604 may exist as part of the application processor 4606 (such as part of a physical CPU package) in which case, at least a portion of the memory 4608 may be shared by the application processor 4606 and graphics processor 4604, although at least a portion of the memory 4608 may be exclusive to the graphics processor 4604, or the graphics processor 4604 may have a separate store of memory. The memory 4608 may comprise a pre-allocated region of a buffer (e.g., framebuffer); however, it should be understood by one of ordinary skill in the art that the embodiments are not so limited, and that any memory accessible to the lower graphics pipeline may be used. The memory 4608 may include various forms of random-access memory (RAM) (e.g., SDRAM, SRAM, etc.) comprising an application that makes use of the graphics processor 4604 to render a desktop or 3D graphics scene. A memory controller hub, such as memory controller 1416 of FIG. 14, may access data in the memory 4608 and forward it to graphics processor 4604 for graphics pipeline processing. The memory 4608 may be made available to other components within the computing device 4600. For example, any data (e.g., input graphics data) received from various I/O sources 4610 of the computing device 4600 can be temporarily queued into memory 4608 prior to their being operated upon by one or more processor(s) (e.g., application processor 4606) in the implementation of a software program or application. Similarly, data that a software program determines should be sent from the computing device 4600 to an outside entity through one of the computing system interfaces, or stored into an internal storage element, is often temporarily queued in memory 4608 prior to its being transmitted or stored.

The I/O sources can include devices such as touchscreens, touch panels, touch pads, virtual or regular keyboards, virtual or regular mice, ports, connectors, network devices, or the like, and can attach via a platform controller hub 1430 as referenced in FIG. 14. Additionally, the I/O sources 4610 may include one or more I/O devices that are implemented for transferring data to and/or from the computing device 4600 (e.g., a networking adapter); or, for a large-scale non-volatile storage within the computing device 4600 (e.g., SSD/HDD). User input devices, including alphanumeric and other keys, may be used to communicate information and command selections to graphics processor 4604. Another type of user input device is cursor control, such as a mouse, a trackball, a touchscreen, a touchpad, or cursor direction keys to communicate direction information and command selections to GPU and to control cursor movement on the display device. Camera and microphone arrays of the computing device 4600 may be employed to observe gestures, record audio and video and to receive and transmit visual and audio commands.

The I/O sources 4610 can include one or more network interfaces. The network interfaces may include associated network processing logic and/or be coupled with the network processor tile 4657. The one or more network interface can provide access to a LAN, a wide area network (WAN), a metropolitan area network (MAN), a personal area network (PAN), Bluetooth, a cloud network, a cellular or mobile network (e.g., $3^{rd}$ Generation (3G), $4^{th}$ Generation (4G), $5^{th}$ Generation (5G), etc.), an intranet, the Internet, etc. Network interface(s) may include, for example, a wireless network interface having one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

Network interface(s) may provide access to a LAN, for example, by conforming to IEEE 802.11 standards, and/or the wireless network interface may provide access to a personal area network, for example, by conforming to Bluetooth standards. Other wireless network interfaces and/or protocols, including previous and subsequent versions of the standards, may also be supported. In addition to, or instead of, communication via the wireless LAN standards, network interface(s) may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

Sampling Across Multiple Views in Supersampling Operation

Temporally amortized supersampling is performed by combining the current frame and the previous output frame warped with the current motion vectors. Temporal Anti-aliasing (TAA) is an anti-aliasing technique in which the renderer jitters the camera every frame to sample different coordinates in screen space. The TAA stage accumulates these samples temporally to produce a supersampled image. The previously accumulated frame is warped using renderer generated velocity/motion vectors to align it with the current frame before accumulation.

In temporal supersampling, an operation is applied to an image and the image is transformed into a subsequent frame or timestep. Errors can be introduced in temporal processing in connection with the assumption that shading and colors don't change, and that changes are instead due to motion and resulting occlusion. However, this can be incorrect, such as in a circumstance in which shadows change in an image, and thus there may be a need to rely on the current frame for sampling. For this reason, supersampling can assist in improving image quality in gaming and other implementations through the additional of temporal data.

In some embodiments, supersampling is further enhanced through the application of data relating to multiple views that are captured at the same time (for example, stereo imaging including left and right images of a scene) in addition to the usage of temporal information in supersampling. Multiple viewpoints that spatially separated from each other may each provide different information regarding a viewed scene. The supersampling operation may utilize this additional spatial information to further improve image quality.

It is noted that multiple images captured of certain surfaces may look significantly different in each of the captured images. For example, a mirror may provide a very different surface at a different angle for each eye in a stereo image. However, this is a known issue in general for processing of stereo images, and thus can be addressed using known filter techniques.

Figure 47:
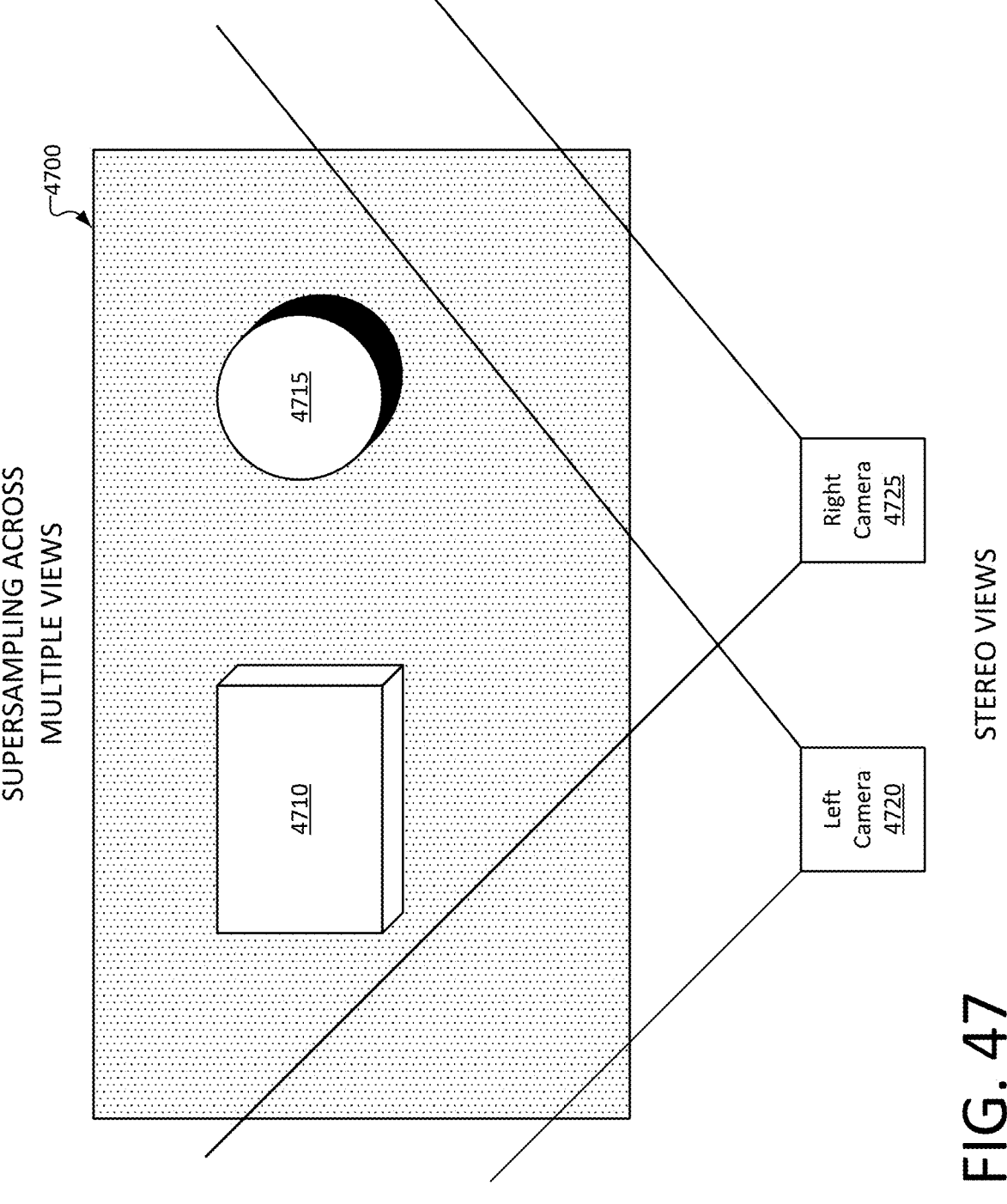
FIG. 47 is an illustration of multiple views in supersampling, according to some embodiments.

FIG. 47 is an illustration of multiple views in supersampling, according to some embodiments. In this example, image data in supersampling is collected across multiple views. For example, the multiple views are rendered with respect to multiple cameras, which in this example are stereo cameras, shown as a left camera 4720 at a first virtual position and a right camera 4725 at a second virtual position. The cameras refer to viewpoints in the rendering of virtual image data. It is noted that FIG. 47 and the following drawings are not drawn to scale, and the locations of the cameras/viewpoints in relation to each other may not be locations that are utilized in an actual implementation. In a particular implementation, the camera/viewpoint locations may reflect the relative alignment of the eyes of a viewer.

In some embodiments, supersampling is performed across multiple views of a scene 4700 from that vantage point of the cameras 4720 and 4725, which may in particular be across stereo views. The viewpoints are separated from each other, but are sufficient near to each other to capture overlapping views. The supersampling across views allows for application of additional data in sampling to improve results, where the additional data may include disparity data that represents a difference in viewing position of a point in multiple frames captured from the multiple viewpoints. The examples provided herein generally describe and illustrate a system with two cameras/viewpoints, but embodiments are not limited to this number, and can includes any number of viewpoints. In addition, for simplicity of illustration the cameras/viewpoints may be shown as being displaced in a horizontal direction, but embodiments may include cameras are displaced from each other in a horizontal direction, a vertical direction, or both directions.

In FIG. 47, the particular scene 4700 may include any number of objects and background elements, such as the illustrated objects 4710 and 4715. In this example, the scene 4700 is rendered from two (or more) different viewpoints, which are shown as the left camera 4720 (a first viewpoint) and the right camera 4725 (a second viewpoint), the viewpoints represented by the left camera 4720 and right camera 4725, which contain overlap in viewing, being utilized to render stereo views of the scene 4700. In particular, objects 4710 and 4715 are both visible from each of the cameras 4720 and 4725.

If there are multiple images generated from different locations, as in generation of stereo images, there will be redundancies and disparities in the multiple images. In FIG. 47, there will be differences between the image generated from the left camera 4720 and the right camera 4725. As with motion vectors that are calculated for image data, vectors can be computed between the multiple (left/right) images. There may be differences between the multiple captured images including possible mismatch between colors from the different viewpoints, but an operation can be confident that, although shading may differ, the lighting and scene geometry has remained constant in the multiple images as the images are rendered for a same scene at a same time.

As a result, the multiple views 4720-4725 may be utilized to provide supersampling spatially, providing more information than temporal supersampling alone can provide. In some embodiments, a set of processing resources are to combine temporal and spatial supersampling to provide an improved process.

Figure 48:
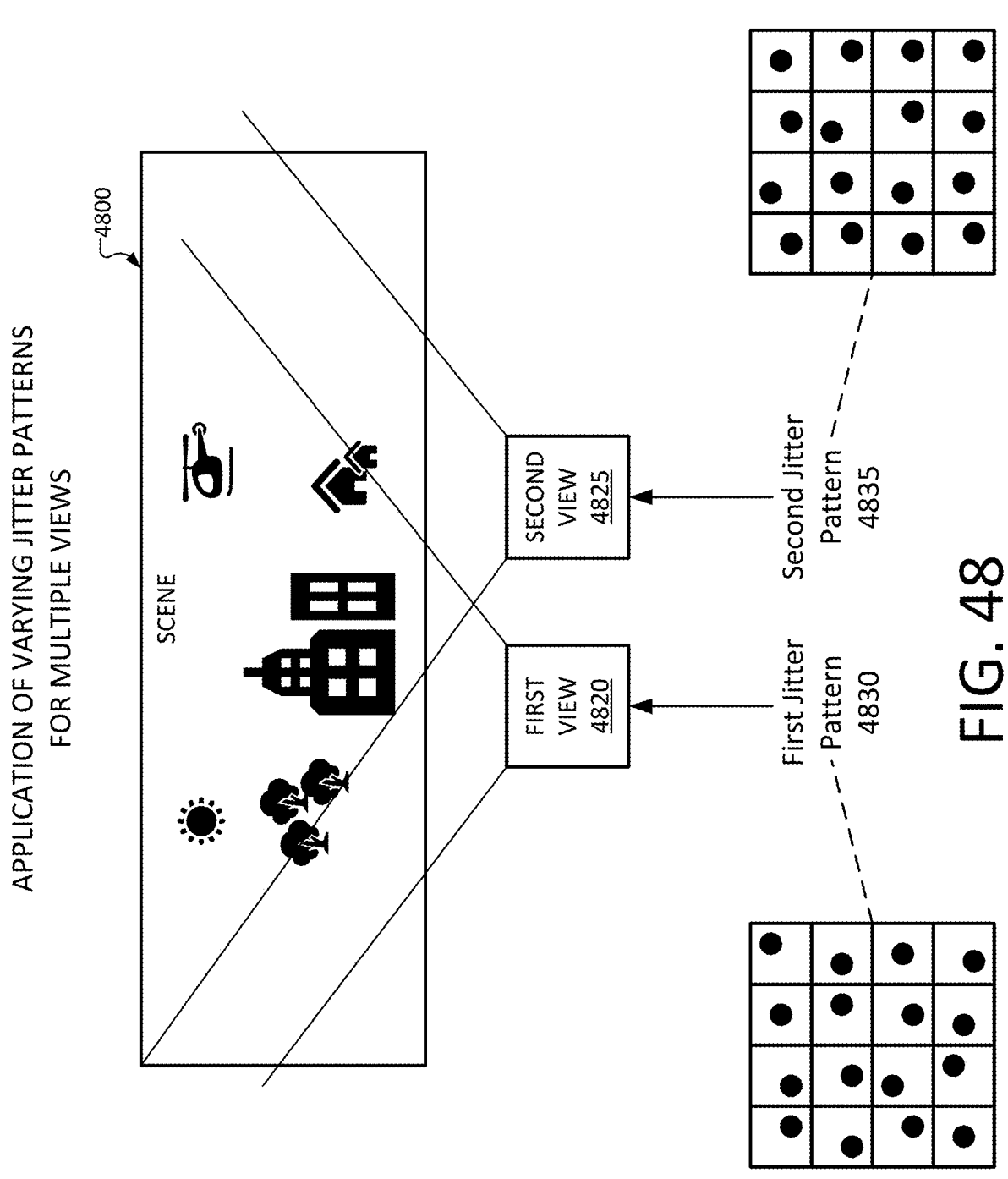
FIG. 48 illustrates application of varying jitter patterns from multiple views for supersampling, according to some embodiments.

FIG. 48 illustrates application of varying jitter patterns from multiple views for supersampling, according to some embodiments. The temporal supersampling operation relies on camera jitter, with each frame providing a slightly different view of the same scene over time. This can be expanded and improved with the addition of multiple/stereo images that are not fully correlated with each other.

With multi-view rendering, it is possible to apply an independent (different) jitter pattern or sequence (jitter vector) for each of different views to increase the effectiveness of spatial supersampling after the reprojection across views. In this example, a first jitter pattern 4830 is applied to a first view 4820 of a particular scene 4800 and a second jitter pattern 4835 is applied to a second view of the scene 4800, thereby providing addition spatial data for supersampling operation. In this example, each jitter pattern 4830-4835 is presented as a particular sample location for each pixel (shown as a 4×4 set of pixels for a simplified illustration) at a particular time. The location of the samples for each pixel may vary over time, such in a pseudo-random or other sequence. In this manner, each camera may see different details in a rendered image, which may be applied to provide for more effective supersampling of each image. The combination of the multiple images results in the inclusion of the additional data.

While stereo imaging may be the most common example in which an embodiment is implemented, embodiments are not limited to this example. The concept may also be applied to other examples in which there are multiple images that are displaced spatially from each other but are similar enough to each other to be of use in sampling.

In some embodiments, a graphics processor includes a set of processing resources configured to perform a supersampling operation via one or more convolutional neural networks (CNNs), the set of processing resources including circuitry configured to receive for processing a set of image data, the image data including data across multiple views; and perform supersampling processing utilizing the set of image data, wherein image data for a first view of the multiple views includes a first jitter pattern and image data for a second view of the multiple views includes a second, different jitter pattern. It is noted that the one or more neural networks in varying implementations may include, for example, multiple neural networks, which may include a neural network for each of multiple views, or a single neural network providing for all supersampling operations in a processing pipeline.

Figure 49:
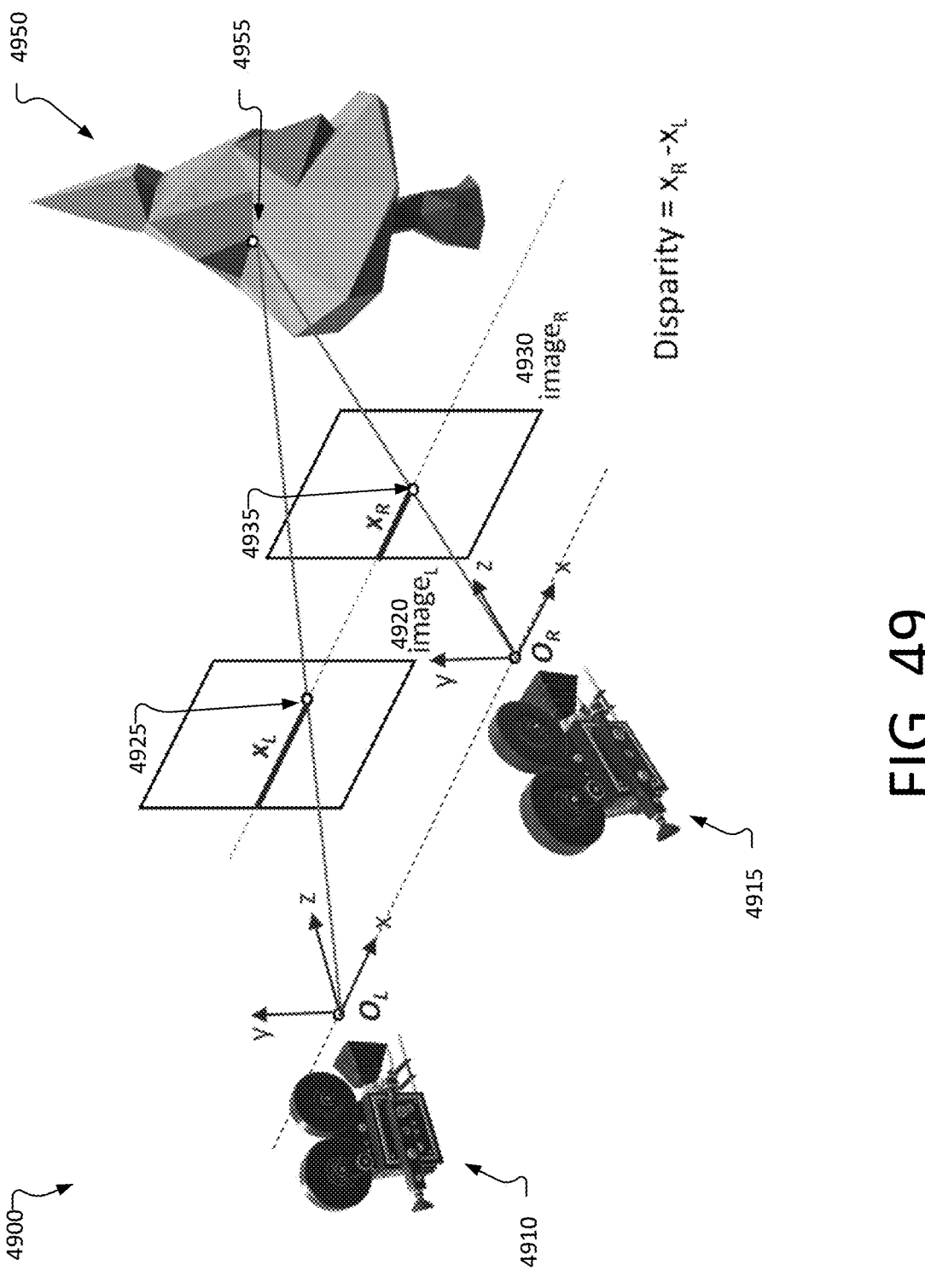
FIG. 49 is an illustration of disparity information utilized in processing of data from multiple views for supersampling, according to some embodiments.

FIG. 49 is an illustration of disparity information utilized in processing of data from multiple views for supersampling, according to some embodiments. As illustrated in FIG. 49, a system 4900 includes multiple cameras/viewpoints in relation to a rendered image, illustrated as a left (first) camera 4910 and a right (second) camera 4915 that are separated/displaced from each other. However, embodiments are not limited to a particular number of viewpoints, and may include any number of views. In a particular embodiment, the vectors for the multiple viewpoints are horizontal in relation to each other (in line along an x-axis), with little or no vertical difference. This may apply in a stereo vision implementation with the vectors representing two eyes of a viewer, with the views that are generally on a same horizontal plane.

In a particular example, a rendered image 4950 may be viewed in relation to the left camera 4910 and the right camera 4915. In particular, a point 4955 within the tendered image 4950 is viewed, the point 4955 being viewed at a first view location 4925 within a first image (Image$_L$) 4920 in relation to the left camera 4910 and at a second view location 4935 within a second image (Image$_R$) 4930 in relation to the second camera 4915. The view locations 4925 and 4935 will be displaced from each other by a certain disparity. For example, the first view location 4925 has an X value of X$_L$ and the second view location 4935 has an X value of X$_R$, resulting in a disparity that may be calculated as a difference between these values (Disparity=X$_R$–X$_L$). In this example, the disparity is along the horizontal axis as the viewpoints are aligned with each other horizontally. In some embodiments, determined disparity values may be stored in a disparity buffer for use in supersampling calculation.

Disparity information, such as between view locations 4925 and 4935, may be determined analytically with rendered images because the precise location of the point will be known in the image rendering, and an algebraic solution for the point location in each frame can be determined. In this embodiment, a disparity buffer includes calculated data describing how, for example, a pixel for the left eye projects to the right eye. In comparison, the disparity determination is a less intensive calculation than velocity determination for the velocity buffer.

In some embodiments, the cameras/viewpoints are geometrically aligned with each other in a fixed relationship. For example, the cameras may be fixed at a distance and alignment that reflects the relationship between the eyes of a viewer. This results in a certain specific disparity between the view locations in the respective frames. However, embodiments may include the application of different jitter patterns to each camera, as illustrated in FIG. 48. In this case, rather than being limited to a horizontal displacement, the displacement may be in both vertical and horizontal directions, depending on the sequence of jittering that is applied to each of the cameras. In this manner, additional spatial information is available for supersampling processing.

Figure 50:
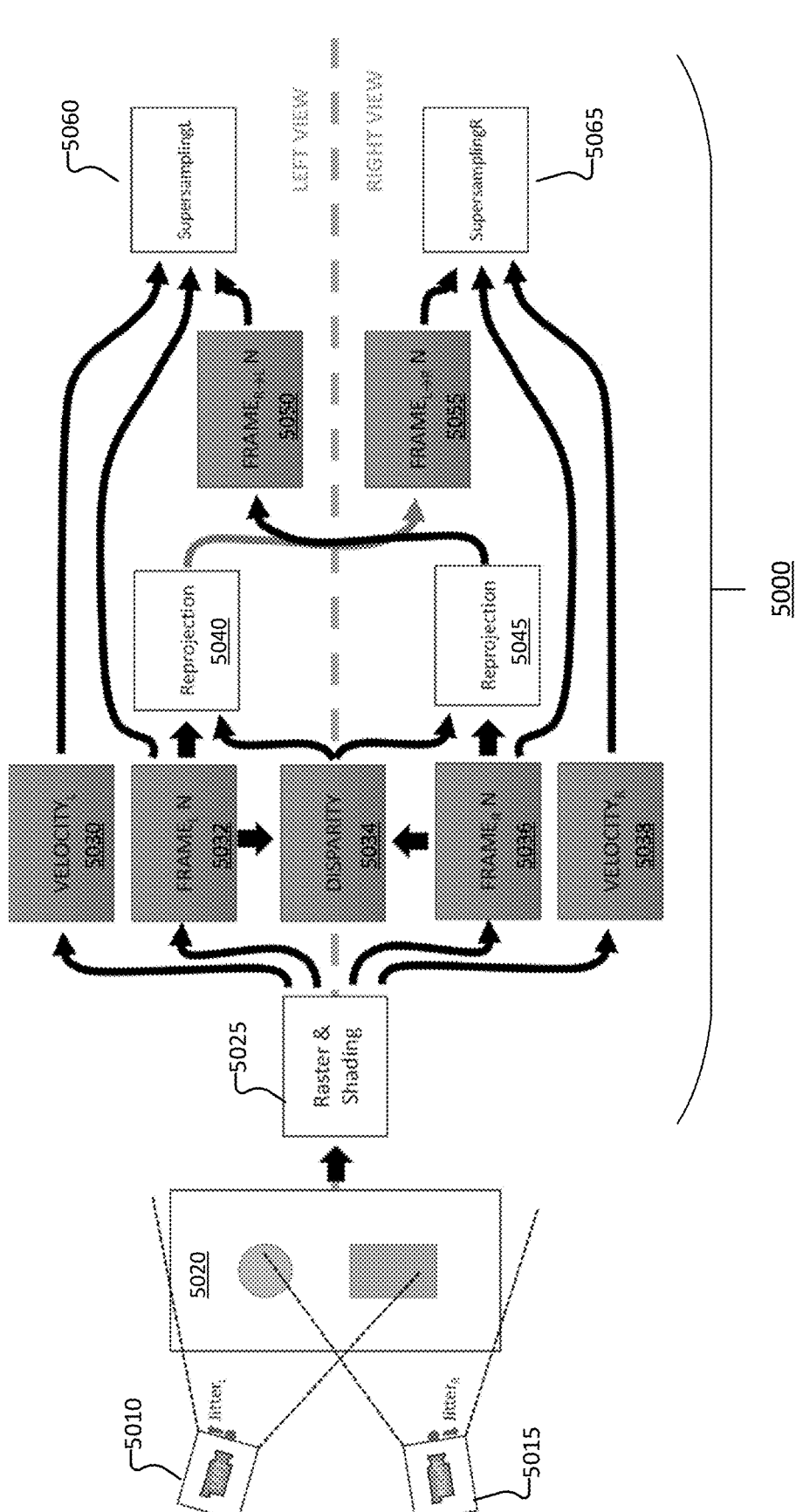
FIG. 50 is an illustration of an example processing flow for a stereoscopic rendering pipeline, according to some embodiments.

FIG. 50 is an illustration of an example processing flow for a stereoscopic rendering pipeline, according to some embodiments. As shown in FIG. 50, multiple cameras/viewpoints capture views of a rendered scene 5020 for processing in a rendering pipeline 5000. In this particular example, the multiple cameras includes two cameras for stereoscopic viewing, the cameras including a first left camera 5010 and a second right camera 5015 Each camera receives a jitter pattern, the left camera 5010 receiving a first jitter pattern (Jitter$_L$) and the right camera 4915 receiving a second jitter pattern (Jitter$_R$), where in some embodiments the jitter patterns are independent of each other, such as illustrated in FIG. 48.

Utilizing raster and shading data 5025 from the captured images, frame data, velocity data, and disparity data are generated representing the images. With two cameras, the data comprises a current left frame (Frame$_L$ N) 5032 and a current right frame (Frame$_R$ N) 5036; velocity data for the left frame (Velocity$_L$) in velocity buffer 5030 and velocity data for the right frame (Velocity$_R$) in velocity buffer 5038;

and disparity data (Disparity) in disparity buffer 5034 representing a disparity between the left and right frames (such as illustrated in FIG. 49).

As further shown in FIG. 50, the left and right camera images from the current left frame 5032 and the current right frame 5036 are reprojected across each other using the computed disparity buffer 5034. This is illustrated as reprojection 5040 from the left view generating Frame$_{L \to R}$ N (5055) for the right view and reprojection 5045 from the right view generating Frame$_{R \to L}$ N (5050) for the right view. The reprojected frames 5050 and 5055 can be then used to enhance the details of the supersampling stage. In this example the supersampling is performed independently for each view, illustrated as Supersampling$_L$ for the left view and Supersampling$_R$ for the right view. However, in other embodiments the image data from the left and right views may be processed with joint supersampling for the multiple views.

Certain additional details for the processing pipeline may be as illustrated in FIGS. 39 and 40.

Figure 51:
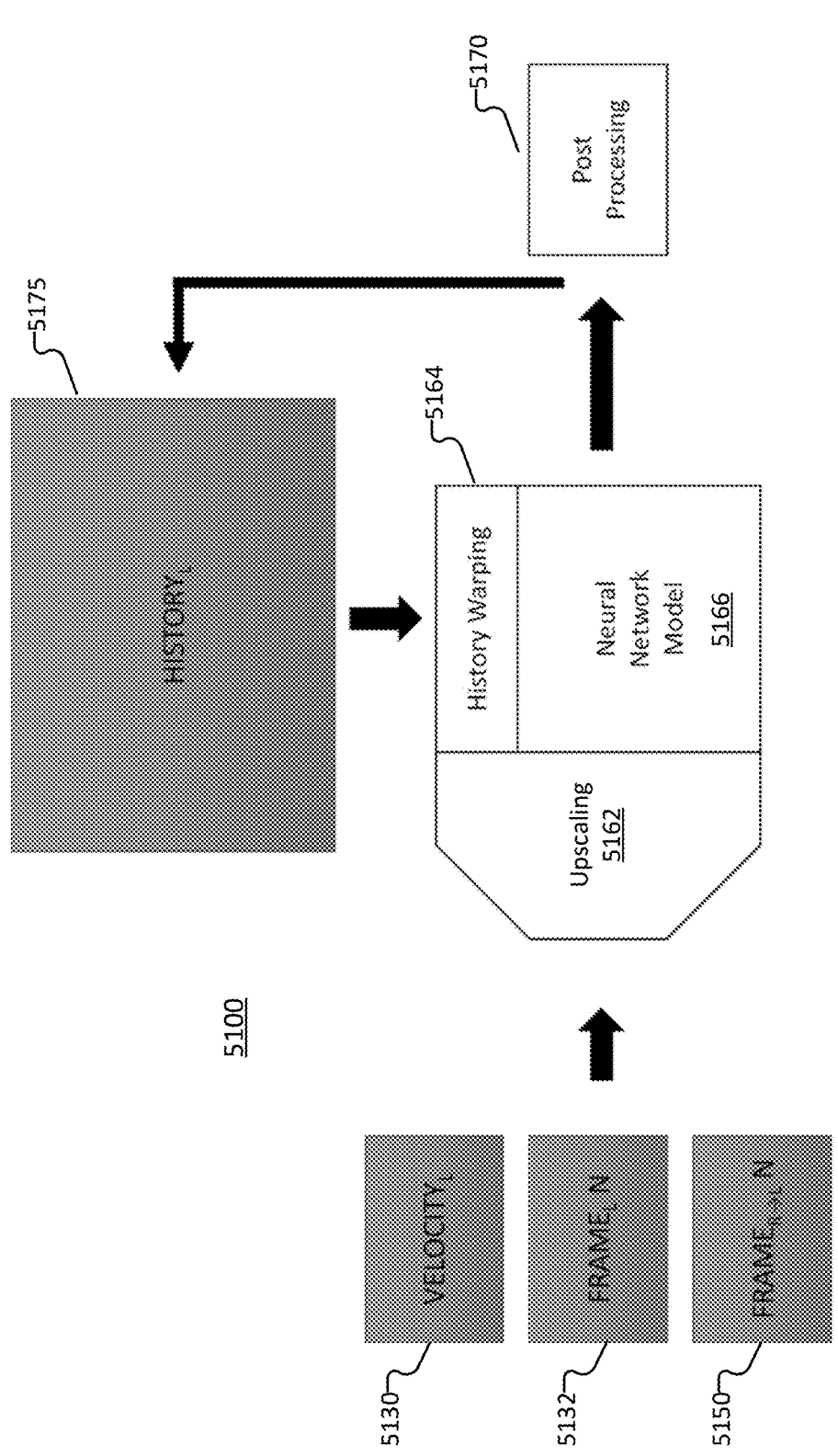
FIG. 51 is an illustration of a supersampling stage in a processing pipeline, according to some embodiments.

FIG. 51 is an illustration of a supersampling stage in a processing pipeline, according to some embodiments. FIG. 51 illustrates a possible implementation of supersampling stage circuitry for one of multiple views in a system. The illustration in particular provides a supersampling stage 5100 for a left view in a stereoscopic viewing system, where a supersampling stage for a right view in the stereoscopic viewing system may be identical or similar to the illustrated stage.

As provided in FIG. 51, Velocity$_L$ 5130, current frame Frame$_L$ N 5132, and reconstructed right frame Frame$_{R \to L}$ N 5150 are received for processing in the supersampling stage 5100. In some embodiments, data is upsampled in an upsampling stage 5162, which may be implemented when images are rendered at a lower than target resolution, with the upscaling stage being applied to the rendered images to upscale the image to the target resolution. The upscaling stage is optional for superresolution techniques.

In some embodiments, a neural network 5166 uses the current frame 5132, the reprojected right frame 5150, and a previously reconstructed frame History$_L$ 5175 (in a history buffer) in supersampling, as warped by history warping 5164. It is noted that the history buffer 5175 in this example is depicted as being at the higher target resolution. The output from the neural network 5166 is then presented to post processing 5170 at the target resolution.

Figure 52:
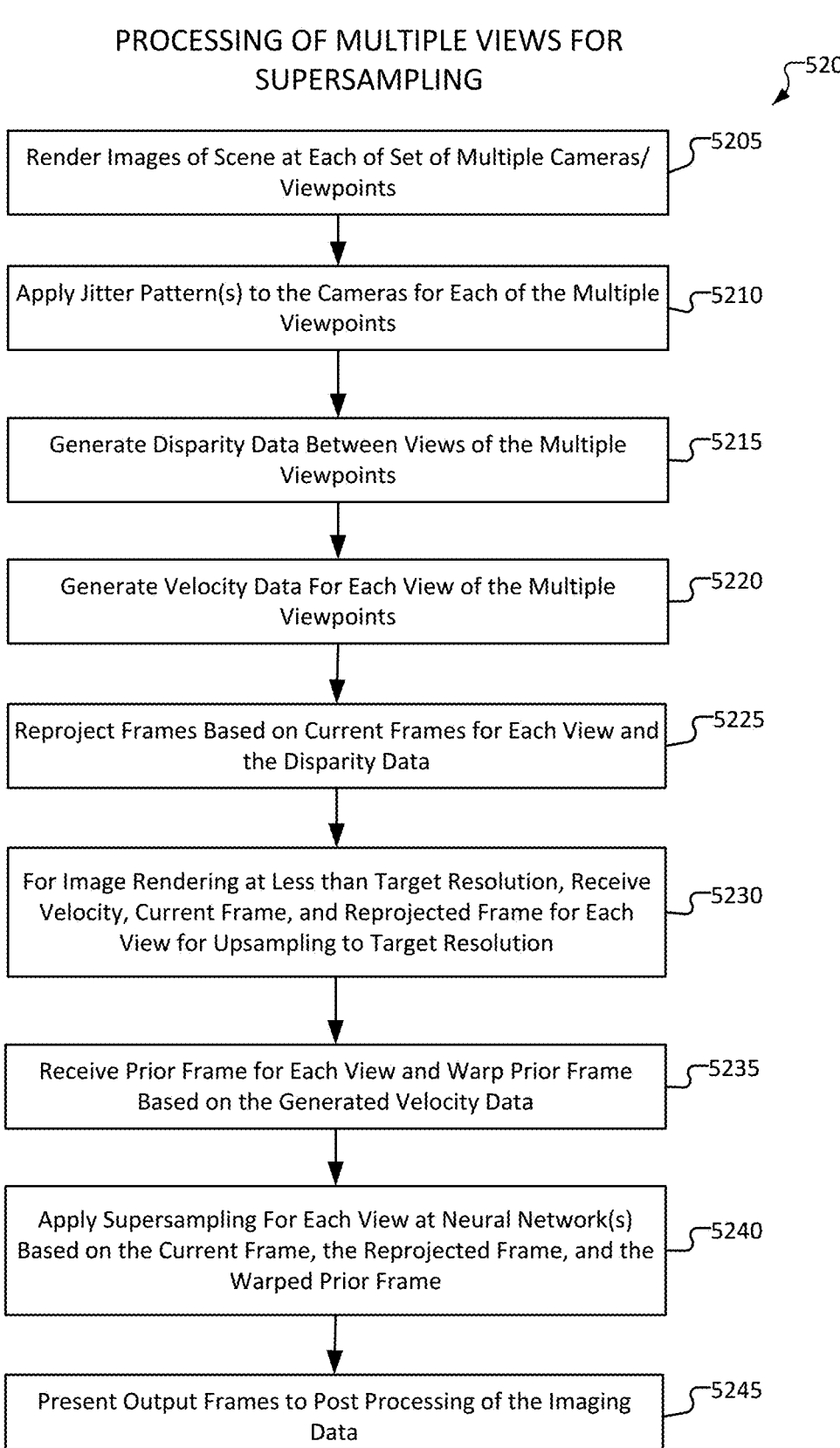
FIG. 52 is a flowchart to illustrated processing of data from multiple views for supersampling, according to an embodiment.

FIG. 52 is a flowchart to illustrated processing of data from multiple views for supersampling, according to an embodiment. In some embodiments, a process 5200 includes capturing images of a rendered scene at each of multiple cameras/viewpoints 5205, which may include a left camera and a right camera in a particular example of a stereoscopic viewing apparatus or system. In some embodiments, a jitter pattern is applied to each of the cameras for each of the multiple viewpoints 5210, which may include applying independent jitter patterns to each of the multiple cameras.

The process 5200 further includes generating disparity data, such as in a disparity buffer, between the views of the multiple viewpoints 5215, such as a disparity buffer representing differences between a current frame for a left view and a current frame for a right view in a stereoscopic viewing implementation. Velocity data may also be generated for each of the multiple views 5220. In some embodiments, the current frame for each view and the disparity data are used to reproject frames to the other views of the multiple frames 5225. For example, the current left frame and the disparity data are used to generate a reprojected frame for the right view, and the current right frame and the disparity data are used to generate a reprojected frame for the left view.

In some embodiments, in implementations in which image data is rendered at a resolution that is less than a target resolution, the velocity, current frame, and reprojected frame for each view are upsampled to the target resolution 5230. Further, a prior (historical) frame is received and warped based on the velocity data to align the prior frame with the current frame before accumulation 5235.

Supersampling is then applied for each view at one or more neural networks based on the current frame, the projected frame, and the warped prior frame 5240, thereby implementing supersampling that is based on both temporal and spatial variations to further improve imaging results. The output image frames may then be presented to post processing of the imaging data 5245.

The following Examples pertain to certain embodiments:

In Example 1, an apparatus includes one or more processing resources configured to perform a supersampling operation for image data generated for a plurality of views, the supersampling operation utilizing one or more neural networks, the one or more processing resources including at least a first circuitry to process a first current frame including first image data generated for a first view of the plurality of views, and a second circuitry to process a second current frame including second image data generated for a second view of the plurality of views, the first view and second view being displaced from each other, wherein the one or more processing resources are to receive for processing the first current frame generated for the first view and the second current frame generated for the second view, and perform supersampling processing utilizing the one or more neural networks based on at least the first current frame and the second current frame and one or more prior generated frames for each of the plurality of views.

In Example 2, the one or more processing resources are further to generate disparity data, the disparity data including data representing a difference between the first image data and the second image data; and reproject a current frame for each of the plurality of views based on the current frame and the disparity data, wherein the supersampling processing further utilizes the reprojected frame for each of the plurality of views.

In Example 3, the apparatus further comprises a disparity buffer to store the disparity data.

In Example 4, the apparatus further comprises an upsampling stage to upsample data provided to the one or more neural networks, wherein upsampling stage is configured to upsample image data from an initial resolution to a target resolution.

In Example 5, generation of the image data for the first view includes application of a first jitter pattern and generation of the image data for the second view includes application of a second jitter pattern, the first jitter pattern and the second jitter pattern being independent of each other.

In Example 6, the one or more processing resources are further to generate velocity data for the imaging data, and wherein the one or more processing resources are further to warp the one or more prior generated frames for the plurality of views based on the velocity data.

In Example 7, the one or more processing resources are to combine temporal supersampling and spatial supersampling.

In Example 8, the first view and the second view comprise a left view and a right view for stereoscopic viewing.

In Example 9, one or more computer-readable storage mediums having stored thereon executable computer program instructions that, when executed by one or more processors, cause the one or more processors to perform operations comprising: generating frames of image data generated for a plurality of views of a rendered scene in a graphics system; receiving for processing in the graphics system a first current frame including first image data generated for a first view of the plurality of views and a second current frame including second image data generated for a second view of the plurality of views; and performing supersampling processing utilizing one or more neural networks based on at least the first current frame and the second current frame and one or more prior generated frames for each of the plurality of views.

In Example 10, the instructions further include instructions for generating disparity data, the disparity data including data representing a difference between the first image data and the second image data; and reprojecting a current frame for each of the plurality of views based on the current frame and the disparity data, wherein the supersampling processing further utilizes the reprojected frame for each of the plurality of views.

In Example 11, the instructions further include instructions for upsampling image data provided to the one or more neural networks, wherein upsampling stage is configured to upsample the image data from an initial resolution to a target resolution.

In Example 12, generating the frames for the first view includes application of a first jitter pattern and generating the frames for the second view includes application of a second jitter pattern, the first jitter pattern and the second jitter pattern being independent of each other.

In Example 13, the instructions further include instructions for generating velocity data for the imaging data; and warping the one or more prior generated frames for the plurality of views based on the velocity data.

In Example 14, the supersampling combines temporal supersampling and spatial supersampling.

In Example 15, a method includes generating frames for a plurality of views of a rendered scene in a graphics system; receiving for processing in the graphics system a first current frame including first image data generated for a first view of the plurality of views and a second current frame including second image data generated for a second view of the plurality of views; and performing supersampling processing utilizing one or more neural networks based on at least the first current frame and the second current frame and one or more prior generated frames for each of the plurality of views.

In Example 16, the method further includes generating disparity data, the disparity data including data representing a difference between the first image data and the second image data; and reprojecting a current frame for each of the plurality of views based on the current frame and the disparity data, wherein the supersampling processing further utilizes the reprojected frame for each of the plurality of views.

In Example 17, the method further includes upsampling image data provided to the one or more neural networks, wherein upsampling stage is configured to upsample the image data from an initial resolution to a target resolution.

In Example 18, generating the frames for the first view includes application of a first jitter pattern and generating the frames for the second view includes application of a second jitter pattern, the first jitter pattern and the second jitter pattern being independent of each other.

In Example 19, the method further includes generating velocity data for the imaging data; and warping the one or more prior generated frames for the plurality of views based on the velocity data.

In Example 20, the supersampling combines temporal supersampling and spatial supersampling.

In Example 21, an apparatus includes means for generating frames of image data generated for a plurality of views of a rendered scene in a graphics system; means for receiving for processing in the graphics system a first current frame including first image data generated for a first view of the plurality of views and a second current frame including second image data generated for a second view of the plurality of views; and means for performing supersampling processing utilizing one or more neural networks based on at least the first current frame and the second current frame and one or more prior generated frames for each of the plurality of views.

In Example 22, the apparatus further includes means for generating disparity data, the disparity data including data representing a difference between the first image data and the second image data; and means for reprojecting a current frame for each of the plurality of views based on the current frame and the disparity data, wherein the supersampling processing further utilizes the reprojected frame for each of the plurality of views.

In Example 23, the apparatus further includes means for upsampling image data provided to the one or more neural networks, wherein upsampling stage is configured to upsample the image data from an initial resolution to a target resolution.

In Example 24, generating the frames for the first view includes application of a first jitter pattern and generating the frames for the second view includes application of a second jitter pattern, the first jitter pattern and the second jitter pattern being independent of each other.

In Example 25, the apparatus further includes means for generating velocity data for the imaging data; and means for warping the one or more prior generated frames for the plurality of views based on the velocity data.

In Example 26, the supersampling combines temporal supersampling and spatial supersampling.

It is to be appreciated that a lesser or more equipped system than the example described above may be preferred for certain implementations. Therefore, the configuration of the computing devices described herein may vary from implementation to implementation depending upon numerous factors, such as price constraints, performance requirements, technological improvements, or other circumstances. Examples include (without limitation) a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

One embodiment provides a graphics processor comprising a set of processing resources configured to perform a supersampling anti-aliasing operation via a mixed precision convolutional neural network. The set of processing resources includes circuitry configured to receive, at an input block of a neural network model, a set of data including previous frame data, current frame data, and velocity data. The previous frame data includes one or more previously generated output frames. The current frame data includes output of a raster and lighting stage of a render pipeline. The velocity data includes motion vectors generated by the render pipeline. The circuitry can pre-process the set of data to generate pre-processed data, provide first pre-processed data to a feature extraction network of the neural network model and provide second-processed data to an output block of the neural network model. The first pre-processed data is provided at a first precision, such as a two-bit, four-bit, or eight-bit integer precision. The second pre-processed data is provided at a second precision that is higher than the first precision, such as a 16-bit floating point precision.

The circuitry can process the first pre-processed data at the feature extraction network via one or more encoder stages and one or more decoder stages, output tensor data from the feature extraction network to the output block, and generate an output frame via the output block based on the second pre-processed data from the input block and the tensor data output from the feature extraction network. The generated output frame is an anti-aliased frame. To generate the pre-processed data includes to warp the previous frame data based on the velocity data to generate warped history data, align the warped history data with the current frame data to generate aligned history data, and shuffle the aligned history data and current frame data from a spatial dimension to a channel dimension. The channel dimension includes a depth channel or multiple feature map channels.

In one embodiment, to generate an output frame via the output block includes to generate the output frame via one or more convolution layers of the output block. In one embodiment, to generate an output frame via the output block includes to predict a set of per-pixel kernel values and blend weights, filter the current frame data via the per-pixel kernel values, and blend the aligned history data with filtered current frame data. In one embodiment, the circuitry is configured to upscale the output of the raster and lighting stage from a first resolution to a second resolution that is higher than the first resolution before the current frame data is provided to the input block of the neural network model. In one embodiment, the output of the raster and lighting stage is upscaled during pre-processing.

An additional embodiment provides a method to perform the operations of the graphics processor described above. A further embodiment provides a data processing system including the graphics processor described above.

The foregoing description and drawings are to be regarded in an illustrative rather than a restrictive sense. Persons skilled in the art will understand that various modifications and changes may be made to the embodiments described herein without departing from the broader spirit and scope of the features set forth in the appended claims.

What is claimed is:

1. An apparatus comprising:

processing circuitry having one or more processing resources configured to perform a supersampling operation for image data generated for a plurality of views, the supersampling operation utilizing one or more neural networks, the one or more processing resources to:

process a first current frame including first image data generated for a first view of the plurality of views, and process a second current frame including second image data generated for a second view of the plurality of views, the first view and second view being displaced from each other;

generate disparity data, the disparity data including data representing a difference between the first image data and the second image data, wherein the disparity data is stored using a disparity buffer; and perform supersampling processing utilizing the one or more neural networks based on at least the first current frame and the second current frame and one or more prior generated frames associated with one or more of the plurality of views, wherein supersampling is performed based on reprojection of one or more current frames associated with the one or more of the plurality of views.

2. The apparatus of claim 1, wherein the one or more processing resources are further to:

re-project the one or more current frame associated with the one or more of the plurality of views based on the current frame and the disparity data, wherein the supersampling processing further utilizes the reprojected frame associated with the one or more of the plurality of views.

3. The apparatus of claim 2, wherein the one or more processing resources are further to:

receive for processing the first current frame generated for the first view and the second current frame generated for the second view; and upsample data provided to the one or more neural networks, wherein to upsample data includes to upsample image data from an initial resolution to a target resolution.

4. The apparatus of claim 1, wherein the first image data for the first view is generated to include application of a first jitter pattern, and wherein the second image data for the second view is generated to include application of a second jitter pattern, the first jitter pattern and the second jitter pattern being independent of each other.

5. The apparatus of claim 1, wherein the one or more processing resources are further to generate velocity data for the first and second image data, and wherein the one or more processing resources are further to warp the one or more prior generated frames for the plurality of views based on the velocity data, and to combine temporal supersampling and spatial supersampling.

6. The apparatus of claim 1, wherein the first view and the second view comprise a left view and a right view, respectively for stereoscopic viewing, wherein the processing circuitry is coupled to a memory, the processing circuitry comprising one or more of graphics processing circuitry or application processing circuitry.

7. At least one non-transitory computer-readable medium having stored thereon instructions which, when executed, cause a computing device to perform operations comprising:

processing a first current frame including first image data generated for a first view of a plurality of views, and processing a second current frame including second image data generated for a second view of the plurality of views, the first view and second view being displaced from each other;

generate disparity data, the disparity data including data representing a difference between the first image data and the second image data, wherein the disparity data is stored using a disparity buffer; and performing supersampling processing utilizing one or more neural networks based on at least the first current frame and the second current frame and one or more prior generated frames associated with one or more of the plurality of views, wherein supersampling is performed based on reprojection of one or more current frames associated with the one or more of the plurality of views.

8. The non-transitory computer-readable medium of claim 7, wherein the operations further comprise:

re-projecting the one or more current frame associated with the one or more of the plurality of views based on the current frame and the disparity data, wherein the supersampling processing further utilizes the reprojected frame associated with the one or more of the plurality of views.

9. The non-transitory computer-readable medium of claim 8, wherein the operations further comprise:

receiving for processing the first current frame generated for the first view and the second current frame generated for the second view; and upsampling data provided to the one or more neural networks, wherein upsampling includes upsampling image data from an initial resolution to a target resolution.

10. The non-transitory computer-readable medium of claim 7, wherein the first image data for the first view is generated to include application of a first jitter pattern, and wherein the second image data for the second view is generated to include application of a second jitter pattern, the first jitter pattern and the second jitter pattern being independent of each other.

11. The non-transitory computer-readable medium of claim 7, wherein the operations further comprise generating velocity data for the first and second image data, and wherein the operations further comprise warping the one or more prior generated frames for the plurality of views based on the velocity data, and to combine temporal supersampling and spatial supersampling.

12. The non-transitory computer-readable medium of claim 7, wherein the first view and the second view comprise a left view and a right view, respectively for stereoscopic viewing, wherein the computing device comprises processing circuitry coupled to a memory, the processing circuitry having one or more of graphics processing circuitry or application processing circuitry.

13. A method comprising:

processing, by a computing device, a first current frame including first image data generated for a first view of a plurality of views, and processing a second current frame including second image data generated for a second view of the plurality of views, the first view and second view being displaced from each other;

generate disparity data, the disparity data including data representing a difference between the first image data and the second image data, wherein the disparity data is stored using a disparity buffer; and performing supersampling processing utilizing one or more neural networks based on at least the first current frame and the second current frame and one or more prior generated frames associated with one or more of the plurality of views, wherein supersampling is performed based on reprojection of one or more current frames associated with the one or more of the plurality of views.

14. The method of claim 13, further comprising:

receiving for processing the first current frame generated for the first view and the second current frame generated for the second view; and upsampling data provided to the one or more neural networks, wherein upsampling includes upsampling image data from an initial resolution to a target resolution.

15. The method of claim 13, wherein the first image data for the first view is generated to include application of a first jitter pattern, and wherein the second image data for the second view is generated to include application of a second jitter pattern, the first jitter pattern and the second jitter pattern being independent of each other.

16. The computer-readable medium of claim 7, further comprising generating velocity data for the first and second image data, and wherein the operations further comprise warping the one or more prior generated frames for the plurality of views based on the velocity data, and to combine temporal supersampling and spatial supersampling.

17. The computer-readable medium of claim 7, wherein the first view and the second view comprise a left view and a right view, respectively for stereoscopic viewing, wherein the computing device comprises processing circuitry coupled to a memory, the processing circuitry having one or more of graphics processing circuitry or application processing circuitry.

* * * * *